(12) United States Patent
Zhu et al.

(10) Patent No.: US 12,464,380 B2
(45) Date of Patent: Nov. 4, 2025

(54) METHOD AND APPARATUS FOR BEAM FAILURE RECOVERY UNDER A UNIFIED TCI FRAMEWORK

(71) Applicant: Samsung Electronics Co., Ltd., Suwon-si (KR)

(72) Inventors: Dalin Zhu, Allen, TX (US); Eko Onggosanusi, Coppell, TX (US); Emad N. Farag, Flanders, NJ (US)

(73) Assignee: Samsung Electronics Co., Ltd., Suwon-si (KR)

( * ) Notice: Subject to any disclaimer, the term of this patent is extended or adjusted under 35 U.S.C. 154(b) by 416 days.

(21) Appl. No.: 18/057,680

(22) Filed: Nov. 21, 2022

(65) Prior Publication Data

US 2023/0171621 A1 Jun. 1, 2023

Related U.S. Application Data

(60) Provisional application No. 63/294,288, filed on Dec. 28, 2021, provisional application No. 63/284,459, filed on Nov. 30, 2021.

(51) Int. Cl.
*H04W 24/04* (2009.01)
*H04W 24/08* (2009.01)

(52) U.S. Cl.
CPC ........... *H04W 24/04* (2013.01); *H04W 24/08* (2013.01)

(58) Field of Classification Search
CPC ..... H04W 24/04; H04W 24/08; H04W 72/21; H04W 72/231; H04W 72/232; H04W 74/004; H04B 7/06964; H04B 7/06968; H04L 5/0048

USPC .................................................. 370/241, 242
See application file for complete search history.

(56) References Cited

U.S. PATENT DOCUMENTS

| | | | |
|---|---|---|---|
| 2021/0105860 A1 | 4/2021 | Tsai et al. | |
| 2021/0227528 A1 | 7/2021 | Bang et al. | |
| 2022/0200687 A1* | 6/2022 | Guo | H04L 5/0053 |
| 2023/0046074 A1* | 2/2023 | Zhang | H04L 5/0053 |
| 2023/0146347 A1* | 5/2023 | Zhou | H04W 74/0841 |
| | | | 370/329 |

(Continued)

FOREIGN PATENT DOCUMENTS

WO 2021207562 A1 10/2021

OTHER PUBLICATIONS

"3rd Generation Partnership Project; Technical Specification Group Radio Access Network; NR; Physical channels and modulation (Release 16)", 3GPP TS 38.211 V16.1.0, Mar. 2020, 130 pages.

(Continued)

*Primary Examiner* — Obaidul Huq

(57) ABSTRACT

Apparatuses and methods for beam failure recovery under a unified transmission configuration indication (TCI) framework in a wireless communication system. A method for operating a user equipment (UE) includes receiving information associated with a control resource set (CORESET) configured for the UE and identifying, based on the information, a type of the CORESET configured for the UE. The method further includes determining, based at least in part on the identified type of the CORESET, a set of beam failure detection (BFD) reference signals (RSs) to use and monitoring for a beam failure instance (BFI) based on the set of BFD RSs.

19 Claims, 12 Drawing Sheets

(56) References Cited

U.S. PATENT DOCUMENTS

2024/0098526 A1* 3/2024 Matsumura ............ H04L 5/0023

OTHER PUBLICATIONS

"3rd Generation Partnership Project; Technical Specification Group Radio Access Network; NR; Multiplexing and channel coding (Release 16)", 3GPP TS 38.212 V16.1.0, Mar. 2020, 146 pages.
"3rd Generation Partnership Project; Technical Specification Group Radio Access Network; NR; Physical layer procedures for control (Release 16)", 3GPP TS 38.213 V16.1.0, Mar. 2020, 156 pages.
"3rd Generation Partnership Project; Technical Specification Group Radio Access Network; NR; Physical layer procedures for data (Release 16)", 3GPP TS 38.214 V16.1.0, Mar. 2020, 151 pages.
"5G; NR; Medium Access Control (MAC) protocol specification (3GPP TS 38.321 version 16.1.0 Release 16)", ETSI TS 138 321 V16.1.0, Jul. 2020, 153 pages.
"5G; NR; Radio Resource Control (RRC); Protocol specification (3GPP TS 38.331 version 16.1.0 Release 16)", ETSI TS 138 331 V16.1.0, Jul. 2020, 886 pages.
International Search Report and Written Opinion issued Feb. 24, 2023 regarding International Application No. PCT/KR2022/018887, 6 pages.
NTT Docomo, Inc, "Discussion on multi-beam operation", 3GPP TSG RAN WG1 Meeting #107-e, R1-2112089, Nov. 2021, 14 pages.
CATT, "Remaining issues on Rel-17 multi-beam operation", 3GPP TSG RAN WG1 Meeting #107-e, R1-2111221, Nov. 2021, 10 pages.
NEC, "Discussion on remaining issues on multi-beam operation", 3GPP TSG RAN WG1 Meeting #107-e, R1-2111683, Nov. 2021, 7 pages.
Extended European Search Report issued Jan. 16, 2025 regarding Application No. 22901692.8, 12 pages.
ZTE Corporation, "CR for the configuration of RadioLinkMonitoringConfig", 3GPP TSG-RAN WG2 Meeting #102, R2-1807434, May 2018, 5 pages.

* cited by examiner

METHOD AND APPARATUS FOR BEAM FAILURE RECOVERY UNDER A UNIFIED TCI FRAMEWORK

CROSS-REFERENCE TO RELATED APPLICATIONS AND CLAIM OF PRIORITY

The present application claims priority to U.S. Provisional Patent Application No. 63/284,459, filed on Nov. 30, 2021, and U.S. Provisional Patent Application No. 63/294,288, filed on Dec. 28, 2021. The contents of the above-identified patent documents are incorporated herein by reference.

TECHNICAL FIELD

The present disclosure relates generally to wireless communication systems and, more specifically, the present disclosure relates to a beam failure recovery under a unified transmission configuration indication (TCI) framework in a wireless communication system.

BACKGROUND

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on.

SUMMARY

The present disclosure relates to wireless communication systems and, more specifically, the present disclosure relates to a beam failure recovery under a unified TCI framework in a wireless communication system.

In one embodiment, a user equipment (UE) is provided. The UE includes a transceiver configured to receive information associated with a control resource set (CORESET) configured for the UE. The UE further includes a processor operably coupled to the transceiver. The processor is configured to identify, based on the information, a type of the CORESET configured for the UE; determine, based at least in part on the identified type of the CORESET, a set of beam failure detection (BFD) reference signals (RSs) to use; and monitor, via the transceiver, for a beam failure instance (BFI) based on the set of BFD RSs.

In another embodiment, a base station (BS) is provided. The BS includes a processor and a transceiver operably coupled to the processor. The transceiver is configured to transmit information associated with a CORESET configured for a UE. The information indicates a type of the CORESET configured for the UE and indicates a set of BFD RSs for the UE to use. The transceiver is further configured to transmit the set of BFD RSs for indication of a BFI.

In yet another embodiment, a method for operating a UE. The method includes receiving information associated with a CORESET configured for the UE and identifying, based on the information, a type of the CORESET configured for the UE. The method further includes determining, based at least in part on the identified type of the CORESET, a set of BFD RSs to use and monitoring for a BFI based on the set of BFD RSs.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 16, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents are hereby incorporated by reference into the present disclosure as if fully set forth herein: 3GPP TS 38.211 v16.1.0, "NR, Physical channels and modulation"; 3GPP TS 38.212 v16.1.0, "NR, Multiplexing and Channel coding"; 3GPP TS 38.213 v16.1.0, "NR, Physical Layer Procedures for Control"; 3GPP TS 38.214 v16.1.0, "NR, Physical Layer Procedures for Data"; 3GPP TS 38.321 v16.1.0, "NR, Medium Access Control (MAC) protocol specification"; and 3GPP TS 38.331 v16.1.0, "NR, Radio Resource Control (RRC) Protocol Specification."

To meet the demand for wireless data traffic having increased since deployment of 4G communication systems and to enable various vertical applications, 5G/NR communication systems have been developed and are currently being deployed. The 5G/NR communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

The discussion of 5G systems and frequency bands associated therewith is for reference as certain embodiments of the present disclosure may be implemented in 5G systems. However, the present disclosure is not limited to 5G systems or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

Figure 1:
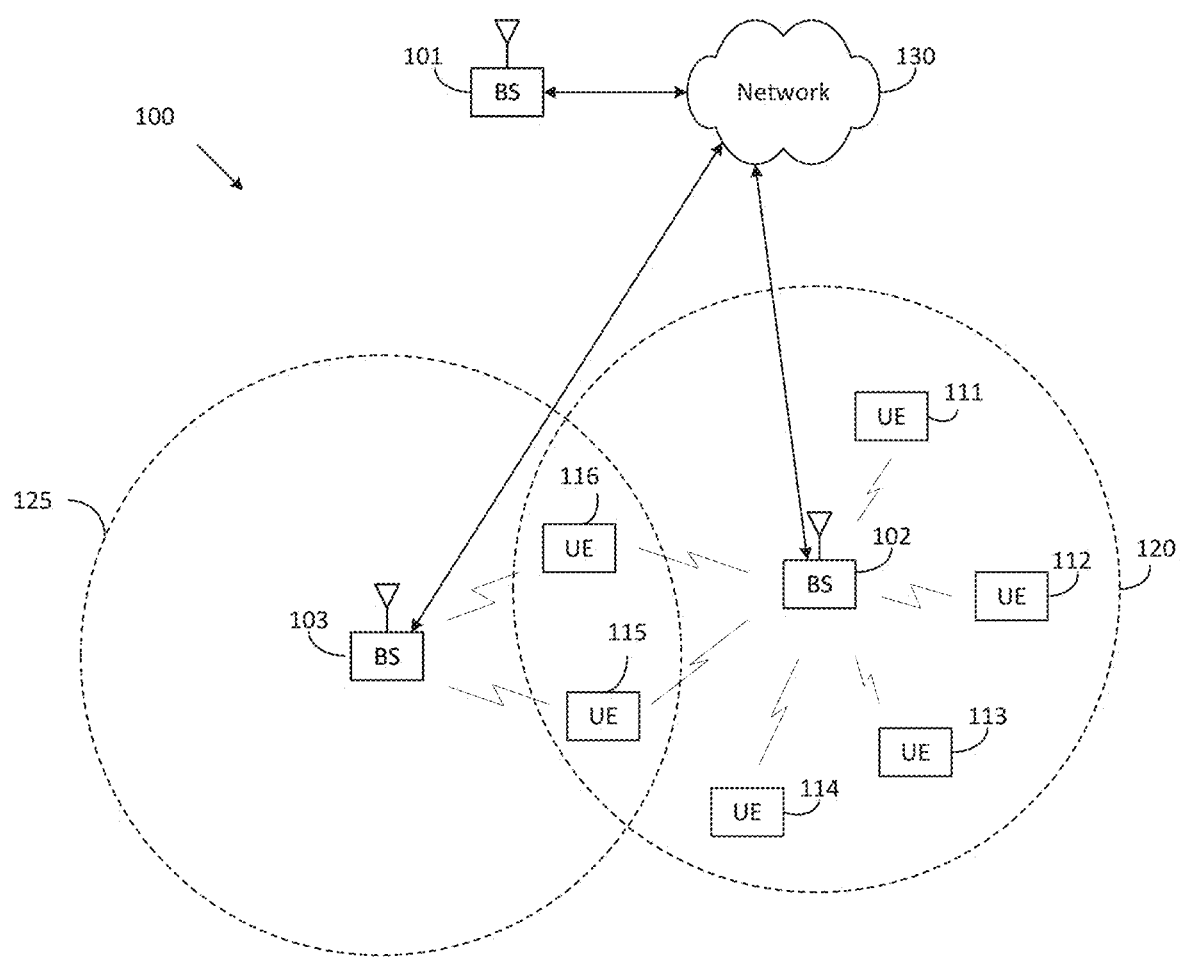
FIG. 1 illustrates an example of wireless network according to embodiments of the present disclosure.
Figure 2:
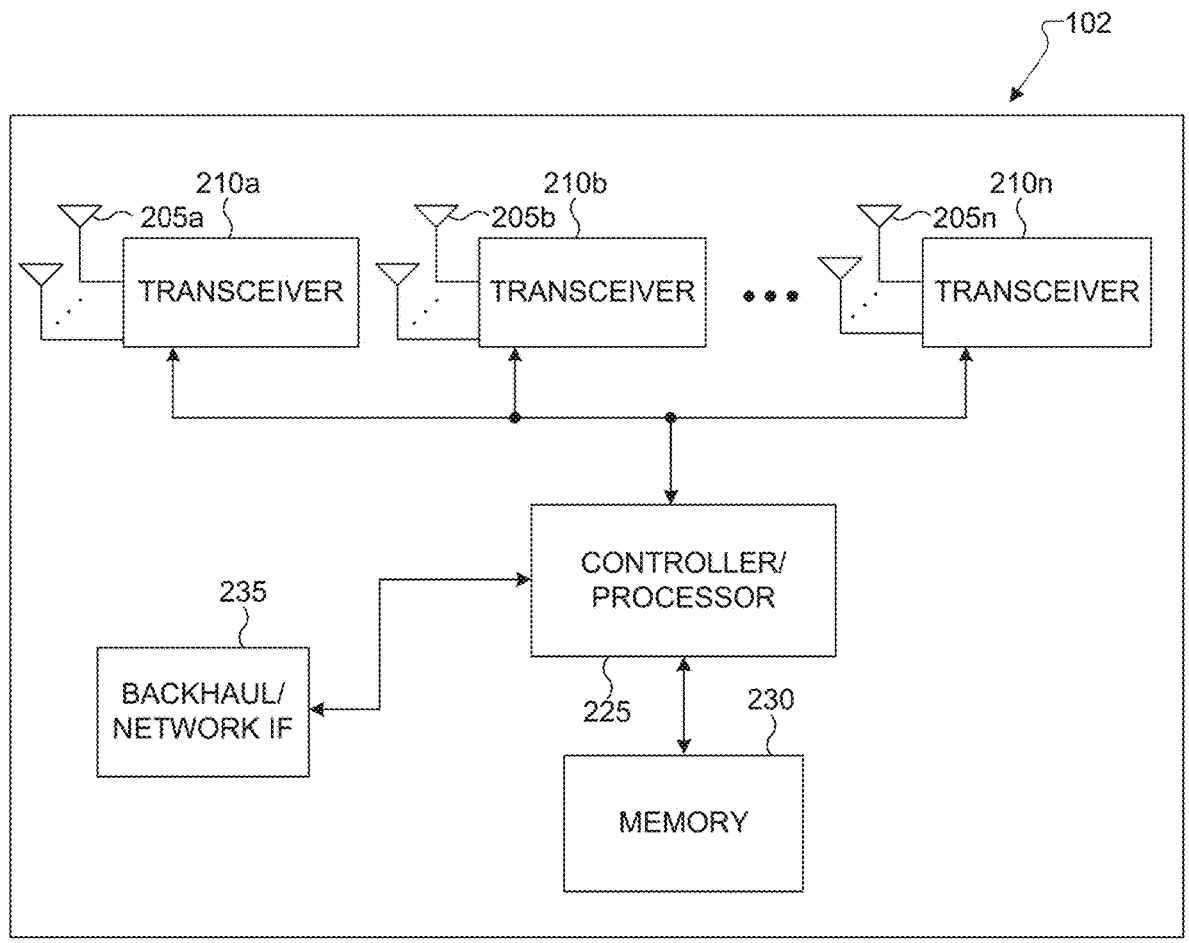
FIG. 2 illustrates an example of gNB according to embodiments of the present disclosure.
Figure 3:
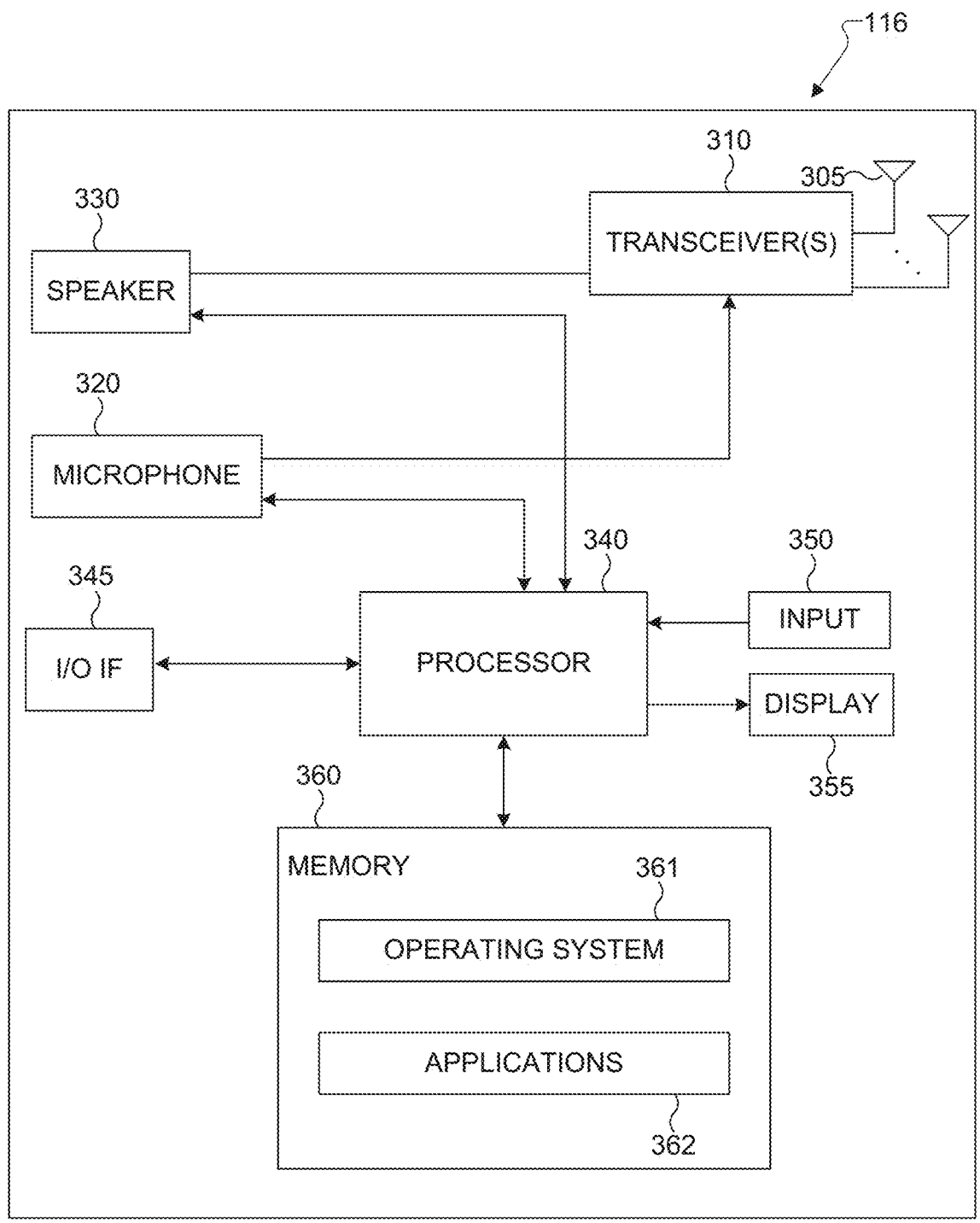
FIG. 3 illustrates an example of UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise; a UE 113, which may be a WiFi hotspot; a UE 114, which may be located in a first residence; a UE 115, which may be located in a second residence; and a UE 116, which may be a mobile device, such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, long term evolution (LTE), long term evolution-advanced (LTE-A), WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR3rd generation partnership project (3GPP) NR, long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof, for a configuration of unified TCI state in a wireless communication system. In certain embodiments, and one or more of the gNBs 101-103 includes circuitry, programing, or a combination thereof, for a beam failure recovery under a unified TCI framework in a wireless communication system.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple transceivers 210a-210n, a controller/processor 225, a memory 230, and a backhaul or network interface 235.

The transceivers 210a-210n receive, from the antennas 205a-205n, incoming RF signals, such as signals transmitted by UEs in the network 100. The transceivers 210a-210n down-convert the incoming RF signals to generate IF or baseband signals. The IF or baseband signals are processed by receive (RX) processing circuitry in the transceivers 210a-210n and/or controller/processor 225, which generates processed baseband signals by filtering, decoding, and/or digitizing the baseband or IF signals. The controller/processor 225 may further process the baseband signals.

Transmit (TX) processing circuitry in the transceivers 210a-210n and/or controller/processor 225 receives analog or digital data (such as voice data, web data, e-mail, or interactive video game data) from the controller/processor 225. The TX processing circuitry encodes, multiplexes, and/or digitizes the outgoing baseband data to generate processed baseband or IF signals. The transceivers 210a-210n up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of UL channel signals and the transmission of DL channel signals by the transceivers 210a-210n in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. As a particular example, an access point could include a number of interfaces 235, and the controller/processor 225 could support a beam failure recovery under a unified TCI framework in a wireless communication system. Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes antenna(s) 305, a transceiver(s) 310, and a microphone 320. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The transceiver(s) 310 receives, from the antenna 305, an incoming RF signal transmitted by a gNB of the network 100. The transceiver(s) 310 down-converts the incoming RF signal to generate an intermediate frequency (IF) or baseband signal. The IF or baseband signal is processed by RX processing circuitry in the transceiver(s) 310 and/or processor 340, which generates a processed baseband signal by filtering, decoding, and/or digitizing the baseband or IF signal. The RX processing circuitry sends the processed baseband signal to the speaker 330 (such as for voice data) or is processed by the processor 340 (such as for web browsing data).

TX processing circuitry in the transceiver(s) 310 and/or processor 340 receives analog or digital voice data from the microphone 320 or other outgoing baseband data (such as web data, e-mail, or interactive video game data) from the processor 340. The TX processing circuitry encodes, multiplexes, and/or digitizes the outgoing baseband data to generate a processed baseband or IF signal. The transceiver(s) 310 up-converts the baseband or IF signal to an RF signal that is transmitted via the antenna(s) 305.

The processor 340 can include one or more processors or other processing devices and execute the OS 361 stored in the memory 360 in order to control the overall operation of the UE 116. For example, the processor 340 could control the reception of DL channel signals and the transmission of UL channel signals by the transceiver(s) 310, the RX processing circuitry, and the TX processing circuitry 315 in accordance with well-known principles. In some embodiments, the processor 340 includes at least one microprocessor or microcontroller.

The processor 340 is also capable of executing other processes and programs resident in the memory 360, such as processes for a beam failure recovery under a unified TCI framework in a wireless communication system. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random-access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). In another example, the transceiver(s) 310 may include any number of transceivers and signal processing chains and may be connected to any number of antennas. Also, while FIG. 3 illustrates the UE 116 configured as a mobile telephone or smartphone, UEs could be configured to operate as other types of mobile or stationary devices.

Figure 4:
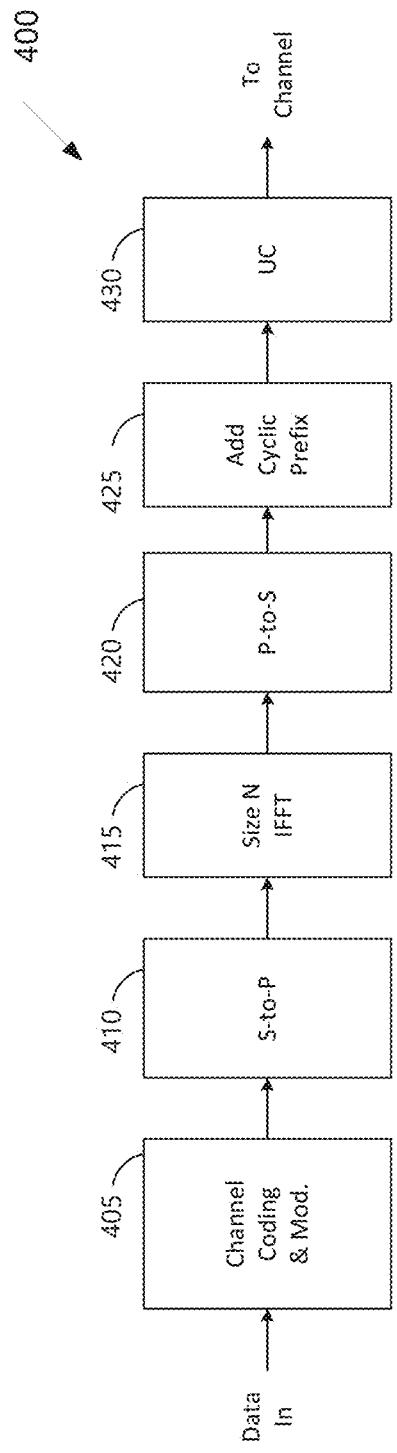
FIGS. 4 and 5 illustrate example of wireless transmit and receive paths according to this disclosure.
Figure 5:
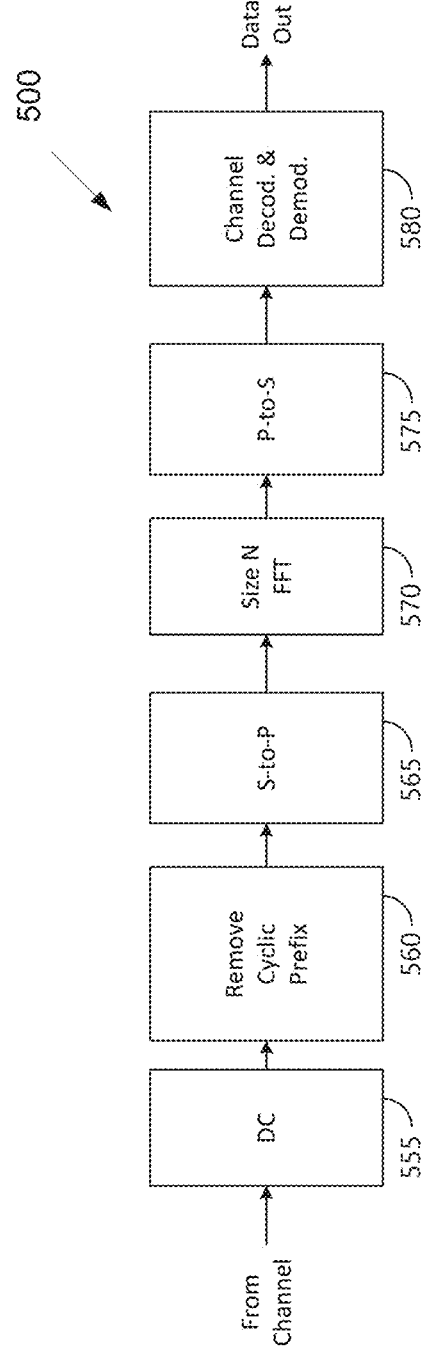

FIG. 4 and FIG. 5 illustrate example wireless transmit and receive paths according to this disclosure. In the following description, a transmit path 400 may be described as being implemented in a gNB (such as the gNB 102), while a receive path 500 may be described as being implemented in a UE (such as a UE 116). However, it may be understood that the receive path 500 can be implemented in a gNB and that the transmit path 400 can be implemented in a UE. In some embodiments, the receive path 500 is configured to support the codebook design and structure for systems having 2D antenna arrays as described in embodiments of the present disclosure.

The transmit path 400 as illustrated in FIG. 4 includes a channel coding and modulation block 405, a serial-to-parallel (S-to-P) block 410, a size N inverse fast Fourier transform (IFFT) block 415, a parallel-to-serial (P-to-S) block 420, an add cyclic prefix block 425, and an up-converter (UC) 430. The receive path 500 as illustrated in FIG. 5 includes a downconverter (DC) 555, a remove cyclic prefix block 560, a serial-to-parallel (S-to-P) block 565, a size N fast Fourier transform (FFT) block 570, a parallel-to-serial (P-to-S) block 575, and a channel decoding and demodulation block 580.

As illustrated in FIG. 4, the channel coding and modulation block 405 receives a set of information bits, applies coding (such as a low-density parity check (LDPC) coding), and modulates the input bits (such as with quadrature phase shift keying (QPSK) or quadrature amplitude modulation (QAM)) to generate a sequence of frequency-domain modulation symbols.

The serial-to-parallel block 410 converts (such as de-multiplexes) the serial modulated symbols to parallel data in order to generate N parallel symbol streams, where N is the IFFT/FFT size used in the gNB 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to an RF frequency for transmission via a wireless channel. The signal may also be filtered at baseband before conversion to the RF frequency.

A transmitted RF signal from the gNB 102 arrives at the UE 116 after passing through the wireless channel, and reverse operations to those at the gNB 102 are performed at the UE 116.

As illustrated in FIG. 5, the downconverter 555 down-converts the received signal to a baseband frequency, and the remove cyclic prefix block 560 removes the cyclic prefix to generate a serial time-domain baseband signal. The serial-to-parallel block 565 converts the time-domain baseband signal to parallel time domain signals. The size N FFT block 570 performs an FFT algorithm to generate N parallel frequency-domain signals. The parallel-to-serial block 575 converts the parallel frequency-domain signals to a sequence of modulated data symbols. The channel decoding and demodulation block 580 demodulates and decodes the modulated symbols to recover the original input data stream.

Each of the gNBs 101-103 may implement a transmit path 400 as illustrated in FIG. 4 that is analogous to transmitting in the downlink to UEs 111-116 and may implement a receive path 500 as illustrated in FIG. 5 that is analogous to receiving in the uplink from UEs 111-116. Similarly, each of UEs 111-116 may implement the transmit path 400 for transmitting in the uplink to the gNBs 101-103 and may implement the receive path 500 for receiving in the downlink from the gNBs 101-103.

Each of the components in FIG. 4 and FIG. 5 can be implemented using only hardware or using a combination of hardware and software/firmware. As a particular example, at least some of the components in FIG. 4 and FIG. 5 may be implemented in software, while other components may be implemented by configurable hardware or a mixture of software and configurable hardware. For instance, the FFT block 570 and the IFFT block 515 may be implemented as configurable software algorithms, where the value of size N may be modified according to the implementation.

Furthermore, although described as using FFT and IFFT, this is by way of illustration only and may not be construed to limit the scope of this disclosure. Other types of transforms, such as discrete Fourier transform (DFT) and inverse discrete Fourier transform (IDFT) functions, can be used. It may be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIG. 4 and FIG. 5 illustrate examples of wireless transmit and receive paths, various changes may be made to FIG. 4 and FIG. 5. For example, various components in FIG. 4 and FIG. 5 can be combined, further subdivided, or omitted and additional components can be added according to particular needs. Also, FIG. 4 and FIG. 5 are meant to illustrate examples of the types of transmit and receive paths that can be used in a wireless network. Any other suitable architectures can be used to support wireless communications in a wireless network.

A unit for DL signaling or for UL signaling on a cell is referred to as a slot and can include one or more symbols. A bandwidth (BW) unit is referred to as a resource block (RB). One RB includes a number of sub-carriers (SCs). For example, a slot can have duration of one millisecond and an RB can have a bandwidth of 180 KHz and include 12 SCs with inter-SC spacing of 15 KHz. A slot can be either full DL slot, or full UL slot, or hybrid slot similar to a special subframe in time division duplex (TDD) systems.

DL signals include data signals conveying information content, control signals conveying DL control information (DCI), and reference signals (RS) that are also known as pilot signals. A gNB transmits data information or DCI through respective physical DL shared channels (PDSCHs) or physical DL control channels (PDCCHs). A PDSCH or a PDCCH can be transmitted over a variable number of slot symbols including one slot symbol. A UE can be indicated a spatial setting for a PDCCH reception based on a configuration of a value for a transmission configuration indication state (TCI state) of a control resource set (CORESET) where the UE receives the PDCCH. The UE can be indicated a spatial setting for a PDSCH reception based on a configuration by higher layers or based on an indication by a DCI format scheduling the PDSCH reception of a value for a TCI state. The gNB can configure the UE to receive signals on a cell within a DL bandwidth part (BWP) of the cell DL BW.

A gNB transmits one or more of multiple types of RS including channel state information RS (CSI-RS) and demodulation RS (DMRS). A CSI-RS is primarily intended for UEs to perform measurements and provide channel state information (CSI) to a gNB. For channel measurement, non-zero power CSI-RS (NZP CSI-RS) resources are used. For interference measurement reports (IMRs), CSI interference measurement (CSI-IM) resources associated with a zero power CSI-RS (ZP CSI-RS) configuration are used. A CSI process consists of NZP CSI-RS and CSI-IM resources. A UE can determine CSI-RS transmission parameters through DL control signaling or higher layer signaling, such as an RRC signaling from a gNB. Transmission instances of a CSI-RS can be indicated by DL control signaling or configured by higher layer signaling. A DMRS is transmitted only in the BW of a respective PDCCH or PDSCH and a UE can use the DMRS to demodulate data or control information.

UL signals also include data signals conveying information content, control signals conveying UL control information (UCI), DMRS associated with data or UCI demodulation, sounding RS (SRS) enabling a gNB to perform UL channel measurement, and a random access (RA) preamble enabling a UE to perform random access. A UE transmits data information or UCI through a respective physical UL shared channel (PUSCH) or a physical UL control channel (PUCCH). A PUSCH or a PUCCH can be transmitted over a variable number of slot symbols including one slot symbol. The gNB can configure the UE to transmit signals on a cell within an UL BWP of the cell UL BW.

UCI includes hybrid automatic repeat request acknowledgement (HARQ-ACK) information, indicating correct or incorrect detection of data transport blocks (TBs) in a PDSCH, scheduling request (SR) indicating whether a UE has data in the buffer of UE, and CSI reports enabling a gNB to select appropriate parameters for PDSCH or PDCCH transmissions to a UE. HARQ-ACK information can be configured to be with a smaller granularity than per TB and can be per data code block (CB) or per group of data CBs where a data TB includes a number of data CBs.

A CSI report from a UE can include a channel quality indicator (CQI) informing a gNB of a largest modulation and coding scheme (MCS) for the UE to detect a data TB with a predetermined block error rate (BLER), such as a 10% BLER, of a precoding matrix indicator (PMI) informing a gNB how to combine signals from multiple transmitter antennas in accordance with a multiple input multiple output (MIMO) transmission principle, and of a rank indicator (RI) indicating a transmission rank for a PDSCH. UL RS includes DMRS and SRS. DMRS is transmitted only in a BW of a respective PUSCH or PUCCH transmission. A gNB can use a DMRS to demodulate information in a respective PUSCH or PUCCH. SRS is transmitted by a UE to provide a gNB with an UL CSI and, for a TDD system, an SRS transmission can also provide a PMI for DL transmission. Additionally, in order to establish synchronization or an initial higher layer connection with a gNB, a UE can transmit a physical random-access channel.

In the present disclosure, a beam is determined by either of: (1) a TCI state, which establishes a quasi-colocation (QCL) relationship or spatial relation between a source reference signal (e.g., synchronization signal/physical broadcasting channel (PBCH) block (SSB) and/or CSI-RS) and a target reference signal; or (2) spatial relation information that establishes an association to a source reference signal, such as SSB or CSI-RS or SRS. In either case, the ID of the source reference signal identifies the beam.

The TCI state and/or the spatial relation reference RS can determine a spatial Rx filter for reception of downlink channels at the UE, or a spatial Tx filter for transmission of uplink channels from the UE.

Figure 6A:
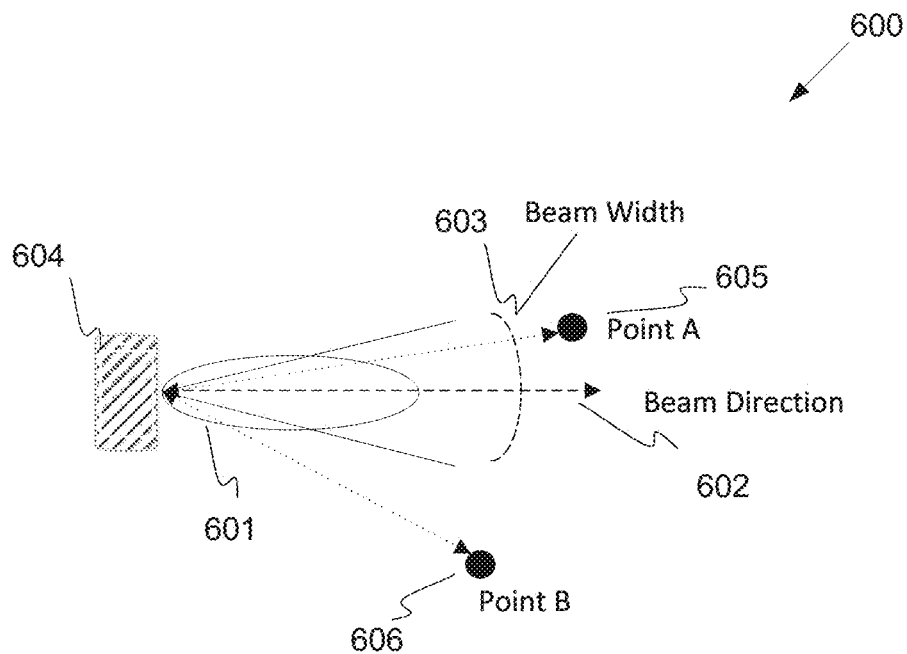
FIG. 6A illustrates an example of wireless system beam according to embodiments of the present disclosure.

FIG. 6A illustrates an example wireless system beam 600 according to embodiments of the present disclosure. An embodiment of the wireless system beam 600 shown in FIG. 6A is for illustration only.

As illustrated in FIG. 6A, in a wireless system a beam 601, for a device 604, can be characterized by a beam direction 602 and a beam width 603. For example, a device 604 with a transmitter transmits radio frequency (RF) energy in a beam direction and within a beam width. The device 604 with a receiver receives RF energy coming towards the device in a beam direction and within a beam width. As illustrated in FIG. 6A, a device at point A 605 can receive from and transmit to the device 604 as point A is within a beam width of a beam traveling in a beam direction and coming from the device 604.

As illustrated in FIG. 6A, a device at point B 606 cannot receive from and transmit to the device 604 as point B is outside a beam width of a beam traveling in a beam direction and coming from the device 604. While FIG. 6A, for illustrative purposes, shows a beam in 2-dimensions (2D), it may be apparent to those skilled in the art, that a beam can be in 3-dimensions (3D), where the beam direction and beam width are defined in space.

Figure 6B:
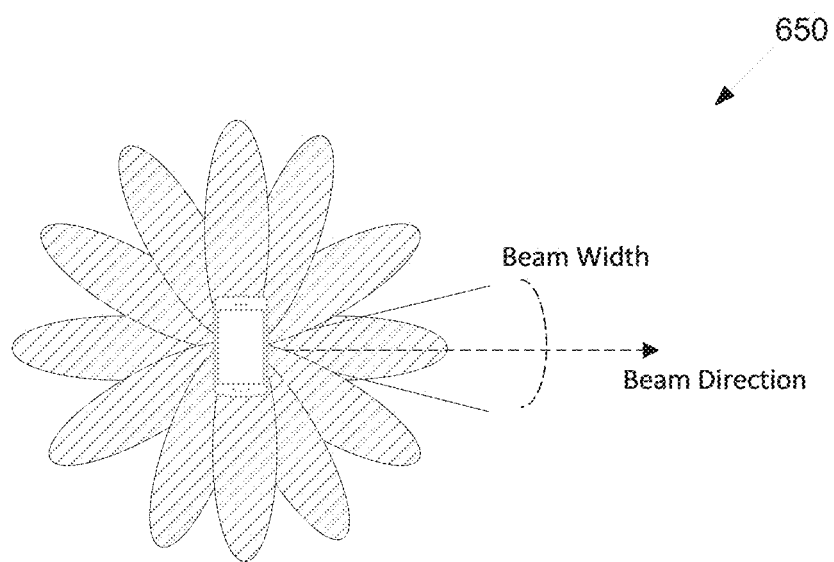
FIG. 6B illustrates an example of multi-beam operation according to embodiments of the present disclosure.

FIG. 6B illustrates an example multi-beam operation 650 according to embodiments of the present disclosure. An embodiment of the multi-beam operation 650 shown in FIG. 6B is for illustration only.

In a wireless system, a device can transmit and/or receive on multiple beams. This is known as "multi-beam operation" and is illustrated in FIG. 6B. While FIG. 6B, for illustrative purposes, is in 2D, it may be apparent to those skilled in the art, that a beam can be 3D, where a beam can be transmitted to or received from any direction in space.

Rel-14 LTE and Rel-15 NR support up to 32 CSI-RS antenna ports which enable an eNB to be equipped with a large number of antenna elements (such as 64 or 128). In this case, a plurality of antenna elements is mapped onto one CSI-RS port. For mmWave bands, although the number of antenna elements can be larger for a given form factor, the number of CSI-RS ports—which can correspond to the number of digitally precoded ports—tends to be limited due to hardware constraints (such as the feasibility to install a large number of ADCs/DACs at mmWave frequencies) as illustrated in FIG. 7.

Figure 7:
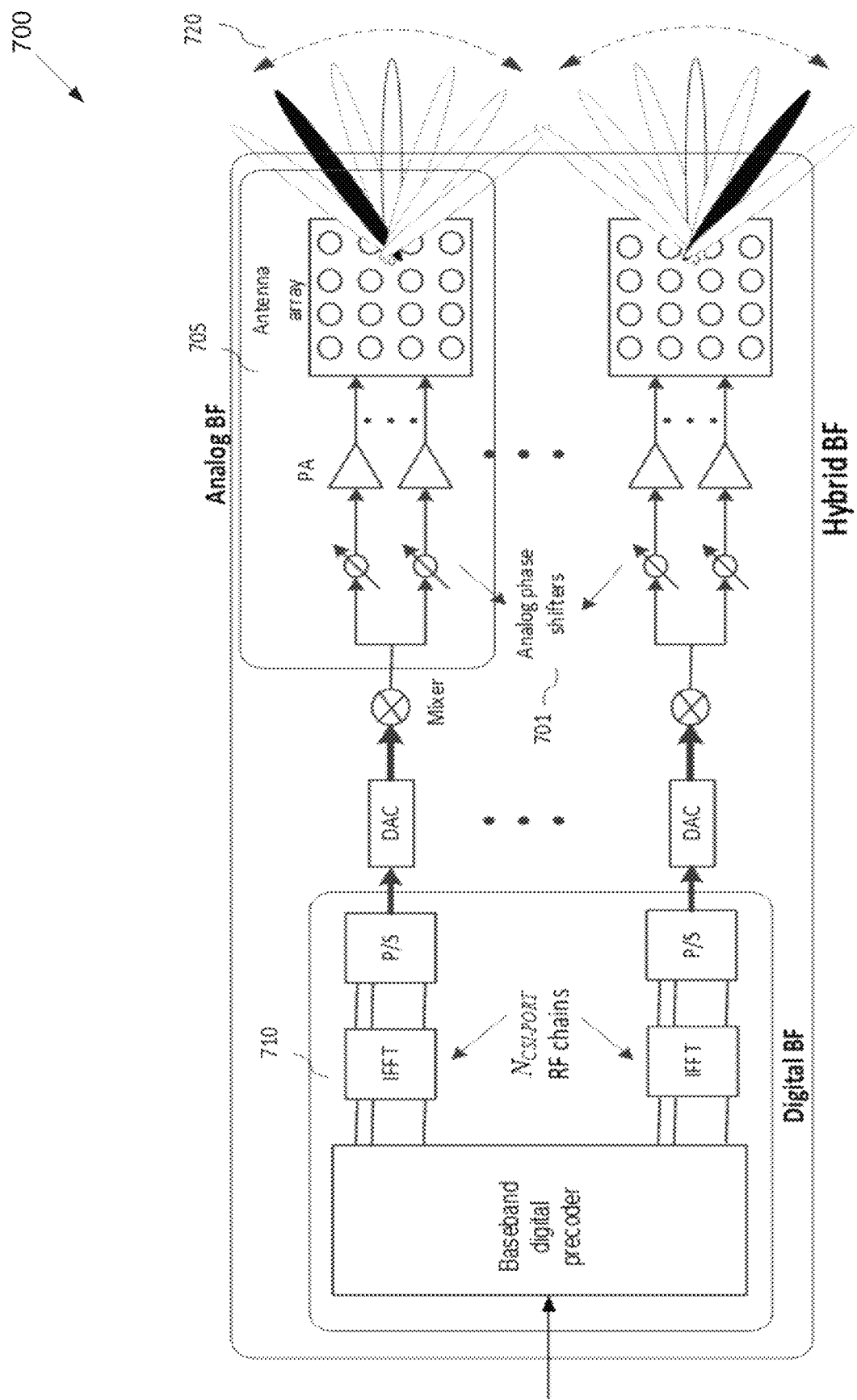
FIG. 7 illustrates an example of antenna structure according to embodiments of the present disclosure.

FIG. 7 illustrates an example antenna structure 700 according to embodiments of the present disclosure. An embodiment of the antenna structure 700 shown in FIG. 7 is for illustration only.

In this case, one CSI-RS port is mapped onto a large number of antenna elements which can be controlled by a bank of analog phase shifters 701. One CSI-RS port can then correspond to one sub-array which produces a narrow analog beam through analog beamforming 705. This analog beam can be configured to sweep across a wider range of angles 720 by varying the phase shifter bank across symbols or subframes. The number of sub-arrays (equal to the number of RF chains) is the same as the number of CSI-RS ports $N_{CSI-PORT}$. A digital beamforming unit 710 performs a linear combination across $N_{CSI-PORT}$ analog beams to further increase precoding gain. While analog beams are wideband (hence not frequency-selective), digital precoding can be varied across frequency sub-bands or resource blocks. Receiver operation can be conceived analogously.

Since the aforementioned system utilizes multiple analog beams for transmission and reception (wherein one or a small number of analog beams are selected out of a large number, for instance, after a training duration—to be performed from time to time), the term "multi-beam operation" is used to refer to the overall system aspect. This includes, for the purpose of illustration, indicating the assigned DL or UL TX beam (also termed "beam indication"), measuring at least one reference signal for calculating and performing beam reporting (also termed "beam measurement" and "beam reporting," respectively), and receiving a DL or UL transmission via a selection of a corresponding RX beam.

The aforementioned system is also applicable to higher frequency bands such as >52.6 GHz. In this case, the system can employ only analog beams. Due to the O2 absorption loss around 60 GHz frequency (~10 dB additional loss @ 100 m distance), larger number of and sharper analog beams (hence larger number of radiators in the array) may be needed to compensate for the additional path loss.

In a wireless communications system, a radio link failure (RLF) could occur if a significant/sudden link quality drop is observed at the UE side. If a RLF occurs, fast RLF recovery mechanisms, therefore, become essential to promptly re-establish the communication link(s) and avoid severe service interruption. At higher frequencies, e.g., millimeter-wave (mmWave) frequencies or FR2 in the 3GPP NR, both the transmitter and receiver could use directional (analog) beams to transmit and receive various RSs/channels such as SSBs, CSI-RSs, PDCCHs or PDSCHs. Hence, prior to declaring a full RLF, the UE could first detect and recover a potential beam failure if the signal qualities/strengths of certain beam pair links (BPLs) are below a certain threshold for a certain period of time.

Figure 8:
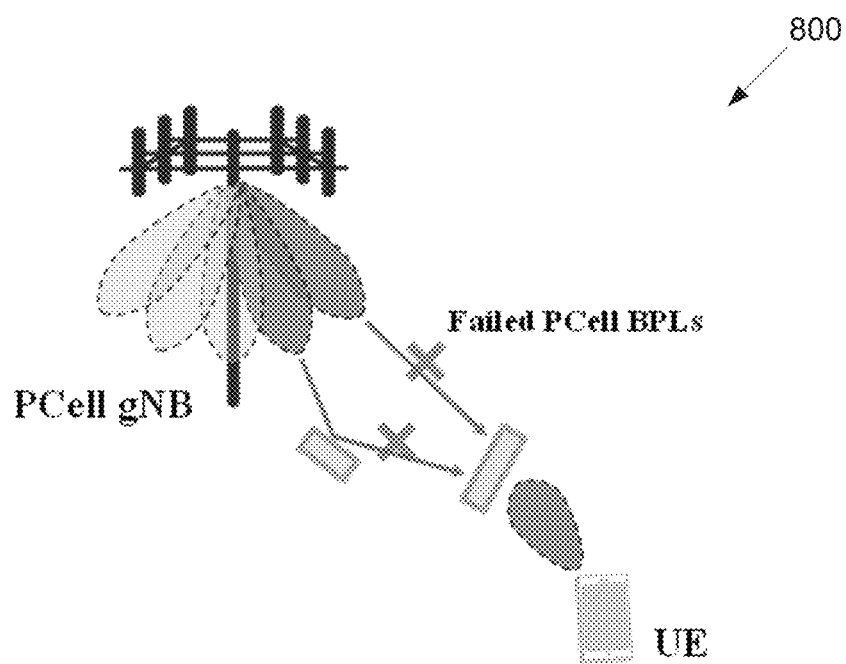
FIG. 8 illustrates an example of beam failure recovery (BFR) procedure for a primary cell (PCell) according to embodiments of the present disclosure.

FIG. 8 illustrates an example of BFR procedure for a PCell 800 according to embodiments of the present disclosure. An embodiment of the of BFR procedure for a PCell 800 shown in FIG. 8 is for illustration only.

The 3GPP Rel-15 BFR procedure mainly targets for a primary cell (PCell or PSCell) under the CA framework (as illustrated in FIG. 8). The BFR procedure in the 3GPP Rel-15 comprises the following key components: (1) a beam failure detection (BFD); (2) a new beam identification (NBI); (3) a BFR request (BURQA); and (4) a BFRQ response (BFRR).

The UE is first configured by the gNB a set of BFD RS resources to monitor the link qualities between the gNB and the UE. One BFD RS resource could correspond to one (periodic) CSI-RS/SSB RS resource, which could be a quasi-co-located (QCL) source RS with typeD in a TCI state for a CORESET. If the received signal qualities of all the BFD RS resources are below a given threshold (implying that the hypothetical BLERs of the corresponding CORE- SETs/PDCCHs are above a given threshold), the UE could declare a beam failure instance (BFI). Furthermore, if the UE has declared N_BFI consecutive BFIs within a given time period, the UE may declare a beam failure.

After declaring/detecting the beam failure, the UE may transmit the BFRQ to the gNB via a contention-free (CF) PRACH (CF BFR-PRACH) resource, whose index is associated with a new beam identified by the UE. Specifically, to determine a potential new beam, the UE could be first configured by the network a set of SSB and/or CSI-RS resources (NBI RS resources) via a higher layer parameter candidateBeamRSList. The UE may then measure the NBI RSs and calculate their L1-RSRPs. If at least one of the measured L1-RSRPs of the NBI RSs is beyond a given threshold, the UE may select the beam that corresponds to the NBI RS with the highest L1-RSRP as the new beam q_new. To determine a CF BFR-PRACH resource to convey the BFRQ, the UE could be first configured by the network a set of PRACH resources, each associated with a NBI RS resource. The UE could then select the PRACH resource that has the one-to-one correspondence to the selected NBI RS resource (and therefore, the new beam index q_new) to send the BFRQ to the gNB. From the index of the selected CF PRACH resource, the gNB could also know which beam is selected by the UE as the new beam.

Four slots after the UE has transmitted the BFRQ, the UE could start to monitor a dedicated CORESET/search space for BFRQ response. The dedicated CORESET is addressed to the UE-specific C-RNTI and may be transmitted by the gNB using the newly identified beam. If the UE detects a valid UE-specific DCI in the dedicated CORESET for BFRR, the UE may assume that the beam failure recovery request has been successfully received by the network, and the UE may complete the BFR process. Otherwise, if the UE does not receive the BFRR within a configured time window, the UE may initiate a contention based (CB) random access (RA) process to reconnect to the network.

Figure 9:
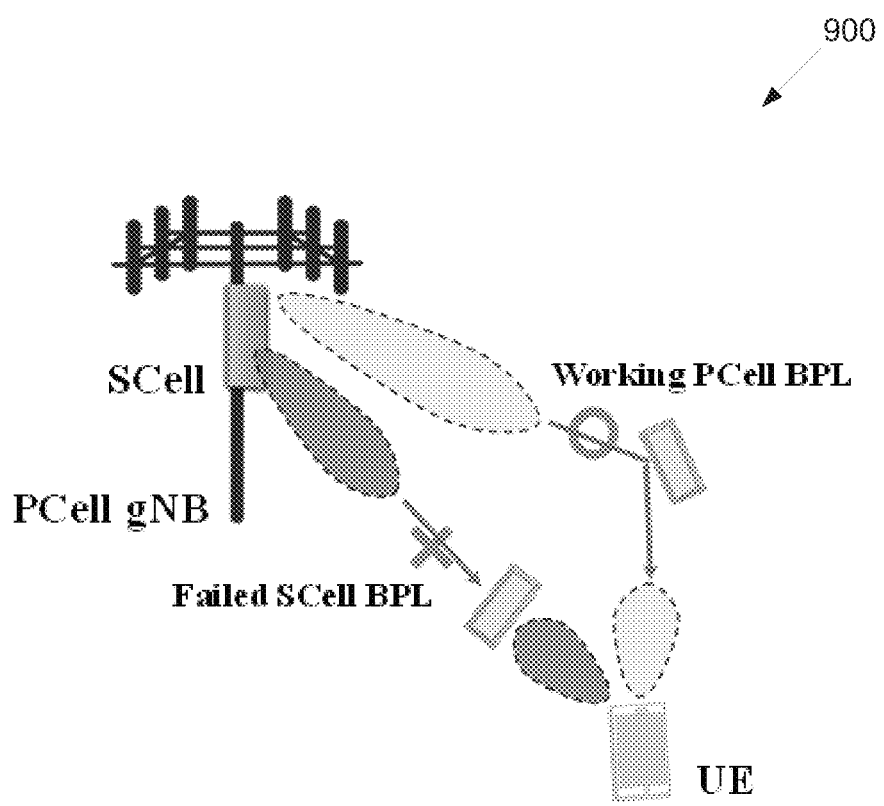
FIG. 9 illustrates an example of secondary cell (SCell) beam failure according to embodiments of the present disclosure.

FIG. 9 illustrates an example of SCell beam failure 900 according to embodiments of the present disclosure. An embodiment of the SCell beam failure 900 shown in FIG. 9 is for illustration only.

In the 3GPP Rel-16, the BFR procedures were customized for the secondary cell (SCell) under the CA framework, in which the BPL(s) between the PCell and the UE is assumed to be always working. An illustrative example of the SCell beam failure is given in FIG. 9.

After declaring/detecting the beam failure for the SCell, the UE may transmit the BFRQ in form of a scheduling request (SR) over a PUCCH for the working PCell. Furthermore, the UE could only transmit the BFRQ at this stage without indicating any new beam index, failed SCell index or other information to the network. This is different from the Rel-15 PCell/PSCell procedure, in which the UE may indicate both the BFRQ and the identified new beam index to the network at the same time. Allowing the gNB to quickly know the beam failure status of the SCell without waiting for the UE to identify a new beam could be beneficial. For instance, the gNB could deactivate the failed SCell and allocate the resources to other working SCells.

The UE could be indicated by the network an uplink grant in response to the BFRQ SR, which may allocate necessary resources for the MAC CE to carry new beam index q_new (if identified), failed SCell index and etc. over the PUSCH for the working PCell. After transmitting the MAC CE for BFR to the working PCell, the UE may start to monitor the BFRR. The BFRR could be a TCI state indication for a CORESET for the corresponding SCell. The BFRR to the MAC CE for BFR could also be a normal uplink grant for scheduling a new transmission for the same HARQ process as the PUSCH carrying the MAC CE for BFR. If the UE could not receive the BFRR within a configured time window, the UE could transmit BFR-PUCCH again, or fall back to CBRA process.

As aforementioned, in the current 3GPP Rel-15/16 based BFR designs, the UE could be explicitly configured by the network (via higher layer RRC signaling) one or more BFD RS resources to measure. Alternatively, the UE could implicitly determine the one or more BFD RS resources as the QCL source RS(s) indicated in active TCI state(s) for PDCCH reception(s) in one or more CORESET(s). Under the Unified TCI framework, wherein a TCI state update could be indicated via DCI, enhancements to both the explicit and implicit BFD RS configurations are needed. Furthermore, if a UE is configured by the network a joint DL and UL TCI state under the Unified TCI framework, a downlink channel beam failure could imply that the corresponding uplink channel has experienced a link/beam failure as well. In this case, the UE may not be able to send to the network the BFRQ via PUCCH-SR.

The present disclosure provides various design aspects for BFD RS configuration, new beam identification, BFRQ transmission and BFRR format optimization following the unified TCI framework, wherein a common beam indication could be applied for all DL and UL channels via DCI.

As described in the U.S. patent application Ser. No. 17/584,239, which is incorporated by reference in its entirety, a unified TCI framework could indicate/include $N \geq 1$ DL TCI states and/or $M \geq 1$ UL TCI states, wherein the indicated TCI state could be at least one of: (1) a DL TCI state and/or its corresponding/associated TCI state ID; (2) an UL TCI state and/or its corresponding/associated TCI state ID; (3) a joint DL and UL TCI state and/or its corresponding/ associated TCI state ID; and (4) a separate DL TCI state and UL TCI state and/or their corresponding/associated TCI state ID(s).

There could be various design options/channels to indicate to the UE a beam (i.e., a TCI state) for the transmission/ reception of a PDCCH or a PDSCH. As described in the U.S. patent application Ser. No. 17/584,239, which is incorporated by reference in its entirety, in one example, a MAC CE could be used to indicate to the UE a beam (i.e., a TCI state and/or a TCI state ID) for the transmission/reception of a PDCCH or a PDSCH. In another example, a DCI could be used to indicate to the UE a beam (i.e., a TCI state and/or a TCI state ID) for the transmission/reception of a PDCCH or a PDSCH.

For example, a DL related DCI (e.g., DCI format 1_0, DCI format 1_1 or DCI format 1_2) could be used to indicate to the UE a beam (i.e., a TCI state and/or a TCI state ID) for the transmission/reception of a PDCCH or a PDSCH, wherein the DL related DCI may or may not include a DL assignment.

For another example, an UL related DCI (e.g., DCI format 0_0, DCI format 0_1, DCI format 0_2) could be used to indicate to the UE a beam (i.e., a TCI state and/or a TCI state ID) for the transmission/reception of a PDCCH or a PDSCH, wherein the UL related DCI may or may not include an UL scheduling grant.

Yet for another example, a custom/purpose designed DCI format could be used to indicate to the UE a beam (i.e., a TCI state and/or a TCI state ID) for the transmission/reception of a PDCCH or a PDSCH.

Rel-17 introduced the unified TCI framework, where a unified or master or main TCI state is signaled to the UE.

The unified or master or main TCI state can be one of: (1) in case of joint TCI state indication, wherein a same beam is used for DL and UL channels, a joint TCI state that can be used at least for UE-dedicated DL channels and UE-dedicated UL channels; (2) in case of separate TCI state indication, wherein different beams are used for DL and UL channels, a DL TCI state can be used at least for UE-dedicated DL channels; or (3) in case of separate TCI state indication, wherein different beams are used for DL and UL channels, a UL TCI state can be used at least for UE-dedicated UL channels.

The unified (master or main) TCI state is TCI state of UE-dedicated reception on PDSCH/PDCCH or dynamic-grant/configured-grant based PUSCH and all of dedicated PUCCH resources.

As described in the U.S. patent application Ser. No. 17/584,239, which is incorporated by reference in its entirety, a unified TCI framework could indicate/include N≥1 DL TCI states and/or M≥1 UL TCI states, wherein the indicated TCI state could be at least one of: (1) a DL TCI state and/or its corresponding/associated TCI state ID; (2) an UL TCI state and/or its corresponding/associated TCI state ID; (3) a joint DL and UL TCI state and/or its corresponding/associated TCI state ID; or (4) separate DL TCI state and UL TCI state and/or their corresponding/associated TCI state ID(s).

There could be various design options/channels to indicate to the UE a beam (i.e., a TCI state) for the transmission/reception of a PDCCH or a PDSCH. As described in the U.S. patent application Ser. No. 17/584,239, which is incorporated by reference in its entirety: (1) in one example, a MAC CE could be used to indicate to the UE a beam (i.e., a TCI state and/or a TCI state ID) for the transmission/reception of a PDCCH or a PDSCH; and (2) in another example, a DCI could be used to indicate to the UE a beam (i.e., a TCI state and/or a TCI state ID) for the transmission/reception of a PDCCH or a PDSCH: (i) for example, a DL related DCI (e.g., DCI format 1_0, DCI format 1_1 or DCI format 1_2) could be used to indicate to the UE a beam (i.e., a TCI state and/or a TCI state ID) for the transmission/reception of a PDCCH or a PDSCH, wherein the DL related DCI may or may not include a DL assignment; (ii) for another example, an UL related DCI (e.g., DCI format 0_0, DCI format 0_1, DCI format 0_2) could be used to indicate to the UE a beam (i.e., a TCI state and/or a TCI state ID) for the transmission/reception of a PDCCH or a PDSCH, wherein the UL related DCI may or may not include an UL scheduling grant; and (iii) yet for another example, a custom/purpose designed DCI format could be used to indicate to the UE a beam (i.e., a TCI state and/or a TCI state ID) for the transmission/reception of a PDCCH or a PDSCH.

Rel-17 introduced the unified TCI framework, where a unified or master or main TCI state is signaled to the UE. The unified or master or main TCI state can be one of: (1) in case of joint TCI state indication, wherein a same beam is used for DL and UL channels, a joint TCI state that can be used at least for UE-dedicated DL channels and UE-dedicated UL channels; (2) in case of separate TCI state indication, wherein different beams are used for DL and UL channels, a DL TCI state can be used at least for UE-dedicated DL channels; or (3) in case of separate TCI state indication, wherein different beams are used for DL and UL channels, a UL TCI state can be used at least for UE-dedicated UL channels.

The unified (master or main) TCI state is TCI state of UE-dedicated reception on PDSCH/PDCCH or dynamic-grant/configured-grant based PUSCH and all of dedicated PUCCH resources.

As discussed herein, a UE could be provided by the network, e.g., via MAC CE or DCI (e.g., DCI format 1_1 or 1_2 with or without DL assignment) based signaling via higher layer parameters DLorJointTCIState or UL-TCIState, M≥1 joint DL and UL TCI states or M≥1 separate UL TCI states or a first combination of M≥1 joint DL and UL TCI states and separate UL TCI states or N≥1 separate DL TCI states or a second combination of N≥1 joint DL and UL TCI states and separate DL TCI states or a third combination of N≥1 joint DL and UL TCI states, separate DL TCI states and separate UL Unified TCI for UE-dedicated reception on PDSCH/PDCCH or dynamic-grant/configured-grant based PUSCH and all of dedicated PUCCH resources.

Throughout the present disclosure, the term "configuration" or "higher layer configuration" and variations thereof (such as "configured" and so on) could be used to refer to one or more of: a system information signaling such as by a MIB or a SIB (such as SIB1), a common or cell-specific higher layer/RRC signaling, or a dedicated or UE-specific or BWP-specific higher layer/RRC signaling.

The UE can be configured with a list of up to M TCI-State configurations within the higher layer parameter PDSCH-Config to decode PDSCH according to a detected PDCCH with DCI intended for the UE and the given serving cell, where M depends on the UE capability maxNumberConfiguredTCIstatesPerCC. Each TCI-State contains parameters for configuring a quasi co-location relationship between one or two downlink reference signals and the DM-RS ports of the PDSCH, the DM-RS port of PDCCH or the CSI-RS port(s) of a CSI-RS resource. The quasi co-location relationship is configured by the higher layer parameter qcl-Type1 for the first DL RS, and qcl-Type2 for the second DL RS (if configured). For the case of two DL RSs, the QCL types shall not be the same, regardless of whether the references are to the same DL RS or different DL RSs. The quasi co-location types corresponding to each DL RS are given by the higher layer parameter qcl-Type in QCL-Info and may take one of the following values: (1) 'typeA': {Doppler shift, Doppler spread, average delay, delay spread}, (2) 'typeB': {Doppler shift, Doppler spread}, (3) 'typeC': {Doppler shift, average delay}, and (4) 'typeD': {Spatial Rx parameter}.

The UE can be configured with a list of up to 128 DLorJointTCIState configurations, within the higher layer parameter PDSCH-Config for providing a reference signal for the quasi co-location for DM-RS of PDSCH and DM-RS of PDCCH in a CC, for CSI-RS, and to provide a reference, if applicable, for determining UL TX spatial filter for dynamic-grant and configured-grant based PUSCH and PUCCH resource in a CC, and SRS.

If the DLorJointTCIState or UL-TCIState configurations are absent in a BWP of the CC, the UE can apply the DLorJointTCIState or UL-TCIState configurations from a reference BWP of a reference CC. The UE is not expected to be configured with TCI-State, SpatialRelationInfo or PUCCH-SpatialRelationInfo, except SpatialRelationInfo-Pos in a CC in a band, if the UE is configured with DLorJointTCIState or UL-TCIState in any CC in the same band. The UE can assume that when the UE is configured with TCI-State in any CC in the CC list configured by simultaneousTCI-UpdateList1-r16, simultaneousTCI-UpdateList2-r16, simultaneousSpatial-UpdatedList1-r16, or simultaneousSpatial-UpdatedList2-r16, the UE is not configured with DLorJointTCIState or UL-TCIState in any CC within the same band in the CC list.

The UE receives an activation command, as described in clause 6.1.3.14 of [10, TS 38.321] or 6.1.3.x of [10, TS 38.321], used to map up to 8 TCI states and/or pairs of TCI states, with one TCI state for DL channels/signals and one TCI state for UL channels/signals to the codepoints of the DCI field 'Transmission Configuration Indication' for one or for a set of CCs/DL BWPs, and if applicable, for one or for a set of CCs/UL BWPs. When a set of TCI state IDs are activated for a set of CCs/DL BWPs and if applicable, for a set of CCs/UL BWPs, where the applicable list of CCs is determined by the indicated CC in the activation command, the same set of TCI state IDs are applied for all DL and/or UL BWPs in the indicated CCs.

The Unified TCI States Activation/Deactivation MAC CE is identified by a MAC subheader with eLCID as specified in Table 6.2.1-1b in TS 38.321. It has a variable size consisting of one or more of the following fields: (1) serving Cell ID: This field indicates the identity of the Serving Cell for which the MAC CE applies. The length of the field is 5 bits. If the indicated Serving Cell is configured as part of a simultaneousU-TCI-UpdateList1, simultaneousU-TCI-UpdateList2, simultaneousU-TCI-UpdateList3 or simultaneousU-TCI-UpdateList4 as specified in TS 38.331, this MAC CE applies to all the Serving Cells in the set simultaneousU-TCI-UpdateList1, simultaneousU-TCI-UpdateList2, simultaneousU-TCI-UpdateList3 or simultaneousU-TCI-UpdateList4, respectively; (2) DL BWP ID: This field indicates a DL BWP for which the MAC CE applies as the codepoint of the DCI bandwidth part indicator field as specified in TS 38.212. The length of the BWP ID field is 2 bits; (3) UL BWP ID: This field indicates a UL BWP for which the MAC CE applies as the codepoint of the DCI bandwidth part indicator field as specified in TS 38.212. The length of the BWP ID field is 2 bits; (4) $P_i$: This field indicates whether each TCI codepoint has multiple TCI states or single TCI state. If $P_i$ field set to 1, it indicates that $i^{th}$ TCI codepoint includes the DL TCI state and the UL TCI state. If $P_i$ field set to 0, it indicates that $i^{th}$ TCI codepoint includes only the DL TCI state or the UL TCI state; (5) D/U: This field indicate whether the TCI state ID in the same octet is for joint/downlink or uplink TCI state. If this field is set to 1, the TCI state ID in the same octet is for joint/downlink. If this field is set to 0, the TCI state ID in the same octet is for uplink; (6) TCI state ID: This field indicates the TCI state identified by TCI-StateId as specified in TS 38.331. If D/U is set to 1, 7-bits length TCI state ID i.e. TCI-StateId as specified in TS 38.331 is used. If D/U is set to 0, the most significant bit of TCI state ID is considered as the reserved bit and remainder 6 bits indicate the UL-TCIState-Id as specified in TS 38.331. The maximum number of activated TCI states is 16; (7) R: Reserved bit, set to 0.

The CellGroupConfig IE specified in the TS 38.331 is used to configure a master cell group (MCG) or secondary cell group (SCG). A cell group comprises of one MAC entity, a set of logical channels with associated RLC entities and of a primary cell (SpCell) and one or more secondary cells (SCells).

simultaneousTCI-UpdateList1, simultaneousTCI-UpdateList2 are list of serving cells which can be updated simultaneously for TCI relation with a MAC CE. The simultaneousTCI-UpdateList1 and simultaneousTCI-UpdateList2 shall not contain same serving cells. Network should not configure serving cells that are configured with a BWP with two different values for the coresetPoolIndex in these lists.

simultaneousU-TCI-UpdateList1, simultaneousU-TCI-UpdateList2, simultaneousU-TCI-UpdateList3, simultaneousU-TCI-UpdateList4 are list of serving cells for which the Unified TCI States Activation/Deactivation MAC CE applies simultaneously, as specified in [TS 38.321 v17.1.0 clause 6.1.3.47]. The different lists shall not contain same serving cells. Network only configures in these lists serving cells that are configured with unifiedtci-StateType.

When the bwp-id or cell for QCL-TypeA/D source RS in a QCL-Info of the TCI state configured with DLorJointTCIState is not configured, the UE assumes that QCL-TypeA/D source RS is configured in the CC/DL BWP where TCI state applies.

When tci-PresentInDCI is set as 'enabled' or tci-PresentDCI-1-2 is configured for the CORESET, the UE with activated DLorJointTCIState or UL-TCIState receives DCI format 1_1/1_2 providing indicated DLorJointTCIState or UL-TCIState for a CC or all CCs in the same CC list configured by simultaneousTCI-UpdateList1-r17, simultaneousTCI-UpdateList2-r17, simultaneousTCI-UpdateList3-r17, simultaneousTCI-UpdateList4-r17. The DCI format 1_1/1_2 can be with or without, if applicable, DL assignment. If the DCI format 1_1/1_2/is without DL assignment, the UE can assume the following: (1) CS-RNTI is used to scramble the CRC for the DCI, (2) the values of the following DCI fields are set as follows: RV=all '1's, MCS=all '1's, NDI=0, and set to all '0's for FDRA Type 0, or all '1's for FDRA Type 1, or all '0's for dynamicSwitch (same as in Table 10.2-4 of [6, TS 38.213]).

After a UE receives an initial higher layer configuration of more than one DLorJoint-TCIState and before application of an indicated TCI state from the configured TCI states: the UE assumes that DM-RS of PDSCH and DM-RS of PDCCH and the CSI-RS applying the indicated TCI state are quasi co-located with the SS/PBCH block the UE identified during the initial access procedure.

After a UE receives an initial higher layer configuration of more than one DLorJoint-TCIState or UL-TCIState and before application of an indicated TCI state from the configured TCI states: the UE assumes that the UL TX spatial filter, if applicable, for dynamic-grant and configured-grant based PUSCH and PUCCH, and for SRS applying the indicated TCI state, is the same as that for a PUSCH transmission scheduled by a RAR UL grant during the initial access procedure.

After a UE receives a higher layer configuration of more than one DLorJoint-TCIState as part of a Reconfiguration with sync procedure as described in [12, TS 38.331] and before applying an indicated TCI state from the configured TCI states: the UE assumes that DM-RS of PDSCH and DM-RS of PDCCH, and the CSI-RS applying the indicated TCI state are quasi co-located with the SS/PBCH block or the CSI-RS resource the UE identified during the random access procedure initiated by the Reconfiguration with sync procedure as described in [12, TS 38.331].

After a UE receives a higher layer configuration of more than one DLorJoint-TCIState or UL-TCIState as part of a Reconfiguration with sync procedure as described in [12, TS 38.331] and before applying an indicated TCI state from the configured TCI states: the UE assumes that the UL TX spatial filter, if applicable, for dynamic-grant and configured-grant based PUSCH and PUCCH, and for SRS applying the indicated TCI state, is the same as that for a PUSCH transmission scheduled by a RAR UL grant during random access procedure initiated by the Reconfiguration with sync procedure as described in [12, TS 38.331].

If a UE receives a higher layer configuration of a single DLorJoint-TCIState, that can be used as an indicated TCI state, the UE obtains the QCL assumptions from the configured TCI state for DM-RS of PDSCH and DM-RS of PDCCH, and the CSI-RS applying the indicated TCI state.

If a UE receives a higher layer configuration of a single DLorJoint-TCIState or UL-TCIState, that can be used as an indicated TCI state, the UE determines an UL TX spatial filter, if applicable, from the configured TCI state for dynamic-grant and configured-grant based PUSCH and PUCCH, and SRS applying the indicated TCI state.

When the UE would transmit the last symbol of a PUCCH with HARQ-ACK information corresponding to the DCI carrying the TCI State indication and without DL assignment, or corresponding to the PDSCH scheduling by the DCI carrying the TCI State indication, and if the indicated TCI State is different from the previously indicated one, the indicated DLorJointTCIState or UL-TCIstate should be applied starting from the first slot that is at least BeamAppTime_r17 symbols after the last symbol of the PUCCH. The first slot and the BeamAppTime_r17 symbols are both determined on the carrier with the smallest SCS among the carrier(s) applying the beam indication.

If a UE is configured with pdsch-TimeDomainAllocationListForMultiPDSCH-r17 in which one or more rows contain multiple SLIVs for PDSCH on a DL BWP of a serving cell, and the UE is receiving a DCI carrying the TCI-State indication and without DL assignment, the UE does not expect that the number of indicated SLIVs in the row of the pdsch-TimeDomainAllocationListForMultiPDSCH-r17 by the DCI is more than one.

If the UE is configured with NumberOfAdditionalPCI and with PDCCH-Config that contains two different values of coresetPoolIndex in ControlResourceSet, the UE receives an activation command for CORESET associated with each coresetPoolIndex, as described in clause 6.1.3.14 of [10, TS 38.321], used to map up to 8 TCI states to the codepoints of the DCI field 'Transmission Configuration Indication' in one CC/DL BWP. When a set of TCI state IDs are activated for a coresetPoolIndex, the activated TCI states corresponding to one coresetPoolIndex can be associated with one physical cell ID and activated TCI states corresponding to another coresetPoolIndex can be associated with another physical cell ID.

When a UE supports two TCI states in a codepoint of the DCI field 'Transmission Configuration Indication' the UE may receive an activation command, as described in clause 6.1.3.24 of [10, TS 38.321], the activation command is used to map up to 8 combinations of one or two TCI states to the codepoints of the DCI field 'Transmission Configuration Indication'. The UE is not expected to receive more than 8 TCI states in the activation command.

When the DCI field 'Transmission Configuration Indication' is present in DCI format 1_2 and when the number of codepoints S in the DCI field 'Transmission Configuration Indication' of DCI format 1_2 is smaller than the number of TCI codepoints that are activated by the activation command, as described in clause 6.1.3.14 and 6.1.3.24 of [10, TS38.321], only the first S activated codepoints are applied for DCI format 1_2.

When the UE would transmit a PUCCH with HARQ-ACK information in slot n corresponding to the PDSCH carrying the activation command, the indicated mapping between TCI states and codepoints of the DCI field 'Transmission Configuration Indication' should be applied starting from the first slot that is after slot $$n + 3N_{slot}^{subframe,\mu} + \frac{2^\mu}{2^{\mu_{K_{mac}}}} \cdot k_{mac}$$

where m is the SCS configuration for the PUCCH and $\mu_{K_{mac}}$ is the subcarrier spacing configuration for $k_{mac}$ with a value of 0 for frequency range 1, and $k_{mac}$ is provided by K-Mac or $k_{mac}=0$ if K-Mac is not provided. If tci-PresentInDCI is set to 'enabled' or tci-PresentDCI-1-2 is configured for the CORESET scheduling the PDSCH, and the time offset between the reception of the DL DCI and the corresponding PDSCH is equal to or greater than timeDurationForQCL if applicable, after a UE receives an initial higher layer configuration of TCI states and before reception of the activation command, the UE may assume that the DM-RS ports of PDSCH of a serving cell are quasi co-located with the SS/PBCH block determined in the initial access procedure with respect to qcl-Type set to 'typeA', and when applicable, also with respect to qcl-Type set to 'typeD'.

If a UE is configured with the higher layer parameter tci-PresentInDCI that is set as 'enabled' for the CORESET scheduling a PDSCH, the UE assumes that the TCI field is present in the DCI format 1_1 of the PDCCH transmitted on the CORESET. If a UE is configured with the higher layer parameter tci-PresentDCI-1-2 for the CORESET scheduling the PDSCH, the UE assumes that the TCI field with a DCI field size indicated by tci-PresentDCI-1-2 is present in the DCI format 1_2 of the PDCCH transmitted on the CORESET. If the PDSCH is scheduled by a DCI format not having the TCI field present, and the time offset between the reception of the DL DCI and the corresponding PDSCH of a serving cell is equal to or greater than a threshold timeDurationForQCL if applicable, where the threshold is based on reported UE capability [13, TS 38.306], for determining PDSCH antenna port quasi co-location, the UE assumes that the TCI state or the QCL assumption for the PDSCH is identical to the TCI state or QCL assumption whichever is applied for the CORESET used for the PDCCH transmission within the active BWP of the serving cell.

When a UE is configured with both sfnSchemePdcch and sfnSchemePdsch scheduled by DCI format 10 or by DCI format 1_1/1_2, if the time offset between the reception of the DL DCI and the corresponding PDSCH of a serving cell is equal to or greater than a threshold timeDurationForQCL if applicable: if the UE supports DCI scheduling without TCI field, the UE assumes that the TCI state(s) or the QCL assumption(s) for the PDSCH is identical to the TCI state(s) or QCL assumption(s) whichever is applied for the CORESET used for the reception of the DL DCI within the active BWP of the serving cell regardless of the number of active TCI states of the CORESET. If the UE does not support dynamic switching between SFN PDSCH and non-SFN PDSCH, the UE should be activated with the CORESET with two TCI states; else if the UE does not support DCI scheduling without TCI field, the UE shall expect TCI field present when scheduled by DCI format 1_1/1_2.

When a UE is configured with sfnSchemePdsch and sfnSchemePdcch is not configured, when scheduled by DCI format 1_1/1_2, if the time offset between the reception of the DL DCI and the corresponding PDSCH of a serving cell is equal to or greater than a threshold timeDurationForQCL if applicable, the UE shall expect TCI field present.

For PDSCH scheduled by DCI format 1_0, 1_1, 1_2, when a UE is configured with sfnSchemePdcch set to 'sfnSchemeA' and sfnSchemePdsch is not configured, and there is no TCI codepoint with two TCI states in the activation command, and if the time offset between the reception of the DL DCI and the corresponding PDSCH is equal or larger than the threshold timeDurationForQCL if applicable and the CORESET which schedules the PDSCH is indicated with two TCI states, the UE assumes that the TCI state or the QCL assumption for the PDSCH is identical to the first TCI state or QCL assumption which is applied for the CORESET used for the PDCCH transmission within the active BWP of the serving cell.

If a PDSCH is scheduled by a DCI format having the TCI field present, the TCI field in DCI in the scheduling component carrier points to the activated TCI states in the scheduled component carrier or DL BWP, the UE shall use the TCI-State according to the value of the 'Transmission Configuration Indication' field in the detected PDCCH with DCI for determining PDSCH antenna port quasi co-location. The UE may assume that the DM-RS ports of PDSCH of a serving cell are quasi co-located with the RS(s) in the TCI state with respect to the QCL type parameter(s) given by the indicated TCI state if the time offset between the reception of the DL DCI and the corresponding PDSCH is equal to or greater than a threshold timeDurationForQCL, where the threshold is based on reported UE capability [13, TS 38.306]. For a single slot PDSCH, the indicated TCI state(s) should be based on the activated TCI states in the slot with the scheduled PDSCH. For a multi-slot PDSCH or the UE is configured with higher layer parameter pdsch-TimeDomainAllocationListForMultiPDSCH-r17, the indicated TCI state(s) should be based on the activated TCI states in the first slot with the scheduled PDSCH(s), and UE shall expect the activated TCI states are the same across the slots with the scheduled PDSCH(s). When the UE is configured with CORESET associated with a search space set for cross-carrier scheduling and the UE is not configured with enableDefaultBeamForCCS, the UE expects tci-PresentInDCI is set as 'enabled' or tci-PresentDCI-1-2 is configured for the CORESET, and if one or more of the TCI states configured for the serving cell scheduled by the search space set contains qcl-Type set to 'typeD', the UE expects the time offset between the reception of the detected PDCCH in the search space set and a corresponding PDSCH is larger than or equal to the threshold timeDurationForQCL.

Independent of the configuration of tci-PresentInDCI and tci-PresentDCI-1-2 in RRC connected mode, if the offset between the reception of the DL DCI and the corresponding PDSCH is less than the threshold timeDurationForQCL and at least one configured TCI state for the serving cell of scheduled PDSCH contains qcl-Type set to 'typeD', the UE may assume that the DM-RS ports of PDSCH(s) of a serving cell are quasi co-located with the RS(s) with respect to the QCL parameter(s) used for PDCCH quasi co-location indication of the CORESET associated with a monitored search space with the lowest controlResourceSetId in the latest slot in which one or more CORESETs within the active BWP of the serving cell are monitored by the UE. In this case, if the qcl-Type is set to 'typeD' of the PDSCH DM-RS is different from that of the PDCCH DM-RS with which they overlap in at least one symbol, the UE is expected to prioritize the reception of PDCCH associated with that CORESET. This also applies to the intra-band CA case (when PDSCH and the CORESET are in different component carriers).

Independent of the configuration of tci-PresentInDCI and tci-PresentDCI-1-2 in RRC connected mode, if the offset between the reception of the DL DCI and the corresponding PDSCH is less than the threshold timeDurationForQCL and at least one configured TCI state for the serving cell of scheduled PDSCH contains qcl-Type set to 'typeD', If a UE is configured with enableDefaultTCI-StatePerCoresetPoolIndex and the UE is configured by higher layer parameter PDCCH-Config that contains two different values of coresetPoolIndex in different ControlResourceSets, the UE may assume that the DM-RS ports of PDSCH associated with a value of coresetPoolIndex of a serving cell are quasi co-located with the RS(s) with respect to the QCL parameter (s) used for PDCCH quasi co-location indication of the CORESET associated with a monitored search space with the lowest controlResourceSetId among CORESETs, which are configured with the same value of coresetPoolIndex as the PDCCH scheduling that PDSCH, in the latest slot in which one or more CORESETs associated with the same value of coresetPoolIndex as the PDCCH scheduling that PDSCH within the active BWP of the serving cell are monitored by the UE. In this case, if the 'QCL-TypeD' of the PDSCH DM-RS is different from that of the PDCCH DM-RS with which they overlap in at least one symbol and they are associated with same value of coresetPoolIndex, the UE is expected to prioritize the reception of PDCCH associated with that CORESET. This also applies to the intra-band CA case (when PDSCH and the CORESET are in different component carriers).

Independent of the configuration of tci-PresentInDCI and tci-PresentDCI-1-2 in RRC connected mode, if the offset between the reception of the DL DCI and the corresponding PDSCH is less than the threshold timeDurationForQCL and at least one configured TCI state for the serving cell of scheduled PDSCH contains qcl-Type set to 'typeD', If a UE is configured with enableTwoDefaultTCI-States, and at least one TCI codepoint indicates two TCI states, the UE may assume that the DM-RS ports of PDSCH or PDSCH transmission occasions of a serving cell are quasi co-located with the RS(s) with respect to the QCL parameter(s) associated with the TCI states corresponding to the lowest codepoint among the TCI codepoints containing two different TCI states. When the UE is configured by higher layer parameter repetitionScheme set to 'tdmSchemeA' or is configured with higher layer parameter repetitionNumber, and the offset between the reception of the DL DCI and the first PDSCH transmission occasion is less than the threshold timeDurationForQCL, the mapping of the TCI states to PDSCH transmission occasions is determined according to clause 5.1.2.1 in TS 38.214 by replacing the indicated TCI states with the TCI states corresponding to the lowest codepoint among the TCI codepoints containing two different TCI states based on the activated TCI states in the slot with the first PDSCH transmission occasion. In this case, if the 'QCL-TypeD' in both of the TCI states corresponding to the lowest codepoint among the TCI codepoints containing two different TCI states is different from that of the PDCCH DM-RS with which they overlap in at least one symbol, the UE is expected to prioritize the reception of PDCCH associated with that CORESET. This also applies to the intra-band CA case (when PDSCH and the CORESET are in different component carriers).

Independent of the configuration of tci-PresentInDCI and tci-PresentDCI-1-2 in RRC connected mode, if the offset between the reception of the DL DCI and the corresponding PDSCH is less than the threshold timeDurationForQCL and at least one configured TCI state for the serving cell of scheduled PDSCH contains qcl-Type set to 'typeD', if a UE is not configured with sfnSchemePdsch, and the UE is configured with sfnSchemePdcch set to 'sfnSchemeA' and there is no TCI codepoint with two TCI states in the activation command and the CORESET with the lowest ID in the latest slot is indicated with two TCI states, the UE may assume that the DM-RS ports of PDSCH of a serving cell are quasi co-located with the RS(s) with respect to the QCL parameter(s) associated with the first TCI state of two TCI states indicated for the CORESET.

Independent of the configuration of tci-PresentInDCI and tci-PresentDCI-1-2 in RRC connected mode, if the offset between the reception of the DL DCI and the corresponding PDSCH is less than the threshold timeDurationForQCL and at least one configured TCI state for the serving cell of scheduled PDSCH contains qcl-Type set to 'typeD', in all cases above, if none of configured TCI states for the serving cell of scheduled PDSCH is configured with qcl-Type set to 'typeD', the UE shall obtain the other QCL assumptions from the indicated TCI state(s) for its scheduled PDSCH irrespective of the time offset between the reception of the DL DCI and the corresponding PDSCH.

If the PDCCH carrying the scheduling DCI is received on one component carrier, and a PDSCH scheduled by that DCI is on another component carrier: (1) the timeDurationForQCL is determined based on the subcarrier spacing of the scheduled PDSCH. If $\mu_{PDCCH} < \mu_{PDSCH}$ an additional timing delay $$d \frac{2^{\mu_{PDSCH}}}{2^{\mu_{PDCCH}}}$$

is added to the timeDurationForQCL, where d is defined in 5.2.1.5.1a-1 in TS 38.214, otherwise d is zero; or (2) when the UE is configured with enableDefaultBeamForCCS, if the offset between the reception of the DL DCI and the corresponding PDSCH is less than the threshold timeDurationForQCL, or if the DL DCI does not have the TCI field present, the UE obtains its QCL assumption for the scheduled PDSCH from the activated TCI state with the lowest ID applicable to PDSCH in the active BWP of the scheduled cell.

A UE that has indicated a capability beamCorrespondenceWithoutUL-BeamSweeping set to '1' as described in [18, TS 38.822], can determine a spatial domain filter to be used while performing the applicable channel access procedures described in [16, TS 37.213] to transmit a UL transmission on the channel as follows: (1) if UE is indicated with an SRI corresponding to the UL transmission, the UE may use a spatial domain filter that is same as the spatial domain transmission filter associated with the indicated SRI, or (2) if UE is configured with TCI-State configurations with DLorJointTCIState or UL-TCIState, the UE may use a spatial domain transmit filter that is same as the spatial domain receive filter the UE may use to receive the DL reference signal associated with the indicated TCI state.

When the PDCCH reception includes two PDCCH from two respective search space sets, as described in clause 10.1 of [6, TS 38.213], for the purpose of determining the time offset between the reception of the DL DCI and the corresponding PDSCH, the PDCCH candidate that ends later in time is used. When the PDCCH reception includes two PDCCH candidates from two respective search space sets, as described in clause 10.1 of [6, TS 38.213], for the configuration of tci-PresentInDCI or tci-PresentDCI-1-2, the UE expects the same configuration in the first and second CORESETs associated with the two PDCCH candidates; and if the PDSCH is scheduled by a DCI format not having the TCI field present and if the scheduling offset is equal to or larger than timeDurationForQCL, if applicable, PDSCH QCL assumption is based on the CORESET with lower ID among the first and second CORESETs associated with the two PDCCH candidates.

For a periodic CSI-RS resource in an NZP-CSI-RS-ResourceSet configured with higher layer parameter trs-Info, the UE shall expect that a TCI-State indicates one of the following quasi co-location type(s): (1) 'typeC' with an SS/PBCH block and, when applicable, 'typeD' with the same SS/PBCH block, or (2) 'typeC' with an SS/PBCH block and, when applicable, 'typeD' with a CSI-RS resource in an NZP-CSI-RS-ResourceSet configured with higher layer parameter repetition.

For periodic/semi-persistent CSI-RS, the UE can assume that the indicated DLorJointTCIState is not applied.

For an aperiodic CSI-RS resource in an NZP-CSI-RS-ResourceSet configured with higher layer parameter trs-Info, the UE shall expect that a TCI-State indicates qcl-Type set to 'typeA' with a periodic CSI-RS resource in a NZP-CSI-RS-ResourceSet configured with higher layer parameter trs-Info and, when applicable, qcl-Type set to 'typeD' with the same periodic CSI-RS resource.

For a CSI-RS resource in an NZP-CSI-RS-ResourceSet configured without higher layer parameter trs-Info and without the higher layer parameter repetition, the UE shall expect that a TCI-State indicates one of the following quasi co-location type(s): (1) 'typeA' with a CSI-RS resource in a NZP-CSI-RS-ResourceSet configured with higher layer parameter trs-Info and, when applicable, 'typeD' with the same CSI-RS resource, (2) 'typeA' with a CSI-RS resource in a NZP-CSI-RS-ResourceSet configured with higher layer parameter trs-Info and, when applicable, 'typeD' with an SS/PBCH block, (3) 'typeA' with a CSI-RS resource in a NZP-CSI-RS-ResourceSet configured with higher layer parameter trs-Info and, when applicable, 'typeD' with a CSI-RS resource in a NZP-CSI-RS-ResourceSet configured with higher layer parameter repetition, or (4) 'typeB' with a CSI-RS resource in a NZP-CSI-RS-ResourceSet configured with higher layer parameter trs-Info when 'typeD' is not applicable.

For a CSI-RS resource in an NZP-CSI-RS-ResourceSet configured with higher layer parameter repetition, the UE shall expect that a TCI-State indicates one of the following quasi co-location type(s): (1) 'typeA' with a CSI-RS resource in a NZP-CSI-RS-ResourceSet configured with higher layer parameter trs-Info and, when applicable, 'typeD' with the same CSI-RS resource, (2) 'typeA' with a CSI-RS resource in a NZP-CSI-RS-ResourceSet configured with higher layer parameter trs-Info and, when applicable, 'typeD' with a CSI-RS resource in a NZP-CSI-RS-ResourceSet configured with higher layer parameter repetition, (3) 'typeC' with an SS/PBCH block and, when applicable, 'typeD' with the same SS/PBCH block, the reference RS may additionally be an SS/PBCH block having a PCI different from the PCI of the serving cell. The UE can assume center frequency, SCS, SFN offset are the same for SS/PBCH block from the serving cell and SS/PBCH block having a PCI different from the serving cell.

For the DM-RS of PDCCH, the UE shall expect that a TCI-State or DLorJointTCIState except an indicated DLorJointTCIState indicates one of the following quasi co-location type(s): (1) 'typeA' with a CSI-RS resource in a NZP-CSI-RS-ResourceSet configured with higher layer parameter trs-Info and, when applicable, 'typeD' with the same CSI-RS resource, (2) 'typeA' with a CSI-RS resource in a NZP-CSI-RS-ResourceSet configured with higher layer parameter trs-Info and, when applicable, 'typeD' with a CSI-RS resource in an NZP-CSI-RS-ResourceSet configured with higher layer parameter repetition, or (3) 'typeA' with a CSI-RS resource in a NZP-CSI-RS-ResourceSet configured without higher layer parameter trs-Info and without higher layer parameter repetition and, when applicable, 'typeD' with the same CSI-RS resource.

When a UE is configured with sfnSchemePdcch set to 'sfnSchemeA', and CORESET is activated with two TCI states, the UE shall assume that the DM-RS port(s) of the PDCCH in the CORESET is quasi co-located with the DL-RSs of the two TCI states. When a UE is configured with sfnSchemePdcch set to 'sfnSchemeB', and a CORESET is activated with two TCI states, the UE shall assume that the DM-RS port(s) of the PDCCH is quasi co-located with the DL-RSs of the two TCI states except for quasi co-location parameters {Doppler shift, Doppler spread} of the second indicated TCI state.

For the DM-RS of PDSCH, the UE shall expect that a TCI-State or DLorJointTCIState except an indicated DLorJointTCIState indicates one of the following quasi co-location type(s): (1) 'typeA' with a CSI-RS resource in a NZP-CSI-RS-ResourceSet configured with higher layer parameter trs-Info and, when applicable, 'typeD' with the same CSI-RS resource, (2) 'typeA' with a CSI-RS resource in a NZP-CSI-RS-ResourceSet configured with higher layer parameter trs-Info and, when applicable, 'typeD' with a CSI-RS resource in an NZP-CSI-RS-ResourceSet configured with higher layer parameter repetition, or (3) 'typeA' with a CSI-RS resource in a NZP-CSI-RS-ResourceSet configured without higher layer parameter trs-Info and without higher layer parameter repetition and, when applicable, 'typeD' with the same CSI-RS resource.

For the DM-RS of PDCCH, the UE shall expect that an indicated DLorJointTCIState indicates one of the following quasi co-location type(s): (1) 'typeA' with a CSI-RS resource in a NZP-CSI-RS-ResourceSet configured with higher layer parameter trs-Info and, when applicable, 'typeD' with the same CSI-RS resource, or (2) 'typeA' with a CSI-RS resource in a NZP-CSI-RS-ResourceSet configured with higher layer parameter trs-Info and, when applicable, 'typeD' with a CSI-RS resource in an NZP-CSI-RS-ResourceSet configured with higher layer parameter repetition.

For the DM-RS of PDSCH, the UE shall expect that an indicated DLorJointTCIState indicates one of the following quasi co-location type(s) if the UE is configured TCI-State(s) with tci-StateId_r17: (1) 'typeA' with a CSI-RS resource in a NZP-CSI-RS-ResourceSet configured with higher layer parameter trs-Info and, when applicable, 'typeD' with the same CSI-RS resource, or (2) 'typeA' with a CSI-RS resource in a NZP-CSI-RS-ResourceSet configured with higher layer parameter trs-Info and, when applicable, 'typeD' with a CSI-RS resource in an NZP-CSI-RS-ResourceSet configured with higher layer parameter repetition.

When a UE is configured with sfnSchemePdsch set to 'sfnSchemeA', and the UE is indicated with two TCI states in a codepoint of the DCI field 'Transmission Configuration Indication' in a DCI scheduling a PDSCH, the UE shall assume that the DM-RS port(s) of the PDSCH is quasi co-located with the DL-RSs of the two TCI states. When a UE is configured with sfnSchemePdsch set to 'sfnSchemeB', and the UE is indicated with two TCI states in a codepoint of the DCI field 'Transmission Configuration Indication' in a DCI scheduling a PDSCH, the UE shall assume that the DM-RS port(s) of the PDSCH is quasi co-located with the DL-RSs of the two TCI states except for quasi co-location parameters {Doppler shift, Doppler spread} of the second indicated TCI state.

Throughout the present disclosure, the joint (e.g., provided by DLorJoint-TCIState), separate DL (e.g., provided by DLorJoint-TCIState) and/or separate UL (e.g., provided by UL-TCIState) TCI states described/discussed herein could also be referred to as unified TCI states, common TCI states, main TCI states and etc. In addition, the TCI state m (or n) or the unified TCI state m (or n) could be equivalent to or the same as the m-th (or n-th) indicated unified TCI state/pair of TCI states among the total M (or N) TCI states/pairs of TCI states indicated by one or more TCI codepoints in one or more TCI fields of the beam indication DCI (e.g., DCI format 1_1 or 1_2 with or without DL assignment) or indicated by the unified TCI state indication/activation MAC CE. Furthermore, in the present disclosure, a (unified) TCI state provided by the higher layer parameter TCI-State-r17 or tci-StateId-r17 could be equivalent to or the same as a joint DL and UL unified TCI state provided by the higher layer parameter DLorJoint-TCIState or a separate DL unified TCI state provided by the higher layer parameter DLorJoint-TCIState or a separate UL unified TCI state provided by the higher layer parameter UL-TCIState. A UE is said to be under the unified TCI framework when the UE is provided DLorJoint-TCIState, UL-TCIState, TCI-State, TCI-State-r17 or tci-StateId-r17 indicating one or more joint DL and UL TCI states or separate DL or separate UL TCI states. Additionally, the higher layer parameter useIndicatedTCIState could be equivalent to the higher layer parameter followUnifiedTCIState.

A UE can be provided, for each BWP of a serving cell, a set $\bar{q}_0$ of periodic CSI-RS resource configuration indexes by failureDetectionResourcesToAddModList and a set $\bar{q}_1$ of periodic CSI-RS resource configuration indexes and/or SS/PBCH block indexes by candidateBeamRSList or candidateBeamRSListExt or candidateBeamRSSCellList for radio link quality measurements on the BWP of the serving cell. In the present disclosure, in a single-TRP system or for single-TRP operation, a BFD RS (beam) set could correspond to the set $\bar{q}_0$ described herein, and a NBI RS (beam) set could correspond to the set $\bar{q}_1$ described herein.

Instead of the sets $\bar{q}_0$ and $\bar{q}_1$, for each BWP of a serving cell, the UE can be provided respective two sets $\bar{q}_{0,0}$ and $\bar{q}_{0,1}$ of periodic CSI-RS resource configuration indexes that can be activated by a MAC CE [11 TS 38.321] and corresponding two sets $\bar{q}_{1,0}$ and $\bar{q}_{1,1}$ of periodic CSI-RS resource configuration indexes and/or SS/PBCH block indexes by candidateBeamRSList1 and candidateBeamRSList2, respectively, for radio link quality measurements on the BWP of the serving cell. The set $\bar{q}_{0,0}$ is associated with the set $\bar{q}_{1,0}$ and the set $\bar{q}_{0,1}$ is associated with the set $\bar{q}_{1,1}$. In the present disclosure, in a multi-TRP system or for multi-TRP operation, the UE can be provided a BFD RS (beam) set p, where $p \in \{1, 2, \ldots, N\}$ and N denotes the total number of BFD RS (beam) sets configured/provided to the UE. For this case, the first BFD RS set or BFD RS set 1 (e.g., p=1) could correspond to the set $\bar{q}_{0,0}$ described herein, and the second BFD RS set or BFD RS set 2 (e.g., p=2) could correspond to the set $\bar{q}_{0,1}$ described herein. In addition, the UE can be provided a NBI RS (beam) set p', where $p' \in \{1,2, \ldots, M\}$ and M denotes the total number of NBI RS (beam) sets configured/provided to the UE. For this case, the first NBI RS set or NBI RS set 1 (e.g., p'=1) could correspond to the set $\bar{q}_1$ described herein, and the second NBI RS set or NBI RS set 2 (e.g., p'=2) could correspond to the set $\bar{q}_1$ described herein. If the UE is not provided $\bar{q}_0$ by failureDetectionResourcesToAddModList for a BWP of the serving cell, the UE determines the set $\bar{q}_0$ to include periodic CSI-RS resource configuration indexes with same values as the RS indexes in the RS sets indicated by TCI-State for respective CORE-SETs that the UE uses for monitoring PDCCH. If the UE is not provided $\bar{q}_{0,0}$ or $\bar{q}_0$, for a BWP of the serving cell, the UE determines the set $\bar{q}_{0,0}$ or $\bar{q}_{0,1}$ to include periodic CSI-RS resource configuration indexes with same values as the RS indexes in the RS sets indicated by TCI-State for first and second CORESETs that the UE uses for monitoring PDCCH, where the UE is provided two coresetPoolIndex values 0 and 1 for the first and second CORESETs, or is not provided coresetPoolIndex value for the first CORESETs and is provided coresetPoolIndex value of 1 for the second CORESETs, respectively. If there are two RS indexes in a TCI state, the set $\bar{q}_0$ or $\bar{q}_{0,0}$, or $\bar{q}_0$, includes RS indexes configured with qcl-Type set to 'typeD' for the corresponding TCI states. In the present disclosure, in a single-TRP system or for single-TRP operation, a BFD RS (beam) set could correspond to the set $\bar{q}_0$ described herein, and a NBI RS (beam) set could correspond to the set $\bar{q}_i$ described herein. In the present disclosure, in a multi-TRP system or for multi-TRP operation, the UE can be provided a BFD RS (beam) set p, where p∈{1,2, . . . , N} and N denotes the total number of BFD RS (beam) sets configured/provided to the UE. For this case, the first BFD RS set or BFD RS set 1 (e.g., p=1) could correspond to the set $\bar{q}_{0,0}$ described herein, and the second BFD RS set or BFD RS set 2 (e.g., p=2) could correspond to the set $\bar{q}_{0,1}$ described herein. In addition, the UE can be provided a NBI RS (beam) set p', where p'∈{1,2, . . . , M} and M denotes the total number of NBI RS (beam) sets configured/provided to the UE. For this case, the first NBI RS set or NBI RS set 1 (e.g., p'=1) could correspond to the set $\bar{q}_{1,0}$ described herein, and the second NBI RS set or NBI RS set 2 (e.g., p'=2) could correspond to the set $\bar{q}_{1,1}$ described herein.

If a CORESET that the UE uses for monitoring PDCCH includes two TCI states and the UE is provided sfn-SchemePdcch set to 'sfnSchemeA' or 'sfnSchemeB', the set $\bar{q}_0$ includes RS indexes in the RS sets associated with the two TCI states. The UE expects the set $\bar{q}_0$ to include up to two RS indexes. If the UE is provided $\bar{q}_{0,0}$ or $\bar{q}_{0,1}$, the UE expects the set $\bar{q}_{0,0}$ or the set $\bar{q}_{0,1}$ to include up to a number of $N_{BFD}$ RS indexes indicated by capabilityparametername. If the UE is not provided $\bar{q}_{0,0}$ or $\bar{q}_{0,1}$, and if a number of active TCI states for PDCCH receptions in the first or second CORE-SETs is larger than $N_{BFD}$, the UE determines the set $\bar{q}_{0,0}$ or $\bar{q}_{0,1}$ to include periodic CSI-RS resource configuration indexes with same values as the RS indexes in the RS sets associated with the active TCI states for PDCCH receptions in the first or second CORESETs corresponding to search space sets according to an ascending order for monitoring periodicity. If more than one first or second CORESETs correspond to search space sets with same monitoring periodicity, the UE determines the order of the first or second CORESETs according to a descending order of a CORESET index.

If a UE is not provided coresetPoolIndex or is provided coresetPoolIndex with a value of 0 for first CORESETs on an active DL BWP of a serving cell, and/or the UE is provided coresetPoolIndex with a value of 1 for second CORESETs on the active DL BWP of the serving cells, and/or the UE is provided SSB-MTCAdditionalPCI, SS/PBCH block indexes associated with a physical cell identity other than the one provided by physCellId in ServingCellConfigCommon can be provided in either $\bar{q}_{1,0}$ or $\bar{q}_{1,1}$ set and the corresponding $\bar{q}_{0,0}$ or $\bar{q}_{0,1}$ set is associated with the physical cell identity.

The UE expects single port RS in the set $\bar{q}_0$, or $\bar{q}_{0,0}$, or $\bar{q}_{0,1}$. The UE expects single-port or two-port CSI-RS with frequency density equal to 1 or 3 REs per RB in the set $\bar{q}_1$, or $\bar{q}_{1,0}$, or $\bar{q}_{0,1}$. The thresholds $Q_{out,LR}$ and $Q_{in,LR}$ correspond to the default value of rlmInSyncOutOfSyncThreshold, as described in [10, TS 38.133] for $Q_{out}$, and to the value provided by rsrp-ThresholdSSB or rsrp-ThresholdBFR, respectively.

The physical layer in the UE assesses the radio link quality according to the set $\bar{q}_0$, $\bar{q}_{0,0}$, or $\bar{q}_{0,1}$, of resource configurations against the threshold $Q_{out,LR}$. For the set $\bar{q}_0$, the UE assesses the radio link quality only according to SS/PBCH blocks on the PCell or the PSCell or periodic CSI-RS resource configurations that are quasi co-located, as described in [6, TS 38.214], with the DM-RS of PDCCH receptions monitored by the UE. The UE applies the $Q_{in,LR}$ threshold to the L1-RSRP measurement obtained from a SS/PBCH block. The UE applies the $Q_{in,LR}$ threshold to the L1-RSRP measurement obtained for a CSI-RS resource after scaling a respective CSI-RS reception power with a value provided by powerControlOffsetSS.

In non-DRX mode operation, the physical layer in the UE provides an indication to higher layers when the radio link quality for all corresponding resource configurations in the set $q_0$, or in the set $\bar{q}_{0,0}$ or $\bar{q}_{0,1}$ that the UE uses to assess the radio link quality is worse than the threshold $Q_{out,LR}$. The physical layer informs the higher layers when the radio link quality is worse than the threshold $Q_{out,LR}$ with a periodicity determined by the maximum between the shortest periodicity among the SS/PBCH blocks on the PCell or the PSCell and/or the periodic CSI-RS configurations in the set $\bar{q}_0$, $\bar{q}_{0,0}$, or $\bar{q}_{0,1}$ that the UE uses to assess the radio link quality and 2 msec. In DRX mode operation, the physical layer provides an indication to higher layers when the radio link quality is worse than the threshold $Q_{out,LR}$ with a periodicity determined as described in [10, TS 38.133].

For the PCell or the PSCell, upon request from higher layers, the UE provides to higher layers the periodic CSI-RS configuration indexes and/or SS/PBCH block indexes from the set $\bar{q}_1$, or $\bar{q}_{1,0}$, or $\bar{q}_{1,1}$ and the corresponding L1-RSRP measurements that are larger than or equal to the $Q_{in,LR}$ threshold.

For the SCell, upon request from higher layers, the UE indicates to higher layers whether there is at least one periodic CSI-RS configuration index or SS/PBCH block index from the set $\bar{q}_1$, or $\bar{q}_{1,0}$, or $\bar{q}_{1,1}$ with corresponding L1-RSRP measurements that is larger than or equal to the $Q_{in,LR}$ threshold, and provides the periodic CSI-RS configuration indexes and/or SS/PBCH block indexes from the set $\bar{q}_1$, or $\bar{q}_{1,0}$, or $\bar{q}_{1,1}$ and the corresponding L1-RSRP measurements that are larger than or equal to the $Q_{in,LR}$ threshold, if any.

For the PCell or the PSCell, a UE can be provided a CORESET through a link to a search space set provided by recoverySearchSpaceId, as described in clause 10.1, for monitoring PDCCH in the CORESET. If the UE is provided recoverySearchSpaceId, the UE does not expect to be provided another search space set for monitoring PDCCH in the CORESET associated with the search space set provided by recoverySearchSpaceId.

For the PCell or the PSCell, the UE can be provided, by PRACH-ResourceDedicatedBFR, a configuration for PRACH transmission as described in clause 8.1. For PRACH transmission in slot n and according to antenna port quasi co-location parameters associated with periodic CSI-RS resource configuration or with SS/PBCH block associated with index $q_{new}$ provided by higher layers [11, TS 38.321], the UE monitors PDCCH in a search space set provided by recoverySearchSpaceId for detection of a DCI format with CRC scrambled by C-RNTI or MCS-C-RNTI starting from slot $n+4+2^{\mu} \cdot k_{mac}$, where $\mu$ is the SCS configuration for the PRACH transmission and $k_{mac}$ is a number of slots provided by K-Mac [12, TS 38.331] or $k_{mac}=0$ if K-Mac is not provided, within a window configured by BeamFailureRecoveryConfig. For PDCCH monitoring in a search space set provided by recoverySearchSpaceId and for corresponding PDSCH reception, the UE assumes the same antenna port quasi-collocation parameters as the ones associated with index $q_{new}$ until the UE receives by higher layers an activation for a TCI state or any of the parameters tci-StatesPDCCH-ToAddList and/or tci-StatesPDCCH-ToReleaseList. After the UE detects a DCI format with CRC scrambled by C-RNTI or MCS-C-RNTI in the search space set provided by recoverySearchSpaceId, the UE continues to monitor PDCCH candidates in the search space set provided by recoverySearchSpaceId until the UE receives a MAC CE activation command for a TCI state or tci-StatesPDCCH-ToAddList and/or tci-StatesPDCCH-ToReleaseList.

Under the Rel-15/16 TCI framework, the UE may expect to receive from the network a MAC CE to indicate the one or more TCI states—from a higher layer RRC configured pool of TCI states—for the one or more PDCCHs. Under the unified TCI framework, the UE may expect to receive from the network a MAC CE, or a DCI, or both MAC CE and DCI to indicate the one or more TCI states—from a higher layer RRC configured pool of TCI states—for the one or more PDCCHs. Furthermore, as aforementioned, an indicated TCI state could be: (1) a DL TCI state and/or its corresponding/associated TCI state ID for both PDCCH and PDSCH, (2) an UL TCI state and/or its corresponding/associated TCI state ID for both PUCCH and PUSCH, (3) a joint DL and UL TCI state and/or its corresponding/associated TCI state ID for all DL and UL channels such as PDCCH, PDSCH, PUCCH and PUSCH, and (4) a separate DL TCI state for PDCCH and PDSCH and a separate UL TCI state for PUCCH and PUSCH and/or their corresponding/associated TCI state ID(s).

Figure 10:
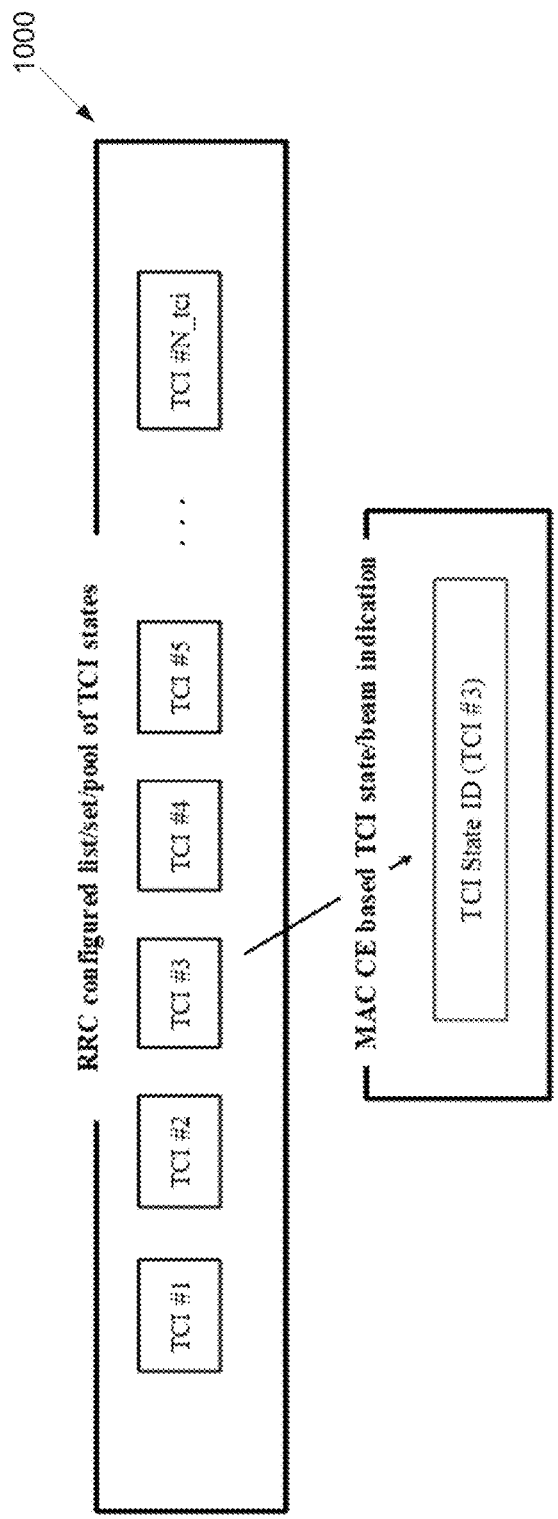
FIG. 10 illustrates an example of media access control-control element (MAC CE) based TCI state/beam indication according to embodiments of the present disclosure.

FIG. 10 illustrates an example of MAC CE based TCI state/beam indication 1000 according to embodiments of the present disclosure. An embodiment of the MAC CE based TCI state/beam indication 1000 shown in FIG. 10 is for illustration only.

In FIG. 10, an example of MAC CE based TCI state/beam indication is presented. As illustrated in FIG. 10, the UE could be first higher layer configured by the network, e.g., via the higher layer RRC signaling, a list/pool of N_tci TCI states. Each TCI state contains at least a QCL source RS with a QCL type, e.g., QCL-typeA/B/C/D. The UE could then receive from the network one or more MAC CE commands to indicate one or more beam(s) (i.e., the TCI state(s)) for the transmission/reception of the PDCCH(s), PDSCH(s), PUCCH(s) or PUSCH(s).

The MAC CE for common TCI state/beam indication could include at least a TCI state ID. As discussed above, the TCI state corresponding to the TCI state ID could be at least one of: (1) a DL TCI state; (2) an UL TCI state; (3) a joint DL and UL TCI state; or (4) a separate DL TCI state and UL TCI state.

Figure 11:
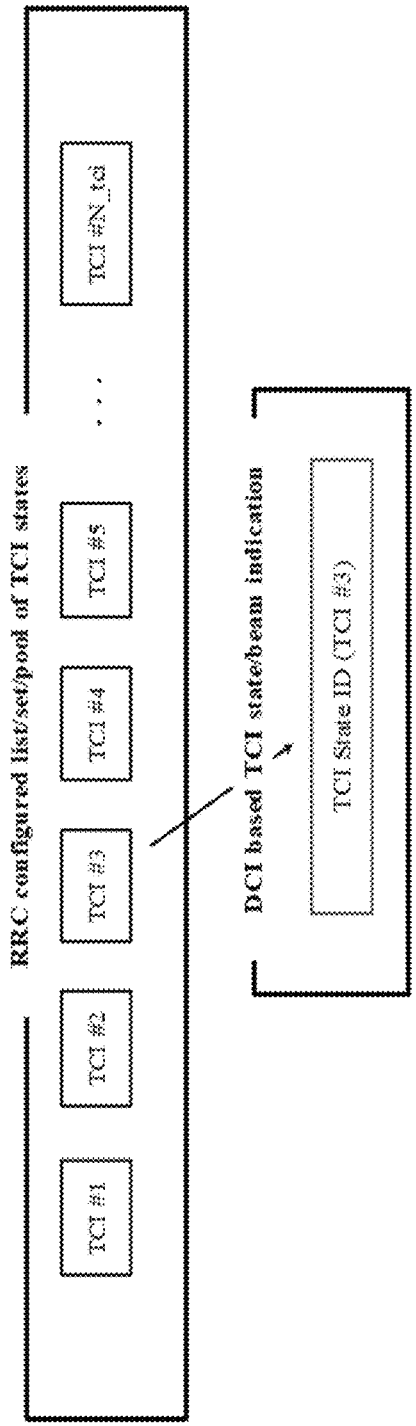
FIG. 11 illustrates an example of downlink control information (DCI) based unified TCI state/beam indication according to embodiments of the present disclosure.

FIG. 11 illustrates an example of DCI based unified TCI state/beam indication 1100 according to embodiments of the present disclosure. An embodiment of the DCI based unified TCI state/beam indication 1100 shown in FIG. 11 is for illustration only.

In FIG. 11, an example of DCI based common TCI state/beam indication is presented. As illustrated in FIG. 11, the UE could be first higher layer configured by the network, e.g., via the higher layer RRC signaling, a list/pool of N_tci TCI states. Each TCI state contains at least a QCL source RS with a QCL type, e.g., QCL-typeA/B/C/D. The UE could then receive from the network one or more DCIs to indicate one or more beam(s) (i.e., the TCI state(s)) for the transmission/reception of the PDCCH(s), PDSCH(s), PUSCH(s) or PUCCH(s).

Figure 12:
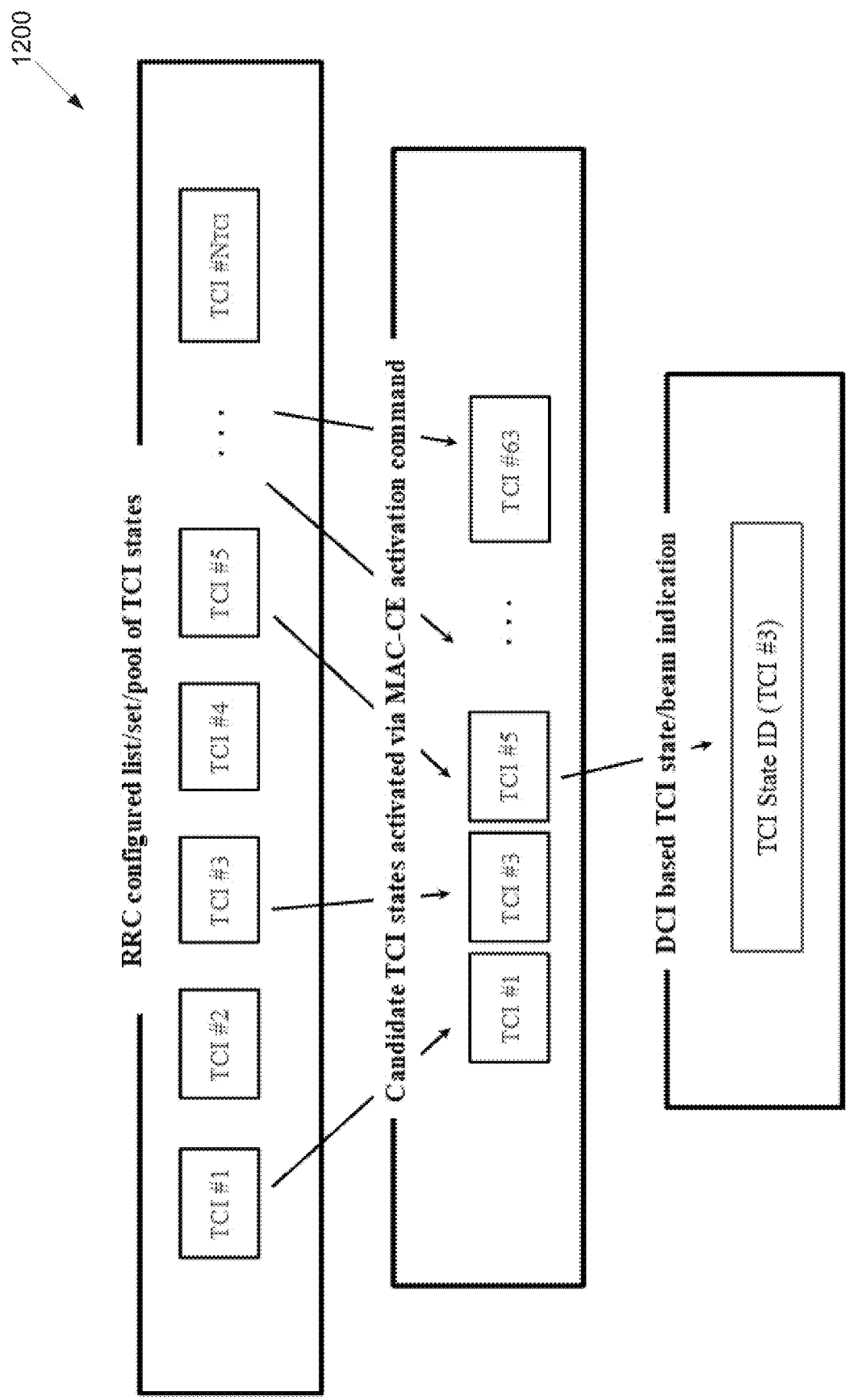
FIG. 12 illustrates an example of DCI based unified TCI state/beam indication with MAC CE activated TCI states according to embodiments of the present disclosure.

FIG. 12 illustrates an example of DCI based unified TCI state/beam indication with MAC CE activated TCI states 1200 according to embodiments of the present disclosure. An embodiment of the DCI based unified TCI state/beam indication with MAC CE activated TCI states 1200 shown in FIG. 12 is for illustration only.

In FIG. 12, an example of DCI based common TCI state/beam indication (with MAC CE activated TCI states) is presented. As illustrated in FIG. 12, the UE could be first higher layer configured by the network, e.g., via the higher layer RRC signaling, a list/pool of N_tci TCI states. Each TCI state contains at least a QCL source RS with a QCL type, e.g., QCL-typeA/B/C/D. The UE could then receive from the network one or more MAC CE activation commands activating one or more TCI states from the higher layer configured list/pool of TCI states, e.g., up to eight TCI states could be activated by a MAC CE activation command. The UE could receive from the network one or more DCIs for beam indication to indicate one or more beam(s) (i.e., the TCI state(s)) from the MAC CE activated TCI state(s)/beam(s) for the transmission/reception of the PDCCH(s), PDSCH(s), PUCCH(s) or PUSCH(s).

As described above, a DCI used to indicate to the UE a beam (i.e., a TCI state and/or a TCI state ID) for the transmission/reception of a PDCCH or a PDSCH could be at least one of the following: (1) in one example, a DL related DCI (e.g., DCI format 1_0, DCI format 1_1 or DCI format 1_2) could be used to indicate to the UE a beam (i.e., a TCI state and/or a TCI state ID) for the transmission/reception of a PDCCH or a PDSCH, wherein the DL related DCI may or may not include a DL assignment; (2) in another example, an UL related DCI (e.g., DCI format 0_0, DCI format 0_1, DCI format 0_2) could be used to indicate to the UE a beam (i.e., a TCI state and/or a TCI state ID) for the transmission/reception of a PDCCH or a PDSCH, wherein the UL related DCI may or may not include an UL scheduling grant; or (3) yet in another example, a custom/purpose designed DCI format could be used to indicate to the UE a beam (i.e., a TCI state and/or a TCI state ID) for the transmission/reception of a PDCCH or a PDSCH.

Furthermore, the TCI state indicated in the DCI for beam indication could be at least one of: (1) a DL TCI state; (2) an UL TCI state; (3) a joint DL and UL TCI state; or (4) a separate DL TCI state and UL TCI state.

As mentioned in the present disclosure, the UE could implicitly determine/configure the BFD RS(s), which could correspond to 1-port CSI-RS resource configuration index(es) or SSB index(es) indicated/configured as the QCL-typeD source RS(s) in one or more active TCI states indicated for one or more PDCCHs reception. Various means of implicitly configuring the BFD RS under the unified TCI framework—e.g., when the UE is provided DLorJoint-TCIState or UL-TCIState—are presented as follows.

In one example, the UE could implicitly determine/configure a BFD RS, which could correspond to a 1-port CSI-RS resource configuration index or SSB index indicated/configured as the QCL source RS in a common DL TCI state, e.g., provided by DLorJoint-TCIState, for both PDCCH and PDSCH receptions under the Unified TCI framework, in a BFD RS set q0. The UE could be indicated by the network the common DL TCI state, e.g., provided by DLorJoint-TCIState, for both PDCCH and PDSCH via the MAC CE based or DCI based (with or without MAC CE activation) common beam indication strategy discussed above.

In another example, the UE could implicitly determine/configure a BFD RS, which could correspond to a 1-port CSI-RS resource configuration index or SSB index indicated/configured as the QCL source RS in a common joint DL and UL TCI state, e.g., provided by DLorJoint-TCIState, for all DL and UL channels such as PDCCH, PDSCH, PUCCH and PUSCH under the Unified TCI framework, in a BFD RS set q0. The UE could be indicated by the network the common joint DL and UL TCI state, e.g., provided by DLorJointTCI-State, for all DL and UL channels via the MAC CE based or DCI based (with or without MAC CE activation) common beam indication strategy discussed above.

In yet another example, the UE could be indicated by the network a separate DL TCI state, e.g., provided by DLorJoint-TCIState, for PDCCH and PDCCH and a separate UL TCI state, e.g., provided by UL-TCIState, for PUCCH and PUSCH via the MAC CE based or DCI based (with or without MAC CE activation) common beam indication strategy discussed above. The UE could implicitly determine/configure a BFD RS, which could correspond to a 1-port CSI-RS resource configuration index or SSB index indicated/configured as the QCL source RS in a separate DL TCI state, e.g., provided by DLorJoint-TCIState, for PDCCH and PDSCH receptions indicated via the common beam indication under the unified TCI framework, in a BFD RS set q0. Optionally, In one instance, the UE could implicitly determine/configure a BFD RS, which could correspond to a 1-port CSI-RS resource configuration index or SSB index indicated/configured as the QCL source RS in the separate UL TCI state, e.g., provided by UL-TCIState, for PUCCH and PUSCH transmissions indicated via the common beam indication under the unified TCI framework, in a BFD RS set q0.

In another instance, the UE is not expected to determine/configure a BFD RS corresponding to a 1-port CSI-RS resource configuration index or SSB index indicated/configured as the QCL source RS in the separate UL TCI state, e.g., provided by UL-TCIState, for PUCCH and PUSCH indicated via the common beam indication under the unified TCI framework.

The UE could be indicated by the network to follow instances, examples, or embodiments.

In yet another example, the UE could be indicated by the network a common UL TCI state for both PUCCH and PUSCH via the MAC CE based or DCI based (with or without MAC CE activation) common beam indication strategy discussed above. In this case, In one instance, the UE could implicitly determine/configure a BFD RS, which could correspond to a 1-port CSI-RS resource configuration index or SSB index indicated/configured as the QCL source RS in the common UL TCI state for PUCCH and PUSCH transmissions under the unified TCI framework, in a BFD RS set q0.

In one instance, the UE is not expected to determine/configure a BFD RS corresponding to a 1-port CSI-RS resource configuration index or SSB index indicated/configured as the QCL source RS in the common UL TCI state for PUCCH and PUSCH under the unified TCI framework.

The UE could be indicated by the network to following instances, examples, or embodiments.

The UE could be higher layer RRC configured and/or MAC CE indicated by the network (e.g., via a higher layer parameter failureDetectionRS and/or BFD RS indication MAC CE) a set of Ntot≥1 BFD RS resources (e.g., via a set of periodic CSI-RS resource configuration indexes). Under the unified TCI framework with common beam indication/update—e.g., when the UE is provided DLorJoint-TCIState or UL-TCIState, In one example, for a RRC/MAC CE configured/indicated set of BFD RS resources and one or more CORESETs that the UE is configured for monitoring PDCCH(s), the UE could only measure/monitor the BFD RS resource(s) in the RRC/MAC CE configured/indicated set of BFD RS resources that is the same as the QCL source RS(s) indicated in the TCI state(s) for the CORESET(s)/PDCCH(s). Under the unified TCI framework, e.g., when the UE is provided DLorJoint-TCIState or UL-TCIState, the TCI state(s) for the CORESET(s)/PDCCH(s) could be indicated via the MAC CE based or DCI based (with or without MAC CE activation) common beam indication strategy discussed above. Furthermore, the indicated TCI state(s) for the CORESET(s)/PDCCH(s) could be: (1) a DL TCI state and/or its corresponding/associated TCI state ID for both PDCCH and PDSCH, (2) an UL TCI state and/or its corresponding/associated TCI state ID for both PUCCH and PUSCH, (3) a joint DL and UL TCI state and/or its corresponding/associated TCI state ID for all DL and UL channels such as PDCCH, PDSCH, PUCCH and PUSCH, and (4) a separate DL TCI state for PDCCH and PDSCH and a separate UL TCI state for PUCCH and PUSCH and/or their corresponding/associated TCI state ID(s).

In another example, the UE could receive from the network a MAC CE activation command/bitmap to activate/update N_bfd≥1 BFD RS resources from the higher layer RRC configured Ntot BFD RS resources to monitor the link quality or detect potential beam failure for the corresponding CORESET(s)/PDCCH(s). For instance, the MAC CE activation command/bitmap could contain/comprise Ntot entries/bit positions with each entry/bit position in the bitmap corresponding to an entry in the RRC configured set of Ntot candidate BFD RS resources. If an entry/bit position in the bitmap is enabled, e.g., set to "1," the corresponding entry in the RRC configured set of Ntot candidate BFD RS resources is activated as a BFD RS resource for monitoring the link quality or detecting potential beam failure of the corresponding CORESET(s)/PDCCH(s).

In yet another example, for the MAC CE based common beam indication strategy as illustrated in FIG. 10, one or more BFD RS resource indexes, e.g., in/from the higher layer RRC configured set of Ntot BFD RS resources, could be included/indicated/comprised in the MAC CE for common beam indication. In this case, the UE is expected to only measure one or more BFD RSs to monitor the link quality or detect potential beam failure for one or more CORESETs/PDCCHs if the one or more BFD RS resources and the TCI state(s) for the one or more CORESETs/PDCCHs are indicated in the same MAC CE for common beam indication. As aforementioned, here, the indicated TCI state(s) for the CORESET(s)/PDCCH(s) could be: (1) a DL TCI state and/or its corresponding/associated TCI state ID for both PDCCH and PDSCH, (2) an UL TCI state and/or its corresponding/associated TCI state ID for both PUCCH and PUSCH, (3) a joint DL and UL TCI state and/or its corresponding/associated TCI state ID for all DL and UL channels such as PDCCH, PDSCH, PUCCH and PUSCH, and (4)

a separate DL TCI state for PDCCH and PDSCH and a separate UL TCI state for PUCCH and PUSCH and/or their corresponding/associated TCI state ID(s).

In yet another example, for the DCI based common beam indication strategy as illustrated in FIG. 11 (without MAC CE activation) and FIG. 10 (with MAC CE activation), one or more BFD RS indexes, e.g., in/from the higher layer RRC configured set of Ntot BFD RS resources, could be included/indicated/comprised in the DCI for common beam indication—i.e., the beam indication DCI 1_1/1_2 with or without DL assignment.

For example, one or more fields in the DCI for common beam indication could be used/reserved for indicating the one or more BFD RS resource indexes. In this case, the UE is expected to only measure one or more BFD RSs to monitor the link quality or detect potential beam failure for one or more CORESETs/PDCCHs if the one or more BFD RS resources and the TCI state(s) for the one or more CORESETs/PDCCHs are indicated in the same DCI for common beam indication (with or without MAC CE activation).

For another example, one or more BFD RS resource indexes, e.g., in/from the higher layer RRC configured set of Ntot BFD RS resources, could be indicated/included/comprised in the common TCI state, e.g., in the higher layer parameter TCI-State or QCL-Info. In TABLE 1, an illustrative example of indicating the BFD RS resource index(es) in the higher layer parameter TCI-State is presented. In TABLE 2, an illustrative example of indicating the BFD RS resource index(es) in the higher layer parameter QCL-Info is presented.

TABLE 1

BFD RS resource in TCI-state

```
TCI-State ::=   SEQUENCE {
tci-StateId     TCI-StateId,
radioLinkMonitoringRS-Id   RadioLinkMonitoringRS-Id OPTIONAL,
                           -- Need R
qcl-Type1    QCL-Info,
qcl-Type2    QCL-Info        OPTIONAL, -- Need R
...
}
```

TABLE 2

BFD RS resource in QCL-Info

```
QCL-Info ::=    SEQUENCE {
cell      ServCellIndex     OPTIONAL, -- Need R
radioLinkMonitoringRS-Id   RadioLinkMonitoringRS-Id OPTIONAL,
                           -- Need R
bwp-Id    BWP-Id    OPTIONAL, -- Cond CSI-RS-Indicated
referenceSignal    CHOICE {
  csi-rs    NZP-CSI-RS-ResourceId,
  ssb       SSB-Index
},
qcl-Type    ENUMERATED {typeA, typeB, typeC, typeD},
...
}
```

In this case, the UE is expected to only measure one or more BFD RSs to monitor the link quality or detect potential beam failure for one or more CORESETs/PDCCHs if the one or more BFD RS resources are indicated in the unified TCI state(s) for the one or more CORESETs/PDCCHs. As aforementioned, here, the indicated TCI state(s) for the CORESET(s)/PDCCH(s) could be: (1) a DL TCI state and/or its corresponding/associated TCI state ID for both PDCCH and PDSCH, (2) an UL TCI state and/or its corresponding/associated TCI state ID for both PUCCH and PUSCH, (3) a joint DL and UL TCI state and/or its corresponding/associated TCI state ID for all DL and UL channels such as PDCCH, PDSCH, PUCCH and PUSCH, and (4) a separate DL TCI state for PDCCH and PDSCH and a separate UL TCI state for PUCCH and PUSCH and/or their corresponding/associated TCI state ID(s).

In one example, the same common TCI state/beam for UE-dedicated PDCCH/PDSCH or dynamic-grant/configured-grant based PUSCH and all of dedicated PUCCH resources could also be indicated for one or more target RSs such as periodic CSI-RSs. Or equivalently, one or more (target) RSs such as periodic CSI-RSs could follow the QCL assumption in a common TCI state/beam indicated for UE-dedicated PDCCH/PDSCH or dynamic-grant/configured-grant based PUSCH and all of dedicated PUCCH resources. The UE could use/configure such a (target) RS as a BFD RS in the BFD RS set q0 for potential beam failure detection. In this case, a BFD RS shares the same common TCI state/beam indicated for UE-dedicated PDCCH/PDSCH or dynamic-grant/configured-grant based PUSCH and all of dedicated PUCCH resources.

In one example, if the UE is not configured/indicated by the network any BFD RS resource(s), e.g., not provided with the higher layer parameter failureDetectionRS or BFD RS indication MAC CE, the UE could implicitly determine/configure the BFD RS resource(s) following the design examples 1.1, 1.2, 1.3 or 1.4 discussed above under the unified TCI framework. Alternatively, the UE could be indicated by the network to implicitly determine/configure the BFD RS resource(s) following the design examples 1.1, 1.2, 1.3 or 1.4 regardless whether the UE is configured by the network (e.g., via the higher layer parameter Beam-Failure-Detection-RS-ResourceConfig) BFD RS resource(s) or not; this indication could be via higher layer (RRC) or/and MAC CE or/and DCI based signaling or/and any combination of at least two of RRC, MAC CE and DCI based signaling; this indication could be via a separate (dedicated) parameter or joint with another parameter.

In another example, the UE is configured/indicated by the network (e.g., via the higher layer parameter failureDetectionRS or BFD RS indication MAC CE) one or more BFD RS resources to monitor the link quality or detect potential beam failure for one or more CORESETs/PDCCHs. The UE could follow the design examples 2.1, 2.2, 2.3 or 2.4 if at least one of the following conditions is met/achieved/satisfied: (1) the UE could be indicated by the network to determine/configure the BFD RS resource(s) following the design examples 2.1, 2.2, 2.3 or 1.4; this indication could be via higher layer (RRC) or/and MAC CE or/and DCI based signaling or/and any combination of at least two of RRC, MAC CE and DCI based signaling; this indication could be via a separate (dedicated) parameter or joint with another parameter; and (2) the QCL source RS(s) indicated in the common/unified TCI state (e.g., provided by DLorJointTCI-State or UL-TCIState for at least PDCCH) is aperiodic CSI-RS.

In yet another example, the UE could first use the higher layer RRC configured (e.g., via the higher layer parameter failureDetectionRS) or the BFD RS indication MAC CE indicated one or more BFD RSs to monitor the link quality or detect potential beam failure for one or more CORESETs/PDCCHs. If the UE receives from the network a DCI for common beam indication (with or without MAC CE activation as illustrated in FIG. 11 or FIG. 12) to indicate the TCI state/beam update for the CORESET(s)/PDCCH(s), the UE could follow at least one of the followings to determine/configure the BFD RS resource(s): (1) the UE could follow the design examples mentioned in the present disclosure to implicitly determine/configure the BFD RS(s) as the QCL source RS(s) indicated in the common/unified TCI state (e.g., provided by DLorJointTCI-State or UL-TCIState for at least PDCCH); here, the common/unified TCI state is indicated via the DCI for common beam indication; or (2) the UE could following the examples discussed in the present disclosure to determine/configure the BFD RS(s) for the corresponding CORESET(s)/PDCCH(s).

The UE could follow the design examples discussed in the present disclosure to determine/configure the BFD RS(s) for the corresponding CORESET(s)/PDCCH(s).

In yet another example, if the UE receives from the network a MAC CE for common beam indication (as illustrated in FIG. 10), the UE could follow at least one of the following to determine/configure the BFD RS resource(s): (1) the UE could use the higher layer RRC configured (e.g., via the higher layer parameter failureDetectionRS) one or more BFD RSs to monitor the link quality or detect potential beam failure for one or more CORESETs/PDCCHs; (2) the UE could follow the design examples discussed in the present disclosure to implicitly determine/configure the BFD RS(s) as the QCL source RS(s) indicated in the common/unified TCI state (for at least PDCCH); here, the common/unified TCI state is indicated via the MAC CE for common beam indication; or (3) the UE could following the design examples discussed in the present disclosure to determine/configure the BFD RS(s) for the corresponding CORESET(s)/PDCCH(s).

In yet another example, the physical layer of the UE could assess the radio link quality of all the BFD RS(s) in the BFD RS set q0 and inform higher layers when the radio link quality is worse than a BFD threshold Qout. As discussed above, the configuration/determination of the BFD RS(s) in the BFD RS set q0 could follow those specified in the design examples discussed in the present disclosure. The higher layers of the UE could maintain a beam failure instance (BFI) counter. If the higher layers in the UE are informed that the radio link quality for the BFD RS set $q_0$ is worse than the BFD threshold Qout, the higher layers in the UE could increment the BFI count for the BFD RS set q0 (e.g., provided by the higher layer parameter BFI_COUNTER) by one. The UE could declare a beam failure for the BFD RS set q0 if the BFI count for the BFD RS set q0 reaches the maximum number of BFI counts (e.g., provided by the higher layer parameter maxBFIcount) before a BFD timer expires.

The higher layers in the UE may reset the BFI count to zero if at least one of the following occurs: (1) the BFD timer expires before the BFI count reaches the maximum number of BFI counts; or (2) the UE receives from the network a common TCI state/beam for UE-dedicated PDCCH/PDSCH or dynamic-grant/configured-grant based PUSCH and all of dedicated PUCCH resources. The common TCI state/beam can be indicated via MAC CE or DCI (with or without downlink assignment and with or without MAC CE activation).

A UE could be provided by the network a configuration for PUCCH transmission with a link recovery request (LRR), using either PUCCH format 0 or PUCCH format 1. The UE could transmit a PUCCH in the PUCCH resource with a LRR if the radio link quality of all the BFD RS(s) in the BFD RS set q0 is worse than Qout. Having the radio link quality of the BFD RS set q0 worse than Qout implies that the hypothetical BLERs of the corresponding CORESETs/PDCCHs are above a given threshold. Under the Unified TCI framework, a beam/link failure for downlink channel (s)—e.g., the hypothetical BLERs of the PDCCH receptions in CORESETs are above the threshold—could also indicate a beam/link failure for uplink channels such as PUCCHs. In this case, the UE may not be able to send to the network the BFRQ via the PUCCH resource with an LRR.

In one example, under the Unified TCI framework, e.g., when a UE is provided DLorJointTCI-State or ULTCI-State indicating a joint DL and UL TCI state or separate DL or UL TCI state for the PCell or the PSCell or the SCell, or when the UE is provided tci-StateId-r17 indicating a joint DL and UL TCI state or separate DL or UL TCI state for the PCell or the PSCell or the SCell, if the radio link quality of the BFD RS set q0 is worse than Qout, regardless of whether the UE is provided by the network a configuration for PUCCH transmission with a LRR, if the UE has been provided, by PRACH-ResourceDedicatedBFR, a configuration for PRACH transmission wherein a set of PRACH resources are configured each associated with a NBI RS resource (corresponding to a periodic 1-port or 2-port CSI-RS resource configuration index or SSB index) in the NBI RS set, the UE would perform PRACH transmission to the network requesting beam/link failure recovery in slot n according to antenna port quasi co-location parameters associated with periodic CSI-RS resource configuration or with SSB associated with the new beam index q_new. Afterwards, the UE monitors PDCCH in a search space set provided by recoverySearchSpaceId for detection of a DCI format with CRC scrambled by C-RNTI or MCS-C-RNTI starting from slot n+4 within a window configured by BeamFailureRecoveryConfig.

For PDCCH monitoring in a search space set provided by recoverySearchSpaceId and for corresponding PDSCH reception, the UE assumes the same antenna port quasi-collocation parameters as the ones associated with the new beam index q_new until the UE receives from the network activation(s) for a joint DL and UL TCI state or separate DL or UL TCI state under the Unified TCI framework. After the UE detects a DCI format with CRC scrambled by C-RNTI or MCS-C-RNTI in the search space set provided by recoverySearchSpaceId, the UE continues to monitor PDCCH candidates in the search space set provided by recoverySearchSpaceId until the UE receives from the network activation(s) for a joint DL and UL TCI state or separate DL or UL TCI state under the Unified TCI framework. As discussed above, the activation(s) for a joint DL and UL TCI state or separate DL or UL TCI state under the Unified TCI framework could be via MAC CE and/or DCI (e.g., DCI format 1_1 or 1_2 with or without DL assignment).

In another example, under the Unified TCI framework, e.g., when a UE is provided DLorJointTCI-State or ULTCI-State indicating a joint DL and UL TCI state or separate DL or UL TCI state for the PCell or the PSCell or the SCell, or when the UE is provided tci-StateId-r17 indicating a joint DL and UL TCI state or separate DL or UL TCI state for the PCell or the PSCell or the SCell, if the radio link quality of the BFD RS set q0 is worse than Qout, regardless of whether the UE is provided by the network a configuration for PUCCH transmission with a LRR, and regardless whether the UE has been provided, by PRACH-ResourceDedicatedBFR, a configuration for PRACH transmission wherein a set of PRACH resources are configured each associated with a NBI RS resource (corresponding to a periodic 1-port or 2-port CSI-RS resource configuration index or SSB index) in the NBI RS set, the UE would initiate or trigger contention based random access procedure to reconnect to the network. For instance, the UE could determine/select one or more contention based PRACH preambles according to the new beam index q_new, if any or identified. Furthermore, the UE could provide BFR MAC CE in Msg3 or MsgA of contention based random access procedure.

In yet another example, under the Unified TCI framework, e.g., when a UE is provided DLorJointTCI-State or ULTCI-State indicating a joint DL and UL TCI state or separate DL or UL TCI state for at least first PCell or first PSCell or first SCell, or when the UE is provided tci-StateId-r17 indicating a joint DL and UL TCI state or separate DL or UL TCI state for at least first PCell or first PSCell or first SCell, if the radio link quality of the BFD RS set q0 is worse than Qout, regardless of whether the UE is provided by the network a configuration for PUCCH transmission with a first LRR for first PCell or first PSCell or first SCell, and regardless whether the UE has been provided, by PRACH-ResourceDedicatedBFR, a configuration for PRACH transmission wherein a set of PRACH resources are configured each associated with a NBI RS resource (corresponding to a periodic 1-port or 2-port CSI-RS resource configuration index or SSB index) in the NBI RS set, the UE can provide in a second PUSCH MAC CE configured for/associated with second PCell or second PSCell or second SCell, if available/applicable, index(es) for at least corresponding first PCell(s) or first PSCell(s) or first SCell(s) with radio link quality worse than Qout, indication(s) of presence of q_new for corresponding first PCell(s) or first PSCell(s) or first SCell(s), and index(es) q_new for a periodic CSI-RS configuration or for a SS/PBCH block provided by higher layers, if any, for corresponding first PCell(s) or first PSCell(s) or first SCell(s).

Alternatively, if the UE is provided by the network a configuration for PUCCH transmission with a second LRR for second PCell or second PSCell or second SCell, the UE could transmit PUCCH in the PUCCH resource with the second LRR when the radio link quality of the first PCell or first PSCell or first SCell is worse than Qout. Upon receiving from the network the uplink grant in response to the second LRR, the UE can provide in a second PUSCH MAC CE configured for/associated with second PCell or second PSCell or second SCell index(es) for at least corresponding first PCell(s) or first PSCell(s) or first SCell(s) with radio link quality worse than Qout, indication(s) of presence of q_new for corresponding first PCell(s) or first PSCell(s) or first SCell(s), and index(es) q_new for a periodic CSI-RS configuration or for a SS/PBCH block provided by higher layers, if any, for corresponding first PCell(s) or first PSCell(s) or first SCell(s).

In yet another example, under the Unified TCI framework, e.g., when a UE is provided DLorJointTCI-State or ULTCI-State indicating a joint DL and UL TCI state or separate DL or UL TCI state for at least first PCell or first PSCell or first SCell, and when a UE is provided tci-StateId-r17 indicating a joint DL and UL TCI state or separate DL or UL TCI state for at least first PCell or first PSCell or first SCell, if the radio link quality of the BFD RS set q0 is worse than Qout, and the UE is provided by the network a configuration for PUCCH transmission with a first LRR, the UE could transmit PUCCH in the PUCCH resource with the first LRR when the radio link quality of the BFD RS set q0 is worse than Qout. Upon receiving from the network the uplink grant in response to the first LRR, the UE can provide in a first PUSCH MAC CE index(es) for at least corresponding first PCell(s) or first PSCell(s) or first SCell(s) with radio link quality worse than Qout, indication(s) of presence of q_new for corresponding first PCell(s) or first PSCell(s) or first SCell(s), and index(es) q_new for a periodic CSI-RS configuration or for a SS/PBCH block provided by higher layers, if any, for corresponding first PCell(s) or first PSCell(s) or first SCell(s).

In yet another example, under the Unified TCI framework, e.g., when a UE is provided DLorJointTCI-State or ULTCI-State indicating a joint DL and UL TCI state or separate DL or UL TCI state for at least first PCell or first PSCell or first SCell, or when a UE is provided tci-StateId-r17 indicating a joint DL and UL TCI state or separate DL or UL TCI state for at least first PCell or first PSCell or first SCell, if the radio link quality of the BFD RS set q0 is worse than Qout, and the UE is provided by the network a configuration for PUCCH transmission with a first LRR, the UE could transmit PUCCH in the PUCCH resource with the first LRR in slot m when the radio link quality of the BFD RS set q0 is worse than Qout. The UE could monitor uplink grant in response to the first LRR starting from slot m. If the UE receives the uplink grant in response to the first LRR within a window configured by BeamFailureRequestConfig, the UE can provide in a first PUSCH MAC CE index(es) for at least corresponding PCell(s) or PSCell(s) or SCell(s) with radio link quality worse than Qout, indication(s) of presence of q_new for corresponding first PCell(s) or first PSCell(s) or first SCell(s), and index(es) q_new for a periodic CSI-RS configuration or for a SS/PBCH block provided by higher layers, if any, for corresponding first PCell(s) or first PSCell(s) or first SCell(s). If the UE does not receive the uplink grant in response to the first LRR within the window configured by BeamFailureRequestConfig, For example, if the UE is provided, by PRACH-ResourceDedicatedBFR, a configuration for PRACH transmission wherein a set of PRACH resources are configured each associated with a NBI RS resource (corresponding to a periodic 1-port or 2-port CSI-RS resource configuration index or SSB index) in the NBI RS set, the UE may perform PRACH transmission to the network requesting beam/link failure recovery in slot n according to antenna port quasi co-location parameters associated with periodic CSI-RS resource configuration or with SSB associated with the new beam index q_new. Afterwards, the UE monitors PDCCH in a search space set provided by recoverySearchSpaceId for detection of a DCI format with CRC scrambled by C-RNTI or MCS-C-RNTI starting from slot n+4 within a window configured by BeamFailureRecoveryConfig. For PDCCH monitoring in a search space set provided by recoverySearchSpaceId and for corresponding PDSCH reception, the UE assumes the same antenna port quasi-collocation parameters as the ones associated with the new beam index q_new until the UE receives from the network activation(s) for a joint DL and UL TCI state or separate DL or UL TCI state under the Unified TCI framework.

After the UE detects a DCI format with CRC scrambled by C-RNTI or MCS-C-RNTI in the search space set provided by recoverySearchSpaceId, the UE continues to monitor PDCCH candidates in the search space set provided by recoverySearchSpaceId until the UE receives from the network activation(s) for a joint DL and UL TCI state or separate DL or UL TCI state under the Unified TCI framework. As discussed above, the activation(s) for a joint DL and UL TCI state or separate DL or UL TCI state under the Unified TCI framework could be via MAC CE and/or DCI (e.g., DCI format 1_1 or 1_2 with or without DL assignment).

For another example, regardless of whether the UE has been provided, by PRACH-ResourceDedicatedBFR, a configuration for PRACH transmission wherein a set of PRACH resources are configured each associated with a NBI RS resource (corresponding to a periodic 1-port or 2-port CSI-RS resource configuration index or SSB index) in the NBI RS set, the UE may initiate or trigger contention based random access procedure to reconnect to the network. Optionally, the UE could determine/select one or more contention based PRACH preambles according to the new beam index q_new, if any or identified. Furthermore, the UE could provide BFR MAC CE in Msg3 or MsgA of contention based random access procedure.

In yet another example, under the Unified TCI framework, e.g., when a UE is provided DLorJointTCI-State or ULTCI-State indicating a joint DL and UL TCI state or separate DL or UL TCI state for at least first PCell or first PSCell or first SCell, or when a UE is provided tci-StateId-r17 indicating a joint DL and UL TCI state or separate DL or UL TCI state for first PCell or first PSCell or first SCell, if the radio link quality of the BFD RS set q0 is worse than Qout, and the UE is provided by the network a configuration for PUCCH transmission with a first LRR for first PCell or first PSCell or first SCell, the UE could transmit PUCCH in the PUCCH resource with the first LRR in slot m when the radio link quality of the BFD RS set q0 is worse than Qout. The UE could monitor uplink grant in response to the first LRR starting from slot m.

If the UE receives the uplink grant in response to the first LRR within a window configured by BeamFailureRequestConfig, the UE can provide in a first PUSCH MAC CE configured for/associated with first PCell or first PSCell or first SCell index(es) for at least corresponding first PCell(s) or first PSCell(s) or first SCell(s) with radio link quality worse than Qout, indication(s) of presence of q_new for corresponding first PCell(s) or first PSCell(s) or first SCell(s), and index(es) q_new for a periodic CSI-RS configuration or for a SS/PBCH block provided by higher layers, if any, for corresponding first PCell(s) or first PSCell(s) or first SCell(s). If the UE does not receive the uplink grant in response to the first LRR within the window configured by BeamFailureRequestConfig, the UE performs following examples.

For example, the UE can provide in a second PUSCH MAC CE configured for/associated with second PCell or second PSCell or second SCell, if available/applicable, index(es) for at least corresponding first PCell(s) or first PSCell(s) or first SCell(s) with radio link quality worse than Qout, indication(s) of presence of q_new for corresponding first PCell(s) or first PSCell(s) or first SCell(s), and index(es) q_new for a periodic CSI-RS configuration or for a SS/PBCH block provided by higher layers, if any, for corresponding first PCell(s) or first PSCell(s) or first SCell(s).

For another example, if the UE is provided by the network a configuration for PUCCH transmission with a second LRR for second PCell or second PSCell or second SCell, the UE could transmit PUCCH in the PUCCH resource with the second LRR when the radio link quality of the first PCell or first PSCell or first SCell is worse than Qout. Upon receiving from the network the uplink grant in response to the second LRR, the UE can provide in a second PUSCH MAC CE configured for/associated with second PCell or second PSCell or second SCell index(es) for at least corresponding first PCell(s) or first PSCell(s) or first SCell(s) with radio link quality worse than Qout, indication(s) of presence of q_new for corresponding first PCell(s) or first PSCell(s) or first SCell(s), and index(es) q_new for a periodic CSI-RS configuration or for a SS/PBCH block provided by higher layers, if any, for corresponding first PCell(s) or first PSCell(s) or first SCell(s).

A UE could receive from the network the BFRR in various formats depending on how the BFRQ is transmitted. Furthermore, upon receiving the BFRR, the UE could apply various QCL assumptions in transmitting various UL channels/signals or receiving various DL channels/signals.

Specifically, for the example, if a UE is provided tci-StateId-r17 indicating a joint DL and UL TCI state or separate DL or UL TCI state for the PCell or the PSCell or the SCell, after 28 symbols from a last symbol of a first PDCCH reception in a search space set provided by recoverySearchSpaceId where the UE detects a DCI format with CRC scrambled by C-RNTI or MCS-C-RNTI, the UE: (1) monitors PDCCH in all CORESETs, and receives PDSCH and aperiodic CSI-RS in a resource from a CSI-RS resource set associated with useIndicatedTCIState, using the same antenna port quasi co-location parameters as the ones associated with the corresponding index q_new, if any; and/or (2) transmits PUCCH, PUSCH and SRS associated with useIndicatedTCIState using a same spatial domain filter as the one corresponding to q_new, if any, or as for the last PRACH transmission, and transmits PUCCH using a power determined as described in the 3GPP TS 38.213 with $q_u=0$, $q_d=q_{new}$, and l=0, where the subcarrier spacing (SCS) for the 28 symbols could correspond to one or more of: (1) the smallest of the SCS configurations of the active DL BWP for the PDCCH reception and of the active DL BWP(s) of the serving cell; or (2) the smallest of the SCS configurations of all the signal(s)/channels sharing the same indicated unified TCI state/beam (e.g., provided by the higher layer parameter tci-StateId_r17).

For one example, if a UE is provided tci-StateId-r17 indicating a joint DL and UL TCI state or separate DL or UL TCI state for the PCell or the PSCell or the SCell and the UE provides BFR MAC CE in Msg3 or MsgA of contention based random access procedure, after 28 symbols from the last symbol of the PDCCH reception that determines the completion of the contention based random access procedure, the UE: (1) monitors PDCCH in all CORESETs, and receives PDSCH and aperiodic CSI-RS in a resource from a CSI-RS resource set associated with useIndicatedTCIState, using the same antenna port quasi co-location parameters as the ones associated with the corresponding index q_new, if any (2) transmits PUCCH, PUSCH and SRS associated with useIndicatedTCIState using a same spatial domain filter as the one corresponding to q_new, if any, or as for the last PRACH transmission, and transmits PUCCH using a power determined as described in the 3GPP TS 38.213 with $q_u=0$, $q_d=q_{new}$, and l=0, where the subcarrier spacing (SCS) for the 28 symbols could correspond to one or more of: (1) the smallest of the SCS configurations of the active DL BWP for the PDCCH reception and of the active DL BWP(s) of the serving cell; or (2) the smallest of the SCS configurations of all the signal(s)/channels sharing the same indicated Unified tci state/beam (e.g., provided by the higher layer parameter tci-StateId_r17).

For one example, if a UE is provided tci-StateId-r17 indicating a joint DL and UL TCI state or separate DL or UL TCI state for first PCell or first PSCell or first SCell, after 28 symbols from a last symbol of a PDCCH reception with a DCI format scheduling a PUSCH transmission with a same HARQ process number as for the transmission of the second PUSCH and having a toggled NDI field value, the UE: (1) monitors PDCCH in all CORESETs, and receives PDSCH and aperiodic CSI-RS in a resource from a CSI-RS resource set associated with useIndicatedTCIState, using the same antenna port quasi co-location parameters as the ones associated with the corresponding index q_new, if any (2) transmits PUCCH, PUSCH and SRS associated with useIndicatedTCIState using a same spatial domain filter as the one corresponding to q_new, if any, or as for the last PRACH transmission, and transmits PUCCH using a power determined as described in the 3GPP TS 38.213 with $q_u=0$, $q_d=q_{new}$, and l=0, where the subcarrier spacing (SCS) for the 28 symbols could correspond to one or more of: (1) the smallest of the SCS configurations of the active DL BWP for the PDCCH reception and of the active DL BWP(s) of the serving cell; or (2) the smallest of the SCS configurations of all the signal(s)/channels sharing the same indicated Unified tci state/beam (e.g., provided by the higher layer parameter tci-StateId_r17).

For one example, if a UE is provided tci-StateId-r17 indicating a joint DL and UL TCI state or separate DL or UL TCI state for first PCell or first PSCell or first SCell, after 28 symbols from a last symbol of a PDCCH reception with a DCI format scheduling a PUSCH transmission with a same HARQ process number as for the transmission of the first PUSCH and having a toggled NDI field value, the UE: (1) monitors PDCCH in all CORESETs, and receives PDSCH and aperiodic CSI-RS in a resource from a CSI-RS resource set associated with useIndicatedTCIState, using the same antenna port quasi co-location parameters as the ones associated with the corresponding index q_new, if any (2) transmits PUCCH, PUSCH and SRS associated with useIndicatedTCIState using a same spatial domain filter as the one corresponding to q_new, if any, or as for the last PRACH transmission, and transmits PUCCH using a power determined as described in the 3GPP TS 38.213 with $q_u=0$, $q_d=q_{new}$, and l=0, where the subcarrier spacing (SCS) for the 28 symbols could correspond to one or more of: (1) the smallest of the SCS configurations of the active DL BWP for the PDCCH reception and of the active DL BWP(s) of the serving cell; or (2) the smallest of the SCS configurations of all the signal(s)/channels sharing the same indicated Unified tci state/beam (e.g., provided by the higher layer parameter tci-StateId_r17).

For one example, if a UE is provided tci-StateId-r17 indicating a joint DL and UL TCI state or separate DL or UL TCI state for first PCell or first PSCell or first SCell, and if the UE receives the uplink grant in response to the first LRR within a window configured by BeamFailureRequestConfig and provides in a first PUSCH MAC CE index(es) for at least corresponding PCell(s) or PSCell(s) or SCell(s) with radio link quality worse than Qout, indication(s) of presence of q_new for corresponding first PCell(s) or first PSCell(s) or first SCell(s), and index(es) q_new for a periodic CSI-RS configuration or for a SS/PBCH block provided by higher layers, if any, for corresponding first PCell(s) or first PSCell(s) or first SCell(s), after 28 symbols from a last symbol of a PDCCH reception with a DCI format scheduling a PUSCH transmission with a same HARQ process number as for the transmission of the first PUSCH and having a toggled NDI field value, the UE: (1) monitors PDCCH in all CORESETs, and receives PDSCH and aperiodic CSI-RS in a resource from a CSI-RS resource set associated with useIndicatedTCIState, using the same antenna port quasi co-location parameters as the ones associated with the corresponding index q_new, if any (2) transmits PUCCH, PUSCH and SRS associated with useIndicatedTCIState using a same spatial domain filter as the one corresponding to q_new, if any, or as for the last PRACH transmission, and transmits PUCCH using a power determined as described in the 3GPP TS 38.213 with $q_u=0$, $q_d=q_{new}$, and l=0, For one example, if a UE is provided tci-StateId-r17 indicating a joint DL and UL TCI state or separate DL or UL TCI state for first PCell or first PSCell or first SCell, and if the UE does not receive the uplink grant in response to the first LRR within the window configured by BeamFailureRequestConfig, and the UE is provided, by PRACH-ResourceDedicatedBFR, a configuration for PRACH transmission wherein a set of PRACH resources are configured each associated with a NBI RS resource (corresponding to a periodic 1-port or 2-port CSI-RS resource configuration index or SSB index) in the NBI RS set and the UE performs PRACH transmission to the network requesting beam/link failure recovery according to antenna port quasi co-location parameters associated with periodic CSI-RS resource configuration or with SSB associated with the new beam index q_new, 28 symbols from a last symbol of a first PDCCH reception in a search space set provided by recoverySearchSpaceId where the UE detects a DCI format with CRC scrambled by C-RNTI or MCS-C-RNTI, the UE: (1) monitors PDCCH in all CORESETs, and receives PDSCH and aperiodic CSI-RS in a resource from a CSI-RS resource set associated with useIndicatedTCIState, using the same antenna port quasi co-location parameters as the ones associated with the corresponding index q_new, if any (2) transmits PUCCH, PUSCH and SRS associated with useIndicatedTCIState using a same spatial domain filter as the one corresponding to q_new, if any, or as for the last PRACH transmission, and transmits PUCCH using a power determined as described in the 3GPP TS 38.213 with $q_u=0$, $q_d=q_{new}$, and l=0.

For one example, if a UE is provided tci-StateId-r17 indicating a joint DL and UL TCI state or separate DL or UL TCI state for first PCell or first PSCell or first SCell, and if the UE does not receive the uplink grant in response to the first LRR within the window configured by BeamFailureRequestConfig, and the UE initiates/triggers contention based random access procedure to reconnect to the network—e.g., the UE determines/selects one or more contention based PRACH preambles according to the new beam index q_new, if any or identified, and provides BFR MAC CE in Msg3 or MsgA of contention based random access procedure, after 28 symbols from the last symbol of the PDCCH reception that determines the completion of the contention based random access procedure, the UE: (1) monitors PDCCH in all CORESETs, and receives PDSCH and aperiodic CSI-RS in a resource from a CSI-RS resource set associated with useIndicatedTCIState, using the same antenna port quasi co-location parameters as the ones associated with the corresponding index q_new, if any (2) transmits PUCCH, PUSCH and SRS associated with useIndicatedTCIState using a same spatial domain filter as the one corresponding to q_new, if any, or as for the last PRACH transmission, and transmits PUCCH using a power determined as described in the 3GPP TS 38.213 with $q_u=0$, $q_d=q_{new}$, and l=0, where the subcarrier spacing (SCS) for the 28 symbols could correspond to one or more of: (1) the smallest of the SCS configurations of the active DL BWP for the PDCCH reception and of the active DL BWP(s) of the serving cell; or (2) the smallest of the SCS configurations of all the signal(s)/channels sharing the same indicated Unified tci state/beam (e.g., provided by the higher layer parameter tci-StateId_r17).

For one example, if a UE is provided tci-StateId-r17 indicating a joint DL and UL TCI state or separate DL or UL TCI state for first PCell or first PSCell or first SCell, and if the UE receives the uplink grant in response to the first LRR within a window configured by BeamFailureRequestConfig and provides in a first PUSCH MAC CE index(es) for at least corresponding first PCell(s) or first PSCell(s) or first SCell(s) with radio link quality worse than Qout, indication(s) of presence of q_new for corresponding first PCell(s) or first PSCell(s) or first SCell(s), and index(es) q_new for a periodic CSI-RS configuration or for a SS/PBCH block provided by higher layers, if any, for corresponding first PCell(s) or first PSCell(s) or first SCell(s), after 28 symbols from a last symbol of a PDCCH reception with a DCI format scheduling a PUSCH transmission with a same HARQ process number as for the transmission of the first PUSCH and having a toggled NDI field value, the UE: (1) monitors PDCCH in all CORESETs, and receives PDSCH and aperiodic CSI-RS in a resource from a CSI-RS resource set associated with useIndicatedT-CIState, using the same antenna port quasi co-location parameters as the ones associated with the corresponding index q_new, if any (2) transmits PUCCH, PUSCH and SRS associated with useIndicatedTCIState using a same spatial domain filter as the one corresponding to q_new, if any, or as for the last PRACH transmission, and transmits PUCCH using a power determined as described in the 3GPP TS 38.213 with $q_u=0$, $q_d=q_{new}$, and l=0, For one example, if a UE is provided tci-StateId-r17 indicating a joint DL and UL TCI state or separate DL or UL TCI state for first PCell or first PSCell or first SCell, and if the UE does not receive the uplink grant in response to the first LRR within the window configured by BeamFailureRequestConfig and provides in a second PUSCH MAC CE index(es) for at least corresponding first PCell(s) or first PSCell(s) or first SCell(s) with radio link quality worse than Qout, indication(s) of presence of q_new for corresponding first PCell(s) or first PSCell(s) or first SCell(s), and index(es) q_new for a periodic CSI-RS configuration or for a SS/PBCH block provided by higher layers, if any, for corresponding first PCell(s) or first PSCell(s) or first SCell(s), after 28 symbols from a last symbol of a PDCCH reception with a DCI format scheduling a PUSCH transmission with a same HARQ process number as for the transmission of the second PUSCH and having a toggled NDI field value, the UE: (1) monitors PDCCH in all CORESETs, and receives PDSCH and aperiodic CSI-RS in a resource from a CSI-RS resource set associated with useIndicatedTCIState, using the same antenna port quasi co-location parameters as the ones associated with the corresponding index q_new, if any (2) transmits PUCCH, PUSCH and SRS associated with useIndicatedTCIState using a same spatial domain filter as the one corresponding to q_new, if any, or as for the last PRACH transmission, and transmits PUCCH using a power determined as described in the 3GPP TS 38.213 with $q_u=0$, $q_d=q_{new}$, and l=0, where the subcarrier spacing (SCS) for the 28 symbols could correspond to one or more of: (1) the smallest of the SCS configurations of the active DL BWP for the PDCCH reception and of the active DL BWP(s) of the serving cell; or (2) the smallest of the SCS configurations of all the signal(s)/channels sharing the same indicated Unified tci state/beam (e.g., provided by the higher layer parameter tci-StateId_r17).

The UE could receive from the network a common beam/TCI state update via MAC CE or DCI (e.g., DCI format 1_1 or 1_2 with or without DL assignment) during any step/phase in the BFR procedure.

In one example, as discussed above, the UE may declare a beam failure for the BFD RS set q0 if the BFI count for the BFD RS set q0 reaches the maximum number of BFI counts (e.g., provided by the higher layer parameter maxBFIcount) before a BFD timer expires.

For one example, if the UE receives from the network a joint DL and UL TCI state or separate DL or UL TCI state via MAC CE or DCI (e.g., DCI format 1_1 or 1_2 with or without DL assignment) before the BFI count for the BFD RS set q0 reaches the maximum number of BFI counts (provided by maxBFIcount), the higher layers in the UE may reset the BFI count for the BFD RS set q0 or the BFD timer to zero.

In this case, the UE may monitor PDCCH in all relevant CORESETs, and receive corresponding PDSCHs and other DL channels/signals sharing the same joint DL and UL TCI state or separate DL or UL TCI state such as aperiodic CSI-RS in a resource from a CSI-RS resource set associated with useIndicatedTCIState following the QCL assumptions in the indicated joint DL and UL TCI state or separate DL or UL TCI state; or the UE may transmit PUCCH, PUSCH and other relevant channels/signals sharing the same joint DL and UL TCI state or separate DL or UL TCI state such as SRS associated with useIndicatedTCIState following the QCL assumptions in the indicated joint DL and UL TCI state or separate DL or UL TCI state.

Furthermore, the UE could update the BFD RS set q0 by including/incorporating the QCL-typeD source RS (e.g., corresponding to a periodic 1-port CSI-RS resource configuration index or SSB index) indicated in the joint DL and UL TCI state or separate DL or UL TCI state. Alternatively, the UE could assess the radio link quality of the BFD RS configured in the BFD RS set q0 having the same value as the QCL-typeD source RS (e.g., corresponding to a periodic 1-port CSI-RS resource configuration index or SSB index) indicated in the joint DL and UL TCI state or separate DL or UL TCI state.

For another example, if the UE receives from the network a joint DL and UL TCI state or separate DL or UL TCI state via MAC CE or DCI (e.g., DCI format 1_1 or 1_2 with or without DL assignment) before the BFI count for the BFD RS set q0 reaches the maximum number of BFI counts (provided by maxBFIcount), the UE could update the BFD RS set q0 by including/incorporating the QCL-typeD source RS (e.g., corresponding to a periodic 1-port CSI-RS resource configuration index or SSB index) indicated in the joint DL and UL TCI state or separate DL or UL TCI state.

Alternatively, the UE could assess the radio link quality of the BFD RS configured in the BFD RS set q0 having the same value as the QCL-typeD source RS (e.g., corresponding to a periodic 1-port CSI-RS resource configuration index or SSB index) indicated in the joint DL and UL TCI state or separate DL or UL TCI state. In this case, the higher layers in the UE may not reset the BFI count or the BFD timer for the BFD RS set q0 to zero; instead, the higher layers in the UE may keep incrementing the BFI count for the BFD RS set q0 if the higher layers in the UE are informed that the radio link quality for the BFD RS set q0 is worse than Qout, and declare beam failure for the BFD RS set q0 if the BFI count for the BFD RS set q0 reaches the maximum number of BFI counts (e.g., provided by the higher layer parameter maxBFIcount) before the BFD timer expires.

The UE could monitor PDCCH in all relevant CORESETs, and receive corresponding PDSCHs and other DL channels/signals sharing the same joint DL and UL TCI state or separate DL or UL TCI state such as aperiodic CSI-RS in a resource from a CSI-RS resource set associated with useIndicatedTCIState following the QCL assumptions in the indicated joint DL and UL TCI state or separate DL or UL TCI state, or the UE could transmit PUCCH, PUSCH and other relevant channels/signals sharing the same joint DL and UL TCI state or separate DL or UL TCI state such as SRS associated with useIndicatedTCIState following the QCL assumptions in the indicated joint DL and UL TCI state or separate DL or UL TCI state, or the UE is not expected to apply the QCL assumptions in the indicated joint DL and UL TCI state or separate DL or UL TCI state for any DL channels/signals or UL channels/signals.

The UE could indicate to the network that the beam failure for the BFD RS set q0 is only for the DL channels/signals such as PDCCH, PDSCH and CSI-RS. This indication could be in part of the first/second PUSCH MAC CE or BFR MAC CE in Msg3 or MsgA of contention based random access procedure. In this case, after 28 symbols from receiving the BFRR discussed in the present disclosure), the UE could monitor PDCCH in all CORESETs, and receive PDSCH and aperiodic CSI-RS in a resource from a CSI-RS resource set associated with useIndicatedTCIState, using the same antenna port quasi co-location parameters as the ones associated with the corresponding index q_new, if any. The UE may not update/reset the spatial domain filter for transmitting the UL channels/signals such as PUCCH, PUSCH and SRS according to q_new.

The UE could indicate to the network that the beam failure for the BFD RS set q0 is only for the UL channels/signals such as PUCCH, PUSCH and SRS. This indication could be in part of the first/second PUSCH MAC CE or BFR MAC CE in Msg3 or MsgA of contention based random access procedure. In this case, after 28 symbols from receiving the BFRR discussed in the present disclosure, the UE could transmit PUCCH, PUSCH and SRS associated with useIndicatedTCIState using a same spatial domain filter as the one corresponding to q_new, if any, or as for the last PRACH transmission, and transmit PUCCH using a power determined as described in the 3GPP TS 38.213 with $q_u=0$, $q_d=q_{new}$, and $l=0$. The UE may not update/reset the QCL assumptions for the DL channels/signals such as PDCCH, PDSCH and CSI-RS according to q_new.

If the UE does not indicate to the network that the beam failure for the BFD RS set q0 is only for the DL channels/signals or only for the UL channels/signals, after 28 symbols from receiving the BFRR discussed in the present disclosure, the UE could monitor PDCCH in all CORESETs, and receive PDSCH and aperiodic CSI-RS in a resource from a CSI-RS resource set associated with useIndicatedTCIState, using the same antenna port quasi co-location parameters as the ones associated with the corresponding index q_new, if any; or, the UE could transmit PUCCH, PUSCH and SRS associated with useIndicatedTCIState using a same spatial domain filter as the one corresponding to q_new, if any, or as for the last PRACH transmission, and transmit PUCCH using a power determined as described in the 3GPP TS 38.213 with $q_u=0$, $q_d=q_{new}$, and $l=0$.

Yet for another example, if the UE receives from the network a separate DL TCI state via MAC CE or DCI (e.g., DCI format 1_1 or 1_2 with or without DL assignment) before the BFI count for the BFD RS set q0 reaches the maximum number of BFI counts (provided by maxBFIcount), the UE may monitor PDCCH in all relevant CORESETs, and receive corresponding PDSCHs and other DL channels/signals sharing the same separate DL TCI state such as aperiodic CSI-RS in a resource from a CSI-RS resource set associated with useIndicatedTCIState following the QCL assumptions in the indicated separate DL TCI state. Furthermore, the UE could update the BFD RS set q0 by including/incorporating the QCL-typeD source RS (e.g., corresponding to a periodic 1-port CSI-RS resource configuration index or SSB index) indicated in the separate DL TCI state.

Alternatively, the UE could assess the radio link quality of the BFD RS configured in the BFD RS set q0 having the same value as the QCL-typeD source RS (e.g., corresponding to a periodic 1-port CSI-RS resource configuration index or SSB index) indicated in the separate DL TCI state. In this case, the higher layers in the UE may not reset the BFI count or the BFD timer for the BFD RS set q0 to zero; instead, the higher layers in the UE may keep incrementing the BFI count for the BFD RS set q0 if the higher layers in the UE are informed that the radio link quality for the BFD RS set q0 is worse than Qout, and declare beam failure for the BFD RS set q0 if the BFI count for the BFD RS set q0 reaches the maximum number of BFI counts (e.g., provided by the higher layer parameter maxBFIcount) before the BFD timer expires.

The UE could indicate to the network that the beam failure for the BFD RS set q0 is only for the UL channels/signals such as PUCCH, PUSCH and SRS. This indication could be in part of the first/second PUSCH MAC CE or BFR MAC CE in Msg3 or MsgA of contention based random access procedure. In this case, after 28 symbols from receiving the BFRR discussed in the present disclosure, the UE could transmit PUCCH, PUSCH and SRS associated with useIndicatedTCIState using a same spatial domain filter as the one corresponding to q_new, if any, or as for the last PRACH transmission, and transmit PUCCH using a power determined as described in the 3GPP TS 38.213 with $q_u=0$, $q_d=q_{new}$, and $l=0$. The UE may not update/reset the QCL assumptions for the DL channels/signals such as PDCCH, PDSCH and CSI-RS according to q_new.

The UE could indicate to the network that the beam failure for the BFD RS set q0 is only for the DL channels/signals such as PDCCH, PDSCH and CSI-RS. This indication could be in part of the first/second PUSCH MAC CE or BFR MAC CE in Msg3 or MsgA of contention based random access procedure. In this case, after 28 symbols from receiving the BFRR discussed in the present disclosure), the UE could monitor PDCCH in all CORESETs, and receive PDSCH and aperiodic CSI-RS in a resource from a CSI-RS resource set associated with useIndicatedTCIState, using the same antenna port quasi co-location parameters as the ones associated with the corresponding index q_new, if any. The UE may not update/reset the spatial domain filter for transmitting the UL channels/signals such as PUCCH, PUSCH and SRS according to q_new.

If the UE does not indicate to the network that the beam failure for the BFD RS set q0 is only for the UL channels/signals or only for the DL channels/signals, after 28 symbols from receiving the BFRR discussed in the present disclosure, the UE could monitor PDCCH in all CORESETs, and receive PDSCH and aperiodic CSI-RS in a resource from a CSI-RS resource set associated with useIndicatedTCIState, using the same antenna port quasi co-location parameters as the ones associated with the corresponding index q_new, if any; or, the UE could transmit PUCCH, PUSCH and SRS associated with useIndicatedTCIState using a same spatial domain filter as the one corresponding to q_new, if any, or as for the last PRACH transmission, and transmit PUCCH using a power determined as described in the 3GPP TS 38.213 with $q_u=0$, $q_d=q_{new}$, and $l=0$.

Yet for another example, if the UE receives from the network a separate UL TCI state via MAC CE or DCI (e.g., DCI format 1_1 or 1_2 with or without DL assignment) before the BFI count for the BFD RS set q0 reaches the maximum number of BFI counts (provided by maxBFIcount), the UE may transmit PUCCH, PUSCH and other UL channels/signals such as SRS associated with useIndicatedTCIState using a same spatial domain filter as the one corresponding to the QCL source RS in the indicated separate UL TCI state. Furthermore, the UE could update the BFD RS set q0 by including/incorporating the QCL-typeD source RS (e.g., corresponding to a periodic 1-port CSI-RS resource configuration index or SSB index) indicated in the separate UL TCI state.

Alternatively, the UE could assess the radio link quality of the BFD RS configured in the BFD RS set q0 having the same value as the QCL-typeD source RS (e.g., corresponding to a periodic 1-port CSI-RS resource configuration index or SSB index) indicated in the separate UL TCI state. In this case, the higher layers in the UE may not reset the BFI count or the BFD timer for the BFD RS set q0 to zero; instead, the higher layers in the UE may keep incrementing the BFI count for the BFD RS set q0 if the higher layers in the UE are informed that the radio link quality for the BFD RS set q0 is worse than Qout, and declare beam failure for the BFD RS set q0 if the BFI count for the BFD RS set q0 reaches the maximum number of BFI counts (e.g., provided by the higher layer parameter maxBFIcount) before the BFD timer expires.

The UE could indicate to the network that the beam failure for the BFD RS set q0 is only for the DL channels/signals such as PDCCH, PDSCH and CSI-RS. This indication could be in part of the first/second PUSCH MAC CE or BFR MAC CE in Msg3 or MsgA of contention based random access procedure. In this case, after 28 symbols from receiving the BFRR discussed in the present disclosure, the UE could monitor PDCCH in all CORESETs, and receive PDSCH and aperiodic CSI-RS in a resource from a CSI-RS resource set associated with useIndicatedTCIState, using the same antenna port quasi co-location parameters as the ones associated with the corresponding index q_new, if any. The UE may not update/reset the spatial domain filter for transmitting the UL channels/signals such as PUCCH, PUSCH and SRS according to q_new.

The UE could indicate to the network that the beam failure for the BFD RS set q0 is only for the UL channels/signals such as PUCCH, PUSCH and SRS. This indication could be in part of the first/second PUSCH MAC CE or BFR MAC CE in Msg3 or MsgA of contention based random access procedure. In this case, after 28 symbols from receiving the BFRR discussed in the present disclosure, the UE could transmit PUCCH, PUSCH and SRS associated with useIndicatedTCIState using a same spatial domain filter as the one corresponding to q_new, if any, or as for the last PRACH transmission, and transmit PUCCH using a power determined as described in the 3GPP TS 38.213 with $q_u=0$, $q_d=q_{new}$, and $l=0$. The UE may not update/reset the QCL assumptions for the DL channels/signals such as PDCCH, PDSCH and CSI-RS according to q_new.

If the UE does not indicate to the network that the beam failure for the BFD RS set q0 is only for the DL channels/signals or only for the UL channels/signals, after 28 symbols from receiving the BFRR discussed in the present disclosure, the UE could monitor PDCCH in all CORESETs, and receive PDSCH and aperiodic CSI-RS in a resource from a CSI-RS resource set associated with useIndicatedTCIState, using the same antenna port quasi co-location parameters as the ones associated with the corresponding index q_new, if any; or, the UE could transmit PUCCH, PUSCH and SRS associated with useIndicatedTCIState using a same spatial domain filter as the one corresponding to q_new, if any, or as for the last PRACH transmission, and transmit PUCCH using a power determined as described in the 3GPP TS 38.213 with $q_u=0$, $q_d=q_{new}$, and $l=0$.

In another example, as discussed above, the UE could perform PRACH transmission to the network requesting beam/link failure recovery in slot n according to antenna port quasi co-location parameters associated with periodic CSI-RS resource configuration or with SSB associated with the new beam index q_new. Afterwards, the UE could monitor PDCCH in a search space set provided by recoverySearchSpaceId for detection of a DCI format with CRC scrambled by C-RNTI or MCS-C-RNTI starting from slot n+4 within a window configured by BeamFailureRecoveryConfig. Optionally, the UE could provide in the first/second PUSCH MAC CE index(es) for at least corresponding first PCell(s) or first PSCell(s) or first SCell(s) with radio link quality worse than Qout, indication(s) of presence of q_new for corresponding first PCell(s) or first PSCell(s) or first SCell(s), and index(es) q_new for a periodic CSI-RS configuration or for a SS/PBCH block provided by higher layers, if any, for corresponding first PCell(s) or first PSCell(s) or first SCell(s).

For one example, the UE could receive from the network a joint DL and UL TCI state or separate DL or UL TCI state via MAC CE or DCI (e.g., DCI format 1_1 or 1_2 with or without DL assignment) before the UE detects a DCI format with CRC scrambled by C-RNTI or MCS-C-RNTI, or before the UE receives a last PDCCH symbol with a DCI format scheduling a PUSCH transmission with a same HARQ process number as for the transmission of the first/second PUSCH and having a toggled NDI field value. In one case, the UE could send to the network HARQ acknowledgement of the reception/detection of the joint DL and UL TCI state or the separate DL or UL TCI state. In another case, the UE may not send to the network any acknowledgement of the reception/detection of the joint DL and UL TCI state or the separate DL or UL TCI state.

In one example, the time of applying the QCL assumptions indicated in the joint DL and UL TCI state, or separate DL or UL TCI state (beam application time) happens prior to the reception of the BFRR. In this case, starting from the beam application time, the UE may monitor PDCCH in all relevant CORESETs, and receive corresponding PDSCHs and other DL channels/signals sharing the same joint DL and UL TCI state or separate DL or UL TCI state such as aperiodic CSI-RS in a resource from a CSI-RS resource set associated with useIndicatedTCIState following the QCL assumptions in the indicated joint DL and UL TCI state or separate DL or UL TCI state; or the UE may transmit PUCCH, PUSCH and other relevant channels/signals sharing the same joint DL and UL TCI state or separate DL or UL TCI state such as SRS associated with useIndicatedTCIState following the QCL assumptions in the indicated joint DL and UL TCI state or separate DL and UL TCI state.

Furthermore, the UE could update the BFD RS set q0 by including/incorporating the QCL-typeD source RS (e.g., corresponding to a periodic 1-port CSI-RS resource configuration index or SSB index) indicated in the joint DL and UL TCI state or separate DL or UL TCI state. Alternatively, the UE could assess the radio link quality of the BFD RS configured in the BFD RS set q0 having the same value as the QCL-typeD source RS (e.g., corresponding to a periodic 1-port CSI-RS resource configuration index or SSB index) indicated in the joint DL and UL TCI state or separate DL or UL TCI state.

If the UE still receives from the network the BFRR discussed in the present disclosure), after 28 symbols from receiving the BFRR, the UE could monitor PDCCH in all CORESETs, and receive PDSCH and aperiodic CSI-RS in a resource from a CSI-RS resource set associated with useIndicatedTCIState, using the same antenna port quasi co-location parameters as the ones associated with the corresponding index q_new, if any; or, the UE could transmit PUCCH, PUSCH and SRS associated with useIndicatedTCIState using a same spatial domain filter as the one corresponding to q_new, if any, or as for the last PRACH transmission, and transmit PUCCH using a power determined as described in the 3GPP TS 38.213 with $q_u=0$, $q_d=q_{new}$, and l=0.

Alternatively, the UE is not expected to use the same antenna port QCL parameters as the ones associated with the corresponding index q_new, if any, to receive DL channels/signals such as PDCCH, PDSCH, CSI-RS and etc., or the UE is not expected to use a same spatial domain filter as the one corresponding to q_new, if any, to transmit UL channels/signals such as PUCCH, PUSCH, SRS and etc., though the UE receives from the network the BFRR discussed in the present disclosure.

Furthermore, the UE is not expected to monitor the BFRR or receive from the network the BFRR discussed in the present disclosure.

In another example, the time of applying the QCL assumptions indicated in the joint DL and UL TCI state, or separate DL or UL TCI state (beam application time) happens prior to the reception of the BFRR. In this example, the UE is not expected to follow the QCL assumptions in the indicated joint DL and UL TCI state or separate DL or UL TCI state to receive DL channels/signals such as PDCCH, PDSCH, CSI-RS or etc.; or the UE is not expected to follow the QCL assumptions in the indicated joint DL and UL TCI state or separate DL or UL TCI state to transmit UL channels/signals such as PUCCH, PUSCH, SRS or etc. The UE could still update the BFD RS set q0 by including/incorporating the QCL-typeD source RS (e.g., corresponding to a periodic 1-port CSI-RS resource configuration index or SSB index) indicated in the joint DL and UL TCI state or separate DL or UL TCI state.

Alternatively, the UE could assess the radio link quality of the BFD RS configured in the BFD RS set q0 having the same value as the QCL-typeD source RS (e.g., corresponding to a periodic 1-port CSI-RS resource configuration index or SSB index) indicated in the joint DL and UL TCI state or separate DL or UL TCI state. After 28 symbols from receiving the BFRR discussed in the present disclosure, the UE could monitor PDCCH in all CORESETs, and receive PDSCH and aperiodic CSI-RS in a resource from a CSI-RS resource set associated with useIndicatedTCIState, using the same antenna port quasi co-location parameters as the ones associated with the corresponding index q_new, if any; or, the UE could transmit PUCCH, PUSCH and SRS associated with useIndicatedTCIState using a same spatial domain filter as the one corresponding to q_new, if any, or as for the last PRACH transmission, and transmit PUCCH using a power determined as described in the 3GPP TS 38.213 with $q_u=0$, $q_d=q_{new}$, and l=0.

In yet another example, the time of applying the QCL assumptions indicated in the joint DL and UL TCI state, or separate DL or UL TCI state (beam application time) could happen after the reception of the BFRR. In this case, after 28 symbols from receiving the BFRR discussed in the present disclosure, the UE could monitor PDCCH in all CORESETs, and receive PDSCH and aperiodic CSI-RS in a resource from a CSI-RS resource set associated with useIndicatedTCIState, using the same antenna port quasi co-location parameters as the ones associated with the corresponding index q_new, if any; or, the UE could transmit PUCCH, PUSCH and SRS associated with useIndicatedTCIState using a same spatial domain filter as the one corresponding to q_new, if any, or as for the last PRACH transmission, and transmit PUCCH using a power determined as described in the 3GPP TS 38.213 with $q_u=0$, $q_d=q_{new}$, and l=0.

Starting from the beam application time, the UE may monitor PDCCH in all relevant CORESETs, and receive corresponding PDSCHs and other DL channels/signals sharing the same joint DL and UL TCI state or separate DL or UL TCI state such as aperiodic CSI-RS in a resource from a CSI-RS resource set associated with useIndicatedTCIState following the QCL assumptions in the indicated joint DL and UL TCI state or separate DL or UL TCI state; or the UE may transmit PUCCH, PUSCH and other relevant channels/signals sharing the same joint DL and UL TCI state or separate DL or UL TCI state such as SRS associated with useIndicatedTCIState following the QCL assumptions in the indicated joint DL and UL TCI state or separate DL and UL TCI state.

Furthermore, the UE could update the BFD RS set q0 by including/incorporating the QCL-typeD source RS (e.g., corresponding to a periodic 1-port CSI-RS resource configuration index or SSB index) indicated in the joint DL and UL TCI state or separate DL or UL TCI state. Alternatively, the UE could assess the radio link quality of the BFD RS configured in the BFD RS set q0 having the same value as the QCL-typeD source RS (e.g., corresponding to a periodic 1-port CSI-RS resource configuration index or SSB index) indicated in the joint DL and UL TCI state or separate DL or UL TCI state.

Alternatively, the UE is not expected to follow the QCL assumptions indicated in the joint DL and UL TCI state or separate DL or UL TCI state to receive DL channels/signals such as PDCCH, PDSCH, CSI-RS and etc., or the UE is not expected to follow the QCL assumptions indicated in the joint DL and UL TCI state or separate DL or UL TCI state to transmit UL channels/signals such as PUCCH, PUSCH, SRS and etc. The UE could still update the BFD RS set q0 by including/incorporating the QCL-typeD source RS (e.g., corresponding to a periodic 1-port CSI-RS resource configuration index or SSB index) indicated in the joint DL and UL TCI state or separate DL or UL TCI state. Alternatively, the UE could assess the radio link quality of the BFD RS configured in the BFD RS set q0 having the same value as the QCL-typeD source RS (e.g., corresponding to a periodic 1-port CSI-RS resource configuration index or SSB index) indicated in the joint DL and UL TCI state or separate DL or UL TCI state.

In yet another example, the time of applying the QCL assumptions indicated in the joint DL and UL TCI state, or separate DL or UL TCI state (beam application time) could happen after the reception of the BFRR. In this example, the UE is not expected to use the same antenna port QCL parameters as the ones associated with the corresponding index q_new, if any, to receive DL channels/signals such as PDCCH, PDSCH, CSI-RS and etc., or the UE is not expected to use a same spatial domain filter as the one corresponding to q_new, if any, to transmit UL channels/signals such as PUCCH, PUSCH, SRS and etc., though the UE receives from the network the BFRR discussed in the present disclosure.

Starting from the beam application time, the UE may monitor PDCCH in all relevant CORESETs, and receive corresponding PDSCHs and other DL channels/signals sharing the same joint DL and UL TCI state or separate DL or UL TCI state such as aperiodic CSI-RS in a resource from a CSI-RS resource set associated with useIndicatedTCIState following the QCL assumptions in the indicated joint DL and UL TCI state or separate DL or UL TCI state; or the UE may transmit PUCCH, PUSCH and other relevant channels/signals sharing the same joint DL and UL TCI state or separate DL or UL TCI state such as SRS associated with useIndicatedTCIState following the QCL assumptions in the indicated joint DL and UL TCI state or separate DL and UL TCI state. Furthermore, the UE could update the BFD RS set q0 by including/incorporating the QCL-typeD source RS (e.g., corresponding to a periodic 1-port CSI-RS resource configuration index or SSB index) indicated in the joint DL and UL TCI state or separate DL or UL TCI state.

Alternatively, the UE could assess the radio link quality of the BFD RS configured in the BFD RS set q0 having the same value as the QCL-typeD source RS (e.g., corresponding to a periodic 1-port CSI-RS resource configuration index or SSB index) indicated in the joint DL and UL TCI state or separate DL or UL TCI state.

For another example, the UE could receive from the network a separate DL TCI state via MAC CE or DCI (e.g., DCI format 1_1 or 1_2 with or without DL assignment) before the UE detects a DCI format with CRC scrambled by C-RNTI or MCS-C-RNTI, or before the UE receives a last PDCCH symbol with a DCI format scheduling a PUSCH transmission with a same HARQ process number as for the transmission of the first/second PUSCH and having a toggled NDI field value. In one case, the UE could send to the network HARQ acknowledgement of the reception/detection of the separate DL TCI state. In another case, the UE may not send to the network any acknowledgement of the reception/detection of the separate DL TCI state.

In one example, the time of applying the QCL assumptions indicated in the separate DL TCI state (beam application time) happens prior to the reception of the BFRR. In this case, starting from the beam application time, the UE may monitor PDCCH in all relevant CORESETs, and receive corresponding PDSCHs and other DL channels/signals sharing the same separate DL TCI state such as aperiodic CSI-RS in a resource from a CSI-RS resource set associated with useIndicatedTCIState following the QCL assumptions in the indicated separate DL TCI state. Furthermore, the UE could update the BFD RS set q0 by including/incorporating the QCL-typeD source RS (e.g., corresponding to a periodic 1-port CSI-RS resource configuration index or SSB index) indicated in the separate DL TCI state. Alternatively, the UE could assess the radio link quality of the BFD RS configured in the BFD RS set q0 having the same value as the QCL-typeD source RS (e.g., corresponding to a periodic 1-port CSI-RS resource configuration index or SSB index) indicated in the separate DL TCI state.

The UE could indicate to the network that the beam failure for the BFD RS set q0 is only for the UL channels/signals such as PUCCH, PUSCH, SRS and etc. This indication could be in part of the first/second PUSCH MAC CE or BFR MAC CE in Msg3 or MsgA of contention based random access procedure. In this case, if the UE still receives from the network the BFRR discussed in the present disclosure, after 28 symbols from receiving the BFRR, the UE could transmit PUCCH, PUSCH and SRS associated with useIndicatedTCIState using a same spatial domain filter as the one corresponding to q_new, if any, or as for the last PRACH transmission, and transmit PUCCH using a power determined as described in the 3GPP TS 38.213 with $q_u=0$, $q_d=q_{new}$, and l=0.

The UE could indicate to the network that the beam failure for the BFD RS set q0 is only for the DL channels/signals such as PDCCH, PDSCH, CSI-RS and etc. This indication could be in part of the first/second PUSCH MAC CE or BFR MAC CE in Msg3 or MsgA of contention based random access procedure. In this case, after 28 symbols from receiving the BFRR discussed in the present disclosure, the UE could monitor PDCCH in all CORESETs, and receive PDSCH and aperiodic CSI-RS in a resource from a CSI-RS resource set associated with useIndicatedTCIState, using the same antenna port quasi co-location parameters as the ones associated with the corresponding index q_new, if any.

Alternatively, if the UE still receives from the network the BFRR discussed in the present disclosure, after 28 symbols from receiving the BFRR, the UE could monitor PDCCH in all CORESETs, and receive PDSCH and aperiodic CSI-RS in a resource from a CSI-RS resource set associated with useIndicatedTCIState, using the same antenna port quasi co-location parameters as the ones associated with the corresponding index q_new, if any; or, the UE could transmit PUCCH, PUSCH and SRS associated with useIndicatedTCIState using a same spatial domain filter as the one corresponding to q_new, if any, or as for the last PRACH transmission, and transmit PUCCH using a power determined as described in the 3GPP TS 38.213 with $q_u=0$, $q_d=q_{new}$, and l=0.

Optionally, the UE is not expected to use the same antenna port QCL parameters as the ones associated with the corresponding index q_new, if any, to receive DL channels/signals such as PDCCH, PDSCH, CSI-RS and etc., or the UE is not expected to use a same spatial domain filter as the one corresponding to q_new, if any, to transmit UL channels/signals such as PUCCH, PUSCH, SRS and etc., though the UE receives from the network the BFRR discussed in the present disclosure.

Furthermore, the UE is not expected to monitor the BFRR or receive from the network the BFRR discussed in the present disclosure.

In another example, the time of applying the QCL assumptions indicated in the separate DL TCI state happens prior to the reception of the BFRR. In this example, the UE is not expected to follow the QCL assumptions in the indicated separate DL TCI state to receive DL channels/signals such as PDCCH, PDSCH, CSI-RS or etc. The UE could still update the BFD RS set q0 by including/incorporating the QCL-typeD source RS (e.g., corresponding to a periodic 1-port CSI-RS resource configuration index or SSB index) indicated in the separate DL TCI state.

Alternatively, the UE could assess the radio link quality of the BFD RS configured in the BFD RS set q0 having the same value as the QCL-typeD source RS (e.g., corresponding to a periodic 1-port CSI-RS resource configuration index or SSB index) indicated in the separate DL TCI state. After 28 symbols from receiving the BFRR discussed in the present disclosure, the UE could monitor PDCCH in all CORESETs, and receive PDSCH and aperiodic CSI-RS in a resource from a CSI-RS resource set associated with useIndicatedTCIState, using the same antenna port quasi co-location parameters as the ones associated with the corresponding index q_new, if any; or, the UE could transmit PUCCH, PUSCH and SRS associated with useIndicatedTCIState using a same spatial domain filter as the one corresponding to q_new, if any, or as for the last PRACH transmission, and transmit PUCCH using a power determined as described in the 3GPP TS 38.213 with $q_u=0$, $q_d=q_{new}$, and l=0.

In yet another example, the time of applying the QCL assumptions indicated in the separate DL TCI state (beam application time) could happen after the reception of the BFRR. In this case, the UE could indicate to the network that the beam failure for the BFD RS set q0 is only for the UL channels/signals such as PUCCH, PUSCH, SRS and etc. This indication could be in part of the first/second PUSCH MAC CE or BFR MAC CE in Msg3 or MsgA of contention based random access procedure. In this case, if the UE still receives from the network the BFRR discussed in the present disclosure, after 28 symbols from receiving the BFRR, the UE could transmit PUCCH, PUSCH and SRS associated with useIndicatedTCIState using a same spatial domain filter as the one corresponding to q_new, if any, or as for the last PRACH transmission, and transmit PUCCH using a power determined as described in the 3GPP TS 38.213 with $q_u=0$, $q_d=q_{new}$, and $l=0$.

In such case, the UE could indicate to the network that the beam failure for the BFD RS set q0 is only for the DL channels/signals such as PDCCH, PDSCH, CSI-RS and etc. This indication could be in part of the first/second PUSCH MAC CE or BFR MAC CE in Msg3 or MsgA of contention based random access procedure. In this case, after 28 symbols from receiving the BFRR discussed in the present disclosure, the UE could monitor PDCCH in all CORESETs, and receive PDSCH and aperiodic CSI-RS in a resource from a CSI-RS resource set associated with useIndicatedTCIState, using the same antenna port quasi co-location parameters as the ones associated with the corresponding index q_new, if any.

Alternatively, after 28 symbols from receiving the BFRR discussed in the present disclosure, the UE could monitor PDCCH in all CORESETs, and receive PDSCH and aperiodic CSI-RS in a resource from a CSI-RS resource set associated with useIndicatedTCIState, using the same antenna port quasi co-location parameters as the ones associated with the corresponding index q_new, if any; or, the UE could transmit PUCCH, PUSCH and SRS associated with useIndicatedTCIState using a same spatial domain filter as the one corresponding to q_new, if any, or as for the last PRACH transmission, and transmit PUCCH using a power determined as described in the 3GPP TS 38.213 with $q_u=0$, $q_d=q_{new}$, and $l=0$.

Starting from the beam application time, the UE may monitor PDCCH in all relevant CORESETs, and receive corresponding PDSCHs and other DL channels/signals sharing the same separate DL TCI state such as aperiodic CSI-RS in a resource from a CSI-RS resource set associated with useIndicatedTCIState following the QCL assumptions in the indicated separate DL TCI state. Furthermore, the UE could update the BFD RS set q0 by including/incorporating the QCL-typeD source RS (e.g., corresponding to a periodic 1-port CSI-RS resource configuration index or SSB index) indicated in the separate DL TCI state. Alternatively, the UE could assess the radio link quality of the BFD RS configured in the BFD RS set q0 having the same value as the QCL-typeD source RS (e.g., corresponding to a periodic 1-port CSI-RS resource configuration index or SSB index) indicated in the separate DL TCI state.

Alternatively, the UE is not expected to follow the QCL assumptions indicated in the separate DL TCI state to receive DL channels/signals such as PDCCH, PDSCH, CSI-RS and etc. The UE could still update the BFD RS set q0 by including/incorporating the QCL-typeD source RS (e.g., corresponding to a periodic 1-port CSI-RS resource configuration index or SSB index) indicated in the separate DL TCI state. Alternatively, the UE could assess the radio link quality of the BFD RS configured in the BFD RS set q0 having the same value as the QCL-typeD source RS (e.g., corresponding to a periodic 1-port CSI-RS resource configuration index or SSB index) indicated in the separate DL TCI state.

In yet another example, the time of applying the QCL assumptions indicated in the separate DL TCI state (beam application time) could happen after the reception of the BFRR. In this example, the UE is not expected to use the same antenna port QCL parameters as the ones associated with the corresponding index q_new, if any, to receive DL channels/signals such as PDCCH, PDSCH, CSI-RS and etc., though the UE receives from the network the BFRR discussed in the present disclosure. After 28 symbols from receiving the BFRR, however, the UE could still transmit PUCCH, PUSCH and SRS associated with useIndicatedTCIState using a same spatial domain filter as the one corresponding to q_new, if any, or as for the last PRACH transmission, and transmit PUCCH using a power determined as described in the 3GPP TS 38.213 with $q_u=0$, $q_d=q_{new}$, and $l=0$.

Starting from the beam application time, the UE may monitor PDCCH in all relevant CORESETs, and receive corresponding PDSCHs and other DL channels/signals sharing the same separate DL TCI state such as aperiodic CSI-RS in a resource from a CSI-RS resource set associated with useIndicatedTCIState following the QCL assumptions in the indicated separate DL TCI state. Furthermore, the UE could update the BFD RS set q0 by including/incorporating the QCL-typeD source RS (e.g., corresponding to a periodic 1-port CSI-RS resource configuration index or SSB index) indicated in the separate DL TCI state. Alternatively, the UE could assess the radio link quality of the BFD RS configured in the BFD RS set q0 having the same value as the QCL-typeD source RS (e.g., corresponding to a periodic 1-port CSI-RS resource configuration index or SSB index) indicated in the separate DL TCI state.

Yet for another example, the UE could receive from the network a separate UL TCI state via MAC CE or DCI (e.g., DCI format 1_1 or 1_2 with or without DL assignment) before the UE detects a DCI format with CRC scrambled by C-RNTI or MCS-C-RNTI, or before the UE receives a last PDCCH symbol with a DCI format scheduling a PUSCH transmission with a same HARQ process number as for the transmission of the first/second PUSCH and having a toggled NDI field value. In one case, the UE could send to the network HARQ acknowledgement of the reception/detection of the separate UL TCI state. In another case, the UE may not send to the network any acknowledgement of the reception/detection of the separate UL TCI state.

In one example, the time of applying the QCL assumptions indicated in the separate UL TCI state (beam application time) happens prior to the reception of the BFRR. In this case, starting from the beam application time, the UE may transmit PUCCH, PUSCH and other relevant channels/signals sharing the same separate UL TCI state such as SRS associated with useIndicatedTCIState following the QCL assumptions in the indicated separate UL TCI state.

Furthermore, the UE could update the BFD RS set q0 by including/incorporating the QCL-typeD source RS (e.g., corresponding to a periodic 1-port CSI-RS resource configuration index or SSB index) indicated in the separate UL TCI state. Alternatively, the UE could assess the radio link quality of the BFD RS configured in the BFD RS set q0 having the same value as the QCL-typeD source RS (e.g., corresponding to a periodic 1-port CSI-RS resource configuration index or SSB index) indicated in the separate UL TCI state.

The UE could indicate to the network that the beam failure for the BFD RS set q0 is only for the DL channels/signals such as PDCCH, PDSCH, CSI-RS and etc. This indication could be in part of the first/second PUSCH MAC CE or BFR MAC CE in Msg3 or MsgA of contention based random access procedure. In this case, if the UE still receives from the network the BFRR discussed in the present disclosure, after 28 symbols from receiving the BFRR, the UE could monitor PDCCH in all CORESETs, and receive PDSCH and aperiodic CSI-RS in a resource from a CSI-RS resource set associated with useIndicatedTCIState, using the same antenna port quasi co-location parameters as the ones associated with the corresponding index q_new, if any.

Or the UE could indicate to the network that the beam failure for the BFD RS set q0 is only for the UL channels/signals such as PUCCH, PUSCH, SRS and etc. This indication could be in part of the first/second PUSCH MAC CE or BFR MAC CE in Msg3 or MsgA of contention based random access procedure. In this case, if the UE still receives from the network the BFRR discussed in the present disclosure, after 28 symbols from receiving the BFRR, the UE could transmit PUCCH, PUSCH and SRS associated with useIndicatedTCIState using a same spatial domain filter as the one corresponding to q_new, if any, or as for the last PRACH transmission, and transmit PUCCH using a power determined as described in the 3GPP TS 38.213 with $q_u=0$, $q_d=q_{new}$, and l=0.

Alternatively, if the UE still receives from the network the BFRR discussed in the present disclosure, after 28 symbols from receiving the BFRR, the UE could monitor PDCCH in all CORESETs, and receive PDSCH and aperiodic CSI-RS in a resource from a CSI-RS resource set associated with useIndicatedTCIState, using the same antenna port quasi co-location parameters as the ones associated with the corresponding index q_new, if any; or, the UE could transmit PUCCH, PUSCH and SRS associated with useIndicatedTCIState using a same spatial domain filter as the one corresponding to q_new, if any, or as for the last PRACH transmission, and transmit PUCCH using a power determined as described in the 3GPP TS 38.213 with $q_u=0$, $q_d=q_{new}$, and l=0.

Optionally, the UE is not expected to use the same antenna port QCL parameters as the ones associated with the corresponding index q_new, if any, to receive DL channels/signals such as PDCCH, PDSCH, CSI-RS and etc., or the UE is not expected to use a same spatial domain filter as the one corresponding to q_new, if any, to transmit UL channels/signals such as PUCCH, PUSCH, SRS and etc., though the UE receives from the network the BFRR discussed in the present disclosure.

Furthermore, the UE is not expected to monitor the BFRR or receive from the network the BFRR discussed in the present disclosure.

In another example, the time of applying the QCL assumptions indicated in the separate UL TCI state happens prior to the reception of the BFRR. In this example, the UE is not expected to follow the QCL assumptions in the indicated separate UL TCI state to transmit UL channels/signals such as PUCCH, PUSCH, SRS or etc. The UE could still update the BFD RS set $q_0$ by including/incorporating the QCL-typeD source RS (e.g., corresponding to a periodic 1-port CSI-RS resource configuration index or SSB index) indicated in the separate UL TCI state. Alternatively, the UE could assess the radio link quality of the BFD RS configured in the BFD RS set q0 having the same value as the QCL-typeD source RS (e.g., corresponding to a periodic 1-port CSI-RS resource configuration index or SSB index) indicated in the separate UL TCI state.

After 28 symbols from receiving the BFRR discussed in the present disclosure, the UE could monitor PDCCH in all CORESETs, and receive PDSCH and aperiodic CSI-RS in a resource from a CSI-RS resource set associated with useIndicatedTCIState, using the same antenna port quasi co-location parameters as the ones associated with the corresponding index q_new, if any; or, the UE could transmit PUCCH, PUSCH and SRS associated with useIndicatedTCIState using a same spatial domain filter as the one corresponding to q_new, if any, or as for the last PRACH transmission, and transmit PUCCH using a power determined as described in the 3GPP TS 38.213 with $q_u=0$, $q_d=q_{new}$, and l=0.

In yet another example, the time of applying the QCL assumptions indicated in the separate UL TCI state (beam application time) could happen after the reception of the BFRR.

The UE could indicate to the network that the beam failure for the BFD RS set q0 is only for the DL channels/signals such as PDCCH, PDSCH, CSI-RS and etc. This indication could be in part of the first/second PUSCH MAC CE or BFR MAC CE in Msg3 or MsgA of contention based random access procedure. In this case, if the UE still receives from the network the BFRR discussed in the present disclosure, after 28 symbols from receiving the BFRR, the UE could monitor PDCCH in all CORESETs, and receive PDSCH and aperiodic CSI-RS in a resource from a CSI-RS resource set associated with useIndicatedTCIState, using the same antenna port quasi co-location parameters as the ones associated with the corresponding index q_new, if any.

Or the UE could indicate to the network that the beam failure for the BFD RS set q0 is only for the UL channels/signals such as PUCCH, PUSCH, SRS and etc. This indication could be in part of the first/second PUSCH MAC CE or BFR MAC CE in Msg3 or MsgA of contention based random access procedure. In this case, after 28 symbols from receiving the BFRR discussed in the present disclosure, the UE could transmit PUCCH, PUSCH and SRS associated with useIndicatedTCIState using a same spatial domain filter as the one corresponding to q_new, if any, or as for the last PRACH transmission, and transmit PUCCH using a power determined as described in the 3GPP TS 38.213 with $q_u=0$, $q_d=q_{new}$, and l=0.

Alternatively, after 28 symbols from receiving the BFRR discussed in the present disclosure, the UE could monitor PDCCH in all CORESETs, and receive PDSCH and aperiodic CSI-RS in a resource from a CSI-RS resource set associated with useIndicatedTCIState, using the same antenna port quasi co-location parameters as the ones associated with the corresponding index q_new, if any; or, the UE could transmit PUCCH, PUSCH and SRS associated with useIndicatedTCIState using a same spatial domain filter as the one corresponding to q_new, if any, or as for the last PRACH transmission, and transmit PUCCH using a power determined as described in the 3GPP TS 38.213 with $q_u=0$, $q_d=q_{new}$, and l=0.

Starting from the beam application time, the UE may transmit PUCCH, PUSCH and other relevant channels/signals sharing the same separate UL TCI state such as SRS associated with useIndicatedTCIState following the QCL assumptions in the indicated separate UL TCI state. Furthermore, the UE could update the BFD RS set q0 by including/incorporating the QCL-typeD source RS (e.g., corresponding to a periodic 1-port CSI-RS resource configuration index or SSB index) indicated in the separate UL TCI state. Alternatively, the UE could assess the radio link quality of the BFD RS configured in the BFD RS set q0 having the same value as the QCL-typeD source RS (e.g., corresponding to a periodic 1-port CSI-RS resource configuration index or SSB index) indicated in the separate UL TCI state.

Alternatively, the UE is not expected to follow the QCL assumptions indicated in the separate UL TCI state to transmit UL channels/signals such as PUCCH, PUSCH, SRS and etc. The UE could still update the BFD RS set q0 by including/incorporating the QCL-typeD source RS (e.g., corresponding to a periodic 1-port CSI-RS resource configuration index or SSB index) indicated in the separate UL TCI state. Alternatively, the UE could assess the radio link quality of the BFD RS configured in the BFD RS set q0 having the same value as the QCL-typeD source RS (e.g., corresponding to a periodic 1-port CSI-RS resource configuration index or SSB index) indicated in the separate UL TCI state.

In yet another example, the time of applying the QCL assumptions indicated in the separate UL TCI state (beam application time) could happen after the reception of the BFRR. In this example, the UE is not expected to use a same spatial domain filter as the one corresponding to q_new, if any, to transmit UL channels/signals such as PUCCH, PUSCH, SRS and etc., though the UE receives from the network the BFRR discussed in the present disclosure. After 28 symbols from receiving the BFRR, however, the UE could still monitor PDCCH in all CORESETs, and receive PDSCH and aperiodic CSI-RS in a resource from a CSI-RS resource set associated with useIndicatedTCIState, using the same antenna port quasi co-location parameters as the ones associated with the corresponding index q_new, if any.

Starting from the beam application time, the UE may transmit PUCCH, PUSCH and other relevant channels/signals sharing the same separate UL TCI state such as SRS associated with useIndicatedTCIState following the QCL assumptions in the indicated separate UL TCI state. Furthermore, the UE could update the BFD RS set q0 by including/incorporating the QCL-typeD source RS (e.g., corresponding to a periodic 1-port CSI-RS resource configuration index or SSB index) indicated in the separate UL TCI state. Alternatively, the UE could assess the radio link quality of the BFD RS configured in the BFD RS set q0 having the same value as the QCL-typeD source RS (e.g., corresponding to a periodic 1-port CSI-RS resource configuration index or SSB index) indicated in the separate UL TCI state.

In yet another example, as discussed above, the UE could transmit PUCCH in the PUCCH resource with the first/second LRR when the radio link quality of the BFD RS set q0 is worse than Qout.

For one example, the UE could receive from the network a joint DL and UL TCI state or separate DL or UL TCI state via MAC CE or DCI (e.g., DCI format 1_1 or 1_2 with or without DL assignment) before the UE receives from the network the uplink grant in response to the first/second LRR, or before the UE provides in the first/second PUSCH MAC CE index(es) for at least corresponding first PCell(s) or first PSCell(s) or first SCell(s) with radio link quality worse than Qout, indication(s) of presence of q_new for corresponding first PCell(s) or first PSCell(s) or first SCell(s), and index(es) q_new for a periodic CSI-RS configuration or for a SS/PBCH block provided by higher layers, if any, for corresponding first PCell(s) or first PSCell(s) or first SCell(s). In one case, the UE could send to the network HARQ acknowledgement of the reception/detection of the joint DL and UL TCI state or the separate DL or UL TCI state. In another case, the UE may not send to the network any acknowledgement of the reception/detection of the joint DL and UL TCI state or the separate DL or UL TCI state.

In one example, the time of applying the QCL assumptions indicated in the joint DL and UL TCI state, or separate DL or UL TCI state (beam application time) happens prior to the reception of the uplink grant in response to the first/second LRR or the transmission of the first/second PUSCH MAC CE. In this case, starting from the beam application time, the UE may monitor PDCCH in all relevant CORESETs, and receive corresponding PDSCHs and other DL channels/signals sharing the same joint DL and UL TCI state or separate DL or UL TCI state such as aperiodic CSI-RS in a resource from a CSI-RS resource set associated with useIndicatedTCIState following the QCL assumptions in the indicated joint DL and UL TCI state or separate DL or UL TCI state; or the UE may transmit PUCCH, PUSCH and other relevant channels/signals sharing the same joint DL and UL TCI state or separate DL or UL TCI state such as SRS associated with useIndicatedTCIState following the QCL assumptions in the indicated joint DL and UL TCI state or separate DL and UL TCI state.

Furthermore, the UE could update the BFD RS set q0 by including/incorporating the QCL-typeD source RS (e.g., corresponding to a periodic 1-port CSI-RS resource configuration index or SSB index) indicated in the joint DL and UL TCI state or separate DL or UL TCI state. Alternatively, the UE could assess the radio link quality of the BFD RS configured in the BFD RS set q0 having the same value as the QCL-typeD source RS (e.g., corresponding to a periodic 1-port CSI-RS resource configuration index or SSB index) indicated in the joint DL and UL TCI state or separate DL or UL TCI state. After applying the QCL assumptions indicated in the joint DL and UL TCI state or separate DL or UL TCI state, the UE may or may not transmit the first/second PUSCH MAC CE. If the UE still transmits to the network the first/second PUSCH MAC CE, the UE could follow those specified in the present disclosure to apply the QCL assumptions for DL or UL channels/signals.

In another example, the time of applying the QCL assumptions indicated in the joint DL and UL TCI state, or separate DL or UL TCI state (beam application time) happens prior to the reception of the uplink grant in response to the first/second LRR or the transmission of the first/second PUSCH MAC CE. In this example, the UE is not expected to follow the QCL assumptions in the indicated joint DL and UL TCI state or separate DL or UL TCI state to receive DL channels/signals such as PDCCH, PDSCH, CSI-RS or etc.; or the UE is not expected to follow the QCL assumptions in the indicated joint DL and UL TCI state or separate DL and UL TCI state to transmit UL channels/signals such as PUCCH, PUSCH, SRS or etc. The UE could still update the BFD RS set q0 by including/incorporating the QCL-typeD source RS (e.g., corresponding to a periodic 1-port CSI-RS resource configuration index or SSB index) indicated in the joint DL and UL TCI state or separate DL or UL TCI state.

Alternatively, the UE could assess the radio link quality of the BFD RS configured in the BFD RS set q0 having the same value as the QCL-typeD source RS (e.g., corresponding to a periodic 1-port CSI-RS resource configuration index or SSB index) indicated in the joint DL and UL TCI state or separate DL or UL TCI state. The UE may or may not transmit the first/second PUSCH MAC CE. If the UE still transmits to the network the first/second PUSCH MAC CE, the UE could follow those specified in the present disclosure to apply the QCL assumptions for DL or UL channels/signals.

In yet another example, the time of applying the QCL assumptions indicated in the joint DL and UL TCI state, or separate DL or UL TCI state (beam application time) could happen after the transmission of the first/second PUSCH MAC CE. In this case, the UE could follow those specified in the present disclosure to apply the QCL assumptions for DL or UL channels/signals.

For another example, the UE could receive from the network a separate DL TCI state via MAC CE or DCI (e.g., DCI format 1_1 or 1_2 with or without DL assignment) before the UE receives from the network the uplink grant in response to the first/second LRR, or before the UE provides in the first/second PUSCH MAC CE index(es) for at least corresponding first PCell(s) or first PSCell(s) or first SCell(s) with radio link quality worse than Qout, indication(s) of presence of q_new for corresponding first PCell(s) or first PSCell(s) or first SCell(s), and index(es) q_new for a periodic CSI-RS configuration or for a SS/PBCH block provided by higher layers, if any, for corresponding first PCell(s) or first PSCell(s) or first SCell(s). In one case, the UE could send to the network HARQ acknowledgement of the reception/detection of the separate DL TCI state. In another case, the UE may not send to the network any acknowledgement of the reception/detection of the separate DL TCI state.

In one example, the time of applying the QCL assumptions indicated in the separate DL TCI state (beam application time) happens prior to the reception of the uplink grant in response to the first/second LRR or the transmission of the first/second PUSCH MAC CE. In this case, starting from the beam application time, the UE may monitor PDCCH in all relevant CORESETs, and receive corresponding PDSCHs and other DL channels/signals sharing the same separate DL TCI state such as aperiodic CSI-RS in a resource from a CSI-RS resource set associated with useIndicatedTCIState following the QCL assumptions in the indicated separate DL TCI state. Furthermore, the UE could update the BFD RS set q0 by including/incorporating the QCL-typeD source RS (e.g., corresponding to a periodic 1-port CSI-RS resource configuration index or SSB index) indicated in the separate DL TCI state.

Alternatively, the UE could assess the radio link quality of the BFD RS configured in the BFD RS set q0 having the same value as the QCL-typeD source RS (e.g., corresponding to a periodic 1-port CSI-RS resource configuration index or SSB index) indicated in the separate DL TCI state. After applying the QCL assumptions indicated in the separate DL TCI state, the UE may or may not transmit the first/second PUSCH MAC CE. If the UE still transmits to the network the first/second PUSCH MAC CE, the UE could follow those specified in the present disclosure to apply the QCL assumptions for DL or UL channels/signals.

In another example, the time of applying the QCL assumptions indicated in the separate DL TCI state (beam application time) happens prior to the reception of the uplink grant in response to the first/second LRR or the transmission of the first/second PUSCH MAC CE. In this example, the UE is not expected to follow the QCL assumptions in the indicated separate DL TCI state to receive DL channels/signals such as PDCCH, PDSCH, CSI-RS or etc. The UE could still update the BFD RS set q0 by including/incorporating the QCL-typeD source RS (e.g., corresponding to a periodic 1-port CSI-RS resource configuration index or SSB index) indicated in the separate DL TCI state. Alternatively, the UE could assess the radio link quality of the BFD RS configured in the BFD RS set q0 having the same value as the QCL-typeD source RS (e.g., corresponding to a periodic 1-port CSI-RS resource configuration index or SSB index) indicated in the separate DL TCI state. The UE may or may not transmit the first/second PUSCH MAC CE. If the UE still transmits to the network the first/second PUSCH MAC CE, the UE could follow those specified in the present disclosure to apply the QCL assumptions for DL or UL channels/signals.

In yet another example, the time of applying the QCL assumptions indicated in the separate DL TCI state (beam application time) could happen after the transmission of the first/second PUSCH MAC CE. In this case, the UE could follow those specified in the present disclosure to apply the QCL assumptions for DL or UL channels/signals.

Yet for example, the UE could receive from the network a separate UL TCI state via MAC CE or DCI (e.g., DCI format 1_1 or 1_2 with or without DL assignment) before the UE receives from the network the uplink grant in response to the first/second LRR, or before the UE provides in the first/second PUSCH MAC CE index(es) for at least corresponding first PCell(s) or first PSCell(s) or first SCell(s) with radio link quality worse than Qout, indication(s) of presence of q_new for corresponding first PCell(s) or first PSCell(s) or first SCell(s), and index(es) q_new for a periodic CSI-RS configuration or for a SS/PBCH block provided by higher layers, if any, for corresponding first PCell(s) or first PSCell(s) or first SCell(s). In one case, the UE could send to the network HARQ acknowledgement of the reception/detection of the separate UL TCI state. In another case, the UE may not send to the network any acknowledgement of the reception/detection of the separate UL TCI state.

In one example, the time of applying the QCL assumptions indicated in the separate UL TCI state (beam application time) happens prior to the reception of the uplink grant in response to the first/second LRR or the transmission of the first/second PUSCH MAC CE. In this case, starting from the beam application time, the UE may transmit PUCCH, PUSCH and other relevant channels/signals sharing the same separate UL TCI state such as SRS associated with useIndicatedTCIState following the QCL assumptions in the indicated separate UL TCI state. Furthermore, the UE could update the BFD RS set q0 by including/incorporating the QCL-typeD source RS (e.g., corresponding to a periodic 1-port CSI-RS resource configuration index or SSB index) indicated in the separate UL TCI state. Alternatively, the UE could assess the radio link quality of the BFD RS configured in the BFD RS set q0 having the same value as the QCL-typeD source RS (e.g., corresponding to a periodic 1-port CSI-RS resource configuration index or SSB index) indicated in the separate UL TCI state. After applying the QCL assumptions indicated in the separate UL TCI state, the UE may or may not transmit the first/second PUSCH MAC CE. If the UE still transmits to the network the first/second PUSCH MAC CE, the UE could follow those specified in the present disclosure to apply the QCL assumptions for DL or UL channels/signals.

In another example, the time of applying the QCL assumptions indicated in the separate UL TCI state (beam application time) happens prior to the reception of the uplink grant in response to the first/second LRR or the transmission of the first/second PUSCH MAC CE. In this example, the UE is not expected to follow the QCL assumptions in the indicated UL TCI state to transmit UL channels/signals such as PUCCH, PUSCH, SRS or etc. The UE could still update the BFD RS set q0 by including/incorporating the QCL-typeD source RS (e.g., corresponding to a periodic 1-port CSI-RS resource configuration index or SSB index) indicated in the separate UL TCI state. Alternatively, the UE could assess the radio link quality of the BFD RS configured in the BFD RS set q0 having the same value as the QCL-typeD source RS (e.g., corresponding to a periodic 1-port CSI-RS resource configuration index or SSB index) indicated in the separate UL TCI state. The UE may or may not transmit the first/second PUSCH MAC CE. If the UE still transmits to the network the first/second PUSCH MAC CE, the UE could follow those specified in the present disclosure to apply the QCL assumptions for DL or UL channels/signals.

In yet another example, the time of applying the QCL assumptions indicated in the separate UL TCI state (beam application time) could happen after the transmission of the first/second PUSCH MAC CE. In this case, the UE could follow those specified in the present disclosure to apply the QCL assumptions for DL or UL channels/signals.

Figure 13:
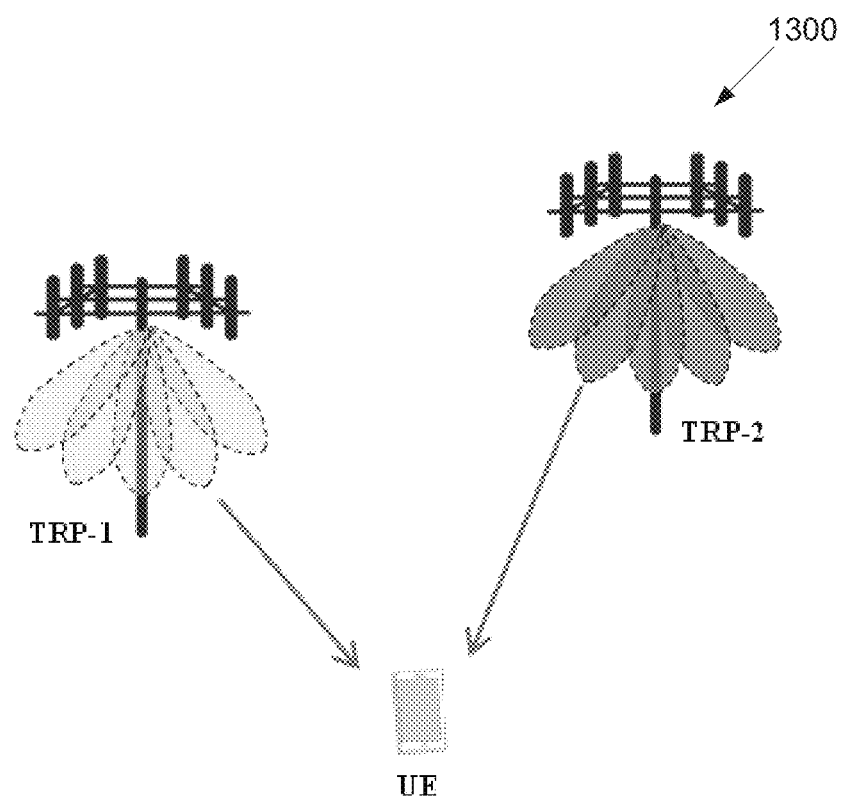
FIG. 13 illustrates an example of multiple transmission and reception points (multi-TRP) system according to embodiments of the present disclosure.

FIG. 13 illustrates an example of multi-TRP system 1300 according to embodiments of the present disclosure. An embodiment of the multi-TRP system 1300 shown in FIG. 13 is for illustration only.

The BFR procedure can be extended to a multiple transmission and reception point (TRP) system, wherein the BFD RS configuration, BFRQ and BFRR could be conducted on a per TRP basis. As depicted in FIG. 13, in a multi-TRP system, the UE could simultaneously receive from multiple physically non-co-located TRPs various channels/RSs such as PDCCHs and/or PDSCHs using either a single receive (RX) panel or multiple RX panels. In this disclosure, a RX panel could correspond to a set of RX antenna elements/ports at the UE, a set of measurement RS resources such as SRS resources, a spatial domain RX filter or etc. Further, a TRP in the multi-TRP system can represent a collection of measurement antenna ports, measurement RS resources and/or control resource sets (CORESETs).

For example, a TRP could be associated with one or more of: (1) a plurality of CSI-RS resources; (2) a plurality of CRIs (CSI-RS resource indices/indicators); (3) a measurement RS resource set, for example, a CSI-RS resource set along with its indicator; (4) a plurality of CORESETs associated with a CORESETPoolIndex; or (5) a plurality of CORESETs associated with a TRP-specific index/indicator/identity.

A cell/TRP could be a non-serving cell/TRP. In this disclosure, the non-serving cell(s) or the non-serving cell TRP(s) could have/broadcast different physical cell IDs (PCIs) and/or other higher layer signaling index values from that of the serving cell or the serving cell TRP (i.e., the serving cell PCI). In one example, the serving cell or the serving cell TRP could be associated with the serving cell ID (SCI) and/or the serving cell PCI. That is, for the inter-cell operation considered in the present disclosure, different cells/TRPs could broadcast different PCIs and/or one or more cells/TRPs (referred to/defined as non-serving cells/TRPs in the present disclosure) could broadcast different PCIs from that of the serving cell/TRP (i.e., the serving cell PCI) and/or one or more cells/TRPs are not associated with valid SCI (e.g., provided by the higher layer parameter ServCellIndex). In the present disclosure, a non-serving cell PCI can also be referred to as an additional PCI, another PCI or a different PCI (with respect to the serving cell PCI).

The UE could be configured by the network one or more transmission configuration information (TCI) states, which indicate the QCL information/assumptions for one or more RSs/channels such as PDCCHs and/or PDSCHs. The TCI state update/indication for PDCCH and/or PDSCH can also be referred to as beam indication. For instance, for data transmissions on the shared channel (such as the physical downlink shared channel in NR, i.e., PDSCH), the corresponding beam indication procedure under the 3GPP Rel-15/16 TCI framework can be summarized as follows: a UE can be first higher layer configured by the network (e.g., via high layer RRC signaling) a set/pool of TCI states; the UE could then receive from the network a MAC CE command activating one or more TCI states from the set/pool of RRC configured TCI states; the UE could be indicated by the network via dynamic DCI signaling that one or more of the MAC CE activated TCI states are active for the reception of the PDSCH(s).

As mentioned in the present disclosure, in the current 3GPP Rel-15/16 based BFR designs, the UE could be explicitly configured by the network (via higher layer RRC signaling) one or more BFD RS resources to measure. Alternatively, the UE could implicitly determine the one or more BFD RS resources as the QCL source RS(s) indicated in active TCI state(s) for PDCCH reception(s) in one or more CORESET(s). Under the Unified TCI framework, a UE could be provided by the network one or more joint DL and UL TCI states or separate DL or UL TCI states via MAC CE or DCI (DCI format 1_1 or 1_2 with or without DL assignment) based signaling. Hence, under the Unified TCI framework, various design aspects related to configuring/determining the BFD RS resources for DL or UL beam detection/declaration and the corresponding BFRQ and BFRR procedures need to be specified for both single-TRP and multi-TRP based operations.

The present disclosure provides various design aspects/enhancements for beam failure detection, beam failure request, beam failure recovery and the corresponding UE's behaviors after receiving the BFRR under the unified TCI framework for both single-TRP and multi-TRP systems.

As described in the U.S. patent application Ser. No. 17/584,239, as incorporated by reference in its entirety, a unified TCI framework could indicate/include N≥1 DL TCI states and/or M≥1 UL TCI states, wherein the indicated TCI state could be at least one of: (1) a DL TCI state and/or its corresponding/associated TCI state ID; (2) an UL TCI state and/or its corresponding/associated TCI state ID; (3) a joint DL and UL TCI state and/or its corresponding/associated TCI state ID; or (4) a separate DL TCI state and UL TCI state and/or their corresponding/associated TCI state ID(s).

There could be various design options/channels to indicate to the UE a beam (i.e., a TCI state) for the transmission/reception of a PDCCH or a PDSCH. As described in the U.S. patent application Ser. No. 17/584,239, as incorporated by reference in its entirety, in one example, a MAC CE could be used to indicate to the UE a beam (i.e., a TCI state and/or a TCI state ID) for the transmission/reception of a PDCCH or a PDSCH. In another example, a DCI could be used to indicate to the UE a beam (i.e., a TCI state and/or a TCI state ID) for the transmission/reception of a PDCCH or a PDSCH.

For example, a DL related DCI (e.g., DCI format 1_0, DCI format 1_1 or DCI format 1_2) could be used to indicate to the UE a beam (i.e., a TCI state and/or a TCI state ID) for the transmission/reception of a PDCCH or a PDSCH, wherein the DL related DCI may or may not include a DL assignment.

For another example, an UL related DCI (e.g., DCI format 0_0, DCI format 0_1, DCI format 0_2) could be used to indicate to the UE a beam (i.e., a TCI state and/or a TCI state ID) for the transmission/reception of a PDCCH or a PDSCH, wherein the UL related DCI may or may not include an UL scheduling grant.

Yet for another example, a custom/purpose designed DCI format could be used to indicate to the UE a beam (i.e., a TCI state and/or a TCI state ID) for the transmission/reception of a PDCCH or a PDSCH.

Rel-17 introduced the unified TCI framework, where a unified or master or main TCI state is signaled to the UE. The unified or master or main TCI state can be one of: (1) in case of joint TCI state indication, wherein a same beam is used for DL and UL channels, a joint TCI state that can be used at least for UE-dedicated DL channels and UE-dedicated UL channels; (2) in case of separate TCI state indication, wherein different beams are used for DL and UL channels, a DL TCI state can be used at least for UE-dedicated DL channels; or (3) in case of separate TCI state indication, wherein different beams are used for DL and UL channels, a UL TCI state can be used at least for UE-dedicated UL channels.

The unified (master or main) TCI state is TCI state of UE-dedicated reception on PDSCH/PDCCH or dynamic-grant/configured-grant based PUSCH and all of dedicated PUCCH resources.

As discussed above, the UE could be provided by the network, e.g., via MAC CE or DCI (e.g., DCI format 1_1 or 1_2 with or without DL assignment) based signaling through the higher layer parameter TCI-State_r17 or DLorJoint-TCIState or UL-TCIState, M=1 joint DL and UL Unified TCI state or M=1 separate UL Unified TCI state or N=1 separate DL Unified TCI state for UE-dedicated reception on PDSCH/PDCCH or dynamic-grant/configured-grant based PUSCH and all of dedicated PUCCH resources. For this case, DM-RS antenna ports for PDCCH receptions in one or more CORESETs may or may not be quasi co-located with the reference signal provided in the indicated Unified TCI state. In the present disclosure, the control resource set(s) whose QCL assumption(s) follow that provided in the indicated Unified TCI state or sharing the indicated Unified TCI state is referred to as first CORESET(s), while the control resource set(s) whose QCL assumption(s) does not follow that provided in the indicated Unified TCI state or not sharing the indicated Unified TCI state is referred to as second CORESET(s).

Furthermore, a first CORESET or a second CORESET could correspond to one or more of: (1) "CORESET A": a CORESET other than CORESET with index 0 (or CORESET #0) associated with only UE-dedicated PDCCH reception(s) in a CC, comprising, e.g., CORESET(s) associated with USS set(s) or Type3-PDCCH CSS set(s); (2) "CORESET B": a CORESET other than CORESET #0 associated with only non-UE-dedicated PDCCH reception(s) in a CC, comprising, e.g., CORESET(s) associated with all types of CSS sets such as Type0/0A/1/2/3-PDCCH CSS sets or CSS sets other than Type3-PDCCH CSS set(s) such as Type0/0A/1/2-PDCCH CSS sets; (3) "CORESET C": a CORESET other than CORESET #0 associated with both UE-dedicated and non-UE-dedicated PDCCH receptions in a CC; or (4) CORESET #0, i.e., CORESET with index 0.

The UE could be provided/configured with "useIndicatedR17TCIState" for one or more of the first CORESETs. For instance, the UE could be provided/configured with "useIndicatedR17TCIstate" set to "enabled" in the parameter, e.g., the higher layer parameter ControlResourceSet, that configures the corresponding first CORESET(s).

The UE could implicitly determine the set of RSs (or RS resources) for beam failure detection (also referred to as BFD RS set) q0 under the Unified TCI framework, wherein the UE is provided by the network, e.g., via MAC CE or DCI (e.g., DCI format 1_1 or 1_2 with or without DL assignment) based signaling through the higher layer parameter TCI-State_r17 or DLorJoint-TCIState or UL-TCIState, M=1 joint DL and UL Unified TCI state or M=1 separate UL Unified TCI state or N=1 separate DL Unified TCI state for UE-dedicated reception on PDSCH/PDCCH or dynamic-grant/configured-grant based PUSCH and all of dedicated PUCCH resources.

In one example, the UE could determine the BFD RS set q0 to include periodic CSI-RS resource configuration indexes or SSB indexes (also referred to as BFD RS resource indexes) with same values as the RS indexes in the RS sets indicated in one or more unified TCI states provided by the higher layer parameter TCI-State-r17 or DLorJoint-TCIState or UL-TCIState for respective first CORESETs that the UE uses for monitoring PDCCH, wherein based on those specified herein in the present disclosure, the one or more unified TCI states could be indicated by one or more unified TCI state indication/activation MAC CEs or one or more TCI codepoints in one or more TCI fields of one or more beam indication DCIs.

In another example, the UE could determine the BFD RS set q0 to include periodic CSI-RS resource configuration indexes or SSB indexes (also referred to as BFD RS resource indexes) with same values as the RS indexes in the RS sets indicated in one or more TCI states provided by the higher layer parameter TCI-State for respective second CORESETs that the UE uses for monitoring PDCCH.

In yet another example, the UE could determine the BFD RS set q0 to include periodic CSI-RS resource configuration indexes or SSB indexes (also referred to as BFD RS resource indexes) with same values as the RS indexes in the RS sets indicated in one or more unified TCI states provided by the higher layer parameter TCI-State-r17 or DLorJoint-TCIState or UL-TCIState for respective first CORESETs that the UE uses for monitoring PDCCH, and periodic CSI-RS resource configuration indexes or SSB indexes (also referred to as BFD RS resource indexes) with same values as the RS indexes in the RS sets indicated in one or more TCI states provided by the higher layer parameter TCI-State for respective second CORESETs that the UE uses for monitoring PDCCH, wherein based on those specified herein in the present disclosure, the one or more unified TCI states could be indicated by one or more unified TCI state indication/activation MAC CEs or one or more TCI codepoints in one or more TCI fields of one or more beam indication DCIs.

In yet another example, the UE could determine a first BFD RS set q0A to include periodic CSI-RS resource configuration indexes or SSB indexes (also referred to as BFD RS resource indexes) with same values as the RS indexes in the RS sets indicated in one or more unified TCI states provided by the higher layer parameter TCI-State-r17 or DLorJoint-TCIState or UL-TCIState for respective first CORESETs that the UE uses for monitoring PDCCH, and a second BFD RS set q0B to include periodic CSI-RS resource configuration indexes or SSB indexes (also referred to as BFD RS resource indexes) with same values as the RS indexes in the RS sets indicated in one or more TCI states provided by the higher layer parameter TCI-State for respective second CORESETs that the UE uses for monitoring PDCCH, wherein based on those specified herein in the present disclosure, the one or more unified TCI states could be indicated by one or more unified TCI state indication/activation MAC CEs or one or more TCI codepoints in one or more TCI fields of one or more beam indication DCIs.

Alternatively, the UE could be configured by the network the set of RSs (or RS resources) for beam failure detection (also referred to as BFD RS set) q0 under the Unified TCI framework, wherein the UE is provided by the network, e.g., via MAC CE or DCI (e.g., DCI format 1_1 or 1_2 with or without DL assignment) based signaling through the higher layer parameter TCI-State_r17 or DLorJointTCI-State or UL-TCIState, M=1 joint DL and UL Unified TCI state or M=1 separate UL Unified TCI state or N=1 separate DL Unified TCI state for UE-dedicated reception on PDSCH/PDCCH or dynamic-grant/configured-grant based PUSCH and all of dedicated PUCCH resources.

In one example, the UE could be configured/indicated by the network, e.g., provided by the higher layer parameter failureDetectionResourcesToAddModList or via BFD RS indication MAC CE, the BFD RS set q0 of periodic CSI-RS resource configuration indexes or SSB indexes for beam/link failure detection or declaration. The UE could assess the radio link quality of the BFD RS set q0 according to SSBs on the PCell or the PSCell or periodic CSI-RS resource configurations that are indicated in one or more unified TCI states provided by the higher layer parameter TCI-State-r17 or DLorJoint-TCIState or UL-TCIState for respective first CORESETs that the UE uses for monitoring PDCCH, wherein based on those specified herein in the present disclosure, the one or more unified TCI states could be indicated by one or more unified TCI state indication/activation MAC CEs or one or more TCI codepoints in one or more TCI fields of one or more beam indication DCIs.

In another example, the UE could be configured/indicated by the network, e.g., provided by the higher layer parameter failureDetectionResourcesToAddModList or BFD RS indication MAC CE, the BFD RS set q0 of periodic CSI-RS resource configuration indexes or SSB indexes for beam/link failure detection or declaration. The UE could assess the radio link quality of the BFD RS set q0 according to SSBs on the PCell or the PSCell or periodic CSI-RS resource configurations that are indicated in one or more TCI states provided by the higher layer parameter TCI-State for respective second CORESETs that the UE uses for monitoring PDCCH.

In yet another example, the UE could be configured/indicated by the network, e.g., provided by the higher layer parameter failureDetectionResourcesToAddModList or via BFD RS indication MAC CE, the BFD RS set q0 of periodic CSI-RS resource configuration indexes or SSB indexes for beam/link failure detection or declaration. The UE could assess the radio link quality of the BFD RS set q0 according to SSBs on the PCell or the PSCell or periodic CSI-RS resource configurations that are indicated in one or more unified TCI states provided by the higher layer parameter TCI-State-r17 or DLorJoint-TCIState or UL-TCIState for respective first CORESETs that the UE uses for monitoring PDCCH, and according to SSBs on the PCell or the PSCell or periodic CSI-RS resource configurations that are indicated in one or more TCI states provided by the higher layer parameter TCI-State for respective second CORESETs that the UE uses for monitoring PDCCH, wherein based on those specified herein in the present disclosure, the one or more unified TCI states could be indicated by one or more unified TCI state indication/activation MAC CEs or one or more TCI codepoints in one or more TCI fields of one or more beam indication DCIs.

In yet another example, the UE could be configured/indicated by the network, e.g., provided by the higher layer parameter failureDetectionResourcesToAddModListA or via BFD RS indication MAC CE, a first BFD RS set q0A of periodic CSI-RS resource configuration indexes or SSB indexes for beam/link failure detection or declaration; the UE could assess the radio link quality of the first BFD RS set q0A according to SSBs on the PCell or the PSCell or periodic CSI-RS resource configurations that are indicated in one or more unified TCI states provided by the higher layer parameter TCI-State-r17 or DLorJoint-TCIState or UL-TCIState for respective first CORESETs that the UE uses for monitoring PDCCH, wherein based on those specified herein in the present disclosure, the one or more unified TCI states could be indicated by one or more unified TCI state indication/activation MAC CEs or one or more TCI codepoints in one or more TCI fields of one or more beam indication DCIs. The UE could also be configured/indicated by the network, e.g., provided by the higher layer parameter failureDetectionResourcesToAddModListB or via BFD RS indication MAC CE, a second BFD RS set q0B of periodic CSI-RS resource configuration indexes or SSB indexes for beam/link failure detection or declaration; the UE could assess the radio link quality of the second BFD RS set q0B according to SSBs on the PCell or the PSCell or periodic CSI-RS resource configurations that are indicated in one or more TCI states provided by the higher layer parameter TCI-State for respective second CORESETs that the UE uses for monitoring PDCCH.

For the BFD RSs, and therefore, the corresponding BFD RS resources determined by the UE, the UE could assess the radio link quality of one or more SSB indexes on the PCell or the PSCell or periodic CSI-RS resource configuration indexes in the BFD RS set q0 against the BFD threshold Qout. Furthermore, the physical layer in the UE provides an indication to higher layers when the radio link quality for all corresponding periodic CSI-RS resource configuration indexes or SSB indexes in the BFD RS set q0 is worse than the threshold Qout. The physical layer informs the higher layers when the radio link quality is worse than the BFD threshold Qout a periodicity determined by the maximum between the shortest periodicity among the SSBs on the PCell or the PSCell and/or the periodic CSI-RS configurations in the BFD RS set q0 and 2 msec.

For the BFD RSs, and therefore, the corresponding BFD RS resources determined by the UE, the UE could assess the radio link quality of one or more SSB indexes on the PCell or the PSCell or periodic CSI-RS resource configuration indexes in the first BFD RS set q0A against the BFD threshold Qout. The physical layer in the UE provides a first indication to higher layers when the radio link quality for all corresponding periodic CSI-RS resource configuration indexes or SSB indexes in the first BFD RS set q0A is worse than the threshold Qout. The physical layer informs the higher layers when the radio link quality is worse than the BFD threshold Qout a periodicity determined by the maximum between the shortest periodicity among the SSBs on the PCell or the PSCell and/or the periodic CSI-RS configurations in the first BFD RS set q0A and 2 msec.

In addition, the UE could assess the radio link quality of one or more SSB indexes on the PCell or the PSCell or periodic CSI-RS resource configuration indexes in the second BFD RS set q0B against the BFD threshold Qout. The physical layer in the UE provides a second indication to higher layers when the radio link quality for all corresponding periodic CSI-RS resource configuration indexes or SSB indexes in the second BFD RS set q0B is worse than the threshold Qout. The physical layer informs the higher layers when the radio link quality is worse than the BFD threshold Qout a periodicity determined by the maximum between the shortest periodicity among the SSBs on the PCell or the PSCell and/or the periodic CSI-RS configurations in the second BFD RS set q0B and 2 msec.

Furthermore, for the BFD RSs, and therefore, the corresponding BFD RS resources configured by the network, the UE could assess the radio link quality of one or more SSB indexes on the PCell or the PSCell or periodic CSI-RS resource configuration indexes in the BFD RS set q0 with same values as the RS indexes in the RS sets indicated in one or more unified TCI states provided by the higher layer parameter TCI-State-r17 or DLorJoint-TCIState or UL-TCIState for respective first CORESETs that the UE uses for monitoring PDCCH against the BFD threshold Qout, wherein based on those specified herein in the present disclosure, the one or more unified TCI states could be indicated by one or more unified TCI state indication/activation MAC CEs or one or more TCI codepoints in one or more TCI fields of one or more beam indication DCIs. The physical layer in the UE provides an indication to higher layers when the radio link quality for all corresponding periodic CSI-RS resource configuration indexes or SSB indexes in the BFD RS set q0 that have same values as the RS indexes in the RS sets indicated in the unified TCI states provided by TCI-State-r17 or DLorJointTCI-State or UL-TCIState for respective first CORESETs that the UE uses for monitoring PDCCH is worse than the threshold Qout. The physical layer informs the higher layers when the radio link quality is worse than the BFD threshold Qout a periodicity determined by the maximum between the shortest periodicity among the SSBs on the PCell or the PSCell and/or the periodic CSI-RS configurations in the BFD RS set q0 that the UE uses to assess the radio link quality and 2 msec.

Furthermore, for the BFD RSs, and therefore, the corresponding BFD RS resources configured by the network, the UE could assess the radio link quality of one or more SSB indexes on the PCell or the PSCell or periodic CSI-RS resource configuration indexes in the BFD RS set q0 with same values as the RS indexes in the RS sets indicated in one or more TCI states provided by the higher layer parameter TCI-State for respective second CORESETs that the UE uses for monitoring PDCCH against the BFD threshold Qout. The physical layer in the UE provides an indication to higher layers when the radio link quality for all corresponding periodic CSI-RS resource configuration indexes or SSB indexes in the BFD RS set q0 that have same values as the RS indexes in the RS sets indicated in the TCI states provided by TCI-State for respective second CORESETs that the UE uses for monitoring PDCCH is worse than the threshold Qout. The physical layer informs the higher layers when the radio link quality is worse than the BFD threshold Qout a periodicity determined by the maximum between the shortest periodicity among the SSBs on the PCell or the PSCell and/or the periodic CSI-RS configurations in the BFD RS set q0 that the UE uses to assess the radio link quality and 2 msec.

Furthermore, for the BFD RSs, and therefore, the corresponding BFD RS resources configured by the network, the UE could assess the radio link quality of one or more SSB indexes on the PCell or the PSCell or periodic CSI-RS resource configuration indexes in the BFD RS set q0 with same values as the RS indexes in the RS sets indicated in one or more TCI states provided by the higher layer parameter TCI-State-r17 or DLorJoint-TCIState or UL-TCIState and/or TCI-State for respective first and/or second CORESETs that the UE uses for monitoring PDCCH against the BFD threshold Qout, wherein based on those specified herein in the present disclosure, the one or more unified TCI states could be indicated by one or more unified TCI state indication/activation MAC CEs or one or more TCI codepoints in one or more TCI fields of one or more beam indication DCIs. The physical layer in the UE provides an indication to higher layers when the radio link quality for all corresponding periodic CSI-RS resource configuration indexes or SSB indexes in the BFD RS set q0 that have same values as the RS indexes in the RS sets indicated in the TCI states provided by TCI-State-r17 or DLorJoint-TCIState or UL-TCIState and/or TCI-State for respective first and/or second CORESETs that the UE uses for monitoring PDCCH is worse than the threshold Qout. The physical layer informs the higher layers when the radio link quality is worse than the BFD threshold Qout a periodicity determined by the maximum between the shortest periodicity among the SSBs on the PCell or the PSCell and/or the periodic CSI-RS configurations in the BFD RS set q0 that the UE uses to assess the radio link quality and 2 msec.

Furthermore, the UE could assess the radio link quality of one or more SSB indexes on the PCell or the PSCell or periodic CSI-RS resource configuration indexes in the first BFD RS set q0A with same values as the RS indexes in the RS sets indicated in one or more unified TCI states provided by the higher layer parameter TCI-State-r17 or DLorJoint-TCIState or UL-TCIState for respective first CORESETs that the UE uses for monitoring PDCCH against the BFD threshold Qout, wherein based on those specified herein in the present disclosure, the one or more unified TCI states could be indicated by one or more unified TCI state indication/activation MAC CEs or one or more TCI codepoints in one or more TCI fields of one or more beam indication DCIs. The physical layer in the UE provides a first indication to higher layers when the radio link quality for all corresponding periodic CSI-RS resource configuration indexes or SSB indexes in the first BFD RS set q0A that have same values as the RS indexes in the RS sets indicated in the unified TCI states provided by TCI-State-r17 or DLorJoint-TCIState or UL-TCIState for respective first CORESETs that the UE uses for monitoring PDCCH is worse than the threshold Qout. The physical layer informs the higher layers when the radio link quality is worse than the BFD threshold Qout a periodicity determined by the maximum between the shortest periodicity among the SSBs on the PCell or the PSCell and/or the periodic CSI-RS configurations in the first BFD RS set q0A that the UE uses to assess the radio link quality and 2 msec.

In addition, the UE could assess the radio link quality of one or more SSB indexes on the PCell or the PSCell or periodic CSI-RS resource configuration indexes in the second BFD RS set q0B with same values as the RS indexes in the RS sets indicated in one or more TCI states provided by the higher layer parameter TCI-State for respective second CORESETs that the UE uses for monitoring PDCCH against the BFD threshold Qout. The physical layer in the UE provides a second indication to higher layers when the radio link quality for all corresponding periodic CSI-RS resource configuration indexes or SSB indexes in the second BFD RS set q0B that have same values as the RS indexes in the RS sets indicated in the TCI states provided by TCI-State for respective second CORESETs that the UE uses for monitoring PDCCH is worse than the threshold Qout. The physical layer informs the higher layers when the radio link quality is worse than the BFD threshold Qout a periodicity determined by the maximum between the shortest periodicity among the SSBs on the PCell or the PSCell and/or the periodic CSI-RS configurations in the second BFD RS set q0B that the UE uses to assess the radio link quality and 2 msec.

For the BFD RS configurations in the present disclosure, the higher layers in the UE may increment the beam failure instance (BFI) count (by one) in a BFI counter (denoted by BFI_COUNTER) if the higher layers receive from the physical layer in the UE that the radio link quality of the BFD RS set q0 is worse than Qout. The UE may declare a DL and/or UL beam failure for the BFD RS set q0 if the BFI count in the BFI counter BFI_COUNTER for the BFD RS set q0 reaches the maximum number of BFI counts (e.g., provided by the higher layer parameter maxBFIcount) before a BFD timer expires. After the higher layers in the UE declare DL and/or UL beam failure for the BFD RS set q0, the higher layers in the UE may reset the BFI count in the BFI counter BFI_COUNTER or the BFD timer to zero.

In addition, for the BFD RS configurations, the higher layers in the UE could reset the BFI count in the BFI counter BFI_COUNTER or the BFD timer to zero if the UE receives from the network a MAC CE or DCI (e.g., DCI format 1_1 or 1_2 with or without DL assignment) based signaling to update a Unified TCI state provided by TCI-State_r17 or DLorJoint-TCIState or UL-TCIState for respective first CORESETs.

For the BFD RS configurations, the higher layers in the UE could reset the BFI count in the BFI counter BFI_COUNTER or the BFD timer to zero if the UE receives from the network a MAC CE activation command to update a TCI state provided by TCI-State for respective second CORESETs.

For the BFD RS configurations, the higher layers in the UE could reset the BFI count in the BFI counter BFI_COUNTER or the BFD timer to zero if the UE receives from the network a MAC CE or DCI (e.g., DCI format 1_1 or 1_2 with or without DL assignment) based signaling to update a Unified TCI state provided by TCI-State_r17 or DLorJoint-TCIState or UL-TCIState for respective first CORESETs and/or a MAC CE activation command to update a TCI state provided by TCI-State for respective second CORESETs.

For the BFD RS configurations in the present disclosure, the higher layers in the UE would increment the beam failure instance (BFI) count (by one) in a first BFI counter (denoted by BFI_COUNTER_1) if the higher layers receive from the physical layer in the UE that the radio link quality of the first BFD RS set q0A is worse than Qout. The UE would declare a DL and/or UL beam failure for the first BFD RS set q0A if the BFI count in the first BFI counter BFI_COUNTER_1 for the first BFD RS set q0A reaches the maximum number of BFI counts (e.g., provided by the higher layer parameter maxBFIcount) before a first BFD timer expires. After the higher layers in the UE declare DL and/or UL beam failure for the first BFD RS set q0A, the higher layers in the UE would reset the BFI count in the first BFI counter BFI_COUNTER_1 or the first BFD timer to zero.

In addition, the higher layers in the UE could also reset the BFI count in the first BFI counter BFI_COUNTER_1 or the first BFD timer to zero if the UE receives from the network a MAC CE or DCI (e.g., DCI format 1_1 or 1_2 with or without DL assignment) based signalling to update a unified TCI state provided by TCI-State_r17 or DLorJoint-TCIState or UL-TCIState for respective first CORESETs, wherein based on those specified herein in the present disclosure, the updated unified TCI state could be indicated by one or more unified TCI state indication/activation MAC CEs or one or more TCI codepoints in one or more TCI fields of one or more beam indication DCIs. Furthermore, the higher layers in the UE would increment the beam failure instance (BFI) count (by one) in a second BFI counter (denoted by BFI_COUNTER_2) if the higher layers receive from the physical layer in the UE that the radio link quality of the second BFD RS set q0B is worse than Qout.

The UE would declare a DL and/or UL beam failure for the second BFD RS set q0B if the BFI count in the second BFI counter BFI_COUNTER_2 for the second BFD RS set q0B reaches the maximum number of BFI counts (e.g., provided by the higher layer parameter maxBFIcount) before a second BFD timer expires. After the higher layers in the UE declare DL and/or UL beam failure for the second BFD RS set q0B, the higher layers in the UE would reset the BFI count in the second BFI counter BFI_COUNTER_2 or the second BFD timer to zero. In addition, the higher layers in the UE could also reset the BFI count in the second BFI counter BFI_COUNTER_2 or the second BFD timer to zero if the UE receives from the network a MAC CE activation command to update a TCI state provided by TCI-State for respective second CORESETs.

For the BFD RS configurations described in the present disclosure, the UE could be configured with/provided by the network, e.g., via the higher layer parameter candidate-BeamRSList, a NBI RS set q1 of periodic CSI-RS resource configuration indexes or SSB indexes for radio link quality measurement and identifying potential new beam(s) to recover the failed beam(s)/link(s). The UE expects single-port or two-port CSI-RS with frequency density equal to 1 or 3 REs per RB in the set q1. The UE could assess the radio link quality according to the set q1 of resource configurations against a threshold Qin. The UE may apply the Qin threshold to the L1-RSRP measurement obtained from a SSB in q1 and apply the Qin threshold to the L1-RSRP measurement obtained from a CSI-RS resource in q1 after scaling a respective CSI-RS reception power with a value provided by powerControlOffsetSS. According to the L1-RSRP measurements, the UE could identity the periodic CSI-RS resource configuration index or SSB index in the NBI RS set q1, denoted by q_new, that corresponds to the largest/highest measured L1-RSRP among those larger than or equal to the Qin threshold.

For the BFD RS configurations described in the present disclosure, the UE could be configured with/provided by the network, e.g., via the higher layer parameter candidate-BeamRSListA, a first NBI RS set q1A of periodic CSI-RS resource configuration indexes or SSB indexes for radio link quality measurement and identifying potential new beam(s) to recover the failed beam(s)/link(s) associated with the first BFD RS set q0A. The UE expects single-port or two-port CSI-RS with frequency density equal to 1 or 3 REs per RB in the set q1A. The UE could assess the radio link quality according to the set q1A of resource configurations against a threshold Qin. The UE may apply the Qin threshold to the L1-RSRP measurement obtained from a SSB in q1A and apply the Qin threshold to the L1-RSRP measurement obtained from a CSI-RS resource in q1A after scaling a respective CSI-RS reception power with a value provided by powerControlOffsetSS.

According to the L1-RSRP measurements, the UE could identity the periodic CSI-RS resource configuration index or SSB index in the first NBI RS set q1A, denoted by qA_new, that corresponds to the largest/highest measured L1-RSRP among those (in the first NBI RS set q1A) larger than or equal to the Qin threshold. In addition, the UE could be configured with/provided by the network, e.g., via the higher layer parameter candidateBeamRSListB, a second NBI RS set q1B of periodic CSI-RS resource configuration indexes or SSB indexes for radio link quality measurement and identifying potential new beam(s) to recover the failed beam(s)/link(s) associated with the second BFD RS set q0B. The UE expects single-port or two-port CSI-RS with frequency density equal to 1 or 3 REs per RB in the set q1B. The UE could assess the radio link quality according to the set q1B of resource configurations against a threshold Qin.

The UE may apply the Qin threshold to the L1-RSRP measurement obtained from a SSB in q1B and apply the Qin threshold to the L1-RSRP measurement obtained from a CSI-RS resource in q1B after scaling a respective CSI-RS reception power with a value provided by powerControlOffsetSS. According to the L1-RSRP measurements, the UE could identity the periodic CSI-RS resource configuration index or SSB index in the second NBI RS set q1A, denoted by qB_new, that corresponds to the largest/highest measured L1-RSRP among those (in the second NBI RS set q1A) larger than or equal to the Qin threshold.

Alternatively, the UE could be configured with/provided by the network, e.g., via the higher layer parameter candidateBeamRSListX, a main/master NBI RS set q1X of periodic CSI-RS resource configuration indexes or SSB indexes for radio link quality measurement and identifying potential new beam(s) to recover the failed beam(s)/link(s) associated with both the first and second BFD RS sets q0A and q0B. The UE expects single-port or two-port CSI-RS with frequency density equal to 1 or 3 REs per RB in the set q1X. The UE could assess the radio link quality according to the set q1X of resource configurations against a threshold Qin. The UE may apply the Qin threshold to the L1-RSRP measurement obtained from a SSB in q1X and apply the Qin threshold to the L1-RSRP measurement obtained from a CSI-RS resource in q1X after scaling a respective CSI-RS reception power with a value provided by powerControlOffsetSS.

According to the L1-RSRP measurements, the UE could identify the periodic CSI-RS resource configuration index or SSB index in the main/master NBI RS set q1X, denoted by qA_new associated with the first BFD RS set q0A, and/or the periodic CSI-RS resource configuration index or SSB index in the main/master NBI RS set q1X, denoted by qB_new associated with the second BFD RS set q0B, that correspond to the largest/highest measured L1-RSRPs among those (in the main/master NBI RS set q1X) larger than or equal to the Qin threshold.

For the BFD RS configurations described in the present disclosure: (i) for the PCell or the PSCell, upon request from higher layers, the UE provides to higher layers the periodic CSI-RS configuration index or SSB index q_new from the NBI RS set q1 and the corresponding L1-RSRP measurement that is larger than or equal to the Qin threshold, and (ii) for the SCell, upon request from higher layers, the UE indicates to higher layers whether there is at least one periodic CSI-RS configuration index or SSB index from the NBI RS set q1 with corresponding L1-RSRP measurement that is larger than or equal to the Qin threshold, and provides the periodic CSI-RS configuration index or SSB index q_new from the NBI RS set q1 and the corresponding L1-RSRP measurement that is larger than or equal to the Qin threshold, if any.

In one example, for the PCell or the PSCell, the UE can be provided, by PRACH-ResourceDedicatedBFR, a configuration for PRACH transmission as described in the 3GPP TS 38.213. The UE could transmit at least one PRACH preamble according to antenna port quasi co-location parameters associated with periodic CSI-RS resource configuration or with SSB associated with index q_new provided by higher layers.

In another example, for the SCell, the UE can be provided, by schedulingRequestID-BFR-SCell, a configuration for PUCCH transmission with a link recovery request (LRR) using either PUCCH format 0 or PUCCH format 1 as described in the 3GPP TS 38.213. The UE could receive from the network an uplink grant in response to the PUCCH transmission with LRR for a first PUSCH MAC CE transmission. The UE could provide in the first PUSCH MAC CE index(es) for at least corresponding SCell(s) with radio link quality worse than Qout, indication(s) of presence of q_new for corresponding SCell(s), and index(es) q_new for a periodic CSI-RS configuration or for a SSB provided by higher layers, if any, for corresponding SCell(s).

For the BFD RS configurations described in the present disclosure: (i) for the PCell or the PSCell, upon request from higher layers, the UE could provide to higher layers the periodic CSI-RS configuration index or SSB index qA_new from the first NBI RS set q1A or the main/master NBI RS set q1X and the corresponding L1-RSRP measurement that is larger than or equal to the Qin threshold and/or the periodic CSI-RS configuration index or SSB index qB_new from the second NBI RS set q1B or the main/master NBI RS set q1X and the corresponding L1-RSRP measurement that is larger than or equal to the Qin threshold, and (ii) for the SCell, upon request from higher layers, the UE indicates to higher layers whether there is at least one periodic CSI-RS configuration index or SSB index from the first NBI RS set q1A with corresponding L1-RSRP measurement that is larger than or equal to the Qin threshold and/or at least one periodic CSI-RS configuration index or SSB index from the second NBI RS set q1B with corresponding L1-RSRP measurement that is larger than or equal to the Qin threshold or at least one periodic CSI-RS configuration index or SSB index from the main/master NBI RS set q1X with corresponding L1-RSRP measurement that is larger than or equal to the Qin threshold, and provides the periodic CSI-RS configuration index or SSB index qA_new from the first NBI RS set q1A or the main/master NBI RS set q1X and the corresponding L1-RSRP measurement that is larger than or equal to the Qin threshold, if any, and/or the periodic CSI-RS configuration index or SSB index qB_new from the second NBI RS set q1B or the main/master NBI RS set q1X and the corresponding L1-RSRP measurement that is larger than or equal to the Qin threshold, if any.

In one example, for the PCell or the PSCell, the UE can be provided, by PRACH-ResourceDedicatedBFR, a configuration for PRACH transmission as described in the 3GPP TS 38.213. The UE could transmit at least one PRACH preamble according to antenna port quasi co-location parameters associated with periodic CSI-RS resource configuration or with SSB associated with index qA_new provided by higher layers. The UE could also transmit at least one PRACH preamble according to antenna port quasi co-location parameters associated with periodic CSI-RS resource configuration or with SSB associated with index qB_new provided by higher layers.

In another example, for the SCell, the UE can be provided, by schedulingRequestID-BFR-SCell, a configuration for PUCCH transmission with a link recovery request (LRR) using either PUCCH format 0 or PUCCH format 1 as described in the 3GPP TS 38.213. The UE could receive from the network an uplink grant in response to the PUCCH transmission with LRR for a first PUSCH MAC CE transmission. The UE could provide in the first PUSCH MAC CE index(es) for at least corresponding SCell(s) with radio link quality worse than Qout, indication(s) of presence of qA_new or qB_new for corresponding SCell(s), index(es) qA_new or qB_new for a periodic CSI-RS configuration or for a SSB provided by higher layers, if any, for corresponding SCell(s), index(es) of corresponding first or second NBI RS sets q1A or q1B, or index(es) of corresponding first or second BFD RS sets q0A or q0B.

For the PCell or the PSCell, the UE could be provided a CORESET through a link to a search space set provided by recoverySearchSpaceId, as described in the 3GPP TS 38.213, for monitoring PDCCH in the CORESET. If the UE is provided recoverySearchSpaceId, the UE does not expect to be provided another search space set for monitoring PDCCH in the CORESET associated with the search space set provided by recoverySearchSpaceId.

For the PCell or the PSCell, the UE can be provided, by PRACH-ResourceDedicatedBFR, a configuration for PRACH transmission as described in the 3GPP TS 38.213. For PRACH transmission in slot n and according to antenna port quasi co-location parameters associated with periodic CSI-RS resource configuration or with SS/PBCH block associated with index q_new as discussed in the present disclosure, qA_new or qB_new (as mentioned in the present disclosure) provided by higher layers, the UE monitors PDCCH in a search space set provided by recoverySearchSpaceId for detection of a DCI format with CRC scrambled by C-RNTI or MCS-C-RNTI starting from slot n+4 within a window configured by BeamFailureRecovery-Config. For PDCCH monitoring in a search space set provided by recoverySearchSpaceId and for corresponding PDSCH reception, the UE assumes the same antenna port quasi-collocation parameters as the ones associated with index q_new (as mentioned in the present disclosure), qA_new or qB_new (as mentioned in the present disclosure) until the UE receives by higher layers an activation for a TCI state provided by TCI-State or TCI-State_r17.

After the UE detects a DCI format with CRC scrambled by C-RNTI or MCS-C-RNTI in the search space set provided by recoverySearchSpaceId, the UE continues to monitor PDCCH candidates in the search space set provided by recoverySearchSpaceId until the UE receives a TCI state update via MAC CE or DCI (e.g., DCI format 1_1 or 1_2 with or without DL assignment) based signalling provided by TCI-State or TCI-State_r17.

If the UE is provided TCI-State_r17 indicating a Unified TCI state (e.g., a joint DL and UL TCI state or a separate DL TCI state or a separate UL TCI state) for the PCell or the PSCell as described in the 3GPP TS 38.214, after X symbols from a last symbol of a first PDCCH reception in a search space set provided by recoverySearchSpaceId where the UE detects a DCI format with CRC scrambled by C-RNTI or MCS-C-RNTI, the UE: (1) monitors PDCCH in respective first CORESETs, and receives PDSCH (e.g., the PDSCH scheduled by the PDCCH in the first CORESETs) and aperiodic CSI-RS in a resource from a CSI-RS resource set with same indicated TCI state as for the PDCCH and PDSCH, using the same antenna port quasi co-location parameters as the ones associated with the corresponding index q_new, if any, (2) transmits PUCCH, PUSCH (e.g., the PUCCH and the PUSCH associated with the PDCCH in the first CORESETs) and SRS with same indicated TCI state as for the PUCCH and the PUSCH using a same spatial domain filter as for the last PRACH transmission, and a power setting associated with the indicated Unified TCI state with $q\_u=0$, $q\_d=q\_new$, and closed loop index $l=0$ or 1.

In such case, X could correspond to 28, and the subcarrier spacing (SCS) for the X=28 symbols could correspond to one or more of: (1) the smallest of the SCS configurations of the active DL BWP for the PDCCH reception, e.g., in the first CORESETs, and of the active DL BWP(s) of the serving cell; and (2) the smallest of the SCS configurations of all the signal(s)/channels sharing the same indicated Unified tci state/beam (e.g., provided by the higher layer parameter TCI-State_r17).

After the UE detects a DCI format with CRC scrambled by C-RNTI or MCS-C-RNTI in the search space set provided by recoverySearchSpaceId, the UE continues to monitor PDCCH candidates in the search space set provided by recoverySearchSpaceId until the UE receives a TCI state update via MAC CE or DCI (e.g., DCI format 1_1 or 1_2 with or without DL assignment) based signalling provided by TCI-State_r17 for respective first CORESETs.

If the UE is provided TCI-State_r17 indicating a Unified TCI state (e.g., a joint DL and UL TCI state or separate DL TCI state or separate UL TCI state) for the PCell or the PSCell as described in the 3GPP TS 38.214 and the UE provides BFR MAC CE in Msg3 or MsgA of contention based random access procedure, after X symbols from the last symbol of the PDCCH reception that determines the completion of the contention based random access procedure as described in the 3GPP TS 38.321, the UE: (1) monitors PDCCH in respective first CORESETs, and receives PDSCH (e.g., the PDSCH scheduled by the PDCCH in the first CORESETs) and aperiodic CSI-RS in a resource from a CSI-RS resource set with same indicated TCI state as for the PDCCH and PDSCH, using the same antenna port quasi co-location parameters as the ones associated with the corresponding index q_new, if any, (2) transmits PUCCH, PUSCH (e.g., the PUCCH and the PUSCH associated with the PDCCH in the first CORESETs) and SRS with same indicated TCI state as for the PUCCH and the PUSCH using a same spatial domain filter as for the last PRACH transmission, and a power setting associated with the indicated Unified TCI state with $q\_u=0$, $q\_d=q\_new$, and closed loop index $l=0$ or 1.

In such case, X could correspond to 28, and the subcarrier spacing (SCS) for the X=28 symbols could correspond to one or more of: (1) the smallest of the SCS configurations of the active DL BWP for the PDCCH reception, e.g., in the first CORESETs, and of the active DL BWP(s) of the serving cell; and (2) the smallest of the SCS configurations of all the signal(s)/channels sharing the same indicated Unified tci state/beam (e.g., provided by the higher layer parameter TCI-State_r17).

If the UE is provided TCI-State_r17 indicating a Unified TCI state (e.g., a joint DL and UL TCI state or a separate DL TCI state or a separate UL TCI state), after X symbols from a last symbol of a PDCCH reception with a DCI format scheduling a PUSCH transmission with a same HARQ process number as for the transmission of the first PUSCH MAC CE and having a toggled NDI field value, the UE: (1) monitors PDCCH in respective first CORESETs, and receives PDSCH (e.g., the PDSCH scheduled by the PDCCH in the first CORESETs) and aperiodic CSI-RS in a resource from a CSI-RS resource set with same indicated TCI state as for the PDCCH and PDSCH, using the same antenna port quasi co-location parameters as the ones associated with the corresponding index q_new, if any, (2) transmits PUCCH, PUSCH (e.g., the PUCCH and the PUSCH associated with the PDCCH in the first CORESETs) and SRS with same indicated TCI state as for the PUCCH and the PUSCH using a same spatial domain filter as the one corresponding to q_new, and a power setting associated with the indicated Unified TCI state with q_u=0, q_d=q_new, and closed loop index l=0 or 1.

In such case, X could correspond to 28, and the subcarrier spacing (SCS) for the X=28 symbols could correspond to one or more of: (1) the smallest of the SCS configurations of the active DL BWP for the PDCCH reception, e.g., in the first CORESETs, and of the active DL BWP(s) of the serving cell; or (2) the smallest of the SCS configurations of all the signal(s)/channels sharing the same indicated Unified tci state/beam (e.g., provided by the higher layer parameter TCI-State_r17).

After X symbols from a last symbol of a first PDCCH reception in a search space set provided by recoverySearchSpaceId where the UE detects a DCI format with CRC scrambled by C-RNTI or MCS-C-RNTI, the UE: (1) monitors PDCCH in respective second CORESETs, and receives PDSCH (e.g., the PDSCH scheduled by the PDCCH in the second CORESETs) and aperiodic CSI-RS in a resource from a CSI-RS resource set with same indicated TCI state as for the PDCCH and PDSCH, using the same antenna port quasi co-location parameters as the ones associated with the corresponding index q_new, if any, (2) transmits PUCCH, PUSCH (e.g., the PUCCH and the PUSCH associated with the PDCCH in the second CORESETs) and SRS with same indicated TCI state as for the PUCCH and the PUSCH using a same spatial domain filter as for the last PRACH transmission, and a power setting of q_u=0, q_d=q_new and closed loop index l=0 or 1 (e.g., associated with the indicated TCI state provided by TCI-State).

In such case, X could correspond to 28, and the subcarrier spacing (SCS) for the X=28 symbols could correspond to one or more of: (1) the smallest of the SCS configurations of the active DL BWP for the PDCCH reception, e.g., in the second CORESETs, and of the active DL BWP(s) of the serving cell; or (2) the smallest of the SCS configurations of all the signal(s)/channels sharing the same indicated TCI state (e.g., provided by the higher layer parameter TCI-State).

After the UE detects a DCI format with CRC scrambled by C-RNTI or MCS-C-RNTI in the search space set provided by recoverySearchSpaceId, the UE continues to monitor PDCCH candidates in the search space set provided by recoverySearchSpaceId until the UE receives a MAC CE activation command for a TCI state provided by TCI-State for respective second CORESETs.

In one example, if the UE provides BFR MAC CE in Msg3 or MsgA of contention based random access procedure, after X symbols from the last symbol of the PDCCH reception that determines the completion of the contention based random access procedure as described in the 3GPP TS 38.321, the UE: (1) monitors PDCCH in respective second CORESETs, and receives PDSCH (e.g., the PDSCH scheduled by the PDCCH in the second CORESETs) and aperiodic CSI-RS in a resource from a CSI-RS resource set with same indicated TCI state as for the PDCCH and PDSCH, using the same antenna port quasi co-location parameters as the ones associated with the corresponding index q_new, if any, (2) transmits PUCCH, PUSCH (e.g., the PUCCH and the PUSCH associated with the PDCCH in the second CORESETs) and SRS with same indicated TCI state as for the PUCCH and the PUSCH using a same spatial domain filter as for the last PRACH transmission, and a power setting of q_u=0, q_d=q_new and closed loop index l=0 or 1 (e.g., associated with the indicated TCI state provided by TCI-State).

In such case, X could correspond to 28, and the subcarrier spacing (SCS) for the X=28 symbols could correspond to one or more of: (1) the smallest of the SCS configurations of the active DL BWP for the PDCCH reception, e.g., in the second CORESETs, and of the active DL BWP(s) of the serving cell; or (2) the smallest of the SCS configurations of all the signal(s)/channels sharing the same indicated TCI state (e.g., provided by the higher layer parameter TCI-State).

In one example, after X symbols from a last symbol of a PDCCH reception with a DCI format scheduling a PUSCH transmission with a same HARQ process number as for the transmission of the first PUSCH MAC CE and having a toggled NDI field value, the UE: (1) monitors PDCCH in respective second CORESETs, and receives PDSCH (e.g., the PDSCH scheduled by the PDCCH in the second CORESETs) and aperiodic CSI-RS in a resource from a CSI-RS resource set with same indicated TCI state as for the PDCCH and PDSCH, using the same antenna port quasi co-location parameters as the ones associated with the corresponding index q_new, if any, (2) transmits PUCCH, PUSCH (e.g., the PUCCH and the PUSCH associated with the PDCCH in the second CORESETs) and SRS with same indicated TCI state as for the PUCCH and the PUSCH using a same spatial domain filter as the one corresponding to q_new, and a power setting of q_u=0, q_d=q_new and closed loop index l=0 or 1 (e.g., associated with the indicated TCI state provided by TCI-State).

In such examples, X could correspond to 28, and the subcarrier spacing (SCS) for the X=28 symbols could correspond to one or more of: (1) the smallest of the SCS configurations of the active DL BWP for the PDCCH reception, e.g., in the second CORESETs, and of the active DL BWP(s) of the serving cell; or (2) the smallest of the SCS configurations of all the signal(s)/channels sharing the same indicated TCI state (e.g., provided by the higher layer parameter TCI-State).

In one example, if the UE is provided TCI-State_r17 indicating a Unified TCI state (e.g., a joint DL and UL TCI state or a separate DL TCI state or a separate UL TCI state) for the PCell or the PSCell as described in the 3GPP TS 38.214, after X symbols from a last symbol of a first PDCCH reception in a search space set provided by recoverySearchSpaceId where the UE detects a DCI format with CRC scrambled by C-RNTI or MCS-C-RNTI, the UE: (1) monitors PDCCH in respective first or second CORESETs, and receives PDSCH (e.g., the PDSCH scheduled by the PDCCH in the first or second CORESETs) and aperiodic CSI-RS in a resource from a CSI-RS resource set with same indicated TCI state as for the PDCCH and PDSCH, using the same antenna port quasi co-location parameters as the ones associated with the corresponding index q_new, if any, (2) transmits PUCCH, PUSCH (e.g., the PUCCH and the PUSCH associated with the PDCCH in the first or second CORESETs) and SRS with same indicated TCI state as for the PUCCH and the PUSCH using a same spatial domain filter as for the last PRACH transmission, and a power setting of q_u=0, q_d=q_new and closed loop index l=0 or 1 (e.g., associated with the indicated TCI state provided by TCI-State_r17 or TCI-State).

In such examples, X could correspond to 28, and the subcarrier spacing (SCS) for the X=28 symbols could correspond to one or more of: (1) the smallest of the SCS configurations of the active DL BWP for the PDCCH reception, e.g., in the first and/or second CORESETs, and of the active DL BWP(s) of the serving cell; or (2) the smallest of the SCS configurations of all the signal(s)/channels sharing the same indicated TCI state (e.g., provided by the higher layer parameter TCI-State_r17 or TCI-State).

After the UE detects a DCI format with CRC scrambled by C-RNTI or MCS-C-RNTI in the search space set provided by recoverySearchSpaceId, the UE continues to monitor PDCCH candidates in the search space set provided by recoverySearchSpaceId until the UE receives a TCI state update via MAC CE or DCI (e.g., DCI format 1_1 or 1_2 with or without DL assignment) based signalling provided by TCI-State_r17 for respective first CORESETs and/or a MAC CE activation command for a TCI state provided by TCI-State for respective second CORESETs.

In one example, if the UE is provided TCI-State_r17 indicating a Unified TCI state (e.g., a joint DL and UL TCI state or separate DL TCI state or separate UL TCI state) for the PCell or the PSCell as described in the 3GPP TS 38.214 and the UE provides BFR MAC CE in Msg3 or MsgA of contention based random access procedure, after X symbols from the last symbol of the PDCCH reception that determines the completion of the contention based random access procedure as described in the 3GPP TS 38.321, the UE: (1) monitors PDCCH in respective first or second CORESETs, and receives PDSCH (e.g., the PDSCH scheduled by the PDCCH in the first or second CORESETs) and aperiodic CSI-RS in a resource from a CSI-RS resource set with same indicated TCI state as for the PDCCH and PDSCH, using the same antenna port quasi co-location parameters as the ones associated with the corresponding index q_new, if any, (2) transmits PUCCH, PUSCH (e.g., the PUCCH and the PUSCH associated with the PDCCH in the first or second CORESETs) and SRS with same indicated TCI state as for the PUCCH and the PUSCH using a same spatial domain filter as for the last PRACH transmission, and a power setting of $q\_u=0$, $q\_d=q\_new$ and closed loop index $l=0$ or 1 (e.g., associated with the indicated TCI state provided by TCI-State_r17 or TCI-State).

In such example, X could correspond to 28, and the subcarrier spacing (SCS) for the X=28 symbols could correspond to one or more of: (1) the smallest of the SCS configurations of the active DL BWP for the PDCCH reception, e.g., in the first and/or second CORESETs, and of the active DL BWP(s) of the serving cell; or (2) the smallest of the SCS configurations of all the signal(s)/channels sharing the same indicated TCI state (e.g., provided by the higher layer parameter TCI-State_r17 or TCI-State).

In one example, if the UE is provided TCI-State_r17 indicating a Unified TCI state (e.g., a joint DL and UL TCI state or a separate DL TCI state or a separate UL TCI state), after X symbols from a last symbol of a PDCCH reception with a DCI format scheduling a PUSCH transmission with a same HARQ process number as for the transmission of the first PUSCH MAC CE and having a toggled NDI field value, the UE: (1) monitors PDCCH in respective first or second CORESETs, and receives PDSCH (e.g., the PDSCH scheduled by the PDCCH in the first or second CORESETs) and aperiodic CSI-RS in a resource from a CSI-RS resource set with same indicated TCI state as for the PDCCH and PDSCH, using the same antenna port quasi co-location parameters as the ones associated with the corresponding index q_new, if any, (2) transmits PUCCH, PUSCH (e.g., the PUCCH and the PUSCH associated with the PDCCH in the first or second CORESETs) and SRS with same indicated TCI state as for the PUCCH and the PUSCH using a same spatial domain filter as the one corresponding to q_new, and a power setting of $q\_u=0$, $q\_d=q\_new$ and closed loop index $l=0$ or 1 (e.g., associated with the indicated TCI state provided by TCI-State_r17 or TCI-State).

In such example, X could correspond to 28, and the subcarrier spacing (SCS) for the X=28 symbols could correspond to one or more of: (1) the smallest of the SCS configurations of the active DL BWP for the PDCCH reception, e.g., in the first and/or second CORESETs, and of the active DL BWP(s) of the serving cell; or (2) the smallest of the SCS configurations of all the signal(s)/channels sharing the same indicated TCI state (e.g., provided by the higher layer parameter TCI-State_r17 or TCI-State).

In one example, after X symbols from a last symbol of a first PDCCH reception in a search space set provided by recoverySearchSpaceId where the UE detects a DCI format with CRC scrambled by C-RNTI or MCS-C-RNTI, if the UE has sent/indicated to the network qA_new, the UE: (1) monitors PDCCH in respective first CORESETs, and receives PDSCH (e.g., the PDSCH scheduled by the PDCCH in the first CORESETs) and aperiodic CSI-RS in a resource from a CSI-RS resource set with same indicated TCI state as for the PDCCH and PDSCH, using the same antenna port quasi co-location parameters as the ones associated with the corresponding index qA_new, if any, (2) transmits PUCCH, PUSCH (e.g., the PUCCH and the PUSCH associated with the PDCCH in the first CORESETs) and SRS with same indicated TCI state as for the PUCCH and the PUSCH using a same spatial domain filter as for the last PRACH transmission, and a power setting associated with the indicated Unified TCI state with $q\_u=0$, $q\_d=qA\_new$, and closed loop index $l=0$ or 1, and after the UE detects a DCI format with CRC scrambled by C-RNTI or MCS-C-RNTI in the search space set provided by recoverySearchSpaceId, the UE continues to monitor PDCCH candidates in the search space set provided by recoverySearchSpaceId until the UE receives a TCI state update via MAC CE or DCI (e.g., DCI format 1_1 or 1_2 with or without DL assignment) based signalling provided by TCI-State_r17 for respective first CORESETs.

In one example, after X symbols from a last symbol of a first PDCCH reception in a search space set provided by recoverySearchSpaceId where the UE detects a DCI format with CRC scrambled by C-RNTI or MCS-C-RNTI, if the UE has sent/indicated to the network qB_new, the UE: (1) monitors PDCCH in respective second CORESETs, and receives PDSCH (e.g., the PDSCH scheduled by the PDCCH in the second CORESETs) and aperiodic CSI-RS in a resource from a CSI-RS resource set with same indicated TCI state as for the PDCCH and PDSCH, using the same antenna port quasi co-location parameters as the ones associated with the corresponding index qB_new, if any, (2) transmits PUCCH, PUSCH (e.g., the PUCCH and the PUSCH associated with the PDCCH in the second CORESETs) and SRS with same indicated TCI state as for the PUCCH and the PUSCH using a same spatial domain filter as for the last PRACH transmission, and a power setting of $q\_u=0$, $q\_d=qB\_new$ and closed loop index $l=0$ or 1 (e.g., associated with the indicated TCI state provided by TCI-State), and after the UE detects a DCI format with CRC scrambled by C-RNTI or MCS-C-RNTI in the search space set provided by recoverySearchSpaceId, the UE continues to monitor PDCCH candidates in the search space set provided by recoverySearchSpaceId until the UE receives a MAC CE activation command for a TCI state provided by TCI-State for respective second CORESETs.

In such examples, X could correspond to 28, and the subcarrier spacing (SCS) for the X=28 symbols could correspond to one or more of: (1) the smallest of the SCS configurations of the active DL BWP for the PDCCH reception, e.g., in the first and/or second CORESETs, and of the active DL BWP(s) of the serving cell; or (2) the smallest of the SCS configurations of all the signal(s)/channels sharing the indicated TCI state(s) (e.g., provided by the higher layer parameter TCI-State_r17 and/or TCI-State).

In one example, if the UE provides BFR MAC CE in Msg3 or MsgA of contention based random access procedure, after X symbols from the last symbol of the PDCCH reception that determines the completion of the contention based random access procedure as described in the 3GPP TS 38.321, if the UE has sent/indicated to the network qA_new, the UE: (1) monitors PDCCH in respective first CORESETs, and receives PDSCH (e.g., the PDSCH scheduled by the PDCCH in the first CORESETs) and aperiodic CSI-RS in a resource from a CSI-RS resource set with same indicated TCI state as for the PDCCH and PDSCH, using the same antenna port quasi co-location parameters as the ones associated with the corresponding index qA_new, if any, (2) transmits PUCCH, PUSCH (e.g., the PUCCH and the PUSCH associated with the PDCCH in the first CORESETs) and SRS with same indicated TCI state as for the PUCCH and the PUSCH using a same spatial domain filter as for the last PRACH transmission, and a power setting associated with the indicated Unified TCI state with $q\_u=0$, $q\_d=qA\_new$, and closed loop index $l=0$ or 1.

In one example, if the UE provides BFR MAC CE in Msg3 or MsgA of contention based random access procedure, after X symbols from the last symbol of the PDCCH reception that determines the completion of the contention based random access procedure as described in the 3GPP TS 38.321, if the UE has sent/indicated to the network qB_new, the UE: (1) monitors PDCCH in respective second CORESETs, and receives PDSCH (e.g., the PDSCH scheduled by the PDCCH in the second CORESETs) and aperiodic CSI-RS in a resource from a CSI-RS resource set with same indicated TCI state as for the PDCCH and PDSCH, using the same antenna port quasi co-location parameters as the ones associated with the corresponding index qB_new, if any, (2) transmits PUCCH, PUSCH (e.g., the PUCCH and the PUSCH associated with the PDCCH in the second CORESETs) and SRS with same indicated TCI state as for the PUCCH and the PUSCH using a same spatial domain filter as for the last PRACH transmission, and a power setting of $q\_u=0$, $q\_d=qB\_new$ and closed loop index $l=0$ or 1 (e.g., associated with the indicated TCI state provided by TCI-State).

In such example, X could correspond to 28, and the subcarrier spacing (SCS) for the X=28 symbols could correspond to one or more of: (1) the smallest of the SCS configurations of the active DL BWP for the PDCCH reception, e.g., in the first and/or second CORESETs, and of the active DL BWP(s) of the serving cell; or (2) the smallest of the SCS configurations of all the signal(s)/channels sharing the indicated TCI state(s) (e.g., provided by the higher layer parameter TCI-State_r17 and/or TCI-State).

In one example, after X symbols from a last symbol of a PDCCH reception with a DCI format scheduling a PUSCH transmission with a same HARQ process number as for the transmission of the first PUSCH MAC CE and having a toggled NDI field value, if the UE has sent/indicated to the network qA_new, the UE: (1) monitors PDCCH in respective first CORESETs, and receives PDSCH (e.g., the PDSCH scheduled by the PDCCH in the first CORESETs) and aperiodic CSI-RS in a resource from a CSI-RS resource set with same indicated TCI state as for the PDCCH and PDSCH, using the same antenna port quasi co-location parameters as the ones associated with the corresponding index qA_new, if any, (2) transmits PUCCH, PUSCH (e.g., the PUCCH and the PUSCH associated with the PDCCH in the first CORESETs) and SRS with same indicated TCI state as for the PUCCH and the PUSCH using a same spatial domain filter as the one corresponding to qA_new, and a power setting associated with the indicated Unified TCI state with $q\_u=0$, $q\_d=qA\_new$, and closed loop index $l=0$ or 1.

In one example, after X symbols from a last symbol of a PDCCH reception with a DCI format scheduling a PUSCH transmission with a same HARQ process number as for the transmission of the first PUSCH MAC CE and having a toggled NDI field value, if the UE has sent/indicated to the network qB_new, the UE: (1) monitors PDCCH in respective second CORESETs, and receives PDSCH (e.g., the PDSCH scheduled by the PDCCH in the second CORESETs) and aperiodic CSI-RS in a resource from a CSI-RS resource set with same indicated TCI state as for the PDCCH and PDSCH, using the same antenna port quasi co-location parameters as the ones associated with the corresponding index qB_new, if any, (2) transmits PUCCH, PUSCH (e.g., the PUCCH and the PUSCH associated with the PDCCH in the second CORESETs) and SRS with same indicated TCI state as for the PUCCH and the PUSCH using a same spatial domain filter as the one corresponding to qB_new, and a power setting of $q\_u=0$, $q\_d=qB\_new$ and closed loop index $l=0$ or 1 (e.g., associated with the indicated TCI state provided by TCI-State).

In such examples, X could correspond to 28, and the subcarrier spacing (SCS) for the X=28 symbols could correspond to one or more of: (1) the smallest of the SCS configurations of the active DL BWP for the PDCCH reception, e.g., in the first and/or second CORESETs, and of the active DL BWP(s) of the serving cell; or (2) the smallest of the SCS configurations of all the signal(s)/channels sharing the indicated TCI state(s) (e.g., provided by the higher layer parameter TCI-State_r17 and/or TCI-State).

Figure 14:
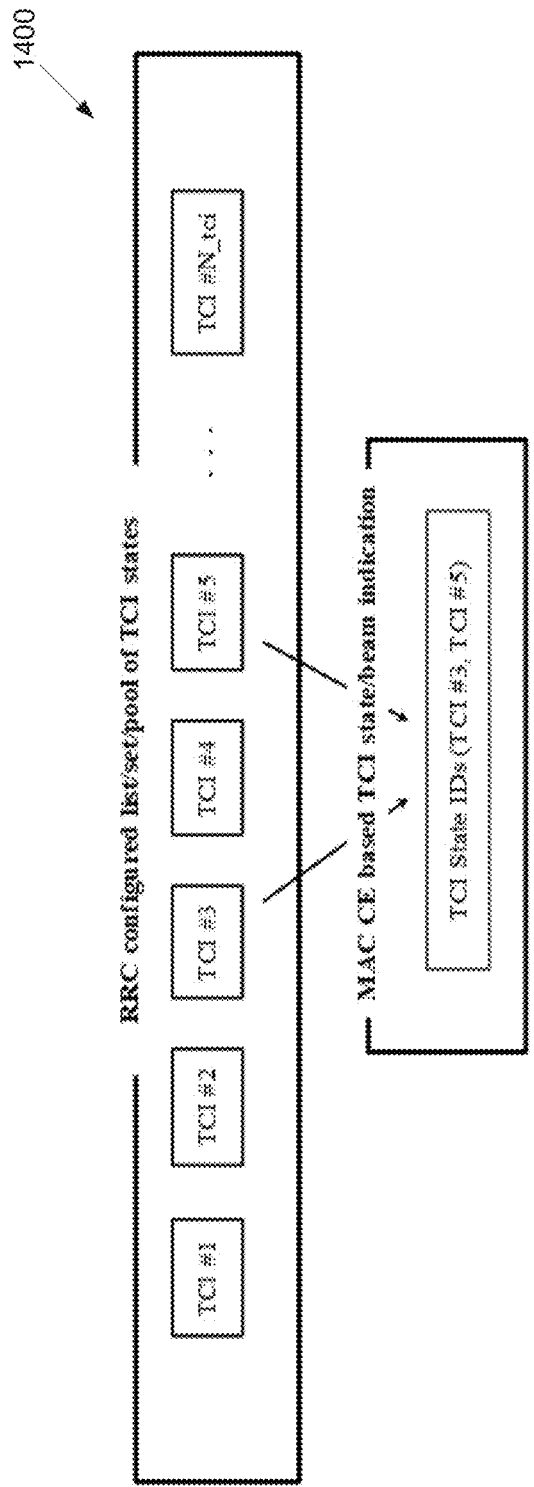
FIG. 14 illustrates another example of MAC CE based TCI state/beam indication according to embodiments of the present disclosure.

FIG. 14 illustrates another example of MAC CE based TCI state/beam indication 1400 according to embodiments of the present disclosure. An embodiment of the MAC CE based TCI state/beam indication 1400 shown in FIG. 14 is for illustration only.

In FIG. 14, an example of MAC CE based Unified TCI state/beam indication for the multi-TRP operation is presented. As illustrated in FIG. 14, the UE could be first higher layer configured by the network, e.g., via the higher layer RRC signaling, a list/pool of N_tci TCI states. Each TCI state contains at least a QCL source RS with a QCL type, e.g., QCL-typeA/B/C/D. The UE could then receive from the network one or more MAC CE commands to indicate one or more beam(s) (i.e., the Unified TCI state(s)) for UE-dedicated reception on PDSCH/PDCCH or dynamic-grant/configured-grant based PUSCH and all of dedicated PUCCH resources associated with one or more TRPs in a multi-TRP system. For instance, the UE could receive from the network a single MAC CE command for beam indication to indicate M≥1 Unified TCI states/beams (e.g., M≥1 joint DL and UL TCI states or M≥1 separate UL TCI states) for the same PUSCH(s)/PUCCH(s) transmitted to/associated with different TRPs in the multi-TRP system.

The MAC CE for beam indication could include at least a Unified TCI state ID. As discussed above, the unified TCI state corresponding to the TCI state ID could be at least one of: (1) a DL TCI state; (2) an UL TCI state; (3) a joint DL and UL TCI state; or (4) separate DL TCI state and UL TCI state.

The association/mapping between the TCI state(s)/beam(s) indicated in the MAC CE command(s) and the TRPs in the multi-TRP system needs to be specified. There could be various means to associate/map the TCI state(s)/beam(s) indicated in the MAC CE command(s) for beam indication and the TRPs in the multi-TRP system.

For N≥1 TCI states/beams indication in a single MAC CE command for beam indication, in one example, the UE could be explicitly indicated by the network, e.g., via higher layer RRC signaling and/or MAC CE command and/or dynamic DCI signaling, the exact association/mapping between the TCI states/beams indicated in the MAC CE command for beam indication and the TRPs in the multi-TRP system. For example, the UE could be first higher layer configured by the network a list/set/pool of TRP-specific ID/index values such as PCIs. The first TCI state and/or the TCI state with the lowest TCI state ID value indicated in the MAC CE command for beam indication could correspond to the first entry/TRP in the list/set/pool of TRP-specific ID/index values, the second TCI state and/or the TCI state with the second lowest TCI state ID value indicated in the MAC CE command for beam indication could correspond to the second entry/TRP in the list/set/pool of TRP-specific ID/index values, and so on, and the last TCI state and/or the TCI state with the highest TCI state ID value indicated in the MAC CE command for beam indication could correspond to the last entry/TRP in the list/set/pool of TRP-specific ID/index values.

For another example, the UE could be first higher layer configured by the network a list/set/pool of TRP-specific ID/index values such as PCIs. The UE could then receive from the network one or more MAC CE activation commands/bitmaps to activate one or more TRP-specific ID/index values from the higher layer configured list/set/pool of TRP-specific ID/index values. The first TCI state and/or the TCI state with the lowest TCI state ID value indicated in the MAC CE command for beam indication could correspond to the first MAC CE(s)/bitmap(s) activated TRP-specific ID/index value, the second TCI state and/or the TCI state with the second lowest TCI state ID value indicated in the MAC CE command for beam indication could correspond to the second MAC CE(s)/bitmap(s) activated TRP-specific ID/index value, and so on, and the last TCI state and/or the TCI state with the highest TCI state ID value indicated in the MAC CE command for beam indication could correspond to the last MAC CE(s)/bitmap(s) activated TRP-specific ID/index value.

Other exact association/mapping relationships between the TCI states/beams indicated in the MAC CE command for beam indication and the TRPs in the multi-TRP system and/or the corresponding indication method(s), e.g., via higher layer RRC signaling and/or MAC CE command and/or dynamic DCI signaling, are also possible.

For N≥1 TCI states/beams indication in a single MAC CE command for beam indication, in another example, the UE could be implicitly indicated by the network the association/mapping between the TCI states/beams indicated in the MAC CE command for beam indication and the TRPs in the multi-TRP system. The UE could be higher layer configured by the network a list/set/pool of TRP-specific ID/index values such as PCIs. The UE could also receive from the network one or more MAC CE activation commands/bitmaps to activate one or more TRP-specific ID/index values from the higher layer configured list/set/pool of TRP-specific ID/index values.

For example, the first TCI state and/or the TCI state with the lowest TCI state ID value indicated in the MAC CE command for beam indication could correspond to the TRP with the lowest/lowest MAC CE activated TRP-specific ID/index value such as the lowest PCI value and/or the first TRP (e.g., TRP #1), the second TCI state and/or the TCI state with the second lowest TCI state ID value indicated in the MAC CE command for beam indication could correspond to the TRP with the second lowest/second lowest MAC CE activated TRP-specific ID/index value such as the second lowest PCI value and/or the second TRP (e.g., TRP #2), and so on, and the last TCI state and/or the TCI state with the highest TCI state ID value indicated in the MAC CE command for beam indication could correspond to the TRP with the highest/highest MAC CE activated TRP-specific ID/index value such as the highest PCI value and/or the last TRP (e.g., TRP #N).

For another example, the first TCI state and/or the TCI state with the lowest TCI state ID value indicated in the MAC CE command for beam indication could correspond to the TRP with the highest/highest MAC CE activated TRP-specific ID/index value such as the highest PCI value and/or the last TRP (e.g., TRP #N), the second TCI state and/or the TCI state with the second lowest TCI state ID value indicated in the MAC CE command for beam indication could correspond to the TRP with the second highest/second highest MAC CE activated TRP-specific ID/index value such as the second highest PCI value and/or the second last TRP (e.g., TRP #N−1), and so on, and the last TCI state and/or the TCI state with the highest TCI state ID value indicated in the MAC CE command for beam indication could correspond to the TRP with the lowest/lowest MAC CE activated TRP-specific ID/index value such as the lowest PCI value and/or the first TRP (e.g., TRP #1).

Other implicit indication methods of the association/mapping between the N≥1 TCI states/beams indicated in the MAC CE command for beam indication and the TRPs in the multi-TRP system are also possible.

For N≥1 TCI states/beams indication in a single MAC CE command for beam indication, in yet another example, the UE could be explicitly indicated by the network, e.g., via higher layer RRC signaling and/or MAC CE command and/or dynamic DCI signaling, the exact association/mapping between the TCI states/beams indicated in the MAC CE command for beam indication and the CORESETPoolIndex values.

For example, the UE could be first higher layer configured by the network a list/set/pool of CORESETPoolIndex values—e.g., a set of two CORESETPoolIndex values 0 and 1. The first TCI state and/or the TCI state with the lowest TCI state ID value indicated in the MAC CE command for beam indication could correspond to the first entry/CORESETPoolIndex value in the list/set/pool of CORESETPoolIndex values, the second TCI state and/or the TCI state with the second lowest TCI state ID value indicated in the MAC CE command for beam indication could correspond to the second entry/CORESETPoolIndex value in the list/set/pool of CORESETPoolIndex values, and so on, and the last TCI state and/or the TCI state with the highest TCI state ID value indicated in the MAC CE command for beam indication could correspond to the last entry/CORESETPoolIndex value in the list/set/pool of CORESETPoolIndex values.

For another example, the UE could be first higher layer configured by the network a list/set/pool of CORESETPoolIndex values—e.g., a set of two CORESETPoolIndex values 0 and 1. The UE could then receive from the network one or more MAC CE activation commands/bitmaps to activate one or more CORESETPoolIndex values from the higher layer configured list/set/pool of CORESETPoolIndex values. The first TCI state and/or the TCI state with the lowest TCI state ID value indicated in the MAC CE command for beam indication could correspond to the first MAC CE(s)/bitmap(s) activated CORESETPoolIndex value, the second TCI state and/or the TCI state with the second lowest TCI state ID value indicated in the MAC CE command for beam indication could correspond to the second MAC CE(s)/bitmap(s) activated CORESETPoolIndex value, and so on, and the last TCI state and/or the TCI state with the highest TCI state ID value indicated in the MAC CE command for beam indication could correspond to the last MAC CE(s)/bitmap(s) activated CORESETPoolIndex value.

Other exact association/mapping relationships between the TCI states/beams indicated in the MAC CE command for beam indication and the CORESETPoolIndex values and/or the corresponding indication method(s), e.g., via higher layer RRC signaling and/or MAC CE command and/or dynamic DCI signaling, are also possible.

For N≥1 TCI states/beams indication in a single MAC CE command for beam indication, in yet another example, the UE could be implicitly indicated by the network the association/mapping between the TCI states/beams indicated in the MAC CE command for beam indication and the CORESETPoolIndex values. The UE could be higher layer configured by the network a list/set/pool of CORESETPoolIndex values—e.g., a set of two CORESETPoolIndex values 0 and 1. The UE could also receive from the network one or more MAC CE activation commands/bitmaps to activate one or more CORESETPoolIndex values from the higher layer configured list/set/pool of CORESETPoolIndex values.

For example, the first TCI state and/or the TCI state with the lowest TCI state ID value indicated in the MAC CE command for beam indication could correspond to the lowest/lowest MAC CE activated CORESETPoolIndex value such as "0," the second TCI state and/or the TCI state with the second lowest TCI state ID value indicated in the MAC CE command for beam indication could correspond to the second lowest/second lowest MAC CE activated CORESETPoolIndex value such as "1," and so on, and the last TCI state and/or the TCI state with the highest TCI state ID value indicated in the MAC CE command for beam indication could correspond to the highest/highest MAC CE activated CORESETPoolIndex value such as "N−1."

For another example, the first TCI state and/or the TCI state with the lowest TCI state ID value indicated in the MAC CE command for beam indication could correspond to the highest/highest MAC CE activated CORESETPoolIndex value such as "N−1," the second TCI state and/or the TCI state with the second lowest TCI state ID value indicated in the MAC CE command for beam indication could correspond to the second highest/second highest MAC CE activated CORESETPoolIndex value such as "N−2," and so on, and the last TCI state and/or the TCI state with the highest TCI state ID value indicated in the MAC CE command for beam indication could correspond to the lowest/lowest MAC CE activated CORESETPoolIndex value such as "0."

Other implicit indication methods of the association/mapping between the N≥1 TCI states/beams indicated in the MAC CE command for beam indication and the CORESETPoolIndex values are also possible.

For N≥1 TCI states/beams indication in a single MAC CE command for beam indication, in yet another example, a TCI state, e.g., the higher layer parameter TCI-State, indicated in the MAC CE command for beam indication could include/comprise/incorporate at least one ID/index value. For example, this ID/index value could be a (absolute) TRP-specific ID/index value such as PCI value, TRP ID value, TRP index value and etc., based on a list/set/pool of TRP-specific ID/index values, e.g., higher layer configured to the UE and/or higher layer configured to the UE and activated by one or more MAC CE activation commands/bitmaps. For another example, this ID/index value could be an (relative) index within the list/set/pool of TRP-specific ID/index values, e.g., higher layer configured to the UE and/or higher layer configured to the UE and activated by one or more MAC CE activation commands/bitmaps. For yet another example, this ID/index value could be a CORESETPoolIndex value.

For N≥1 TCI states/beams indication in a single MAC CE command for beam indication, in yet another example, the MAC CE command for Unified TCI state/beam indication could include/comprise/incorporate at least one (e.g., N≥1 or M≥1) entity ID/index. In the present disclosure, an entity ID/index could correspond to a PCI value, a PCI index corresponding/pointing to a PCI in a list/set/pool of PCIs higher layer configured to the UE, a CORESETPoolIndex value, a CORESETGroupIndex value, a TRP-specific ID/index, a TRP-specific higher layer signaling index/ID, a one-bit flag indicating either the serving cell PCI or a PCI different from the serving cell PCI, a multi-bit indicator with each state of the indicator indicating a PCI, or etc.

For this case, the n-th or m-th TCI state (e.g., the n-th or m-th joint DL and UL TCI state or separate DL TCI state or separate UL TCI state) among/within the indicated N≥1 or M≥1 Unified TCI states could be associated with the n-th or m-th entity ID/index indicated in the same MAC CE command for Unified TCI state/beam indication, where n∈{1, . . . , N} or m∈{1, . . . , M}. For instance, the first TCI state in the indicated N=2 or M=2 Unified TCI states could be associated with the first entity ID/index such as the first PCI, CORESETPoolIndex value 0 or CORESETGroupIndex value 0 indicated in the same MAC CE command for Unified TCI state/beam indication, and the second TCI state in the indicated N=2 or M=2 Unified TCI states could be associated with the second entity ID/index such as the second PCI, CORESETPoolIndex value 1 or CORESETGroupIndex value 1 indicated in the same MAC CE command for Unified TCI state/beam indication.

In the present disclosure, the UE could be provided by PDCCH-Config multiple (e.g., two) CORESETGroupIndex values (e.g., 0 and 1). The association of a CORESET and a CORESETGroupIndex value could be via indicating the explicit CORESETGroupIndex value (e.g., either 0 or 1) in the parameter, e.g., the higher layer parameter ControlResourceSet, configuring the CORESET.

For a list/set/pool of N≥1 MAC CE commands for beam indication with each MAC CE command indicating a single TCI state/beam, a unique entity ID/index could be included/incorporated in each MAC CE command for beam indication.

In one example, the UE could be explicitly indicated by the network, e.g., via higher layer RRC signaling and/or MAC CE command and/or dynamic DCI signaling, the exact association/mapping between the MAC CE commands for beam indication (and therefore, the TCI states/beams indicated therein) and the TRPs in the multi-TRP system.

For example, the UE could be first higher layer configured by the network a list/set/pool of TRP-specific ID/index values such as PCIs. The first MAC CE command for beam indication in the list/set/pool of N≥1 MAC CE commands for beam indication and/or the MAC CE command for beam indication indicating the lowest entity ID/index value and/or the MAC CE command for beam indication indicating the TCI state with the lowest TCI state ID value could correspond to the first entry/TRP in the list/set/pool of TRP-specific ID/index values, the second MAC CE command for beam indication in the list/set/pool of N≥1 MAC CE commands for beam indication and/or the MAC CE command for beam indication indicating the second lowest entity ID/index value and/or the MAC CE command for beam indication indicating the TCI state with the second lowest TCI state ID value could correspond to the second entry/TRP in the list/set/pool of TRP-specific ID/index values, and so on, and the last MAC CE command for beam indication in the list/set/pool of N≥1 MAC CE commands for beam indication and/or the MAC CE command for beam indication indicating the highest entity ID/index value and/or the MAC CE command for beam indication indicating the TCI state with the highest TCI state ID value could correspond to the last entry/TRP in the list/set/pool of TRP-specific ID/index values.

For another example, the UE could be first higher layer configured by the network a list/set/pool of TRP-specific ID/index values such as PCIs. The UE could then receive from the network one or more MAC CE activation commands/bitmaps to activate one or more TRP-specific ID/index values from the higher layer configured list/set/pool of TRP-specific ID/index values. The first MAC CE command for beam indication in the list/set/pool of N≥1 MAC CE commands for beam indication and/or the MAC CE command indicating the lowest entity ID/index value and/or the MAC CE command for beam indication indicating the TCI state with the lowest TCI state ID value could correspond to the first MAC CE(s)/bitmap(s) activated TRP-specific ID/index values, the second MAC CE command for beam indication in the list/set/pool of N≥1 MAC CE commands for beam indication and/or the MAC CE command for beam indication indicting the second lowest entity ID/index value and/or the MAC CE command for beam indication indicating the TCI state with the second lowest TCI state ID value could correspond to the second MAC CE(s)/bitmap(s) activated TRP-specific ID/index values, and so on, and the last MAC CE command for beam indication in the list/set/pool of N≥1 MAC CE commands for beam indication and/or the MAC CE command for beam indication indicating the highest entity ID/index value and/or the MAC CE command for beam indication indicating the TCI state with the highest TCI state ID value could correspond to the last MAC CE(s)/bitmap(s) activated TRP-specific ID/index values.

Other exact association/mapping relationships between the MAC CE commands for beam indication (and therefore, the TCI states/beams indicated therein) and the TRPs in the multi-TRP system and/or the corresponding indication method(s), e.g., via higher layer RRC signaling and/or MAC CE command and/or dynamic DCI signaling, are also possible.

In another example, the UE could be implicitly indicated by the network the association/mapping between the MAC CE commands for beam indication (and therefore, the TCI states/beams indicated therein) and the TRPs in the multi-TRP system. The UE could be higher layer configured by the network a list/set/pool of TRP-specific ID/index values such as PCIs. The UE could also receive from the network one or more MAC CE activation commands/bitmaps to activate one or more TRP-specific ID/index values from the higher layer configured list/set/pool of TRP-specific ID/index values.

For example, the first MAC CE command for beam indication in the list/set/pool of N≥1 MAC CE commands for beam indication and/or the MAC CE command for beam indication indicating the lowest entity ID/index value and/or the MAC CE command for beam indication indicating the lowest TCI state ID value could correspond to the TRP with the lowest/lowest MAC CE activated TRP-specific ID/index value such as the lowest PCI value and/or the first TRP (e.g., TRP #1), the second MAC CE command for beam indication in the list/set/pool of N≥1 MAC CE commands for beam indication and/or the MAC CE command for beam indication indicating the second lowest entity ID/index value and/or the MAC CE command for beam indication indicating the second lowest TCI state ID value could correspond to the TRP with the second lowest/second lowest MAC CE activated TRP-specific ID/index value such as the second lowest PCI value and/or the second TRP (e.g., TRP #2), and so on, and the last MAC CE command for beam indication in the list/set/pool of N≥1 MAC CE commands for beam indication and/or the MAC CE command for beam indication indicating the highest entity ID/index value and/or the MAC CE command for beam indication indicating the highest TCI state ID value could correspond to the TRP with the highest/highest MAC CE activated TRP-specific ID/index value such as the highest PCI value and/or the last TRP (e.g., TRP #N).

For another example, the first MAC CE command for beam indication in the list/set/pool of N≥1 MAC CE commands for beam indication and/or the MAC CE command for beam indication indicating the lowest entity ID/index value and/or the MAC CE command for beam indication indicating the lowest TCI state ID value could correspond to the TRP with the highest/highest MAC CE activated TRP-specific ID/index value such as the highest PCI value and/or the last TRP (e.g., TRP #N), the second MAC CE command for beam indication in the list/set/pool of N≥1 MAC CE commands for beam indication and/or the MAC CE command for beam indication indicating the second lowest entity ID/index value and/or the MAC CE command for beam indication indicating the second lowest TCI state ID value could correspond to the TRP with the second highest/second highest MAC CE activated TRP-specific ID/index value such as the second highest PCI value and/or the second last TRP (e.g., TRP #N−1), and so on, and the last MAC CE command for beam indication in the list/set/pool of N≥1 MAC CE commands for beam indication and/or the MAC CE command for beam indication indicating the highest entity ID/index value and/or the MAC CE command for beam indication indicating the highest TCI state ID value indicated could correspond to the TRP with the lowest/lowest MAC CE activated TRP-specific ID/index value such as the lowest PCI value and/or the first TRP (e.g., TRP #1).

Other implicit indication methods of the association/mapping between the N≥1 MAC CE commands for beam indication (and therefore, the TCI states/beams indicated therein) and the TRPs in the multi-TRP system are also possible.

In yet another example, the UE could be explicitly indicated by the network, e.g., via higher layer RRC signaling and/or MAC CE command and/or dynamic DCI signaling, the exact association/mapping between the MAC CE commands for beam indication (and therefore, the TCI states/beams indicated therein) and the TRPs in the multi-TRP system.

For example, the UE could be first higher layer configured by the network a list/set/pool of CORESETPoolIndex values—e.g., a set of two CORESETPoolIndex values 0 and 1. The first MAC CE command for beam indication in the list/set/pool of N≥1 MAC CE commands for beam indication and/or the MAC CE command for beam indication indicating the lowest entity ID/index value and/or the MAC CE command for beam indication indicating the TCI state with the lowest TCI state ID value could correspond to the first entry/CORESETPoolIndex value in the list/set/pool of CORESETPoolIndex values, the second MAC CE command for beam indication in the list/set/pool of N≥1 MAC CE commands for beam indication and/or the MAC CE command for beam indication indicating the second lowest entity ID/index value and/or the MAC CE command for beam indication indicating the TCI state with the second lowest TCI state ID value could correspond to the second entry/CORESETPoolIndex value in the list/set/pool of CORESETPoolIndex values, and so on, and the last MAC CE command for beam indication in the list/set/pool of N≥1 MAC CE commands for beam indication and/or the MAC CE command for beam indication indicating the highest entity ID/index value and/or the MAC CE command for beam indication indicating the TCI state with the highest TCI state ID value could correspond to the last entry/CORESETPoolIndex value in the list/set/pool of CORESETPoolIndex values.

For another example, the UE could be first higher layer configured by the network a list/set/pool of CORESETPoolIndex values—e.g., a set of two CORESETPoolIndex values 0 and 1. The UE could then receive from the network one or more MAC CE activation commands/bitmaps to activate one or more CORESETPoolIndex values from the higher layer configured list/set/pool of CORESETPoolIndex values. The first MAC CE command for beam indication in the list/set/pool of N≥1 MAC CE commands for beam indication and/or the MAC CE command for beam indication indicating the lowest entity ID/index value and/or the MAC CE command for beam indication indicating the TCI state with the lowest TCI state ID value could correspond to the first MAC CE(s)/bitmap(s) activated CORESETPoolIndex value, the second MAC CE command for beam indication in the list/set/pool of N≥1 MAC CE commands for beam indication and/or the MAC CE command for beam indication indicating the second lowest entity ID/index value and/or the MAC CE command for beam indication indicating the TCI state with the second lowest TCI state ID value could correspond to the second MAC CE(s)/bitmap(s) activated CORESETPoolIndex value, and so on, and the last MAC CE command for beam indication in the list/set/pool of N≥1 MAC CE commands for beam indication and/or the MAC CE command for beam indication indicating the highest entity ID/index value and/or the MAC CE command for beam indication indicating the TCI state with the highest TCI state ID value could correspond to the last MAC CE(s)/bitmap(s) activated CORESETPoolIndex value.

Other exact association/mapping relationships between the MAC CE commands for beam indication (and therefore, the TCI states/beams indicated therein) and the CORESETPoolIndex values and/or the corresponding indication method(s), e.g., via higher layer RRC signaling and/or MAC CE command and/or dynamic DCI signaling, are also possible.

In yet another example, the UE could be implicitly indicated by the network the association/mapping between the MAC CE commands for beam indication (and therefore, the TCI states/beams indicated therein) and the CORESETPoolIndex values. The UE could be higher layer configured by the network a list/set/pool of CORESETPoolIndex values—e.g., a set of two CORESETPoolIndex values 0 and 1. The UE could also receive from the network one or more MAC CE activation commands/bitmaps to activate one or more CORESETPoolIndex values from the higher layer configured list/set/pool of CORESETPoolIndex values.

For example, the first MAC CE command for beam indication in the list/set/pool of N≥1 MAC CE commands for beam indication and/or the MAC CE command for beam indication indicating the lowest entity ID/index value and/or the MAC CE command for beam indication indicating the lowest TCI state ID value could correspond to the lowest/lowest MAC CE activated CORESETPoolIndex value, the second MAC CE command for beam indication in the list/set/pool of N≥1 MAC CE commands for beam indication and/or the MAC CE command for beam indication indicating the second lowest entity ID/index value and/or the MAC CE command for beam indication indicating the second lowest TCI state ID value could correspond to the second lowest/second lowest MAC CE activated CORESETPoolIndex value, and so on, and the last MAC CE command for beam indication in the list/set/pool of N≥1 MAC CE commands for beam indication and/or the MAC CE command for beam indication indicating the highest entity ID/index value and/or the MAC CE command for beam indication indicating the highest TCI state ID value could correspond to the highest/highest MAC CE activated CORESETPoolIndex value.

For another example, the first MAC CE command for beam indication in the list/set/pool of N≥1 MAC CE commands for beam indication and/or the MAC CE command for beam indication indicating the lowest entity ID/index value and/or the MAC CE command for beam indication indicating the lowest TCI state ID value could correspond to the highest/highest MAC CE activated CORESETPoolIndex value, the second MAC CE command for beam indication in the list/set/pool of N≥1 MAC CE commands for beam indication and/or the MAC CE command for beam indication indicating the second lowest entity ID/index value and/or the MAC CE command for beam indication indicating the second lowest TCI state ID value could correspond to the second highest/second highest MAC CE activated CORESETPoolIndex value, and so on, and the last MAC CE command for beam indication in the list/set/pool of N≥1 MAC CE commands for beam indication and/or the MAC CE command for beam indication indicating the highest entity ID/index value and/or the MAC CE command for beam indication indicating the highest TCI state ID value indicated could correspond to the lowest/lowest MAC CE activated CORESETPoolIndex value.

Other implicit indication methods of the association/mapping between the N≥1 MAC CE commands for beam indication (and therefore, the TCI states/beams indicated therein) and the CORESETPoolIndex values are also possible.

In yet another example, a MAC CE command for beam indication could include/comprise/incorporate at least one ID/index value. For example, this ID/index value could be a (absolute) TRP-specific ID/index value such as PCI value, TRP ID value, TRP index value and etc., based on a list/set/pool of TRP-specific ID/index values, e.g., higher layer configured to the UE and/or higher layer configured to the UE and activated by one or more MAC CE activation commands/bitmaps. For another example, this ID/index value could be an (relative) index within the list/set/pool of TRP-specific ID/index values, e.g., higher layer configured to the UE and/or higher layer configured to the UE and activated by one or more MAC CE activation commands/bitmaps. For yet another example, this ID/index value could be a CORESETPoolIndex value. The MAC CE command for beam indication may indicate/update the corresponding TCI state(s) for the TRP(s) associated with the same ID/index value, e.g., the CORESETPoolIndex value, as that indicated in the MAC CE command for beam indication.

In yet another example, a MAC CE command for Unified TCI state/beam indication could include/comprise/incorporate at least one (e.g., N≥1 or M≥1) entity ID/index. In the present disclosure, an entity ID/index could correspond to a PCI value, a PCI index corresponding/pointing to a PCI in a list/set/pool of PCIs higher layer configured to the UE, a CORESETPoolIndex value, a CORESETGroupIndex value, a TRP-specific ID/index, a TRP-specific higher layer signaling index/ID, a one-bit flag indicating either the serving cell PCI or a PCI different from the serving cell PCI, a multi-bit indicator with each state of the indicator indicating a PCI, or etc. For this case, the n-th or m-th TCI state (e.g., the n-th or m-th joint DL and UL TCI state or separate DL TCI state or separate UL TCI state) among/within the indicated N≥1 or M≥1 Unified TCI states could be associated with the n-th or m-th entity ID/index indicated in the same MAC CE command for Unified TCI state/beam indication, where n∈{1, . . . , N} or m∈{1, . . . , M}.

For instance, the first TCI state in the indicated N=2 or M=2 Unified TCI states could be associated with the first entity ID/index such as the first PCI, CORESETPoolIndex value 0 or CORESETGroupIndex value 0 indicated in the same MAC CE command for Unified TCI state/beam indication, and the second TCI state in the indicated N=2 or M=2 Unified TCI states could be associated with the second entity ID/index such as the second PCI, CORESETPoolIndex value 1 or CORESETGroupIndex value 1 indicated in the same MAC CE command for Unified TCI state/beam indication. In the present disclosure, the UE could be provided by PDCCH-Config multiple (e.g., two) CORESETGroupIndex values (e.g., 0 and 1). The association of a CORESET and a CORESETGroupIndex value could be via indicating the explicit CORESETGroupIndex value (e.g., either 0 or 1) in the parameter, e.g., the higher layer parameter ControlResourceSet, configuring the CORESET.

Figure 15:
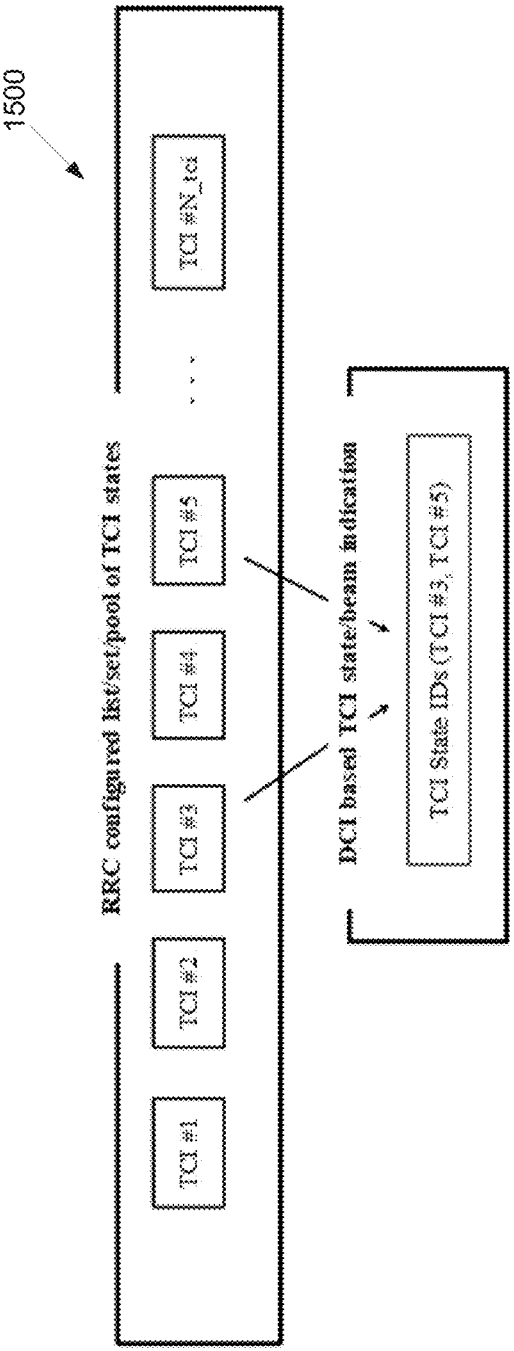
FIG. 15 illustrates another example of DCI based unified TCI state/beam indication according to embodiments of the present disclosure.

FIG. 15 illustrates another example of DCI based unified TCI state/beam indication 1500 according to embodiments of the present disclosure. An embodiment of the DCI based unified TCI state/beam indication 1500 shown in FIG. 15 is for illustration only.

In FIG. 15, an example of DCI based Unified TCI state/beam indication for the multi-TRP operation is presented. As illustrated in FIG. 15, the UE could be first higher layer configured by the network, e.g., via the higher layer RRC signaling, a list/pool of N_tci TCI states. Each TCI state contains at least a QCL source RS with a QCL type, e.g., QCL-typeA/B/C/D. The UE could then receive from the network one or more DCIs (e.g., DCI format 1_1 or 1_2 with or without DL assignment) to indicate one or more beam(s) (i.e., the Unified TCI state(s)) for UE-dedicated reception on PDSCH/PDCCH or dynamic-grant/configured-grant based PUSCH and all of dedicated PUCCH resources associated with one or more TRPs in a multi-TRP system.

For instance, the UE could receive from the network a single DCI (e.g., DCI format 1_1 or 1_2 with or without DL assignment) to indicate M≥1 Unified TCI states/beams (e.g., M≥1 joint DL and UL TCI states or M≥1 separate UL TCI states) for the same PUSCH(s)/PUCCH(s) transmitted to/associated with different TRPs in the multi-TRP system.

As described above, a DCI used to indicate to the UE a beam (i.e., a TCI state and/or a TCI state ID) for the transmission/reception of a PDCCH or a PDSCH could be at least one of the following examples.

In one example, a DL related DCI (e.g., DCI format 1_0, DCI format 1_1 or DCI format 1_2) could be used to indicate to the UE a beam (i.e., a TCI state and/or a TCI state ID) for the transmission/reception of a PDCCH or a PDSCH, wherein the DL related DCI may or may not include a DL assignment.

In another example, an UL related DCI (e.g., DCI format 0_0, DCI format 0_1, DCI format 0_2) could be used to indicate to the UE a beam (i.e., a TCI state and/or a TCI state ID) for the transmission/reception of a PDCCH or a PDSCH, wherein the UL related DCI may or may not include an UL scheduling grant.

Yet in another example, a custom/purpose designed DCI format could be used to indicate to the UE a beam (i.e., a TCI state and/or a TCI state ID) for the transmission/reception of a PDCCH or a PDSCH.

Furthermore, the Unified TCI state indicated in the DCI for beam indication could be at least one of: (1) a DL TCI state; (2) an UL TCI state; (3) a joint DL and UL TCI state; or (4) a separate DL TCI state and UL TCI state.

The association/mapping between the TCI state(s)/beam(s) indicated in the DCI(s) and the TRPs in the multi-TRP system needs to be specified. There could be various means to associate/map the TCI state(s)/beam(s) indicated in the DCI(s) and the TRPs in the multi-TRP system.

For N≥1 TCI states/beams indication in a single DCI, in one example, the UE could be explicitly indicated by the network, e.g., via higher layer RRC signaling and/or MAC CE command and/or dynamic DCI signaling, the exact association/mapping between the TCI states/beams indicated in the DCI and the TRPs in the multi-TRP system. For example, the UE could be first higher layer configured by the network a list/set/pool of TRP-specific ID/index values such as PCIs. The first TCI state and/or the TCI state with the lowest TCI state ID value indicated in the DCI for beam indication could correspond to the first entry/TRP in the list/set/pool of TRP-specific ID/index values, the second TCI state and/or the TCI state with the second lowest TCI state ID value indicated in the DCI for beam indication could correspond to the second entry/TRP in the list/set/pool of TRP-specific ID/index values, and so on, and the last TCI state and/or the TCI state with the highest TCI state ID value indicated in the DCI for beam indication could correspond to the last entry/TRP in the list/set/pool of TRP-specific ID/index values.

For another example, the UE could be first higher layer configured by the network a list/set/pool of TRP-specific ID/index values such as PCIs. The UE could then receive from the network one or more MAC CE activation commands/bitmaps to activate one or more TRP-specific ID/index values from the higher layer configured list/set/pool of TRP-specific ID/index values. The first TCI state and/or the TCI state with the lowest TCI state ID value indicated in the DCI for beam indication could correspond to the first MAC CE(s)/bitmap(s) activated TRP-specific ID/index value, the second TCI state and/or the TCI state with the second lowest TCI state ID value indicated in the DCI for beam indication could correspond to the second MAC CE(s)/bitmap(s) activated TRP-specific ID/index value, and so on, and the last TCI state and/or the TCI state with the highest TCI state ID value indicated in the DCI for beam indication could correspond to the last MAC CE(s)/bitmap(s) activated TRP-specific ID/index value. Other exact association/mapping relationships between the TCI states/beams indicated in the DCI for beam indication and the TRPs in the multi-TRP system and/or the corresponding indication method(s), e.g., via higher layer RRC signaling and/or MAC CE command and/or dynamic DCI signaling, are also possible.

For N≥1 TCI states/beams indication in a single DCI, in another example, the UE could be implicitly indicated by the network the association/mapping between the TCI states/ beams indicated in the DCI for beam indication and the TRPs in the multi-TRP system. The UE could be higher layer configured by the network a list/set/pool of TRP-specific ID/index values such as PCIs. The UE could also receive from the network one or more MAC CE activation commands/bitmaps to activate one or more TRP-specific ID/index values from the higher layer configured list/set/pool of TRP-specific ID/index values.

For example, the first TCI state and/or the TCI state with the lowest TCI state ID value indicated in the DCI for beam indication could correspond to the TRP with the lowest/lowest MAC CE activated TRP-specific ID/index value such as the lowest PCI value and/or the first TRP (e.g., TRP #1), the second TCI state and/or the TCI state with the second lowest TCI state ID value indicated in the DCI for beam indication could correspond to the TRP with the second lowest/second lowest MAC CE activated TRP-specific ID/index value such as the second lowest PCI value and/or the second TRP (e.g., TRP #2), and so on, and the last TCI state and/or the TCI state with the highest TCI state ID value indicated in the DCI for beam indication could correspond to the TRP with the highest/highest MAC CE activated TRP-specific ID/index value such as the highest PCI value and/or the last TRP (e.g., TRP #N).

For another example, the first TCI state and/or the TCI state with the lowest TCI state ID value indicated in the DCI for beam indication could correspond to the TRP with the highest/highest MAC CE activated TRP-specific ID/index value such as PCI value, the second TCI state and/or the TCI state with the second lowest TCI state ID value indicated in the DCI for beam indication could correspond to the TRP with the second highest/second highest MAC CE activated TRP-specific ID/index value such as PCI value, and so on, and the last TCI state and/or the TCI state with the highest TCI state ID value indicated in the DCI for beam indication could correspond to the TRP with the lowest/lowest MAC CE activated TRP-specific ID/index value such as PCI value. Other implicit indication methods of the association/mapping between the N≥1 TCI states/beams indicated in the DCI and the TRPs in the multi-TRP system are also possible.

For N≥1 TCI states/beams indication in a single DCI, in yet another example, the UE could be explicitly indicated by the network, e.g., via higher layer RRC signaling and/or MAC CE command and/or dynamic DCI signaling, the exact association/mapping between the TCI states/beams indicated in the DCI for beam indication and the CORESETPoolIndex values.

For example, the UE could be first higher layer configured by the network a list/set/pool of CORESETPoolIndex values—e.g., a set of two CORESETPoolIndex values 0 and 1. The first TCI state and/or the TCI state with the lowest TCI state ID value indicated in the DCI for beam indication could correspond to the first entry/CORESETPoolIndex value in the list/set/pool of CORESETPoolIndex values, the second TCI state and/or the TCI state with the second lowest TCI state ID value indicated in the DCI for beam indication could correspond to the second entry/CORESETPoolIndex value in the list/set/pool of CORESETPoolIndex values, and so on, and the last TCI state and/or the TCI state with the highest TCI state ID value indicated in the DCI for beam indication could correspond to the last entry/CORESETPoolIndex value in the list/set/pool of CORESETPoolIndex values.

For another example, the UE could be first higher layer configured by the network a list/set/pool of CORESETPoolIndex values—e.g., a set of two CORESETPoolIndex values 0 and 1. The UE could then receive from the network one or more MAC CE activation commands/bitmaps to activate one or more CORESETPoolIndex values from the higher layer configured list/set/pool of CORESETPoolIndex values. The first TCI state and/or the TCI state with the lowest TCI state ID value indicated in the DCI for beam indication could correspond to the first MAC CE(s)/bitmap(s) activated CORESETPoolIndex value, the second TCI state and/or the TCI state with the second lowest TCI state ID value indicated in the DCI for beam indication could correspond to the second MAC CE(s)/bitmap(s) activated CORESETPoolIndex value, and so on, and the last TCI state and/or the TCI state with the highest TCI state ID value indicated in the DCI for beam indication could correspond to the last MAC CE(s)/bitmap(s) activated CORESETPoolIndex value.

Other exact association/mapping relationships between the TCI states/beams indicated in the DCI for beam indication and the CORESETPoolIndex values and/or the corresponding indication method(s), e.g., via higher layer RRC signaling and/or MAC CE command and/or dynamic DCI signaling, are also possible.

For N≥1 TCI states/beams indication in a single DCI, in yet another example, the UE could be implicitly indicated by the network the association/mapping between the TCI states/beams indicated in the DCI for beam indication and the CORESETPoolIndex values. The UE could be higher layer configured by the network a list/set/pool of CORESETPoolIndex values—e.g., a set of two CORESETPoolIndex values 0 and 1. The UE could also receive from the network one or more MAC CE activation commands/bitmaps to activate one or more CORESETPoolIndex values from the higher layer configured list/set/pool of CORESETPoolIndex values.

For example, the first TCI state and/or the TCI state with the lowest TCI state ID value indicated in the DCI for beam indication could correspond to the lowest/lowest MAC CE activated CORESETPoolIndex value such as "0," the second TCI state and/or the TCI state with the second lowest TCI state ID value indicated in the DCI for beam indication could correspond to the second lowest/second lowest MAC CE activated CORESETPoolIndex value such as "1," and so on, and the last TCI state and/or the TCI state with the highest TCI state ID value indicated in the DCI for beam indication could correspond to the highest/highest MAC CE activated CORESETPoolIndex value such as "N−1."

For another example, the first TCI state and/or the TCI state with the lowest TCI state ID value indicated in the DCI for beam indication could correspond to the highest/highest MAC CE activated CORESETPoolIndex value, the second TCI state and/or the TCI state with the second lowest TCI state ID value indicated in the DCI for beam indication could correspond to the second highest/second highest MAC CE activated CORESETPoolIndex value, and so on, and the last TCI state and/or the TCI state with the highest TCI state ID value indicated in the DCI for beam indication could correspond to the lowest/lowest MAC CE activated CORESETPoolIndex value. Other implicit indication methods of the association/mapping between the N≥1 TCI states/beams indicated in the DCI for beam indication and the CORESETPoolIndex values are also possible.

For N≥1 TCI states/beams indication in a single DCI, in yet another example, a TCI state, e.g., the higher layer parameter TCI-State, indicated in the DCI for beam indication could include/comprise/incorporate at least one ID/index value. For example, this ID/index value could be a (absolute) TRP-specific ID/index value such as PCI value, TRP ID value, TRP index value and etc., based on a list/set/pool of TRP-specific ID/index values, e.g., higher layer configured to the UE and/or higher layer configured to the UE and activated by one or more MAC CE activation commands/bitmaps. For another example, this ID/index value could be an (relative) index within the list/set/pool of TRP-specific ID/index values, e.g., higher layer configured to the UE and/or higher layer configured to the UE and activated by one or more MAC CE activation commands/bitmaps. For yet another example, this ID/index value could be a CORESETPoolIndex value.

For N≥1 TCI states/beams indication in a single DCI, in yet another example, the DCI (e.g., DCI format 1_1 or 1_2 with or without DL assignment) for Unified TCI state/beam indication could include/comprise/incorporate at least one (e.g., N≥1 or M≥1) entity ID/index. In the present disclosure, an entity ID/index could correspond to a PCI value, a PCI index corresponding/pointing to a PCI in a list/set/pool of PCIs higher layer configured to the UE, a CORESETPoolIndex value, a CORESETGroupIndex value, a TRP-specific ID/index, a TRP-specific higher layer signaling index/ID, a one-bit flag indicating either the serving cell PCI or a PCI different from the serving cell PCI, a multi-bit indicator with each state of the indicator indicating a PCI, or etc. For this case, the n-th or m-th TCI state (e.g., the n-th or m-th joint DL and UL TCI state or separate DL TCI state or separate UL TCI state) among/within the indicated N≥1 or M≥1 Unified TCI states could be associated with the n-th or m-th entity ID/index indicated in the same DCI (e.g., DCI format 1_1 or 1_2 with or without DL assignment) for Unified TCI state/beam indication, where n∈{1, . . . , N} or m∈{1, . . . , M}.

For instance, the first TCI state in the indicated N=2 or M=2 Unified TCI states could be associated with the first entity ID/index such as the first PCI, CORESETPoolIndex value 0 or CORESETGroupIndex value 0 indicated in the same DCI (e.g., DCI format 1_1 or 1_2 with or without DL assignment) for Unified TCI state/beam indication, and the second TCI state in the indicated N=2 or M=2 Unified TCI states could be associated with the second entity ID/index such as the second PCI, CORESETPoolIndex value 1 or CORESETGroupIndex value 1 indicated in the same DCI (e.g., DCI format 1_1 or 1_2 with or without DL assignment) for Unified TCI state/beam indication. In the present disclosure, the UE could be provided by PDCCH-Config multiple (e.g., two) CORESETGroupIndex values (e.g., 0 and 1). The association of a CORESET and a CORESETGroupIndex value could be via indicating the explicit CORESETGroupIndex value (e.g., either 0 or 1) in the parameter, e.g., the higher layer parameter ControlResourceSet, configuring the CORESET.

For N≥1 DCIs with each DCI indicating a single TCI state/beam, in one example, the UE could be explicitly indicated by the network, e.g., via higher layer RRC signaling and/or MAC CE command and/or dynamic DCI signaling, the exact association/mapping between the DCIs for beam indication (and therefore, the TCI states/beams indicated therein) and the TRPs in the multi-TRP system.

For example, the UE could be first higher layer configured by the network a list/set/pool of TRP-specific ID/index values such as PCIs. The DCI for beam indication associated with the lowest CORESETPoolIndex value (indicated in the corresponding higher layer parameter ControlResourceSet) and/or the DCI for beam indication indicating the TCI state with the lowest TCI state ID value could correspond to the first entry/TRP in the list/set/pool of TRP-specific ID/index values, the DCI for beam indication associated with the second lowest CORESETPoolIndex value (indicated in the corresponding higher layer parameter ControlResourceSet) and/or the DCI for beam indication indicating the TCI state with the second lowest TCI state ID value could correspond to the second entry/TRP in the list/set/pool of TRP-specific ID/index values, and so on, and the DCI for beam indication associated with the highest CORESETPoolIndex value (indicated in the corresponding higher layer parameter ControlResourceSet) and/or the DCI for beam indication indicating the TCI state with the highest TCI state ID value could correspond to the last entry/TRP in the list/set/pool of TRP-specific ID/index values.

For another example, the UE could be first higher layer configured by the network a list/set/pool of TRP-specific ID/index values such as PCIs. The UE could then receive from the network one or more MAC CE activation commands/bitmaps to activate one or more TRP-specific ID/index values from the higher layer configured list/set/pool of TRP-specific ID/index values. The DCI for beam indication associated with the lowest CORESETPoolIndex value (indicated in the corresponding higher layer parameter ControlResourceSet) and/or the DCI for beam indication indicating the TCI state with the lowest TCI state ID value could correspond to the first MAC CE(s)/bitmap(s) activated TRP-specific ID/index values, the DCI for beam indication associated with the second lowest CORESETPoolIndex value (indicated in the corresponding higher layer parameter ControlResourceSet) and/or the DCI for beam indication indicating the TCI state with the second lowest TCI state ID value could correspond to the second MAC CE(s)/bitmap(s) activated TRP-specific ID/index values, and so on, and the DCI for beam indication associated with the highest CORESETPoolIndex value (indicated in the corresponding higher layer parameter ControlResourceSet) and/or the DCI for beam indication indicating the TCI state with the highest TCI state ID value could correspond to the last MAC CE(s)/bitmap(s) activated TRP-specific ID/index values.

Other exact association/mapping relationships between the DCIs for beam indication (and therefore, the TCI states/beams indicated therein) and the TRPs in the multi-TRP system and/or the corresponding indication method(s), e.g., via higher layer RRC signaling and/or MAC CE command and/or dynamic DCI signaling, are also possible.

In another example, the UE could be implicitly indicated by the network the association/mapping between the DCIs for beam indication (and therefore, the TCI states/beams indicated therein) and the TRPs in the multi-TRP system. The UE could be higher layer configured by the network a list/set/pool of TRP-specific ID/index values such as PCIs. The UE could also receive from the network one or more MAC CE activation commands/bitmaps to activate one or more TRP-specific ID/index values from the higher layer configured list/set/pool of TRP-specific ID/index values.

For example, the DCI for beam indication associated with the lowest CORESETPoolIndex value (indicated in the corresponding higher layer parameter ControlResourceSet) and/or the DCI for beam indication indicating the lowest TCI state ID value could correspond to the TRP with the lowest/lowest MAC CE activated TRP-specific ID/index value such as the lowest PCI value and/or the first TRP (e.g., TRP #1), the DCI for beam indication associated with the second lowest CORESETPoolIndex value (indicated in the corresponding higher layer parameter ControlResourceSet) and/or the DCI for beam indication indicating the second lowest TCI state ID value could correspond to the TRP with the second lowest/second lowest MAC CE activated TRP-specific ID/index value such as the second lowest PCI value and/or the second TRP (e.g., TRP #2), and so on, and the DCI for beam indication associated with the highest CORESETPoolIndex value (indicated in the corresponding higher layer parameter ControlResourceSet) and/or the DCI for beam indication indicating the highest TCI state ID value could correspond to the TRP with the highest/highest MAC CE activated TRP-specific ID/index value such as the highest PCI value and/or the last TRP (e.g., TRP #N).

For another example, the DCI for beam indication associated with the lowest CORESETPoolIndex value (indicated in the corresponding higher layer parameter ControlResourceSet) and/or the DCI for beam indication indicating the lowest TCI state ID value could correspond to the TRP with the highest/highest MAC CE activated TRP-specific ID/index value such as PCI value, the DCI for beam indication associated with the second lowest CORESETPoolIndex value (indicated in the corresponding higher layer parameter ControlResourceSet) and/or the DCI for beam indication indicating the second lowest TCI state ID value could correspond to the TRP with the second highest/second highest MAC CE activated TRP-specific ID/index value such as PCI value, and so on, and the DCI for beam indication associated with the highest CORESETPoolIndex value (indicated in the corresponding higher layer parameter ControlResourceSet) and/or the DCI for beam indication indicating the highest TCI state ID value could correspond to the TRP with the lowest/lowest MAC CE activated TRP-specific ID/index value such as PCI value.

Other implicit indication methods of the association/mapping between the N≥1 DCIs for beam indication (and therefore, the TCI states/beams indicated therein) and the TRPs in the multi-TRP system are also possible.

In yet another example, a DCI for beam indication could include/comprise/incorporate at least one ID/index value. For example, this ID/index value could be a (absolute) TRP-specific ID/index value such as PCI value, TRP ID value, TRP index value and etc., based on a list/set/pool of TRP-specific ID/index values, e.g., higher layer configured to the UE and/or higher layer configured to the UE and activated by one or more MAC CE activation commands/bitmaps.

For another example, this ID/index value could be an (relative) index within the list/set/pool of TRP-specific ID/index values, e.g., higher layer configured to the UE and/or higher layer configured to the UE and activated by one or more MAC CE activation commands/bitmaps. For yet another example, this ID/index value could be a CORESETPoolIndex value. The DCI for beam indication may indicate/update the corresponding TCI state(s) for the TRP(s) associated with the same ID/index value, e.g., the CORESETPoolIndex value, as that indicated in the DCI for beam indication.

In yet another example, a DCI (e.g., DCI format 1_1 or 1_2 with or without DL assignment) for Unified TCI state/beam indication could include/comprise/incorporate at least one (e.g., N≥1 or M≥1) entity ID/index. In the present disclosure, an entity ID/index could correspond to a PCI value, a PCI index corresponding/pointing to a PCI in a list/set/pool of PCIs higher layer configured to the UE, a CORESETPoolIndex value, a CORESETGroupIndex value, a TRP-specific ID/index, a TRP-specific higher layer signaling index/ID, a one-bit flag indicating either the serving cell PCI or a PCI different from the serving cell PCI, a multi-bit indicator with each state of the indicator indicating a PCI, or etc.

For this case, the n-th or m-th TCI state (e.g., the n-th or m-th joint DL and UL TCI state or separate DL TCI state or separate UL TCI state) among/within the indicated N≥1 or M≥1 Unified TCI states could be associated with the n-th or m-th entity ID/index indicated in the same DCI (e.g., DCI format 1_1 or 1_2 with or without DL assignment) for Unified TCI state/beam indication, where n∈{1, . . . , N} or m∈{1, . . . , M}. For instance, the first TCI state in the indicated N=2 or M=2 Unified TCI states could be associated with the first entity ID/index such as the first PCI, CORESETPoolIndex value 0 or CORESETGroupIndex value 0 indicated in the same DCI (e.g., DCI format 1_1 or 1_2 with or without DL assignment) for Unified TCI state/beam indication, and the second TCI state in the indicated N=2 or M=2 Unified TCI states could be associated with the second entity ID/index such as the second PCI, CORESETPoolIndex value 1 or CORESETGroupIndex value 1 indicated in the same DCI (e.g., DCI format 1_1 or 1_2 with or without DL assignment) for Unified TCI state/beam indication. In the present disclosure, the UE could be provided by PDCCH-Config multiple (e.g., two) CORESETGroupIndex values (e.g., 0 and 1). The association of a CORESET and a CORESETGroupIndex value could be via indicating the explicit CORESETGroupIndex value (e.g., either 0 or 1) in the parameter, e.g., the higher layer parameter ControlResourceSet, configuring the CORESET.

Figure 16:
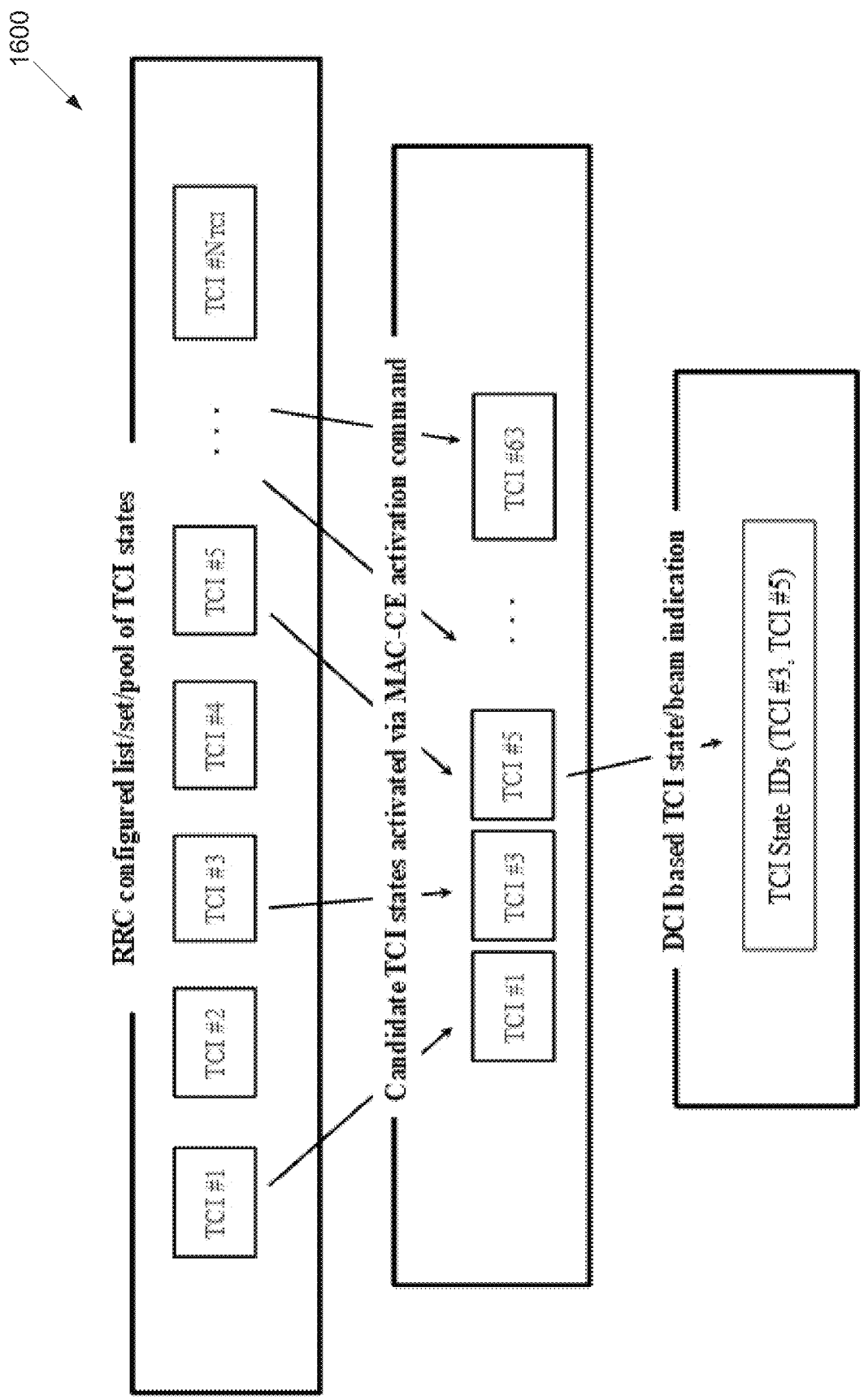
FIG. 16 illustrates another example of DCI based unified TCI state/beam indication with MAC CE activated TCI states according to embodiments of the present disclosure.

FIG. 16 illustrates another example of DCI based unified TCI state/beam indication with MAC CE activated TCI states 1600 according to embodiments of the present disclosure. An embodiment of the DCI based unified TCI state/beam indication with MAC CE activated TCI states 1600 shown in FIG. 16 is for illustration only.

In FIG. 16, an example of DCI based unified TCI state/beam indication (with MAC CE activated TCI states) for the multi-TRP operation is presented. As illustrated in FIG. 16, the UE could be first higher layer configured by the network, e.g., via the higher layer RRC signaling, a list/pool of N_tci TCI states. Each TCI state contains at least a QCL source RS with a QCL type, e.g., QCL-typeA/B/C/D.

The UE could then receive from the network one or more MAC CE activation commands activating one or more TCI states from the higher layer configured list/pool of TCI states, e.g., up to eight TCI states could be activated by a MAC CE activation command. The UE could receive from the network one or more DCIs to indicate one or more beam(s) (i.e., the Unified TCI state(s)) from the MAC CE activated TCI state(s)/beam(s) for UE-dedicated reception on PDSCH/PDCCH or dynamic-grant/configured-grant based PUSCH and all of dedicated PUCCH resources associated with one or more TRPs in a multi-TRP system. For instance, the UE could receive from the network a single DCI to indicate M'>1 Unified TCI states/beams (e.g., M'>1 joint DL and UL TCI states or M'>1 separate UL TCI states) from the MAC CE activated TCI states/beams for the same PUSCH(s)/PUCCH(s) transmitted to/associated with different TRPs in the multi-TRP system.

As described above, a DCI used to indicate to the UE a beam (i.e., a TCI state and/or a TCI state ID) for the transmission/reception of a PDCCH or a PDSCH could be at least one of the following example.

In one example, a DL related DCI (e.g., DCI format 1_0, DCI format 1_1 or DCI format 1_2) could be used to indicate to the UE a beam (i.e., a TCI state and/or a TCI state ID) for the transmission/reception of a PDCCH or a PDSCH, wherein the DL related DCI may or may not include a DL assignment.

In another example, an UL related DCI (e.g., DCI format 0_0, DCI format 0_1, DCI format 0_2) could be used to indicate to the UE a beam (i.e., a TCI state and/or a TCI state ID) for the transmission/reception of a PDCCH or a PDSCH, wherein the UL related DCI may or may not include an UL scheduling grant.

Yet in another example, a custom/purpose designed DCI format could be used to indicate to the UE a beam (i.e., a TCI state and/or a TCI state ID) for the transmission/reception of a PDCCH or a PDSCH.

Furthermore, the Unified TCI state indicated in the DCI for beam indication could be at least one of: (1) a DL TCI state; (2) an UL TCI state; (3) a joint DL and UL TCI state; or (4) a separate DL TCI state and UL TCI state.

The association/mapping between the DCI(s) indicated TCI state(s)/beam(s)—from the MAC CE activated TCI state(s)/beam(s)—and the TRPs in the multi-TRP system needs to be specified. There could be various means to associate/map the DCI(s) indicated TCI state(s)/beam(s)—from the MAC CE activated TCI state(s)/beam(s)—and the TRPs in the multi-TRP system.

For N'>1 TCI states/beams indication in a single DCI, following examples can be provided.

In one example, the UE could be explicitly indicated by the network, e.g., via higher layer RRC signaling and/or MAC CE command and/or dynamic DCI signaling, the exact association/mapping between the DCI indicated TCI states/beams (selected from the MAC CE activated TCI states/beams) and the TRPs in the multi-TRP system. For example, the UE could be first higher layer configured by the network a list/set/pool of TRP-specific ID/index values such as PCIs. The first TCI state and/or the TCI state with the lowest TCI state ID value indicated in the DCI for beam indication could correspond to the first entry/TRP in the list/set/pool of TRP-specific ID/index values, the second TCI state and/or the TCI state with the second lowest TCI state ID value indicated in the DCI for beam indication could correspond to the second entry/TRP in the list/set/pool of TRP-specific ID/index values, and so on, and the last TCI state and/or the TCI state with the highest TCI state ID value indicated in the DCI for beam indication could correspond to the last entry/TRP in the list/set/pool of TRP-specific ID/index values.

For another example, the UE could be first higher layer configured by the network a list/set/pool of TRP-specific ID/index values such as PCIs. The UE could then receive from the network one or more MAC CE activation commands/bitmaps to activate one or more TRP-specific ID/index values from the higher layer configured list/set/pool of TRP-specific ID/index values. The first TCI state and/or the TCI state with the lowest TCI state ID value indicated in the DCI for beam indication could correspond to the first MAC CE(s)/bitmap(s) activated TRP-specific ID/index value, the second TCI state and/or the TCI state with the second lowest TCI state ID value indicated in the DCI for beam indication could correspond to the second MAC CE(s)/bitmap(s) activated TRP-specific ID/index value, and so on, and the last TCI state and/or the TCI state with the highest TCI state ID value indicated in the DCI for beam indication could correspond to the last MAC CE(s)/bitmap(s) activated TRP-specific ID/index value.

Other exact association/mapping relationships between the DCI indicated TCI states/beams (selected from the MAC CE activated TCI states/beams) and the TRPs in the multi-TRP system and/or the corresponding indication method(s), e.g., via higher layer RRC signaling and/or MAC CE command and/or dynamic DCI signaling, are also possible.

In another example, the UE could be implicitly indicated by the network the association/mapping between the DCI indicated TCI states/beams (selected from the MAC CE activated TCI states/beams) and the TRPs in the multi-TRP system. The UE could be higher layer configured by the network a list/set/pool of TRP-specific ID/index values such as PCIs. The UE could also receive from the network one or more MAC CE activation commands/bitmaps to activate one or more TRP-specific ID/index values from the higher layer configured list/set/pool of TRP-specific ID/index values.

For example, the first TCI state and/or the TCI state with the lowest TCI state ID value indicated in the DCI for beam indication could correspond to the TRP with the lowest/lowest MAC CE activated TRP-specific ID/index value such as the lowest PCI value and/or the first TRP (e.g., TRP #1), the second TCI state and/or the TCI state with the second lowest TCI state ID value indicated in the DCI for beam indication could correspond to the TRP with the second lowest/second lowest MAC CE activated TRP-specific ID/index value such as the second lowest PCI value and/or the second TRP (e.g., TRP #2), and so on, and the last TCI state and/or the TCI state with the highest TCI state ID value indicated in the DCI for beam indication could correspond to the TRP with the highest/highest MAC CE activated TRP-specific ID/index value such as the highest PCI value and/or the last TRP (e.g., TRP #N').

For another example, the first TCI state and/or the TCI state with the lowest TCI state ID value indicated in the DCI for beam indication could correspond to the TRP with the highest/highest MAC CE activated TRP-specific ID/index value such as the highest PCI value and/or the last TRP (e.g., TRP #N'), the second TCI state and/or the TCI state with the second lowest TCI state ID value indicated in the DCI for beam indication could correspond to the TRP with the second highest/second highest MAC CE activated TRP-specific ID/index value such as the second highest PCI value and/or the second last TRP (e.g., TRP #N'-1), and so on, and the last TCI state and/or the TCI state with the highest TCI state ID value indicated in the DCI for beam indication could correspond to the TRP with the lowest/lowest MAC CE activated TRP-specific ID/index value such as the lowest PCI value and/or the first TRP (e.g., TRP #1). Other implicit indication methods of the association/mapping between the N'>1 DCI indicated TCI states/beams (selected from the MAC CE activated TCI states/beams) and the TRPs in the multi-TRP system are also possible.

In yet another example, the UE could be explicitly indicated by the network, e.g., via higher layer RRC signaling and/or MAC CE command and/or dynamic DCI signaling, the exact association/mapping between the DCI indicated TCI states/beams (selected from the MAC CE activated TCI states/beams) and the CORESETPoolIndex values.

For example, the UE could be first higher layer configured by the network a list/set/pool of CORESETPoolIndex values—e.g., a set of two CORESETPoolIndex values 0 and 1. The first TCI state and/or the TCI state with the lowest TCI state ID value indicated in the DCI for beam indication could correspond to the first entry/CORESETPoolIndex value in the list/set/pool of CORESETPoolIndex values, the second TCI state and/or the TCI state with the second lowest TCI state ID value indicated in the DCI for beam indication could correspond to the second entry/CORESETPoolIndex value in the list/set/pool of CORESETPoolIndex values, and so on, and the last TCI state and/or the TCI state with the highest TCI state ID value indicated in the DCI for beam indication could correspond to the last entry/CORESETPoolIndex value in the list/set/pool of CORESETPoolIndex values.

For another example, the UE could be first higher layer configured by the network a list/set/pool of CORESET-PoolIndex values—e.g., a set of two CORESETPoolIndex values 0 and 1. The UE could then receive from the network one or more MAC CE activation commands/bitmaps to activate one or more CORESETPoolIndex values from the higher layer configured list/set/pool of CORESETPoolIndex values. The first TCI state and/or the TCI state with the lowest TCI state ID value indicated in the DCI for beam indication could correspond to the first MAC CE(s)/bitmap(s) activated CORESETPoolIndex value, the second TCI state and/or the TCI state with the second lowest TCI state ID value indicated in the DCI for beam indication could correspond to the second MAC CE(s)/bitmap(s) activated CORESETPoolIndex value, and so on, and the last TCI state and/or the TCI state with the highest TCI state ID value indicated in the DCI for beam indication could correspond to the last MAC CE(s)/bitmap(s) activated CORESET-PoolIndex value. Other exact association/mapping relationships between the DCI indicated TCI states/beams (selected from the MAC CE activated TCI states/beams) and the CORESETPoolIndex values and/or the corresponding indication method(s), e.g., via higher layer RRC signaling and/or MAC CE command and/or dynamic DCI signaling, are also possible.

In yet another example, the UE could be implicitly indicated by the network the association/mapping between the DCI indicated TCI states/beams (selected from the MAC CE activated TCI states/beams) and the CORESETPoolIndex values. The UE could be higher layer configured by the network a list/set/pool of CORESETPoolIndex values—e.g., a set of two CORESETPoolIndex values 0 and 1. The UE could also receive from the network one or more MAC CE activation commands/bitmaps to activate one or more CORESETPoolIndex values from the higher layer configured list/set/pool of CORESETPoolIndex values.

For example, the first TCI state and/or the TCI state with the lowest TCI state ID value indicated in the DCI for beam indication could correspond to the lowest/lowest MAC CE activated CORESETPoolIndex value such as "0," the second TCI state and/or the TCI state with the second lowest TCI state ID value indicated in the DCI for beam indication could correspond to the second lowest/second lowest MAC CE activated CORESETPoolIndex value such as "1," and so on, and the last TCI state and/or the TCI state with the highest TCI state ID value indicated in the DCI for beam indication could correspond to the highest/highest MAC CE activated CORESETPoolIndex value such as "N−1."

For another example, the first TCI state and/or the TCI state with the lowest TCI state ID value indicated in the DCI for beam indication could correspond to the highest/highest MAC CE activated CORESETPoolIndex value, the second TCI state and/or the TCI state with the second lowest TCI state ID value indicated in the DCI for beam indication could correspond to the second highest/second highest MAC CE activated CORESETPoolIndex value, and so on, and the last TCI state and/or the TCI state with the highest TCI state ID value indicated in the DCI for beam indication could correspond to the lowest/lowest MAC CE activated CORE-SETPoolIndex value. Other implicit indication methods of the association/mapping between the N'>1 DCI indicated TCI states/beams (selected from the MAC CE activated TCI states/beams) and the CORESETPoolIndex values are also possible.

In yet another example, a TCI state (selected from the MAC CE activated TCI states/beams), e.g., the higher layer parameter TCI-State, indicated in the MAC CE command for beam indication could include/comprise/incorporate at least one ID/index value. For example, this ID/index value could be a (absolute) TRP-specific ID/index value such as PCI value, TRP ID value, TRP index value and etc., based on a list/set/pool of TRP-specific ID/index values, e.g., higher layer configured to the UE and/or higher layer configured to the UE and activated by one or more MAC CE activation commands/bitmaps. For another example, this ID/index value could be an (relative) index within the list/set/pool of TRP-specific ID/index values, e.g., higher layer configured to the UE and/or higher layer configured to the UE and activated by one or more MAC CE activation commands/bitmaps. For yet another example, this ID/index value could be a CORESETPoolIndex value.

In yet another example, the DCI (e.g., DCI format 1_1 or 1_2 with or without DL assignment) for Unified TCI state/beam indication could include/comprise/incorporate at least one (e.g., N'>1 or M'>1) entity ID/index. In the present disclosure, an entity ID/index could correspond to a PCI value, a PCI index corresponding/pointing to a PCI in a list/set/pool of PCIs higher layer configured to the UE, a CORESETPoolIndex value, a CORESETGroupIndex value, a TRP-specific ID/index, a TRP-specific higher layer signaling index/ID, a one-bit flag indicating either the serving cell PCI or a PCI different from the serving cell PCI, a multi-bit indicator with each state of the indicator indicating a PCI, or etc. For this case, the n'-th or m'-th TCI state (e.g., the n'-th or m'-th joint DL and UL TCI state or separate DL TCI state or separate UL TCI state) among/within the indicated N'>1 or M'>1 Unified TCI states (selected from the MAC CE activated TCI states/beams) could be associated with the n'-th or m'-th entity ID/index indicated in the same DCI (e.g., DCI format 1_1 or 1_2 with or without DL assignment) for Unified TCI state/beam indication, where $n' \in \{1, \ldots, N'\}$ or $m' \in \{1, \ldots, M'\}$.

For instance, the first TCI state in the indicated N'=2 or M'=2 Unified TCI states selected from the MAC CE activated TCI states could be associated with the first entity ID/index such as the first PCI, CORESETPoolIndex value 0 or CORESETGroupIndex value 0 indicated in the same DCI (e.g., DCI format 1_1 or 1_2 with or without DL assignment) for Unified TCI state/beam indication, and the second TCI state in the indicated N'=2 or M'=2 Unified TCI states selected from the MAC CE activated TCI states could be associated with the second entity ID/index such as the second PCI, CORESETPoolIndex value 1 or CORESET-GroupIndex value 1 indicated in the same DCI (e.g., DCI format 1_1 or 1_2 with or without DL assignment) for Unified TCI state/beam indication. In the present disclosure, the UE could be provided by PDCCH-Config multiple (e.g., two) CORESETGroupIndex values (e.g., 0 and 1). The association of a CORESET and a CORESETGroupIndex value could be via indicating the explicit CORESET-GroupIndex value (e.g., either 0 or 1) in the parameter, e.g., the higher layer parameter ControlResourceSet, configuring the CORESET.

For N'>1 DCIs with each DCI indicating a single TCI state/beam, following examples may be provided.

In one example, the UE could be explicitly indicated by the network, e.g., via higher layer RRC signaling and/or MAC CE command and/or dynamic DCI signaling, the exact association/mapping between the DCIs for beam indication (and therefore, the TCI states/beams indicated therein—selected from the MAC CE activated TCI states/beams) and the TRPs in the multi-TRP system.

For example, the UE could be first higher layer configured by the network a list/set/pool of TRP-specific ID/index values such as PCIs. The DCI for beam indication associated with the lowest CORESETPoolIndex value (indicated in the corresponding higher layer parameter ControlResourceSet) and/or the DCI for beam indication indicating the TCI state with the lowest TCI state ID value could correspond to the first entry/TRP in the list/set/pool of TRP-specific ID/index values, the DCI for beam indication associated with the second lowest CORESETPoolIndex value (indicated in the corresponding higher layer parameter ControlResourceSet) and/or the DCI for beam indication indicating the TCI state with the second lowest TCI state ID value could correspond to the second entry/TRP in the list/set/pool of TRP-specific ID/index values, and so on, and the DCI for beam indication associated with the highest CORESETPoolIndex value (indicated in the corresponding higher layer parameter ControlResourceSet) and/or the DCI for beam indication indicating the TCI state with the highest TCI state ID value could correspond to the last entry/TRP in the list/set/pool of TRP-specific ID/index values.

For another example, the UE could be first higher layer configured by the network a list/set/pool of TRP-specific ID/index values such as PCIs. The UE could then receive from the network one or more MAC CE activation commands/bitmaps to activate one or more TRP-specific ID/index values from the higher layer configured list/set/pool of TRP-specific ID/index values. The DCI for beam indication associated with the lowest CORESETPoolIndex value (indicated in the corresponding higher layer parameter ControlResourceSet) and/or the DCI for beam indication indicating the TCI state with the lowest TCI state ID value could correspond to the first MAC CE(s)/bitmap(s) activated TRP-specific ID/index values, the DCI for beam indication associated with the second lowest CORESETPoolIndex value (indicated in the corresponding higher layer parameter ControlResourceSet) and/or the DCI for beam indication indicating the TCI state with the second lowest TCI state ID value could correspond to the second MAC CE(s)/bitmap(s) activated TRP-specific ID/index values, and so on, and the DCI for beam indication associated with the highest CORESETPoolIndex value (indicated in the corresponding higher layer parameter ControlResourceSet) and/or the DCI for beam indication indicating the TCI state with the highest TCI state ID value could correspond to the last MAC CE(s)/bitmap(s) activated TRP-specific ID/index values.

Other exact association/mapping relationships between the DCIs for beam indication (and therefore, the TCI states/beams indicated therein—selected from the MAC CE activated TCI states/beams) and the TRPs in the multi-TRP system and/or the corresponding indication method(s), e.g., via higher layer RRC signaling and/or MAC CE command and/or dynamic DCI signaling, are also possible.

In another example, the UE could be implicitly indicated by the network the association/mapping between the DCIs for beam indication (and therefore, the TCI states/beams indicated therein—selected from the MAC CE activated TCI states/beams) and the TRPs in the multi-TRP system. The UE could be higher layer configured by the network a list/set/pool of TRP-specific ID/index values such as PCIs. The UE could also receive from the network one or more MAC CE activation commands/bitmaps to activate one or more TRP-specific ID/index values from the higher layer configured list/set/pool of TRP-specific ID/index values.

For example, the DCI for beam indication associated with the lowest CORESETPoolIndex value (indicated in the corresponding higher layer parameter ControlResourceSet) and/or the DCI for beam indication indicating the lowest TCI state ID value could correspond to the TRP with the lowest/lowest MAC CE activated TRP-specific ID/index value such as the lowest PCI value and/or the first TRP (e.g., TRP #1), the DCI for beam indication associated with the second lowest CORESETPoolIndex value (indicated in the corresponding higher layer parameter ControlResourceSet) and/or the DCI for beam indication indicating the second lowest TCI state ID value could correspond to the TRP with the second lowest/second lowest MAC CE activated TRP-specific ID/index value such as the second lowest PCI value and/or the second TRP (e.g., TRP #2), and so on, and the DCI for beam indication associated with the highest CORESETPoolIndex value (indicated in the corresponding higher layer parameter ControlResourceSet) and/or the DCI for beam indication indicating the highest TCI state ID value could correspond to the TRP with the highest/highest MAC CE activated TRP-specific ID/index value such as the highest PCI value and/or the last TRP (e.g., TRP #N').

For another example, the DCI for beam indication associated with the lowest CORESETPoolIndex value (indicated in the corresponding higher layer parameter ControlResourceSet) and/or the DCI for beam indication indicating the lowest TCI state ID value could correspond to the TRP with the highest/highest MAC CE activated TRP-specific ID/index value such as the highest PCI value and/or the last TRP (e.g., TRP #N'), the DCI for beam indication associated with the second lowest CORESETPoolIndex value (indicated in the corresponding higher layer parameter ControlResourceSet) and/or the DCI for beam indication indicating the second lowest TCI state ID value could correspond to the TRP with the second highest/second highest MAC CE activated TRP-specific ID/index value such as the second highest PCI value and/or the second last TRP (e.g., TRP #N'−1), and so on, and the DCI for beam indication associated with the highest CORESETPoolIndex value (indicated in the corresponding higher layer parameter ControlResourceSet) and/or the DCI for beam indication indicating the highest TCI state ID value could correspond to the TRP with the lowest/lowest MAC CE activated TRP-specific ID/index value such as the lowest PCI value and/or the first TRP (e.g., TRP #1).

Other implicit indication methods of the association/mapping between the N'>1 DCIs for beam indication (and therefore, the TCI states/beams indicated therein—selected from the MAC CE activated TCI states/beams) and the TRPs in the multi-TRP system are also possible.

In yet another example, a DCI for beam indication (indicating the TCI state(s)/beam(s) selected from the MAC CE activated TCI states/beams) could include/comprise/incorporate at least one ID/index value.

For example, this ID/index value could be a (absolute) TRP-specific ID/index value such as PCI value, TRP ID value, TRP index value and etc., based on a list/set/pool of TRP-specific ID/index values, e.g., higher layer configured to the UE and/or higher layer configured to the UE and activated by one or more MAC CE activation commands/bitmaps. For another example, this ID/index value could be an (relative) index within the list/set/pool of TRP-specific ID/index values, e.g., higher layer configured to the UE and/or higher layer configured to the UE and activated by one or more MAC CE activation commands/bitmaps.

For yet another example, this ID/index value could be a CORESETPoolIndex value. The DCI for beam indication (indicating the TCI state(s)/beam(s) selected from the MAC CE activated TCI states/beams) may indicate/update the corresponding TCI state(s) for the TRP(s) associated with the same ID/index value, e.g., the CORESETPoolIndex value, as that indicated in the DCI for beam indication (indicating the TCI state(s)/beam(s) selected from the MAC CE activated TCI states/beams).

In yet another example, a DCI (e.g., DCI format 1_1 or 1_2 with or without DL assignment) for Unified TCI state/beam indication could include/comprise/incorporate at least one (e.g., N'>1 or M'>1) entity ID/index. In the present disclosure, an entity ID/index could correspond to a PCI value, a PCI index corresponding/pointing to a PCI in a list/set/pool of PCIs higher layer configured to the UE, a CORESETPoolIndex value, a CORESETGroupIndex value, a TRP-specific ID/index, a TRP-specific higher layer signaling index/ID, a one-bit flag indicating either the serving cell PCI or a PCI different from the serving cell PCI, a multi-bit indicator with each state of the indicator indicating a PCI, or etc.

For this case, the n'-th or m'-th TCI state (e.g., the n'-th or m'-th joint DL and UL TCI state or separate DL TCI state or separate UL TCI state) among/within the indicated N'>1 or M'>1 Unified TCI states (selected from the MAC CE activated TCI states/beams) could be associated with the n'-th or m'-th entity ID/index indicated in the same DCI (e.g., DCI format 1_1 or 1_2 with or without DL assignment) for Unified TCI state/beam indication, where n'∈{1, . . . , N'} or m'∈{1, . . . , M'}. For instance, the first TCI state in the indicated N'=2 or M'=2 Unified TCI states selected from the MAC CE activated TCI states could be associated with the first entity ID/index such as the first PCI, CORESETPoolIndex value 0 or CORESETGroupIndex value 0 indicated in the same DCI (e.g., DCI format 1_1 or 1_2 with or without DL assignment) for Unified TCI state/beam indication, and the second TCI state in the indicated N'=2 or M'=2 Unified TCI states selected from the MAC CE activated TCI states could be associated with the second entity ID/index such as the second PCI, CORESETPoolIndex value 1 or CORESETGroupIndex value 1 indicated in the same DCI (e.g., DCI format 1_1 or 1_2 with or without DL assignment) for Unified TCI state/beam indication.

In the present disclosure, the UE could be provided by PDCCH-Config multiple (e.g., two) CORESETGroupIndex values (e.g., 0 and 1). The association of a CORESET and a CORESETGroupIndex value could be via indicating the explicit CORESETGroupIndex value (e.g., either 0 or 1) in the parameter, e.g., the higher layer parameter ControlResourceSet, configuring the CORESET.

As discussed in the present disclosure, in a single-DCI based multi-TRP system, one or more CORESETs could be configured with a same group index, denoted by CORESETGroupIndex. The CORESETs configured with the same CORESETGroupIndex value could be associated with the same TRP in a multi-TRP system. In the present disclosure, the UE could be provided by PDCCH-Config multiple (e.g., two) CORESETGroupIndex values (e.g., 0 and 1). The association of a CORESET and a CORESETGroupIndex value could be via indicating the explicit CORESETGroupIndex value (e.g., either 0 or 1) in the parameter, e.g., the higher layer parameter ControlResourceSet, configuring the CORESET.

As discussed in the present disclosure, the UE could be provided by the network, e.g., via a MAC CE or a DCI (e.g., DCI format 1_1 or 1_2 with or without DL assignment) through the higher layer parameter TCI-State_r17 or DLorJoint-TCIState or UL-TCIState, M≥1 joint DL and UL Unified TCI states or M≥1 separate UL Unified TCI states or a first combination of M≥1 joint DL and UL Unified TCI states and separate UL Unified TCI states or N≥1 separate DL Unified TCI states or a second combination of N≥1 joint DL and UL Unified TCI states and separate DL Unified TCI states or a third combination of N≥1 joint DL and UL Unified TCI states, separate DL Unified TCI states and separate UL Unified TCI states for UE-dedicated reception on PDSCH/PDCCH or dynamic-grant/configured-grant based PUSCH and all of dedicated PUCCH resources.

For this case, DM-RS antenna ports for PDCCH receptions in one or more CORESETs associated with a CORESETGroupIndex value may or may not be quasi co-located with the reference signal provided in the corresponding indicated Unified TCI state (e.g., one out of the indicated M≥1 joint DL and UL TCI states or M≥1 separate UL TCI states or N≥1 separate DL TCI states) associated with the same CORESETGroupIndex value. In the present disclosure, the control resource set(s)—associated with a CORESETGroupIndex value—whose QCL assumption(s) follow that provided in the corresponding indicated Unified TCI state or sharing the corresponding indicated Unified TCI state associated with the same CORESETGroupIndex value is referred to as Type-1 CORESET(s), while the control resource set(s)—associated with a CORESETGroupIndex value—whose QCL assumption(s) does not follow that provided in the corresponding indicated Unified TCI state or not sharing the corresponding indicated Unified TCI state associated with the same CORESETGroupIndex value is referred to as Type-2 CORESET(s).

Furthermore, a Type-1 CORESET or a Type-2 CORESET could correspond to one or more of: (1) "CORESET A": a CORESET other than CORESET with index 0 (or CORESET #0) associated with only UE-dedicated PDCCH reception(s) in a CC, comprising, e.g., CORESET(s) associated with USS set(s) or Type3-PDCCH CSS set(s); (2) "CORESET B": a CORESET other than CORESET #0 associated with only non-UE-dedicated PDCCH reception(s) in a CC, comprising, e.g., CORESET(s) associated with all types of CSS sets such as Type0/0A/1/2/3-PDCCH CSS sets or CSS sets other than Type3-PDCCH CSS set(s) such as Type0/0A/1/2-PDCCH CSS sets; (3) "CORESET C": a CORESET other than CORESET #0 associated with both UE-dedicated and non-UE-dedicated PDCCH receptions in a CC; or (4) CORESET #0, i.e., CORESET with index 0.

The UE could be provided/configured with "useIndicatedR17TCIState" for one or more of the Type-1 CORESETs. For instance, the UE could be provided/configured with "useIndicatedR17TCIstate" set to "enabled" in the parameter, e.g., the higher layer parameter ControlResourceSet, that configures the corresponding Type-1 CORESET(s).

For a single-DCI based multi-TRP system wherein a UE could be provided by the network, e.g., via a MAC CE or a beam indication DCI (e.g., DCI format 1_1 or 1_2 with or without DL assignment) through the higher layer parameter TCI-State_r17 or DLorJoint-TCIstate or UL-TCIState, M≥1 joint DL and UL unified TCI states or M≥1 separate UL unified TCI states or a first combination of M≥1 joint DL and UL unified TCI states and separate UL unified TCI states or N≥1 separate DL unified TCI states or a second combination of N≥1 joint DL and UL unified TCI states and separate DL unified TCI states or a third combination of N≥1 joint DL and UL unified TCI states, separate DL unified TCI states and separate UL unified TCI states for UE-dedicated reception on PDSCH/PDCCH or dynamic-grant/configured-grant based PUSCH and all of dedicated PUCCH resources, a BFD RS set could include one or more BFD RS resource indexes associated with one or more indicated unified TCI states associated with a same CORESETGroupIndex value.

In the present disclosure, the BFD RS set n (or m) or the n-th (or m-th) BFD RS set including one or more BFD RS resource indexes could be associated with/configured for the indicated unified TCI state n (or m) or the n-th (or m-th) indicated unified TCI state—e.g., among all the indicated N (or M) unified TCI states via one or more TCI codepoints of one or more TCI fields in one or more beam indication DCIs—associated with CORESETGroupIndex value n−1 (or m−1), where n∈{1, . . . , N} and m∈{1, . . . , M}. In particularly, for N=2 (or M=2), the first BFD RS set including one or more BFD RS resource indexes could be associated with/configured for the first indicated unified TCI state—e.g., among the N=2 (M=2) unified TCI states indicated by a TCI codepoint of the TCI field in the beam indication DCI—associated with value 0 of CORESET-GroupIndex, and the second BFD RS set including one or more BFD RS resource indexes could be associated with/configured for the second indicated unified TCI state—e.g., among the N=2 (M=2) unified TCI states indicated by a TCI codepoint of the TCI field in the beam indication DCI—associated with value 1 of CORESETGroupIndex. In the present disclosure, the indicated unified TCI state n or m could correspond to the n-th joint DL and UL TCI state or the m-th separate UL TCI state or the n-th separate DL TCI state or the m-th TCI state in the first combination of TCI states or the n-th TCI state in the second combination of TCI states or the n-th TCI state in the third combination of TCI states or the joint DL and UL TCI state with the n-th lowest or highest TCI state ID or the separate UL TCI state with the m-th lowest or highest TCI state ID or the separate DL TCI state with the n-th lowest or highest TCI state ID or the TCI state in the first combination of TCI states with the m-th lowest or highest TCI state ID or the TCI state in the second combination of TCI states with the n-th lowest or highest TCI state ID or the TCI state in the third combination of TCI states with the n-th lowest or highest TCI state ID, where n∈{1, . . . , N} and m∈{1, . . . , M}.

The UE could implicitly determine the BFD RS set n∈{1, . . . , N} (or m∈{1, . . . , M}) q0_n (or q0_m) in a single-DCI based multi-TRP system under the Unified TCI framework, wherein the UE could be provided by the network, e.g., via a MAC CE or a DCI (e.g., DCI format 1_1 or 1_2 with or without DL assignment) through the higher layer parameter TCI-State_r17 or DLorJoint-TCIState or UL-TCIState, M≥1 joint DL and UL unified TCI states or M≥1 separate UL unified TCI states or a first combination of M≥1 joint DL and UL unified TCI states and separate UL unified TCI states or N≥1 separate DL unified TCI states or a second combination of N≥1 joint DL and UL unified TCI states and separate DL unified TCI states or a third combination of N≥1 joint DL and UL unified TCI states, separate DL unified TCI states and separate UL unified TCI states for UE-dedicated reception on PDSCH/PDCCH or dynamic-grant/configured-grant based PUSCH and all of dedicated PUCCH resources.

In one example, when a first condition is achieved/met/satisfied/triggered, the UE could determine the BFD RS set q0_n (or q0_m) to include periodic CSI-RS resource configuration indexes or SSB indexes (also referred to as BFD RS resource indexes) with same values as the RS indexes in the RS sets indicated in the unified TCI state n (or m), e.g., among the N (or M) unified TCI states indicated by one or more TCI codepoints of one or more TCI fields in one or more beam indication DCIs—associated with CORESET-GroupIndex value n−1 (or m−1)—provided by the higher layer parameter TCI-State-r17 or DLorJointTCI-State or UL-TCIState for respective Type-1 CORESETs associated with CORESETGroupIndex value n−1 (or m−1) that the UE uses for monitoring PDCCH, where n∈{1, . . . , N} and m∈{1, . . . , M}.

That is, for N=2 (or M=2), when the first condition is achieved/met/satisfied/triggered, the UE could determine the first BFD RS set q0_0 to include periodic CSI-RS resource configuration indexes or SSB indexes (also referred to as BFD RS resource indexes) with same values as the RS indexes in the RS sets indicated in the first (or second) indicated unified TCI state, e.g., among the N=2 (or M=2) unified TCI states indicated by a TCI codepoint of the TCI field in the beam indication DCI—associated with value 0 (or 1) of CORESETGroupIndex—provided by the higher layer parameter TCI-State-r17 or DLorJointTCI-State or UL-TCIState for respective Type-1 CORESETs associated with value 0 (or 1) of CORESETGroupIndex that the UE uses for monitoring PDCCH, and the second BFD RS set q0_1 to include periodic CSI-RS resource configuration indexes or SSB indexes (also referred to as BFD RS resource indexes) with same values as the RS indexes in the RS sets indicated in the second (or first) indicated unified TCI state, e.g., among the N=2 (or M=2) unified TCI states indicated by a TCI codepoint of the TCI field in the beam indication DCI—associated with value 1 (or 0) of CORESETGroupIndex—provided by the higher layer parameter TCI-State-r17 or DLorJointTCI-State or UL-TCIState for respective Type-1 CORESETs associated with value 1 (or 0) of CORESETGroupIndex that the UE uses for monitoring PDCCH.

In another example, when a first condition is achieved/met/satisfied/triggered, the UE could determine the BFD RS set q0_n (or q0_m) to include periodic CSI-RS resource configuration indexes or SSB indexes (also referred to as BFD RS resource indexes) with same values as the RS indexes in the RS sets indicated in the TCI state n (or m)—associated with CORESETGroupIndex value n−1 (or m−1)—provided by the higher layer parameter TCI-State for respective Type-2 CORESETs associated with CORESET-GroupIndex value n−1 (or m−1) that the UE uses for monitoring PDCCH, where n∈{1, . . . , N} and m∈{1, . . . , M}.

That is, for N=2 (or M=2), when the first condition is achieved/met/satisfied/triggered, the UE could determine the first BFD RS set q0_0 to include periodic CSI-RS resource configuration indexes or SSB indexes (also referred to as BFD RS resource indexes) with same values as the RS indexes in the RS sets indicated in the first (or second) indicated TCI state, e.g., among the N=2 (or M=2) indicated TCI states—associated with value 0 (or 1) of CORESET-GroupIndex—provided by the higher layer parameter TCI-State for respective Type-2 CORESETs associated with value 0 (or 1) of CORESETGroupIndex that the UE uses for monitoring PDCCH, and the second BFD RS set q0_1 to include periodic CSI-RS resource configuration indexes or SSB indexes (also referred to as BFD RS resource indexes) with same values as the RS indexes in the RS sets indicated in the second (or first) indicated TCI state, e.g., among the N=2 (or M=2) indicated TCI states—associated with value 1 (or 0) of CORESETGroupIndex—provided by the higher layer parameter TCI-State for respective Type-2 CORESETs associated with value 1 (or 0) of CORESETGroupIndex that the UE uses for monitoring PDCCH.

In yet another example, when a first condition is achieved/met/satisfied/triggered, the UE could determine the BFD RS set q0_n (or q0_m) to include periodic CSI-RS resource configuration indexes or SSB indexes (also referred to as BFD RS resource indexes) with same values as the RS indexes in the RS sets indicated in the unified TCI state n (or m), e.g., among the N (or M) unified TCI states indicated by one or more TCI codepoints of one or more TCI fields in one or more beam indication DCIs—provided by the higher layer parameter TCI-State-r17 or DLorJoint-TCIState or UL-TCIState—for respective Type-1 CORESETs associated with CORESETGroupIndex value n−1 (or m−1) that the UE uses for monitoring PDCCH, and periodic CSI-RS resource configuration indexes or SSB indexes (also referred to as BFD RS resource indexes) with same values as the RS indexes in the RS sets indicated in the TCI state n (or m) provided by the higher layer parameter TCI-State for respective Type-2 CORESETs associated with CORESETGroupIndex value n−1 (or m−1) that the UE uses for monitoring PDCCH, where n∈{1, . . . , N} and m∈{1, . . . , M}.

That is, for N=2 (or M=2), when the first condition is achieved/met/satisfied/triggered, the UE could determine the first BFD RS set q0_0 to include periodic CSI-RS resource configuration indexes or SSB indexes (also referred to as BFD RS resource indexes) with same values as the RS indexes in the RS sets indicated in the first (or second) indicated unified TCI state, e.g., among the N=2 (or M=2) unified TCI states indicated by a TCI codepoint of the TCI field in the beam indication DCI—associated with value 0 (or 1) of CORESETGroupIndex—provided by the higher layer parameter TCI-State-r17 or DLorJointTCI-State or UL-TCIState for respective Type-1 CORESETs associated with value 0 (or 1) of CORESETGroupIndex that the UE uses for monitoring PDCCH and periodic CSI-RS resource configuration indexes or SSB indexes (also referred to as BFD RS resource indexes) with same values as the RS indexes in the RS sets indicated in the first (or second) indicated TCI state, e.g., among the N=2 (or M=2) indicated TCI states—associated with value 0 (or 1) of CORESETGroupIndex—provided by the higher layer parameter TCI-State for respective Type-2 CORESETs associated with value 0 (or 1) of CORESETGroupIndex that the UE uses for monitoring PDCCH, and the second BFD RS set q0_1 to include periodic CSI-RS resource configuration indexes or SSB indexes (also referred to as BFD RS resource indexes) with same values as the RS indexes in the RS sets indicated in the second (or first) indicated unified TCI state, e.g., among the N=2 (or M=2) unified TCI states indicated by a TCI codepoint of the TCI field in the beam indication DCI—associated with value 1 (or 0) of CORESETGroupIndex—provided by the higher layer parameter TCI-State-r17 or DLorJointTCI-State or UL-TCIState for respective Type-1 CORESETs associated with value 1 (or 0) of CORESETGroupIndex that the UE uses for monitoring PDCCH and periodic CSI-RS resource configuration indexes or SSB indexes (also referred to as BFD RS resource indexes) with same values as the RS indexes in the RS sets indicated in the second (or first) indicated TCI state, e.g., among the N=2 (or M=2) indicated TCI states—associated with value 1 (or 0) of CORESETGroupIndex—provided by the higher layer parameter TCI-State for respective Type-2 CORESETs associated with value 1 (or 0) of CORESETGroupIndex that the UE uses for monitoring PDCCH.

In yet another example, when a first condition is achieved/met/satisfied/triggered, the UE could determine a first BFD RS set q0A_n (or q0A_m) to include periodic CSI-RS resource configuration indexes or SSB indexes (also referred to as BFD RS resource indexes) with same values as the RS indexes in the RS sets indicated in the unified TCI state n (or m), e.g., among the N (or M) unified TCI states indicated by one or more TCI codepoints of one or more TCI fields in one or more beam indication DCIs—provided by the higher layer parameter TCI-State-r17 or DLorJoint-TCIState or UL-TCIState for respective Type-1 CORESETs associated with CORESETGroupIndex value n−1 (or m−1) that the UE uses for monitoring PDCCH, and a second BFD RS set q0B_n (or q0B_m) to include periodic CSI-RS resource configuration indexes or SSB indexes (also referred to as BFD RS resource indexes) with same values as the RS indexes in the RS sets indicated in the TCI state n (or m) provided by the higher layer parameter TCI-State for respective Type-2 CORESETs associated with CORESETGroupIndex value n−1 (or m−1) that the UE uses for monitoring PDCCH, where n∈{1, . . . , N} and m∈{1, . . . , M}.

For example, for N=2 (or M=2), when the first condition is achieved/met/satisfied/triggered, the UE could determine the first of first BFD RS set q0A_0 to include periodic CSI-RS resource configuration indexes or SSB indexes (also referred to as BFD RS resource indexes) with same values as the RS indexes in the RS sets indicated in the first (or second) indicated unified TCI state, e.g., among the N=2 (or M=2) unified TCI states indicated by a TCI codepoint of the TCI field in the beam indication DCI—associated with value 0 (or 1) of CORESETGroupIndex—provided by the higher layer parameter TCI-State-r17 or DLorJointTCI-State or UL-TCIState for respective Type-1 CORESETs associated with value 0 (or 1) of CORESETGroupIndex that the UE uses for monitoring PDCCH, and the second of first BFD RS set q0A_1 to include periodic CSI-RS resource configuration indexes or SSB indexes (also referred to as BFD RS resource indexes) with same values as the RS indexes in the RS sets indicated in the second (or first) indicated unified TCI state, e.g., among the N=2 (or M=2) unified TCI states indicated by a TCI codepoint of the TCI field in the beam indication DCI—associated with value 1 (or 0) of CORESETGroupIndex—provided by the higher layer parameter TCI-State-r17 or DLorJointTCI-State or UL-TCIState for respective Type-1 CORESETs associated with value 1 (or 0) of CORESETGroupIndex that the UE uses for monitoring PDCCH. Furthermore, the UE could determine the first of second BFD RS set q0B_0 to include periodic CSI-RS resource configuration indexes or SSB indexes (also referred to as BFD RS resource indexes) with same values as the RS indexes in the RS sets indicated in the first (or second) indicated TCI state, e.g., among the N=2 (or M=2) indicated TCI states—associated with value 0 (or 1) of CORESETGroupIndex—provided by the higher layer parameter TCI-State for respective Type-2 CORESETs associated with value 0 (or 1) of CORESETGroupIndex that the UE uses for monitoring PDCCH, and the second of second BFD RS set q0B_1 to include periodic CSI-RS resource configuration indexes or SSB indexes (also referred to as BFD RS resource indexes) with same values as the RS indexes in the RS sets indicated in the second (or first) indicated TCI state, e.g., among the N=2 (or M=2) indicated TCI states—associated with value 1 (or 0) of CORESETGroupIndex—provided by the higher layer parameter TCI-State for respective Type-2 CORESETs associated with value 1 (or 0) of CORESETGroupIndex that the UE uses for monitoring PDCCH.

For another example, for N=2 (or M=2), the UE could determine a first BFD RS set q0A to include periodic CSI-RS resource configuration indexes or SSB indexes (also referred to as BFD RS resource indexes) with same values as the RS indexes in the RS sets indicated in the first (or second) indicated unified TCI state, e.g., among the N=2 (or M=2) unified TCI states indicated by a TCI codepoint of the TCI field in the beam indication DCI—associated with value 0 (or 1) of CORESETGroupIndex—provided by the higher layer parameter TCI-State-r17 or DLorJointTCI-State or UL-TCIState for respective Type-1 CORESETs associated with value 0 (or 1) of CORESETGroupIndex that the UE uses for monitoring PDCCH, and a second BFD RS set q0B to include periodic CSI-RS resource configuration indexes or SSB indexes (also referred to as BFD RS resource indexes) with same values as the RS indexes in the RS sets indicated in the second (or first) indicated TCI state, e.g., among the N=2 (or M=2) indicated TCI states—associated with value 1 (or 0) of CORESETGroupIndex—provided by the higher layer parameter TCI-State for respective Type-2 CORESETs associated with value 1 (or 0) of CORESET-GroupIndex that the UE uses for monitoring PDCCH.

Alternatively, the UE could be configured/indicated by the network the BFD RS set $n \in \{1, \ldots, N\}$ (or $m \in \{1, \ldots, M\}$) q0_n (or q0_m) in a single-DCI based multi-TRP system under the unified TCI framework, wherein the UE could be provided by the network, e.g., via a MAC CE or a beam indication DCI (e.g., DCI format 1_1 or 1_2 with or without DL assignment) through the higher layer parameter TCI-State_r17 or DLorJoint-TCIState or UL-TCIState, M≥1 joint DL and UL unified TCI states or M≥1 separate UL unified TCI states or a first combination of M≥1 joint DL and UL unified TCI states and separate UL unified TCI states or N≥1 separate DL unified TCI states or a second combination of N≥1 joint DL and UL unified TCI states and separate DL unified TCI states or a third combination of N≥1 joint DL and UL unified TCI states, separate DL unified TCI states and separate UL unified TCI states for UE-dedicated reception on PDSCH/PDCCH or dynamic-grant/configured-grant based PUSCH and all of dedicated PUCCH resources.

In one example, the UE could be configured/indicated by the network, e.g., provided by the higher layer parameter failureDetectionResourcesToAddModList and/or via BFD RS indication MAC CE, the BFD RS set q0_n (or q0_m) of periodic CSI-RS resource configuration indexes or SSB indexes for beam/link failure detection or declaration. The UE could assess the radio link quality of the BFD RS set q0_n (or q0_m) according to SSBs on the PCell or the PSCell or periodic CSI-RS resource configurations that are indicated in the unified TCI state n (or m)—associated with CORESETGroupIndex value n−1 (or m−1)—provided by the higher layer parameter TCI-State-r17 or DLorJoint-TCIState or UL-TCIState for respective Type-1 CORESETs associated with CORESETGroupIndex value n−1 (or m−1) that the UE uses for monitoring PDCCH, where $n \in \{1, \ldots, N\}$ and $m \in \{1, \ldots, M\}$, wherein based on those specified herein in the present disclosure, the unified TCI state n (or m) or equivalently the n-th (m-th) unified TCI state could be indicated by one or more unified TCI state indication/activation MAC CEs or one or more TCI codepoints in one or more TCI fields of one or more beam indication DCIs.

For instance, for N=2 (or M=2), the UE could be configured/indicated by the network, e.g., provided by the higher layer parameters failureDetectionResourcesToAddModList0 and failureDetectionResourcesToAddModList1 and/or via BFD RS indication MAC CE, a first BFD RS set q0_0 and a second BFD RS set q0_1 of periodic CSI-RS resource configuration indexes or SSB indexes, for beam/link failure detection or declaration. The UE could assess the radio link quality of the first BFD RS set q0_0 according to SSBs on the PCell or the PSCell or periodic CSI-RS resource configurations that are indicated in the first (or second) unified TCI state, e.g., among the N=2 (or M=2) unified TCI states indicated by a TCI codepoint of the TCI field in the beam indication DCI—associated with value 0 (or 1) of CORESETGroupIndex—provided by the higher layer parameter TCI-State-r17 or DLorJoint-TCIState or UL-TCIState for respective Type-1 CORESETs associated with value 0 (or 1) of CORESETGroupIndex value that the UE uses for monitoring PDCCH, and the radio link quality of the second BFD RS set q0_1 according to SSBs on the PCell or the PSCell or periodic CSI-RS resource configurations that are indicated in the second (or first) unified TCI state, e.g., among the N=2 (or M=2) unified TCI states indicated by a TCI codepoint of the TCI field in the beam indication DCI—associated with value 1 (or 0) of CORESETGroupIndex—provided by the higher layer parameter TCI-State-r17 or DLorJoint-TCIState or UL-TCIState for respective Type-1 CORESETs associated with value 1 (or 0) of CORESET-GroupIndex value that the UE uses for monitoring PDCCH.

In another example, the UE could be configured/indicated by the network, e.g., provided by the higher layer parameter failureDetectionResourcesToAddModList and/or BFD RS indication MAC CE, the BFD RS set q0_n (or q0_m) of periodic CSI-RS resource configuration indexes or SSB indexes for beam/link failure detection or declaration. The UE could assess the radio link quality of the BFD RS set q0_n (or q0_m) according to SSBs on the PCell or the PSCell or periodic CSI-RS resource configurations that are indicated in the TCI state n (or m)—associated with CORESETGroupIndex value n−1 (or m−1)—provided by the higher layer parameter TCI-State for respective Type-2 CORESETs associated with CORESETGroupIndex value n−1 (or m−1) that the UE uses for monitoring PDCCH, where $n \in \{1, \ldots, N\}$ and $m \in \{1, \ldots, M\}$.

For instance, for N=2 (or M=2), the UE could be configured/indicated by the network, e.g., provided by the higher layer parameters failureDetectionResourcesToAddModList0 and failureDetectionResourcesToAddModList1 and/or via BFD RS indication MAC CE, a first BFD RS set q0_0 and a second BFD RS set q0_1 of periodic CSI-RS resource configuration indexes or SSB indexes, for beam/link failure detection or declaration. The UE could assess the radio link quality of the first BFD RS set q0_0 according to SSBs on the PCell or the PSCell or periodic CSI-RS resource configurations that are indicated in the first (or second) TCI state, e.g., among the N=2 (or M=2) indicated TCI states—associated with value 0 (or 1) of CORESETGroupIndex—provided by the higher layer parameter TCI-State for respective Type-2 CORESETs associated with value 0 (or 1) of CORESETGroupIndex value that the UE uses for monitoring PDCCH, and the radio link quality of the second BFD RS set q0_1 according to SSBs on the PCell or the PSCell or periodic CSI-RS resource configurations that are indicated in the second (or first) TCI state, e.g., among the N=2 (or M=2) indicated TCI states—associated with value 1 (or 0) of CORESETGroupIndex—provided by the higher layer parameter TCI-State for respective Type-2 CORESETs associated with value 1 (or 0) of CORESETGroupIndex value that the UE uses for monitoring PDCCH.

In yet another example, the UE could be configured/indicated by the network, e.g., provided by the higher layer parameter failureDetectionResourcesToAddModList and/or BFD RS indication MAC CE, the BFD RS set q0_n (or q0_m) of periodic CSI-RS resource configuration indexes or SSB indexes for beam/link failure detection or declaration. The UE could assess the radio link quality of the BFD RS set q0_n (or q0_m) according to SSBs on the PCell or the PSCell or periodic CSI-RS resource configurations that are indicated in the unified TCI state n (or m)—associated with CORESETGroupIndex value n−1 (or m−1) provided by the higher layer parameter TCI-State-r17 or DLorJoint-TCIState or UL-TCIState for respective Type-1 CORESETs associated with CORESETGroupIndex value n−1 (or m−1) that the UE uses for monitoring PDCCH wherein based on those specified herein in the present disclosure, the unified TCI state n (or m) or equivalently the n-th (m-th) unified TCI state could be indicated by one or more unified TCI state indication/activation MAC CEs or one or more TCI codepoints in one or more TCI fields of one or more beam indication DCIs, and according to SSBs on the PCell or the PSCell or periodic CSI-RS resource configurations that are indicated in the TCI state n (or m)—associated with CORESETGroupIndex value n−1 (or m−1)—provided by the higher layer parameter TCI-State for respective Type-2 CORESETs associated with CORESETGroupIndex value n−1 (or m−1) that the UE uses for monitoring PDCCH, where n∈{1, . . . , N} and m∈{1, . . . , M}.

For instance, for N=2 (or M=2), the UE could be configured/indicated by the network, e.g., provided by the higher layer parameters failureDetectionResourcesToAddModList0 and failureDetectionResourcesToAddModList1 and/or via BFD RS indication MAC CE, a first BFD RS set q0_0 and a second BFD RS set q0_1 of periodic CSI-RS resource configuration indexes or SSB indexes, for beam/link failure detection or declaration. The UE could assess the radio link quality of the first BFD RS set q0_0 according to SSBs on the PCell or the PSCell or periodic CSI-RS resource configurations that are indicated in the first (or second) unified TCI state, e.g., among the N=2 (or M=2) unified TCI states indicated by a TCI codepoint of the TCI field in the beam indication DCI—associated with value 0 (or 1) of CORESETGroupIndex—provided by the higher layer parameter TCI-State-r17 or DLorJoint-TCIState or UL-TCIState for respective Type-1 CORESETs associated with value 0 (or 1) of CORESETGroupIndex value that the UE uses for monitoring PDCCH and according to SSBs on the PCell or the PSCell or periodic CSI-RS resource configurations that are indicated in the first (or second) TCI state, e.g., among the N=2 (or M=2) indicated TCI states—associated with value 0 (or 1) of CORESETGroupIndex—provided by the higher layer parameter TCI-State for respective Type-2 CORESETs associated with value 0 (or 1) of CORESETGroupIndex value that the UE uses for monitoring PDCCH, and the radio link quality of the second BFD RS set q0_1 according to SSBs on the PCell or the PSCell or periodic CSI-RS resource configurations that are indicated in the second (or first) unified TCI state, e.g., among the N=2 (or M=2) unified TCI states indicated by a TCI codepoint of the TCI field in the beam indication DCI—associated with value 1 (or 0) of CORESETGroupIndex—provided by the higher layer parameter TCI-State-r17 or DLorJoint-TCIState or UL-TCIState for respective Type-1 CORESETs associated with value 1 (or 0) of CORESETGroupIndex value that the UE uses for monitoring PDCCH and according to SSBs on the PCell or the PSCell or periodic CSI-RS resource configurations that are indicated in the second (or first) TCI state, e.g., among the N=2 (or M=2) indicated TCI states—associated with value 1 (or 0) of CORESETGroupIndex—provided by the higher layer parameter TCI-State for respective Type-2 CORESETs associated with value 1 (or 0) of CORESETGroupIndex value that the UE uses for monitoring PDCCH.

In yet another example, the UE could be configured/indicated by the network, e.g., provided by the higher layer parameter failureDetectionResourcesToAddModListA and/or BFD RS indication MAC CE, a first BFD RS set q0A_n (or q0A_m) of periodic CSI-RS resource configuration indexes or SSB indexes for beam/link failure detection or declaration; the UE could assess the radio link quality of the first BFD RS set q0A_n (or q0A_m) according to SSBs on the PCell or the PSCell or periodic CSI-RS resource configurations that are indicated in the unified TCI state n (or m), e.g., among the N (or M) unified TCI states indicated by one or more TCI codepoints of one or more TCI fields in one or more beam indication DCIs—associated with CORESETGroupIndex value n−1 (or m−1)—provided by the higher layer parameter TCI-State-r17 or DLorJoint-TCIState or UL-TCIState for respective Type-1 CORESETs associated with CORESETGroupIndex value n−1 (or m−1) that the UE uses for monitoring PDCCH, where n∈{1, . . . , N} and m∈{1, . . . , M}. The UE could also be configured/indicated by the network, e.g., provided by the higher layer parameter failureDetectionResourcesToAddModListB or BFD RS indication MAC CE, a second BFD RS set q0B_n (or q0B_m) of periodic CSI-RS resource configuration indexes or SSB indexes for beam/link failure detection or declaration; the UE could assess the radio link quality of the second BFD RS set q0B_n (or q0B_m) according to SSBs on the PCell or the PSCell or periodic CSI-RS resource configurations that are indicated in the TCI state n (or m)—associated with CORESETGroupIndex value n−1 (or m−1)—provided by the higher layer parameter TCI-State for respective Type-2 CORESETs associated with CORESETGroupIndex value n−1 (or m−1) that the UE uses for monitoring PDCCH, where n∈{1, . . . , N} and m∈{1, . . . , M}.

For instance, for N=2 (or M=2), the UE could assess the radio link quality of the first of first BFD RS set q0A_0 according to SSBs on the PCell or the PSCell or periodic CSI-RS resource configurations that are indicated in the first (or second) unified TCI state, e.g., among the N=2 (or M=2) unified TCI states indicated by a TCI codepoint of the TCI field in the beam indication DCI—associated with value 0 (or 1) of CORESETGroupIndex—provided by the higher layer parameter TCI-State-r17 or DLorJoint-TCIState or UL-TCIState for respective Type-1 CORESETs associated with value 0 (or 1) of CORESETGroupIndex value that the UE uses for monitoring PDCCH, and the radio link quality of the second of first BFD RS set q0A_1 according to SSBs on the PCell or the PSCell or periodic CSI-RS resource configurations that are indicated in the second (or first) unified TCI state, e.g., among the N=2 (or M=2) unified TCI states indicated by a TCI codepoint of the TCI field in the beam indication DCI—associated with value 1 (or 0) of CORESETGroupIndex—provided by the higher layer parameter TCI-State-r17 or DLorJoint-TCIState or UL-TCIState for respective Type-1 CORESETs associated with value 1 (or 0) of CORESETGroupIndex value that the UE uses for monitoring PDCCH. Furthermore, the UE could assess the radio link quality of the first of second BFD RS set q0B_0 according to SSBs on the PCell or the PSCell or periodic CSI-RS resource configurations that are indicated in the first (or second) TCI state, e.g., among the N=2 (or M=2) indicated TCI states—associated with value 0 (or 1) of CORESETGroupIndex—provided by the higher layer parameter TCI-State for respective Type-2 CORESETs associated with value 0 (or 1) of CORESETGroupIndex value that the UE uses for monitoring PDCCH, and the radio link quality of the second of second BFD RS set q0B_1 according to SSBs on the PCell or the PSCell or periodic CSI-RS resource configurations that are indicated in the second (or first) TCI state, e.g., among the N=2 (or M=2) indicated TCI states—associated with value 1 (or 0) of CORESETGroupIndex—provided by the higher layer parameter TCI-State for respective Type-2 CORESETs associated with value 1 (or 0) of CORESETGroupIndex value that the UE uses for monitoring PDCCH.

For another example, for N=2 (or M=2), the UE could assess the radio link quality of the first BFD RS set q0A according to SSBs on the PCell or the PSCell or periodic CSI-RS resource configurations that are indicated in the first (or second) unified TCI state, e.g., among the N=2 (or M=2) unified TCI states indicated by a TCI codepoint of the TCI field in the beam indication DCI—associated with value 0 (or 1) of CORESETGroupIndex—provided by the higher layer parameter TCI-State-r17 or DLorJoint-TCIState or UL-TCIState for respective Type-1 CORESETs associated with value 0 (or 1) of CORESETGroupIndex value that the UE uses for monitoring PDCCH, and the UE could assess the radio link quality of the second BFD RS set q0B according to SSBs on the PCell or the PSCell or periodic CSI-RS resource configurations that are indicated in the second (or first) TCI state, e.g., among the N=2 (or M=2) indicated TCI states—associated with value 1 (or 0) of CORESETGroupIndex—provided by the higher layer parameter TCI-State for respective Type-2 CORESETs associated with value 1 (or 0) of CORESETGroupIndex value that the UE uses for monitoring PDCCH.

For the BFD RSs, and therefore, the corresponding BFD RS resources determined by the UE, following examples may be provided.

As mentioned in the present disclosure, in one example, the UE could assess the radio link quality of one or more SSB indexes on the PCell or the PSCell or periodic CSI-RS resource configuration indexes in the BFD RS set q0_n (or q0_m) against the BFD threshold Qout. Furthermore, the physical layer in the UE provides an indication to higher layers when the radio link quality for all corresponding periodic CSI-RS resource configuration indexes or SSB indexes in the BFD RS set q0_n (or q0_m) is worse than the threshold Qout. Furthermore, the physical layer in the UE provides to higher layers the index of the BFD RS set q0_n (or q0_m) if the corresponding radio link quality is worse than the BFD threshold Qout. The physical layer informs the higher layers when the radio link quality is worse than the BFD threshold Qout a periodicity determined by the maximum between the shortest periodicity among the SSBs on the PCell or the PSCell and/or the periodic CSI-RS configurations in the BFD RS set q0_n (or q0_m) and 2 msec.

As mentioned in the present disclosure, in one example, UE could assess the radio link quality of one or more SSB indexes on the PCell or the PSCell or periodic CSI-RS resource configuration indexes in the first BFD RS set q0A_n (or q0A_m) against the BFD threshold Qout. The physical layer in the UE provides a first indication to higher layers when the radio link quality for all corresponding periodic CSI-RS resource configuration indexes or SSB indexes in the first BFD RS set q0A_n (or q0A_m) is worse than the threshold Qout.

Furthermore, the physical layer in the UE provides to higher layers the index of the first BFD RS set q0A_n (or q0A_m) if the corresponding radio link quality is worse than the BFD threshold Qout. The physical layer informs the higher layers when the radio link quality is worse than the BFD threshold Qout a periodicity determined by the maximum between the shortest periodicity among the SSBs on the PCell or the PSCell and/or the periodic CSI-RS configurations in the first BFD RS set q0A_n (or q0A_m) and 2 msec.

In addition, the UE could assess the radio link quality of one or more SSB indexes on the PCell or the PSCell or periodic CSI-RS resource configuration indexes in the second BFD RS set q0B_n (or q0B_m) against the BFD threshold Qout. The physical layer in the UE provides a second indication to higher layers when the radio link quality for all corresponding periodic CSI-RS resource configuration indexes or SSB indexes in the second BFD RS set q0B_n (or q0B_m) is worse than the threshold Qout. Furthermore, the physical layer in the UE provides to higher layers the index of the second BFD RS set q0B_n (or q0B_m) if the corresponding radio link quality is worse than the BFD threshold Qout. The physical layer informs the higher layers when the radio link quality is worse than the BFD threshold Qout a periodicity determined by the maximum between the shortest periodicity among the SSBs on the PCell or the PSCell and/or the periodic CSI-RS configurations in the second BFD RS set q0B_n (or q0B_m) and 2 msec.

Furthermore, for the BFD RSs, and therefore, the corresponding BFD RS resources configured by the network, following examples may be provided.

As mentioned in the present disclosure, in one example, the UE could assess the radio link quality of one or more SSB indexes on the PCell or the PSCell or periodic CSI-RS resource configuration indexes in the BFD RS set q0_n (or q0_m) with same values as the RS indexes in the RS sets indicated in the unified TCI state n (or m)—associated with CORESETGroupIndex value n−1 (or m−1)—provided by the higher layer parameter TCI-State-r17 or DLorJoint-TCIState or UL-TCIState for respective Type-1 CORESETs associated with CORESETGroupIndex value n−1 (or m−1) that the UE uses for monitoring PDCCH against the BFD threshold Qout, wherein based on those specified herein in the present disclosure, the unified TCI state n (or m) could be indicated by one or more unified TCI state indication/activation MAC CEs or one or more TCI codepoints in one or more TCI fields of one or more beam indication DCIs. The physical layer in the UE provides an indication to higher layers when the radio link quality for all corresponding periodic CSI-RS resource configuration indexes or SSB indexes in the BFD RS set q0_n (or q0_m) that have same values as the RS indexes in the RS sets indicated in the unified TCI state n (or m) provided by TCI-State-r17 or DLorJoint-TCIState or UL-TCIState for respective Type-1 CORESETs that the UE uses for monitoring PDCCH is worse than the threshold Qout. Furthermore, the physical layer in the UE provides to higher layers the index of the BFD RS set q0_n (or q0_m) if the corresponding radio link quality is worse than the BFD threshold Qout. The physical layer informs the higher layers when the radio link quality is worse than the BFD threshold Qout a periodicity determined by the maximum between the shortest periodicity among the SSBs on the PCell or the PSCell and/or the periodic CSI-RS configurations in the BFD RS set q0_n (or q0_m) that the UE uses to assess the radio link quality and 2 msec.

As mentioned in the present disclosure, in one example, the UE could assess the radio link quality of one or more SSB indexes on the PCell or the PSCell or periodic CSI-RS resource configuration indexes in the BFD RS set q0_n (or q0_m) with same values as the RS indexes in the RS sets indicated in the TCI state n (or m)—associated with CORESETGroupIndex value n−1 (or m−1)—provided by the higher layer parameter TCI-State for respective Type-2 CORESETs associated with CORESETGroupIndex value n−1 (or m−1) that the UE uses for monitoring PDCCH against the BFD threshold Qout. The physical layer in the UE provides an indication to higher layers when the radio link quality for all corresponding periodic CSI-RS resource configuration indexes or SSB indexes in the BFD RS set q0_n (or q0_m) that have same values as the RS indexes in the RS sets indicated in the TCI state n (or m) provided by TCI-State for respective Type-2 CORESETs that the UE uses for monitoring PDCCH is worse than the threshold Qout.

Furthermore, the physical layer in the UE provides to higher layers the index of the BFD RS set q0_n (or q0_m) if the corresponding radio link quality is worse than the BFD threshold Qout. The physical layer informs the higher layers when the radio link quality is worse than the BFD threshold Qout a periodicity determined by the maximum between the shortest periodicity among the SSBs on the PCell or the PSCell and/or the periodic CSI-RS configurations in the BFD RS set q0_n (or q0_m) that the UE uses to assess the radio link quality and 2 msec.

In one example, the UE could assess the radio link quality of one or more SSB indexes on the PCell or the PSCell or periodic CSI-RS resource configuration indexes in the BFD RS set q0_n (or q0_m) with same values as the RS indexes in the RS sets indicated in the unified TCI state n (or m) and/or the TCI state n (or m)—associated with CORESET-GroupIndex value n−1 (or m−1)—provided by the higher layer parameter TCI-State-r17 or DLorJoint-TCIState or UL-TCIState and/or TCI-State respectively for respective Type-1 and/or Type-2 CORESETs associated with CORESETGroupIndex value n−1 (or m−1) that the UE uses for monitoring PDCCH against the BFD threshold Qout, wherein based on those specified herein in the present disclosure, the unified TCI state n (or m) could be indicated by one or more unified TCI state indication/activation MAC CEs or one or more TCI codepoints in one or more TCI fields of one or more beam indication DCIs. The physical layer in the UE provides an indication to higher layers when the radio link quality for all corresponding periodic CSI-RS resource configuration indexes or SSB indexes in the BFD RS set q0_n (or q0_m) that have same values as the RS indexes in the RS sets indicated in the unified TCI state n (or m) and/or TCI state n (or m) provided by TCI-State-r17 or DLorJoint-TCIState or UL-TCIState and/or TCI-State respectively for respective Type-1 and/or Type-2 CORESETs that the UE uses for monitoring PDCCH is worse than the threshold Qout. Furthermore, the physical layer in the UE provides to higher layers the index of the BFD RS set q0_n (or q0_m) if the corresponding radio link quality is worse than the BFD threshold Qout. The physical layer informs the higher layers when the radio link quality is worse than the BFD threshold Qout a periodicity determined by the maximum between the shortest periodicity among the SSBs on the PCell or the PSCell and/or the periodic CSI-RS configurations in the BFD RS set q0_n (or q0_m) that the UE uses to assess the radio link quality and 2 msec.

In one example, the UE could assess the radio link quality of one or more SSB indexes on the PCell or the PSCell or periodic CSI-RS resource configuration indexes in the first BFD RS set q0A_n (or q0A_m) with same values as the RS indexes in the RS sets indicated in the unified TCI state n (or m)—associated with CORESETGroupIndex value n−1 (or m−1)—provided by the higher layer parameter TCI-State-r17 or DLorJoint-TCIState or UL-TCIState for respective Type-1 CORESETs associated with CORESETGroupIndex value n−1 (or m−1) that the UE uses for monitoring PDCCH against the BFD threshold Qout, wherein based on those specified herein in the present disclosure, the unified TCI state n (or m) could be indicated by one or more unified TCI state indication/activation MAC CEs or one or more TCI codepoints in one or more TCI fields of one or more beam indication DCIs. The physical layer in the UE provides a first indication to higher layers when the radio link quality for all corresponding periodic CSI-RS resource configuration indexes or SSB indexes in the first BFD RS set q0A_n (or q0A_m) that have same values as the RS indexes in the RS sets indicated in the unified TCI state n (or m) provided by TCI-State-r17 or DLorJoint-TCIState or UL-TCIState for respective Type-1 CORESETs that the UE uses for monitoring PDCCH is worse than the threshold Qout. Furthermore, the physical layer in the UE provides to higher layers the index of the first BFD RS set q0A_n (or q0A_m) if the corresponding radio link quality is worse than the BFD threshold Qout. The physical layer informs the higher layers when the radio link quality is worse than the BFD threshold Qout a periodicity determined by the maximum between the shortest periodicity among the SSBs on the PCell or the PSCell and/or the periodic CSI-RS configurations in the first BFD RS set q0A_n (or q0A_m) that the UE uses to assess the radio link quality and 2 msec. In addition, the UE could assess the radio link quality of one or more SSB indexes on the PCell or the PSCell or periodic CSI-RS resource configuration indexes in the second BFD RS set q0B_n (or q0B_m) with same values as the RS indexes in the RS sets indicated in the TCI state n (or m)—associated with CORESETGroupIndex value n−1 (or m−1)—provided by the higher layer parameter TCI-State for respective Type-2 CORESETs associated with CORESETGroupIndex value n−1 (or m−1) that the UE uses for monitoring PDCCH against the BFD threshold Qout. The physical layer in the UE provides a second indication to higher layers when the radio link quality for all corresponding periodic CSI-RS resource configuration indexes or SSB indexes in the second BFD RS set q0B_n (or q0B_m) that have same values as the RS indexes in the RS sets indicated in the TCI state n (or m) provided by TCI-State for respective Type-2 CORESETs that the UE uses for monitoring PDCCH is worse than the threshold Qout. Furthermore, the physical layer in the UE provides to higher layers the index of the second BFD RS set q0B_n (or q0B_m) if the corresponding radio link quality is worse than the BFD threshold Qout. The physical layer informs the higher layers when the radio link quality is worse than the BFD threshold Qout a periodicity determined by the maximum between the shortest periodicity among the SSBs on the PCell or the PSCell and/or the periodic CSI-RS configurations in the second BFD RS set q0B_n (or q0B_m) that the UE uses to assess the radio link quality and 2 msec.

For the BFD RS configurations as mentioned in the present disclosure, the higher layers in the UE may increment the beam failure instance (BFI) count (by one) in a BFI counter n or m (denoted by BFI_COUNTER_n or BFI_COUNTER_m) associated with CORESET-GroupIndex value n−1 or m−1 or the BFD RS set q0_n or q0_m if the higher layers receive from the physical layer in the UE that the radio link quality of the BFD RS set q0_n (or q0_m) is worse than Qout, where n∈{1, . . . , N} and m∈{1, . . . , M}. The UE may declare a DL and/or UL beam failure for the BFD RS set q0_n (or q0_m) if the BFI count in the BFI counter n (or m) BFI_COUNTER_n (or BFI_COUNTER_m) for the BFD RS set q0_n (or q0_m) reaches the maximum number of BFI counts (e.g., provided by the higher layer parameter maxBFIcount) before a BFD timer expires. After the higher layers in the UE declare DL and/or UL beam failure for the BFD RS set q0_n (or q0_m), the higher layers in the UE may reset the BFI count in the BFI counter n (or m) BFI_COUNTER_n (or BFI_COUNTER_m) or the BFD timer to zero.

In addition, for the BFD RS configurations as mentioned in the present disclosure, the higher layers in the UE could reset the BFI count in the BFI counter n (or m) BFI_COUNTER_n (or BFI_COUNTER_m) or the BFD timer to zero if the UE receives from the network a MAC CE or DCI (e.g., DCI format 1_1 or 1_2 with or without DL assignment) based signaling to update the Unified TCI state n (or m) provided by TCI-State_r17 or DLorJoint-TCIState or UL-TCIState for respective Type-1 CORESETs associated with CORESETGroupIndex value n−1 (or m−1), where n∈{1, ..., N} and m∈{1, ..., M}.

For the BFD RS configurations as mentioned in the present disclosure, the higher layers in the UE could reset the BFI count in the BFI counter n (or m) BFI_COUNTER_n (or BFI_COUNTER_m) or the BFD timer to zero if the UE receives from the network a MAC CE activation command to update the TCI state n (or m) provided by TCI-State for respective Type-2 CORESETs associated with CORESETGroupIndex value n−1 (or m−1), where n∈{1, ..., N} and m∈{1, ..., M}.

For the BFD RS configurations as mentioned in the present disclosure, the higher layers in the UE could reset the BFI count in the BFI counter n (or m) BFI_COUNTER_n (or BFI_COUNTER_m) or the BFD timer to zero if the UE receives from the network a MAC CE or DCI (e.g., DCI format 1_1 or 1_2 with or without DL assignment) based signaling to update the Unified TCI state n (or m) provided by TCI-State_r17 or DLorJoint-TCIState or UL-TCIState for respective Type-1 CORESETs associated with CORESETGroupIndex value n−1 (or m−1) and/or a MAC CE activation command to update the TCI state n (or m) provided by TCI-State for respective Type-2 CORESETs associated with CORESETGroupIndex n−1 (or m−1), where n∈{1, ..., N} and m∈{1, ..., M}.

For the BFD RS configurations as mentioned in the present disclosure, the higher layers in the UE may increment the beam failure instance (BFI) count (by one) in a first BFI counter n or m (denoted by BFI_COUNTER_A_n or BFI_COUNTER_A_m) associated with CORESETGroupIndex value n−1 or m−1 or the first BFD RS set q0A_n or q0A_m if the higher layers receive from the physical layer in the UE that the radio link quality of the first BFD RS set q0A_n (or q0A_m) is worse than Qout, where n∈{1, ..., N} and m∈{1, ..., M}. The UE may declare a DL and/or UL beam failure for the first BFD RS set q0A_n (or q0A_m) if the BFI count in the first BFI counter n (or m) BFI_COUNTER_A_n (or BFI_COUNTER_A_m) for the first BFD RS set q0A_n (or q0A_m) reaches the maximum number of BFI counts (e.g., provided by the higher layer parameter maxBFIcount) before a first BFD timer expires.

After the higher layers in the UE declare DL and/or UL beam failure for the first BFD RS set q0A_n (or q0A_m), the higher layers in the UE may reset the BFI count in the first BFI counter n (or m) BFI_COUNTER_A_n (or BFI_COUNTER_A_m) or the first BFD timer to zero. In addition, the higher layers in the UE could also reset the BFI count in the first BFI counter n (or m) BFI_COUNTER_A_n (or BFI_COUNTER_A_m) or the first BFD timer to zero if the UE receives from the network a MAC CE or DCI (e.g., DCI format 1_1 or 1_2 with or without DL assignment) based signaling to update the Unified TCI state n (or m) provided by TCI-State_r17 or DLorJoint-TCIState or UL-TCIState for respective Type-1 CORESETs associated with CORESETGroupIndex value n−1 (or m−1), where n∈{1, ..., N} and m∈{1, ..., M}.

Furthermore, the higher layers in the UE may increment the beam failure instance (BFI) count (by one) in a second BFI counter n or m (denoted by BFI_COUNTER_B_n or BFI_COUNTER_B_m) associated with CORESETGroupIndex value n−1 or m−1 or the second BFD RS set q0B_n or q0B_m if the higher layers receive from the physical layer in the UE that the radio link quality of the second BFD RS set q0B_n (or q0B_m) is worse than Qout, where n∈{1, ..., N} and m∈{1, ..., M}. The UE may declare a DL and/or UL beam failure for the second BFD RS set q0B_n (or q0B_m) if the BFI count in the second BFI counter n (or m) BFI_COUNTER_B_n (or BFI_COUNTER_B_m) for the second BFD RS set q0B_n (or q0B_m) reaches the maximum number of BFI counts (e.g., provided by the higher layer parameter maxBFIcount) before a second BFD timer expires. After the higher layers in the UE declare DL and/or UL beam failure for the second BFD RS set q0B_n (or q0B_m), the higher layers in the UE may reset the BFI count in the second BFI counter n (or m) BFI_COUNTER_B_n (or BFI_COUNTER_B_m) or the second BFD timer to zero.

In addition, the higher layers in the UE could also reset the BFI count in the second BFI counter n (or m) BFI_COUNTER_B_n (or BFI_COUNTER_B_m) or the second BFD timer to zero if the UE receives from the network a MAC CE activation command to update the TCI state n (or m) provided by TCI-State for respective Type-2 CORESETs associated with CORESETGroupIndex value n−1 (or m−1), where n∈{1, ..., N} and m∈{1, ..., M}.

For the BFD RS configurations as described in the present disclosure, the UE could be configured with/provided by the network, e.g., via the higher layer parameter candidateBeamRSList, a NBI RS set q1_n (or q1_m)—associated with the BFD RS set q0_n (or q0_m)—of periodic CSI-RS resource configuration indexes or SSB indexes for radio link quality measurement and identifying potential new beam(s) to recover the failed beam(s)/link(s), where n∈{1, ..., N} and m∈{1, ..., M}. That is, the UE could be configured with/provided by the network N≥1 (or M≥1) NBI RS sets each associated with a BFD RS set in the single-DCI based multi-TRP system. The UE expects single-port or two-port CSI-RS with frequency density equal to 1 or 3 REs per RB in the set q1_n (or q1_m).

The UE could assess the radio link quality according to the set q1_n (or q1_m) of resource configurations against a threshold Qin. The UE may apply the Qin threshold to the L1-RSRP measurement obtained from a SSB in q1_n (or q1_m), and apply the Qin threshold to the L1-RSRP measurement obtained from a CSI-RS resource in q1_n (or q1_m) after scaling a respective CSI-RS reception power with a value provided by powerControlOffsetSS. According to the L1-RSRP measurements, the UE could identity the periodic CSI-RS resource configuration index or SSB index in the NBI RS set q1_n (or q1_m), denoted by q_new_n (or q_new_m), that corresponds to the largest/highest measured L1-RSRP among those larger than or equal to the Qin threshold, where n∈{1, ..., N} and m∈{1, ..., M}.

For the BFD RS configurations described in the present disclosure, the UE could be configured with/provided by the network, e.g., via the higher layer parameter candidateBeamRSListA, a first NBI RS set q1A_n (or q1A_m)—associated with the first BFD RS set q0A_n (or q0A_m)—of periodic CSI-RS resource configuration indexes or SSB indexes for radio link quality measurement and identifying potential new beam(s) to recover the failed beam(s)/link(s), where n∈{1, ..., N} and m∈{1, ..., M}. That is, the UE could be configured with/provided by the network N≥1 (or M≥1) NBI RS sets each associated with a first BFD RS set in the single-DCI based multi-TRP system. The UE expects single-port or two-port CSI-RS with frequency density equal to 1 or 3 REs per RB in the set q1A_n (or q1A_m).

The UE could assess the radio link quality according to the set q1A_n (or q1A_m) of resource configurations against a threshold Qin. The UE may apply the Qin threshold to the L1-RSRP measurement obtained from a SSB in q1A_n (or q1A_m), and apply the Qin threshold to the L1-RSRP measurement obtained from a CSI-RS resource in q1A_n (or q1A_m) after scaling a respective CSI-RS reception power with a value provided by powerControlOffsetSS. According to the L1-RSRP measurements, the UE could identity the periodic CSI-RS resource configuration index or SSB index in the first NBI RS set q1A_n (or q1A_m), denoted by qA_new_n (or qA_new_m), that corresponds to the largest/highest measured L1-RSRP among those (in the first NBI RS set q1A_n or q1A_m) larger than or equal to the Qin threshold.

In addition, the UE could be configured with/provided by the network, e.g., via the higher layer parameter candidate-BeamRSListB, a second NBI RS set q1B_n (or q1B_m)—associated with the second BFD RS set q0B_n (or q0B_m)—of periodic CSI-RS resource configuration indexes or SSB indexes for radio link quality measurement and identifying potential new beam(s) to recover the failed beam(s)/link(s). That is, the UE could be configured with/provided by the network N≥1 (or M≥1) NBI RS sets each associated with a second BFD RS set in the single-DCI based multi-TRP system. The UE expects single-port or two-port CSI-RS with frequency density equal to 1 or 3 REs per RB in the set q1B_n (or q1B_m). The UE could assess the radio link quality according to the set q1B_n (or q1B_m) of resource configurations against a threshold Qin.

The UE may apply the Qin threshold to the L1-RSRP measurement obtained from a SSB in q1B_n (or q1B_m), and apply the Qin threshold to the L1-RSRP measurement obtained from a CSI-RS resource in q1B_n (or q1B_m) after scaling a respective CSI-RS reception power with a value provided by powerControlOffsetSS. According to the L1-RSRP measurements, the UE could identify the periodic CSI-RS resource configuration index or SSB index in the second NBI RS set q1B_n (or q1B_m), denoted by qB_new_n (or qB_new_m), that corresponds to the largest/highest measured L1-RSRP among those (in the second NBI RS set q1B_n or q1B_m) larger than or equal to the Qin threshold, where $n \in \{1, \ldots, N\}$ and $m \in \{1, \ldots, M\}$.

Alternatively, the UE could be configured with/provided by the network, e.g., via the higher layer parameter candidateBeamRSListX, a main/master NBI RS set q1X_n (or q1X_m)—associated with both the first BFD RS set q0A_n (or q0A_m) and the second BFD RS set q0B_n (or q0B_m)—of periodic CSI-RS resource configuration indexes or SSB indexes for radio link quality measurement and identifying potential new beam(s) to recover the failed beam(s)/link(s), where $n \in \{1, \ldots, N\}$ and $m \in \{1, \ldots, M\}$. That is, the UE could be configured with/provided by the network N≥1 (or M≥1) main/master NBI RS sets each associated with both the first and second BFD RS sets in the single-DCI based multi-TRP system. The UE expects single-port or two-port CSI-RS with frequency density equal to 1 or 3 REs per RB in the set q1X_n (or q1X_m). The UE could assess the radio link quality according to the set q1X_n (or q1X_m) of resource configurations against a threshold Qin. The UE may apply the Qin threshold to the L1-RSRP measurement obtained from a SSB in q1X_n (or q1X_m), and apply the Qin threshold to the L1-RSRP measurement obtained from a CSI-RS resource in q1X_n (or q1X_m) after scaling a respective CSI-RS reception power with a value provided by powerControlOffsetSS.

According to the L1-RSRP measurements, the UE could identify the periodic CSI-RS resource configuration index or SSB index in the main/master NBI RS set q1X_n (or q1X_m), denoted by qA_new_n (or qA_new_m) associated with the first BFD RS set q0A_n (or q0A_m), and/or the periodic CSI-RS resource configuration index or SSB index in the main/master NBI RS set q1X_n (or q1X_m), denoted by qB_new_n (or qB_new_m) associated with the second BFD RS set q0B_n (or q0B_m), that correspond to the largest/highest measured L1-RSRPs among those (in the main/master NBI RS set q1X_n or q1X_m) larger than or equal to the Qin threshold, where $n \in \{1, \ldots, N\}$ and $m \in \{1, \ldots, M\}$.

For the BFD RS configurations described in the present disclosure, for the PCell or the PSCell or the SCell, upon request from higher layers, the UE indicates to higher layers whether there is at least one periodic CSI-RS configuration index or SSB index from the NBI RS set q1_n (or q1_m) with corresponding L1-RSRP measurement that is larger than or equal to the Qin threshold, and provides the periodic CSI-RS configuration index or SSB index q_new_n (or q_new_m) from the NBI RS set q1_n (or q1_m) and the corresponding L1-RSRP measurement that is larger than or equal to the Qin threshold, if any, or the index of the NBI RS set q1_n (or q1_m), where $n \in \{1, \ldots, N\}$ and $m \in \{1, \ldots, M\}$.

In one example, the UE can be provided, by PRACH-ResourceDedicatedBFR, a configuration for PRACH transmission as described in the 3GPP TS 38.213. The UE could transmit at least one PRACH preamble according to antenna port quasi co-location parameters associated with periodic CSI-RS resource configuration or with SSB associated with index q_new_n (or q_new_m) provided by higher layers, where $n \in \{1, \ldots, N\}$ and $m \in \{1, \ldots, M\}$.

In another example, the UE can be provided, by PRACH-ResourceDedicatedBFRMTRP, N≥1 or M≥1 (e.g., N=2 or M=2) configurations for PRACH transmission as described in the 3GPP TS 38.213 with each configuration for PRACH transmission associated with a CORESETGroupIndex value (e.g., either 0 or 1) or a BFD RS set. For instance, the PRACH configuration n (or m) could be associated with CORESETGroupIndex value n−1 (or m−1) or BFD RS set q0_n (or q0_m), where n={1, ..., N} and m={1, ..., M}. For this case, the UE could transmit at least one PRACH preamble from the PRACH configuration n (or m) according to antenna port quasi co-location parameters associated with periodic CSI-RS resource configuration or with SSB associated with index q_new_n (or q_new_m) provided by higher layers, where $n \in \{1, \ldots, N\}$ and $m \in \{1, \ldots, M\}$.

In yet another example, the UE can be provided, by schedulingRequestID-BFR, a configuration for PUCCH transmission with a link recovery request (LRR) using either PUCCH format 0 or PUCCH format 1 as described in the 3GPP TS 38.213. The UE could receive from the network an uplink grant in response to the PUCCH transmission with LRR for a first PUSCH MAC CE transmission. The UE could provide in the first PUSCH MAC CE index(es) for at least corresponding SCell(s) with radio link quality worse than Qout, indication(s) of presence of q_new_n (or q_new_m) for $n \in \{1, \ldots, N\}$ and $m \in \{1, \ldots, M\}$, and index(es) q_new_n (or q_new_m) for a periodic CSI-RS configuration or for a SSB provided by higher layers, if any, for $n \in \{1, \ldots, N\}$ and $m \in \{1, \ldots, M\}$, or index(es) of the NBI RS set q1_n (or q1_m), or index(es) of the BFD RS set q0_n (or q0_m).

In yet another example, the UE can be provided, by schedulingRequestID-BFR-MTRP, N≥1 or M≥1 (e.g., N=2 or M=2) configurations for PUCCH transmission each having a link recovery request (LRR) and using either PUCCH format 0 or PUCCH format 1 as described in the 3GPP TS 38.213. Furthermore, each configuration for PUCCH transmission with a LRR is associated with a CORESET-GroupIndex value (e.g., either 0 or 1) or a BFD RS set. For instance, the UE uses the n-th (or m-th) configuration or configuration n (or m) to transmit PUCCH with LRR associated with CORESETGroupIndex value n−1 (or m−1) or BFD RS set q0_n (or q0_m), where n∈{1, . . . , N} and m∈{1, . . . , M}. The UE could receive from the network an uplink grant in response to one or more PUCCH transmissions with LRR for a first PUSCH MAC CE transmission. The UE could provide in the first PUSCH MAC CE index (es) for at least corresponding SCell(s) with radio link quality worse than Qout, indication(s) of presence of q_new_n (or q_new_m) for n∈{1, . . . , N} and m∈{1, . . . , M}, and index(es) q_new_n (or q_new_m) for a periodic CSI-RS configuration or for a SSB provided by higher layers, if any, for n∈{1, . . . , N} and m∈{1, . . . , M}, or index(es) of the NBI RS set q1_n (or q1_m), or index(es) of the BFD RS set q0_n (or q0_m).

For the BFD RS configurations described in the present disclosure, upon request from higher layers, the UE indicates to higher layers whether there is at least one periodic CSI-RS configuration index or SSB index from the first NBI RS set q1A_n (or q1A_m) with corresponding L1-RSRP measurement that is larger than or equal to the Qin threshold and/or at least one periodic CSI-RS configuration index or SSB index from the second NBI RS set q1B_n (or q1B_m) with corresponding L1-RSRP measurement that is larger than or equal to the Qin threshold or at least one periodic CSI-RS configuration index or SSB index from the main/master NBI RS set q1X_n (or q1X_m) with corresponding L1-RSRP measurement that is larger than or equal to the Qin threshold, and provides the periodic CSI-RS configuration index or SSB index qA_new_n (qA_new_m) from the first NBI RS set q1A_n (or q1A_m) or the main/master NBI RS set q1X_n (or q1X_m) and the corresponding L1-RSRP measurement that is larger than or equal to the Qin threshold, if any, and/or the periodic CSI-RS configuration index or SSB index qB_new_n (or qB_new_m) from the second NBI RS set q1B_n (or q1B_m) or the main/master NBI RS set qX_n (or q1X_m) and the corresponding L1-RSRP measurement that is larger than or equal to the Qin threshold, if any, or the index of the first NBI RS set q1A_n (or q1A_m) and/or the index of the second NBI RS set q1B_n (or q1B_m) or the index of the main/master NBI RS set q1X_n (or q1X_m), where n∈{1, . . . , N} and m∈{1, . . . , M}.

In one example, the UE can be provided, by PRACH-ResourceDedicatedBFR, a configuration for PRACH transmission as described in the 3GPP TS 38.213. The UE could transmit at least one PRACH preamble according to antenna port quasi co-location parameters associated with periodic CSI-RS resource configuration or with SSB associated with index qA_new_n (or qA_new_m) provided by higher layers, where n∈{1, . . . , N} and m∈{1, . . . , M}. The UE could also transmit at least one PRACH preamble according to antenna port quasi co-location parameters associated with periodic CSI-RS resource configuration or with SSB associated with index qB_new_n (or qB_new_m) provided by higher layers, where n∈{1, . . . , N} and m∈{1, . . . , M}.

In another example, the UE can be provided, by PRACH-ResourceDedicatedBFRMTRP, N≥1 or M≥1 (e.g., N=2 or M=2) configurations for PRACH transmission as described in the 3GPP TS 38.213 with each configuration for PRACH transmission associated with a CORESETGroupIndex value (e.g., either 0 or 1) or one or more BFD RS sets.

For instance, the PRACH configuration n (or m) could be associated with CORESETGroupIndex value n−1 (or m−1) or the first BFD RS set q0A_n (or q0A_m) or the second BFD RS set q0B_n (or q0B_m), where n={1, . . . , N} and m={1, . . . , M}. For this case, the UE could transmit at least one PRACH preamble from the PRACH configuration n (or m) according to antenna port quasi co-location parameters associated with periodic CSI-RS resource configuration or with SSB associated with index qA_new_n (or qA_new_m) provided by higher layers, where n∈{1, . . . , N} and m∈{1, . . . , M}. The UE could also transmit at least one PRACH preamble from the PRACH configuration n (or m) according to antenna port quasi co-location parameters associated with periodic CSI-RS resource configuration or with SSB associated with index qB_new_n (or qB_new_m) provided by higher layers, where n∈{1, . . . , N} and m∈{1, . . . , M}.

In yet another example, the UE can be provided, by schedulingRequestID-BFR, a configuration for PUCCH transmission with a link recovery request (LRR) using either PUCCH format 0 or PUCCH format 1 as described in the 3GPP TS 38.213. The UE could receive from the network an uplink grant in response to the PUCCH transmission with LRR for a first PUSCH MAC CE transmission. The UE could provide in the first PUSCH MAC CE index(es) for at least corresponding SCell(s) with radio link quality worse than Qout, indication(s) of presence of qA_new_n (or qA_new_m) or qB_new_n (or qB_new_m) for n∈{1, . . . , N} and m∈{1, . . . , M}, index(es) qA_new_n (or qA_new_m) or qB_new_n (or qB_new_m) for a periodic CSI-RS configuration or for a SSB provided by higher layers, if any, for n∈{1, . . . , N} and m∈{1, . . . , M}, index(es) of the corresponding first or second NBI RS sets q1A_n (or q1A_m) or q1B_n (or q1B_m), index(es) of the corresponding master/main NBI RS set q1X_n (or q1X_m), or index(es) of the corresponding first or second BFD RS set q0A_n (or q0A_m) or q0B_n (or q0B_m) for n∈{1, . . . , N} and m∈{1, . . . , M}.

In yet another example, the UE can be provided, by schedulingRequestID-BFR-MTRP, N≥1 or M≥1 (e.g., N=2 or M=2) configurations for PUCCH transmission each having a link recovery request (LRR) and using either PUCCH format 0 or PUCCH format 1 as described in the 3GPP TS 38.213.

Furthermore, each configuration for PUCCH transmission with a LRR is associated with a CORESETGroupIndex value (e.g., either 0 or 1) or one or more BFD RS sets. For instance, the UE uses the n-th (or m-th) configuration or configuration n (or m) to transmit PUCCH with LRR associated with CORESETGroupIndex value n−1 (or m−1) or the first BFD RS set q0A_n (or q0A_m) or the second BFD RS set q0B_n (or q0B_m), where n∈{1, . . . , N} and m∈{1, . . . , M}. The UE could receive from the network an uplink grant in response to one or more PUCCH transmissions with LRR for a first PUSCH MAC CE transmission. The UE could provide in the first PUSCH MAC CE index(es) for at least corresponding SCell(s) with radio link quality worse than Qout, indication(s) of presence of qA_new_n (or qA_new_m) or qB_new_n (or qB_new_m) for n∈{1, . . . , N} and m∈{1, . . . , M}, index(es) qA_new_n (or qA_new_m) or qB_new_n (or qB_new_m) for a periodic CSI-RS configuration or for a SSB provided by higher layers, if any, for n∈{1, . . . , N} and m∈{1, . . . , M}, index(es) of the corresponding first or second NBI RS sets q1A_n (or q1A_m) or q1B_n (or q1B_m), index(es) of the corresponding master/main NBI RS set q1X_n (or q1X_m), or index(es) of the corresponding first or second BFD RS set q0A_n (or q0A_m) or q0B_n (or q0B_m) for n∈{1, . . . , N} and m∈{1, . . . , M}.

Throughout the present disclosure, the first condition could be one or more of the followings.

In one example, the UE could be provided/indicated/configured/informed by the network, e.g., via higher layer RRC signaling and/or MAC CE command and/or dynamic DCI based signaling, that the implicit BFD RS configuration for the SDCI based MTRP operation is enabled. For instance, a higher layer parameter 'implicitBFDforSDCI' could be provided in a higher layer RRC signaling/parameter such as PDCCH-Config, PDSCH-Config, ServingCell-Config, ControlResourceSet and etc. to turn on/off the implicit BFD RS configuration specified herein in the present disclosure for the SDCI based MTRP operation. When/if the higher layer parameter 'implicitBFDforSDCI' is configured/present or set to 'enabled'/'on'/'1', the UE could follow those specified herein in the present disclosure to (implicitly) determine the BFD RS(s).

In another example, when/if the UE is configured/provided by the network, one or more—e.g., more than one such as two—NBI RS sets as described/specified herein in the present disclosure.

In yet another example, when/if the UE is indicated/provided by the network, e.g., in a beam indication DCI (e.g., DCI format 1_1/1_2 with or without DL assignment), one or more—e.g., more than one such as two (N=2 or M=2)—unified TCI states/pairs of unified TCI states by one or more TCI codepoints of one or more TCI fields.

In yet another example, when/if at least one TCI codepoint activated by the unified TCI states activation MAC CE is mapped/associated to one or more—e.g., more than one such as two (N=2 or M=2)—unified TCI states/pairs of unified TCI states.

In yet another example, when/if the UE is provided in a higher layer RRC signaling/parameter such as PDCCH-Config, PDSCH-Config, ControlResourceSet and etc., two values of CORESETGroupIndex (e.g., 0 and 1).

In yet another example, when/if the UE is not provided in a higher layer RRC signaling/parameter such as PDCCH-Config, PDSCH-Config, ControlResourceSet and etc., two values of CORESETPoolIndex (e.g., 0 and 1) or is provided only a single value of CORESETPoolIndex (e.g., 0).

For the PCell or the PSCell, the UE could be provided a CORESET through a link to a search space set provided by recoverySearchSpaceId, as described in the 3GPP TS 38.213, for monitoring PDCCH in the CORESET. If the UE is provided recoverySearchSpaceId, the UE does not expect to be provided another search space set for monitoring PDCCH in the CORESET associated with the search space set provided by recoverySearchSpaceId.

As mentioned in the present disclosure, the UE can be provided, by PRACH-ResourceDedicatedBFR or PRACH-ResourceDedicatedBFRMTRP, one or more configurations for PRACH transmission with each configuration for PRACH transmission associated with a CORESETGroupIndex value (e.g., either 0 or 1) or one or more BFD RS sets. For PRACH transmission in slot n and according to antenna port quasi co-location parameters associated with periodic CSI-RS resource configuration or with SS/PBCH block associated with index q_new_n (or q_new_m) (as mentioned in the present disclosure), qA_new_n (or qA_new_m) or qB_new_n (or qB_new_m) (as mentioned in the present disclosure) provided by higher layers for n∈{1, . . . , N} and m E {1, . . . , M}, the UE monitors PDCCH in a search space set provided by recoverySearchSpaceId for detection of a DCI format with CRC scrambled by C-RNTI or MCS-C-RNTI starting from slot n+4 within a window configured by BeamFailureRecoveryConfig.

For PDCCH monitoring in a search space set provided by recoverySearchSpaceId and for corresponding PDSCH reception, the UE assumes the same antenna port quasi-collocation parameters as the ones associated with index q_new_n (or q_new_m) (as mentioned in the present disclosure), qA_new_n (or qA_new_m) or qB_new_n (or qB_new_m) (as mentioned in the present disclosure) provided by higher layers for n∈{1, . . . , N} and m∈{1, . . . , M} until the UE receives by higher layers an activation for a TCI state provided by TCI-State or TCI-State_r17. After the UE detects a DCI format with CRC scrambled by C-RNTI or MCS-C-RNTI in the search space set provided by recoverySearchSpaceId, the UE continues to monitor PDCCH candidates in the search space set provided by recoverySearchSpaceId until the UE receives a TCI state update via MAC CE or DCI (e.g., DCI format 1_1 or 1_2 with or without DL assignment) based signalling provided by TCI-State or TCI-State_r17.

In one examples mentioned in the present disclosure, if the UE is provided TCI-State_r17 indicating M≥1 joint DL and UL Unified TCI states or M≥1 separate UL Unified TCI states or a first combination of M≥1 joint DL and UL Unified TCI states and separate UL Unified TCI states or N≥1 separate DL Unified TCI states or a second combination of N≥1 joint DL and UL Unified TCI states and separate DL Unified TCI states or a third combination of N≥1 joint DL and UL Unified TCI states, separate DL Unified TCI states and separate UL Unified TCI states for the PCell or the PSCell as described in the 3GPP TS 38.214, and if the UE has sent/indicated to the network q_new_n (or q_new_m) for n∈{1, . . . , N} and m∈{1, . . . , M}, after X symbols from a last symbol of a first PDCCH reception in a search space set provided by recoverySearchSpaceId where the UE detects a DCI format with CRC scrambled by C-RNTI or MCS-C-RNTI, the UE: (1) monitors PDCCH in respective Type-1 CORESETs associated with CORESETGroupIndex value n−1 (or m−1), and receives PDSCH (e.g., the PDSCH scheduled by the PDCCH in the Type-1 CORESETs associated with CORESETGroupIndex value n−1 or m−1) and aperiodic CSI-RS in a resource from a CSI-RS resource set with same indicated TCI state n (or m) as for the PDCCH and PDSCH, using the same antenna port quasi co-location parameters as the ones associated with the corresponding index q_new_n (or q_new_m), if any, where n∈{1, . . . , N} and m∈{1, . . . , M}; and (2) transmits PUCCH, PUSCH (e.g., the PUCCH and the PUSCH associated with the PDCCH in the Type-1 CORESETs associated with CORESETGroupIndex value n−1 or m−1) and SRS with same indicated TCI state n (or m) as for the PUCCH and the PUSCH using a same spatial domain filter as for the last PRACH transmission, and a power setting associated with the indicated Unified TCI state n (or m) with q_u=0, q_d=q_new_n (or q_new_m), and closed loop index l=0 or 1, where n∈{1, . . . , N} and m∈{1, . . . , M}.

In such examples, X could correspond to 28, and the subcarrier spacing (SCS) for the X=28 symbols could correspond to one or more of (n∈{1, . . . , N} and m∈{1, . . . , M}): (1) the smallest of the SCS configurations of the active DL BWP for the PDCCH reception, e.g., in the Type-1 CORESETs associated with CORESETGroupIndex value n−1 (or m−1), and of the active DL BWP(s) of the serving cell; or (2) the smallest of the SCS configurations of all the signal(s)/channels sharing the same indicated Unified TCI state n or m (e.g., provided by the higher layer parameter TCI-State_r17).

After the UE detects a DCI format with CRC scrambled by C-RNTI or MCS-C-RNTI in the search space set provided by recoverySearchSpaceId, the UE continues to monitor PDCCH candidates in the search space set provided by recoverySearchSpaceId until the UE receives a MAC CE or DCI (e.g., DCI format 1_1 or 1_2 with or without DL assignment) based signalling to update the Unified TCI state n (or m) provided by TCI-State_r17 for respective Type-1 CORESETs associated with CORESETGroupIndex value n−1 (or m−1), where n∈{1, ..., N} and m∈{1, ..., M}.

In one example, if the UE is provided TCI-State_r17 indicating M≥1 joint DL and UL Unified TCI states or M≥1 separate UL Unified TCI states or a first combination of M≥1 joint DL and UL Unified TCI states and separate UL Unified TCI states or N≥1 separate DL Unified TCI states or a second combination of N≥1 joint DL and UL Unified TCI states and separate DL Unified TCI states or a third combination of N≥1 joint DL and UL Unified TCI states, separate DL Unified TCI states and separate UL Unified TCI states for the PCell or the PSCell as described in the 3GPP TS 38.214, and if the UE has sent/indicated to the network q_new_n (or q_new_m) for n∈{1, ..., N} and m∈{1, ..., M} and the UE provides BFR MAC CE in Msg3 or MsgA of contention based random access procedure, after X symbols from the last symbol of the PDCCH reception that determines the completion of the contention based random access procedure as described in the 3GPP TS 38.321, the UE: (1) monitors PDCCH in respective Type-1 CORESETs associated with CORESETGroupIndex value n−1 (or m−1), and receives PDSCH (e.g., the PDSCH scheduled by the PDCCH in the Type-1 CORESETs associated with CORESETGroupIndex n or m) and aperiodic CSI-RS in a resource from a CSI-RS resource set with same indicated TCI state n (or m) as for the PDCCH and PDSCH, using the same antenna port quasi co-location parameters as the ones associated with the corresponding index q_new_n (or q_new_m), if any, where n∈{1, ..., N} and m∈{1, ..., M}, and (2) transmits PUCCH, PUSCH (e.g., the PUCCH and the PUSCH associated with the PDCCH in the Type-1 CORESETs associated with CORESETGroupIndex value n−1 or m−1) and SRS with same indicated TCI state n (or m) as for the PUCCH and the PUSCH using a same spatial domain filter as for the last PRACH transmission, and a power setting associated with the indicated Unified TCI state n (or m) with q_u=0, q_d=q_new_n (or q_new_m), and closed loop index l=0 or 1, where n∈{1, ..., N} and m∈{1, ..., M}.

In such examples, X could correspond to 28, and the subcarrier spacing (SCS) for the X=28 symbols could correspond to one or more of (n∈{1, ..., N} and m∈{1, ..., M}): (1) the smallest of the SCS configurations of the active DL BWP for the PDCCH reception, e.g., in the Type-1 CORESETs associated with CORESETGroupIndex value n−1 (or m−1), and of the active DL BWP(s) of the serving cell; or (2) the smallest of the SCS configurations of all the signal(s)/channels sharing the same indicated Unified TCI state n or m (e.g., provided by the higher layer parameter TCI-State_r17).

In one example, if the UE is provided TCI-State_r17 indicating M≥1 joint DL and UL Unified TCI states or M≥1 separate UL Unified TCI states or a first combination of M≥1 joint DL and UL Unified TCI states and separate UL Unified TCI states or N≥1 separate DL Unified TCI states or a second combination of N≥1 joint DL and UL Unified TCI states and separate DL Unified TCI states or a third combination of N≥1 joint DL and UL Unified TCI states, separate DL Unified TCI states and separate UL Unified TCI states, and if the UE has sent/indicated to the network q_new_n (or q_new_m) for n∈{1, ..., N} and m∈{1, ..., M}, after X symbols from a last symbol of a PDCCH reception with a DCI format scheduling a PUSCH transmission with a same HARQ process number as for the transmission of the first PUSCH MAC CE and having a toggled NDI field value, the UE: (1) monitors PDCCH in respective Type-1 CORESETs associated with CORESETGroupIndex value n−1 (or m−1), and receives PDSCH (e.g., the PDSCH scheduled by the PDCCH in the Type-1 CORESETs associated with CORESETGroupIndex value n−1 or m−1) and aperiodic CSI-RS in a resource from a CSI-RS resource set with same indicated TCI state n (or m) as for the PDCCH and PDSCH, using the same antenna port quasi co-location parameters as the ones associated with the corresponding index q_new_n or (q_new_m), if any, for n∈{1, ..., N} and m∈{1, ..., M}, and (2) transmits PUCCH, PUSCH (e.g., the PUCCH and the PUSCH associated with the PDCCH in the Type-1 CORESETs associated with CORESETGroupIndex value n−1 or m−1) and SRS with same indicated TCI state n (or m) as for the PUCCH and the PUSCH using a same spatial domain filter as the one corresponding to q_new_n (or q_new_m), and a power setting associated with the indicated Unified TCI state n (or m) with q_u=0, q_d=q_new_n (or q_new_m), and closed loop index l=0 or 1, for n∈{1, ..., N} and m∈{1, ..., M}.

In such examples, X could correspond to 28, and the subcarrier spacing (SCS) for the X=28 symbols could correspond to one or more of (n∈{1, ..., N} and m∈{1, ..., M}): (1) the smallest of the SCS configurations of the active DL BWP for the PDCCH reception, e.g., in the Type-1 CORESETs associated with CORESETGroupIndex value n−1 (or m−1), and of the active DL BWP(s) of the serving cell; or (2) the smallest of the SCS configurations of all the signal(s)/channels sharing the same indicated Unified TCI state n or m (e.g., provided by the higher layer parameter TCI-State_r17).

In one example, if the UE has sent/indicated to the network q_new_n (or q_new_m) for n∈{1, ..., N} and m∈{1, ..., M}, after X symbols from a last symbol of a first PDCCH reception in a search space set provided by recoverySearchSpaceId where the UE detects a DCI format with CRC scrambled by C-RNTI or MCS-C-RNTI, the UE: (1) monitors PDCCH in respective Type-2 CORESETs associated with CORESETGroupIndex value n−1 (or m−1), and receives PDSCH (e.g., the PDSCH scheduled by the PDCCH in the Type-2 CORESETs associated with CORESETGroupIndex value n−1 or m−1) and aperiodic CSI-RS in a resource from a CSI-RS resource set with same indicated TCI state n (or m) as for the PDCCH and PDSCH, using the same antenna port quasi co-location parameters as the ones associated with the corresponding index q_new_n (or q_new_m), if any, for n∈{1, ..., N} and m∈{1, ..., M}, and (2) transmits PUCCH, PUSCH (e.g., the PUCCH and the PUSCH associated with the PDCCH in the Type-2 CORESETs associated with CORESETGroupIndex value n−1 or m−1) and SRS with same indicated TCI state n (or m) as for the PUCCH and the PUSCH using a same spatial domain filter as for the last PRACH transmission, and a power setting of q_u=0, q_d=q_new_n (or q_new_m) and closed loop index l=0 or 1 (e.g., associated with the indicated TCI state n or m provided by TCI-State), for n∈{1, ..., N} and m∈{1, ..., M}.

In such examples, X could correspond to 28, and the subcarrier spacing (SCS) for the X=28 symbols could correspond to one or more of (n∈{1, ..., N} and m∈{1, ..., M}): (1) the smallest of the SCS configurations of the active DL BWP for the PDCCH reception, e.g., in the Type-2 CORESETs associated with CORESETGroupIndex value n−1 (or m−1), and of the active DL BWP(s) of the serving cell; or (2) the smallest of the SCS configurations of all the signal(s)/channels sharing the same indicated TCI state n or m (e.g., provided by the higher layer parameter TCI-State).

After the UE detects a DCI format with CRC scrambled by C-RNTI or MCS-C-RNTI in the search space set provided by recoverySearchSpaceId, the UE continues to monitor PDCCH candidates in the search space set provided by recoverySearchSpaceId until the UE receives a MAC CE activation command for the TCI state n (or m) provided by TCI-State for respective Type-2 CORESETs associated with CORESETGroupIndex value n−1 (or m−1), where n∈{1, ..., N} and m∈{1, ..., M}.

In one example, if the UE has sent/indicated to the network q_new_n (or q_new_m) for n∈{1, ..., N} and m∈{1, ..., M}, and if the UE provides BFR MAC CE in Msg3 or MsgA of contention based random access procedure, after X symbols from the last symbol of the PDCCH reception that determines the completion of the contention based random access procedure as described in the 3GPP TS 38.321, the UE: (1) monitors PDCCH in respective Type-2 CORESETs associated with CORESETGroupIndex n (or m), and receives PDSCH (e.g., the PDSCH scheduled by the PDCCH in the Type-2 CORESETs associated with CORESETGroupIndex n or m) and aperiodic CSI-RS in a resource from a CSI-RS resource set with same indicated TCI state n (or m) as for the PDCCH and PDSCH, using the same antenna port quasi co-location parameters as the ones associated with the corresponding index q_new_n (q_new_m), if any, for n∈{1, ..., N} and m∈{1, ..., M}, and (2) transmits PUCCH, PUSCH (e.g., the PUCCH and the PUSCH associated with the PDCCH in the Type-2 CORESETs associated with CORESETGroupIndex value n−1 or m−1) and SRS with same indicated TCI state n (or m) as for the PUCCH and the PUSCH using a same spatial domain filter as for the last PRACH transmission, and a power setting of q_u=0, q_d=q_new_n (or q_new_m) and closed loop index l=0 or 1 (e.g., associated with the indicated TCI state n or m provided by TCI-State), for n∈{1, ..., N} and m∈{1, ..., M}.

In such examples, X could correspond to 28, and the subcarrier spacing (SCS) for the X=28 symbols could correspond to one or more of (for n∈{1, ..., N} and m∈{1, ..., M}): (1) the smallest of the SCS configurations of the active DL BWP for the PDCCH reception, e.g., in the Type-2 CORESETs associated with CORESETGroupIndex value n−1 (or m−1), and of the active DL BWP(s) of the serving cell; or (2) the smallest of the SCS configurations of all the signal(s)/channels sharing the same indicated TCI state n or m (e.g., provided by the higher layer parameter TCI-State).

In one example, if the UE has sent/indicated to the network q_new_n (or q_new_m) for n∈{1, ..., N} and m∈{1, ..., M}, after X symbols from a last symbol of a PDCCH reception with a DCI format scheduling a PUSCH transmission with a same HARQ process number as for the transmission of the first PUSCH MAC CE and having a toggled NDI field value, the UE: (1) monitors PDCCH in respective Type-2 CORESETs associated with CORESETGroupIndex value n−1 (or m−1), and receives PDSCH (e.g., the PDSCH scheduled by the PDCCH in the Type-2 CORESETs associated with CORESETGroupIndex value n−1 or m−1) and aperiodic CSI-RS in a resource from a CSI-RS resource set with same indicated TCI state n (or m) as for the PDCCH and PDSCH, using the same antenna port quasi co-location parameters as the ones associated with the corresponding index q_new_n (or q_new_m), if any, for n∈{1, ..., N} and m∈{1, ..., M} and (2)transmits PUCCH, PUSCH (e.g., the PUCCH and the PUSCH associated with the PDCCH in the Type-2 CORESETs associated with CORESETGroupIndex value n−1 or m−1) and SRS with same indicated TCI state n (or m) as for the PUCCH and the PUSCH using a same spatial domain filter as the one corresponding to q_new_n (or q_new_m), and a power setting of q_u=0, q_d=q_new_n (or q_new_m) and closed loop index l=0 or 1 (e.g., associated with the indicated TCI state n or m provided by TCI-State).

In such examples, X could correspond to 28, and the subcarrier spacing (SCS) for the X=28 symbols could correspond to one or more of (n∈{1, ..., N} and m∈{1, ..., M}): (1) the smallest of the SCS configurations of the active DL BWP for the PDCCH reception, e.g., in the Type-2 CORESETs associated with CORESETGroupIndex value n−1 (or m−1), and of the active DL BWP(s) of the serving cell; or (2) the smallest of the SCS configurations of all the signal(s)/channels sharing the same indicated TCI state n or m (e.g., provided by the higher layer parameter TCI-State).

In one example, if the UE is provided TCI-State_r17 indicating M≥1 joint DL and UL Unified TCI states or M≥1 separate UL Unified TCI states or a first combination of M≥1 joint DL and UL Unified TCI states and separate UL Unified TCI states or N≥1 separate DL Unified TCI states or a second combination of N≥1 joint DL and UL Unified TCI states and separate DL Unified TCI states or a third combination of N≥1 joint DL and UL Unified TCI states, separate DL Unified TCI states and separate UL Unified TCI states for the PCell or the PSCell as described in the 3GPP TS 38.214, and if the UE has sent/indicated to the network q_new_n (or q_new_m) for n∈{1, ..., N} and m∈{1, ..., M}, after X symbols from a last symbol of a first PDCCH reception in a search space set provided by recoverySearchSpaceId where the UE detects a DCI format with CRC scrambled by C-RNTI or MCS-C-RNTI, the UE: (1) monitors PDCCH in respective Type-1 or Type-2 CORESETs associated with CORESETGroupIndex value n−1 (or m−1), and receives PDSCH (e.g., the PDSCH scheduled by the PDCCH in the Type-1 or Type-2 CORESETs associated with CORESETGroupIndex value n−1 or m−1) and aperiodic CSI-RS in a resource from a CSI-RS resource set with same indicated TCI state n (or m) as for the PDCCH and PDSCH, using the same antenna port quasi co-location parameters as the ones associated with the corresponding index q_new_n (or q_new_m), if any, for n∈{1, ..., N} and m∈{1, ..., M}, and (2) transmits PUCCH, PUSCH (e.g., the PUCCH and the PUSCH associated with the PDCCH in the Type-1 or Type-2 CORESETs associated with CORESETGroupIndex value n−1 or m−1) and SRS with same indicated TCI state n (or m) as for the PUCCH and the PUSCH using a same spatial domain filter as for the last PRACH transmission, and a power setting of q_u=0, q_d=q_new_n (or q_new_m) and closed loop index l=0 or 1 (e.g., associated with the indicated TCI state n or m provided by TCI-State_r17 or TCI-State), for n∈{1, ..., N} and m∈{1, ..., M}.

In such examples, X could correspond to 28, and the subcarrier spacing (SCS) for the X=28 symbols could correspond to one or more of (n∈{1, ..., N} and m∈{1, ..., M}): (1) the smallest of the SCS configurations of the active DL BWP for the PDCCH reception, e.g., in the Type-1 and/or Type-2 CORESETs associated with CORESETGroupIndex value n−1 (or m−1), and of the active DL BWP(s) of the serving cell; or (2) the smallest of the SCS configurations of all the signal(s)/channels sharing the same indicated TCI state n or m (e.g., provided by the higher layer parameter TCI-State_r17 or TCI-State).

After the UE detects a DCI format with CRC scrambled by C-RNTI or MCS-C-RNTI in the search space set provided by recoverySearchSpaceId, the UE continues to monitor PDCCH candidates in the search space set provided by recoverySearchSpaceId until the UE receives a MAC CE or DCI (e.g., DCI format 1_1 or 1_2 with or without DL assignment) based signalling to update the Unified TCI state n (or m) provided by TCI-State_r17 for respective Type-1 CORESETs associated with CORESETGroupIndex value n−1 (or m−1) and/or a MAC CE activation command for the TCI state n (or m) provided by TCI-State for respective Type-2 CORESETs associated with CORESETGroupIndex value n−1 (or m−1), where n∈{1, . . . , N} and m∈{1, . . . , M}.

In one example, if the UE is provided TCI-State_r17 indicating M≥1 joint DL and UL Unified TCI states or M≥1 separate UL Unified TCI states or a first combination of M≥1 joint DL and UL Unified TCI states and separate UL Unified TCI states or N≥1 separate DL Unified TCI states or a second combination of N≥1 joint DL and UL Unified TCI states and separate DL Unified TCI states or a third combination of N≥1 joint DL and UL Unified TCI states, separate DL Unified TCI states and separate UL Unified TCI states for the PCell or the PSCell as described in the 3GPP TS 38.214, and if the UE has sent/indicated to the network q_new_n (or q_new_m) for n∈{1, . . . , N} and m∈{1, . . . , M} and the UE provides BFR MAC CE in Msg3 or MsgA of contention based random access procedure, after X symbols from the last symbol of the PDCCH reception that determines the completion of the contention based random access procedure as described in the 3GPP TS 38.321, the UE: (1) monitors PDCCH in respective Type-1 or Type-2 CORESETs associated with CORESETGroupIndex value n−1 (or m−1), and receives PDSCH (e.g., the PDSCH scheduled by the PDCCH in the Type-1 or Type-2 CORESETs associated with CORESETGroupIndex value n−1 or m−1) and aperiodic CSI-RS in a resource from a CSI-RS resource set with same indicated TCI state n (or m) as for the PDCCH and PDSCH, using the same antenna port quasi co-location parameters as the ones associated with the corresponding index q_new_n (or q_new_m), if any, for n∈{1, . . . , N} and m∈{1, . . . , M}, and (2) transmits PUCCH, PUSCH (e.g., the PUCCH and the PUSCH associated with the PDCCH in the Type-1 or Type-2 CORESETs associated with CORESETGroupIndex value n−1 or m−1) and SRS with same indicated TCI state n (or m) as for the PUCCH and the PUSCH using a same spatial domain filter as for the last PRACH transmission, and a power setting of q_u=0, q_d=q_new_n (or q_new_m) and closed loop index l=0 or 1 (e.g., associated with the indicated TCI state n or m provided by TCI-State_r17 or TCI-State), for n∈{1, . . . , N} and m∈{1, . . . , M}.

In such examples, X could correspond to 28, and the subcarrier spacing (SCS) for the X=28 symbols could correspond to one or more of (n∈{1, . . . , N} and m∈{1, . . . , M}): (1) the smallest of the SCS configurations of the active DL BWP for the PDCCH reception, e.g., in the Type-1 and/or Type-2 CORESETs associated with CORESETGroupIndex value n−1 (or m−1), and of the active DL BWP(s) of the serving cell; or (2) the smallest of the SCS configurations of all the signal(s)/channels sharing the same indicated TCI state n or m (e.g., provided by the higher layer parameter TCI-State_r17 or TCI-State).

In one example, if the UE is provided TCI-State_r17 indicating M≥1 joint DL and UL Unified TCI states or M≥1 separate UL Unified TCI states or a first combination of M≥1 joint DL and UL Unified TCI states and separate UL Unified TCI states or N≥1 separate DL Unified TCI states or a second combination of N≥1 joint DL and UL Unified TCI states and separate DL Unified TCI states or a third combination of N≥1 joint DL and UL Unified TCI states, separate DL Unified TCI states and separate UL Unified TCI states, and if the UE has sent/indicated to the network q_new_n (or q_new_m) for n∈{1, . . . , N} and m∈{1, . . . , M}, after X symbols from a last symbol of a PDCCH reception with a DCI format scheduling a PUSCH transmission with a same HARQ process number as for the transmission of the first PUSCH MAC CE and having a toggled NDI field value, the UE: (1) monitors PDCCH in respective Type-1 or Type-2 CORESETs associated with CORESETGroupIndex value n−1 (or m−1), and receives PDSCH (e.g., the PDSCH scheduled by the PDCCH in the Type-1 or Type-2 CORESETs associated with CORESETGroupIndex value n−1 or m−1) and aperiodic CSI-RS in a resource from a CSI-RS resource set with same indicated TCI state n (or m) as for the PDCCH and PDSCH, using the same antenna port quasi co-location parameters as the ones associated with the corresponding index q_new_n (or q_new_m), if any, for n∈{1, . . . , N} and m∈{1, . . . , M}, and (2) transmits PUCCH, PUSCH (e.g., the PUCCH and the PUSCH associated with the PDCCH in the Type-1 or Type-2 CORESETs associated with CORESETGroupIndex value n−1 or m−1) and SRS with same indicated TCI state n (or m) as for the PUCCH and the PUSCH using a same spatial domain filter as the one corresponding to q_new_n (or q_new_m), and a power setting of q_u=0, q_d=q_new_n (or q_new_m) and closed loop index l=0 or 1 (e.g., associated with the indicated TCI state n or m provided by TCI-State_r17 or TCI-State), for n∈{1, . . . , N} and m∈{1, . . . , M}.

In such examples, X could correspond to 28, and the subcarrier spacing (SCS) for the X=28 symbols could correspond to one or more of (n∈{1, . . . , N} and m∈{1, . . . , M}): (1) the smallest of the SCS configurations of the active DL BWP for the PDCCH reception, e.g., in the Type-1 and/or Type-2 CORESETs associated with CORESETGroupIndex value n−1 (or m−1), and of the active DL BWP(s) of the serving cell; or (2) the smallest of the SCS configurations of all the signal(s)/channels sharing the same indicated TCI state n or m (e.g., provided by the higher layer parameter TCI-State_r17 or TCI-State).

In one example, after X symbols from a last symbol of a first PDCCH reception in a search space set provided by recoverySearchSpaceId where the UE detects a DCI format with CRC scrambled by C-RNTI or MCS-C-RNTI, if the UE has sent/indicated to the network qA_new_n (or qA_new_m) for n∈{1, . . . , N} and m∈{1, . . . , M}, the UE: (1) monitors PDCCH in respective Type-1 CORESETs associated with CORESETGroupIndex value n−1 (or m−1), and receives PDSCH (e.g., the PDSCH scheduled by the PDCCH in the Type-1 CORESETs associated with CORESETGroupIndex value n−1 or m−1) and aperiodic CSI-RS in a resource from a CSI-RS resource set with same indicated TCI state n (or m) as for the PDCCH and PDSCH, using the same antenna port quasi co-location parameters as the ones associated with the corresponding index qA_new_n (or qA_new_m), if any, (2) transmits PUCCH, PUSCH (e.g., the PUCCH and the PUSCH associated with the PDCCH in the first CORESETs) and SRS with same indicated TCI state n (or m) as for the PUCCH and the PUSCH using a same spatial domain filter as for the last PRACH transmission, and a power setting associated with the indicated Unified TCI state n (or m) with q_u=0, q_d=qA_new_n (or qA_new_m), and closed loop index l=0 or 1, and after the UE detects a DCI format with CRC scrambled by C-RNTI or MCS-C-RNTI in the search space set provided by recoverySearchSpaceId, the UE continues to monitor PDCCH candidates in the search space set provided by recoverySearchSpaceId until the UE receives a MAC CE or DCI (e.g., DCI format 1_1 or 1_2 with or without DL assignment) based signalling to update the Unified TCI state n (or m) provided by TCI-State_r17 for respective Type-1 CORESETs associated with CORESETGroupIndex value n−1 (or m−1), where n∈{1, . . . , N} and m∈{1, . . . , M}.

In one example, after X symbols from a last symbol of a first PDCCH reception in a search space set provided by recoverySearchSpaceId where the UE detects a DCI format with CRC scrambled by C-RNTI or MCS-C-RNTI, if the UE has sent/indicated to the network qB_new_n (or qB_new_m) for n∈{1, . . . , N} and m∈{1, . . . , M}, the UE: (1) monitors PDCCH in respective Type-2 CORESETs associated with CORESETGroupIndex value n−1 (or m−1), and receives PDSCH (e.g., the PDSCH scheduled by the PDCCH in the Type-2 CORESETs associated with CORESETGroupIndex value n−1 or m−1) and aperiodic CSI-RS in a resource from a CSI-RS resource set with same indicated TCI state n (or m) as for the PDCCH and PDSCH, using the same antenna port quasi co-location parameters as the ones associated with the corresponding index qB_new_n (or qB_new_m), if any, (2) transmits PUCCH, PUSCH (e.g., the PUCCH and the PUSCH associated with the PDCCH in the Type-2 CORESETs associated with CORESETGroupIndex value n−1 or m−1) and SRS with same indicated TCI state n (or m) as for the PUCCH and the PUSCH using a same spatial domain filter as for the last PRACH transmission, and a power setting of q_u=0, q_d=qB_new_n (or qB_new_m) and closed loop index l=0 or 1 (e.g., associated with the indicated TCI state n or m provided by TCI-State), and after the UE detects a DCI format with CRC scrambled by C-RNTI or MCS-C-RNTI in the search space set provided by recoverySearchSpaceId, the UE continues to monitor PDCCH candidates in the search space set provided by recoverySearchSpaceId until the UE receives a MAC CE activation command for the TCI state n (or m) provided by TCI-State for respective Type-2 CORESETs associated with CORESETGroupIndex value n−1 (or m−1), where n∈{1, . . . , N} and m∈{1, . . . , M}.

In such examples, X could correspond to 28, and the subcarrier spacing (SCS) for the X=28 symbols could correspond to one or more of (n∈{1, . . . , N} and m∈{1, . . . , M}): (1) the smallest of the SCS configurations of the active DL BWP for the PDCCH reception, e.g., in the Type-1 and/or Type-2 CORESETs associated with CORESETGroupIndex value n−1 (or m−1), and of the active DL BWP(s) of the serving cell; or (2) the smallest of the SCS configurations of all the signal(s)/channels sharing the indicated TCI state(s) n or m (e.g., provided by the higher layer parameter TCI-State_r17 and/or TCI-State).

In one example, if the UE provides BFR MAC CE in Msg3 or MsgA of contention based random access procedure, after X symbols from the last symbol of the PDCCH reception that determines the completion of the contention based random access procedure as described in the 3GPP TS 38.321, if the UE has sent/indicated to the network qA_new_n (or qA_new_m) for n∈{1, . . . , N} and m∈{1, . . . , M}, the UE: (1) monitors PDCCH in respective Type-1 CORESETs associated with CORESETGroupIndex value n−1 (or m−1), and receives PDSCH (e.g., the PDSCH scheduled by the PDCCH in the Type-1 CORESETs associated with CORESETGroupIndex value n−1 or m−1) and aperiodic CSI-RS in a resource from a CSI-RS resource set with same indicated TCI state n (or m) as for the PDCCH and PDSCH, using the same antenna port quasi co-location parameters as the ones associated with the corresponding index qA_new_n (or qA_new_m), if any, (2) transmits PUCCH, PUSCH (e.g., the PUCCH and the PUSCH associated with the PDCCH in the Type-2 CORESETs associated with CORESETGroupIndex value n−1 or m−1) and SRS with same indicated TCI state n (or m) as for the PUCCH and the PUSCH using a same spatial domain filter as for the last PRACH transmission, and a power setting associated with the indicated Unified TCI state n (or m) with q_u=0, q_d=qA_new_n (or qA_new_m), and closed loop index l=0 or 1.

In one example, if the UE provides BFR MAC CE in Msg3 or MsgA of contention based random access procedure, after X symbols from the last symbol of the PDCCH reception that determines the completion of the contention based random access procedure as described in the 3GPP TS 38.321, if the UE has sent/indicated to the network qB_new_n (or qB_new_m) for n∈{1, . . . , N} and m∈{1, . . . , M}, the UE: (1) monitors PDCCH in respective Type-2 CORESETs associated with CORESETGroupIndex value n−1 (or m−1), and receives PDSCH (e.g., the PDSCH scheduled by the PDCCH in the Type-2 CORESETs associated with CORESETGroupIndex value n−1 or m−1) and aperiodic CSI-RS in a resource from a CSI-RS resource set with same indicated TCI state n (or m) as for the PDCCH and PDSCH, using the same antenna port quasi co-location parameters as the ones associated with the corresponding index qB_new_n (or qB_new_m), if any, (2) transmits PUCCH, PUSCH (e.g., the PUCCH and the PUSCH associated with the PDCCH in the Type-2 CORESETs associated with CORESETGroupIndex value n−1 or m−1) and SRS with same indicated TCI state n (or m) as for the PUCCH and the PUSCH using a same spatial domain filter as for the last PRACH transmission, and a power setting of q_u=0, q_d=qB_new_n (or qB_new_m) and closed loop index l=0 or 1 (e.g., associated with the indicated TCI state n or m provided by TCI-State).

In such examples, X could correspond to 28, and the subcarrier spacing (SCS) for the X=28 symbols could correspond to one or more of (n∈{1, . . . , N} and m∈{1, . . . , M}): (1) the smallest of the SCS configurations of the active DL BWP for the PDCCH reception, e.g., in the Type-1 and/or Type-2 CORESETs associated with CORESETGroupIndex value n−1 (or m−1), and of the active DL BWP(s) of the serving cell; or (2) the smallest of the SCS configurations of all the signal(s)/channels sharing the indicated TCI state(s) n or m (e.g., provided by the higher layer parameter TCI-State_r17 and/or TCI-State).

In one example, after X symbols from a last symbol of a PDCCH reception with a DCI format scheduling a PUSCH transmission with a same HARQ process number as for the transmission of the first PUSCH MAC CE and having a toggled NDI field value, if the UE has sent/indicated to the network qA_new_n (or qA_new_m) for n∈{1, . . . , N} and m∈{1, . . . , M}, the UE: (1) monitors PDCCH in respective Type-1 CORESETs associated with CORESETGroupIndex value n−1 (or m−1), and receives PDSCH (e.g., the PDSCH scheduled by the PDCCH in the Type-1 CORESETs associated with CORESETGroupIndex value n−1 or m−1) and aperiodic CSI-RS in a resource from a CSI-RS resource set with same indicated TCI state n (or m) as for the PDCCH and PDSCH, using the same antenna port quasi co-location parameters as the ones associated with the corresponding index qA_new_n (or qA_new_m), if any, (2) transmits PUCCH, PUSCH (e.g., the PUCCH and the PUSCH associated with the PDCCH in the Type-1 CORESETs associated with CORESETGroupIndex value n−1 or m−1) and SRS with same indicated TCI state n (or m) as for the PUCCH and the PUSCH using a same spatial domain filter as the one corresponding to qA_new_n (or qA_new_m), and a power setting associated with the indicated Unified TCI state n (or m) with q_u=0, q_d=qA_new_n (or qA_new_m), and closed loop index l=0 or 1.

In one example, after X symbols from a last symbol of a PDCCH reception with a DCI format scheduling a PUSCH transmission with a same HARQ process number as for the transmission of the first PUSCH MAC CE and having a toggled NDI field value, if the UE has sent/indicated to the network qB_new_n (or qB_new_m) for n∈{1, . . . , N} and m∈{1, . . . , M}, the UE: (1) monitors PDCCH in respective Type-2 CORESETs associated with CORESETGroupIndex value n−1 (or m−1), and receives PDSCH (e.g., the PDSCH scheduled by the PDCCH in the Type-2 CORESETs associated with CORESETGroupIndex value n−1 or m−1) and aperiodic CSI-RS in a resource from a CSI-RS resource set with same indicated TCI state n (or m) as for the PDCCH and PDSCH, using the same antenna port quasi co-location parameters as the ones associated with the corresponding index qB_new_n (or qB_new_m), if any, (2) transmits PUCCH, PUSCH (e.g., the PUCCH and the PUSCH associated with the PDCCH in the Type-2 CORESETs associated with CORESETGroupIndex value n−1 or m−1) and SRS with same indicated TCI state n (or m) as for the PUCCH and the PUSCH using a same spatial domain filter as the one corresponding to qB_new_n (or qB_new_m), and a power setting of q_u=0, q_d=qB_new_n (or qB_new_m) and closed loop index l=0 or 1 (e.g., associated with the indicated TCI state n or m provided by TCI-State).

In such examples, X could correspond to 28, and the subcarrier spacing (SCS) for the X=28 symbols could correspond to one or more of (n∈{1, . . . , N} and m∈{1, . . . , M}): (1) the smallest of the SCS configurations of the active DL BWP for the PDCCH reception, e.g., in the Type-1 and/or Type-2 CORESETs associated with CORESETGroupIndex value n−1 (or m−1), and of the active DL BWP(s) of the serving cell; or (2) the smallest of the SCS configurations of all the signal(s)/channels sharing the indicated TCI state(s) n or m (e.g., provided by the higher layer parameter TCI-State_r17 and/or TCI-State).

In a multi-DCI based multi-TRP system, one or more CORESETs could be configured with a same pool index, denoted by CORESETPoolIndex. The CORESETs configured with the same CORESETPoolIndex value could be associated with the same TRP in a multi-TRP system. In the present disclosure, the UE could be provided by PDCCH-Config multiple (e.g., two) CORESETPoolIndex values (e.g., 0 and 1). The association of a CORESET and a CORESETPoolIndex value could be via indicating the explicit CORESETPoolIndex value (e.g., either 0 or 1) in the parameter, e.g., the higher layer parameter ControlResourceSet, configuring the CORESET.

As discussed in the present disclosure, the UE could be provided by the network N≥1 or M≥1 MAC CEs or DCIs (e.g., DCI format 1_1 or 1_2 with or without DL assignment) each indicating at least one joint DL and UL Unified TCI state or separate UL Unified TCI state or separate DL Unified TCI state through the higher layer parameter TCI-State_r17 or DLorJoint-TCIState or UL-TCIState for UE-dedicated reception on PDSCH/PDCCH or dynamic-grant/configured-grant based PUSCH and all of dedicated PUCCH resources and associated with a CORESETPoolIndex value (e.g., either 0 or 1). For this case, DM-RS antenna ports for PDCCH receptions in one or more CORESETs associated with a CORESETPoolIndex value may or may not be quasi co-located with the reference signal(s) provided in the corresponding Unified TCI state(s) (e.g., a joint DL and UL TCI state or separate UL TCI state or separate DL TCI state) indicated via the MAC CE or DCI (out of the N≥1 or M≥1 MAC CEs or DCIs for Unified TCI state indication/update) associated with the same CORESETPoolIndex value.

In the present disclosure, the control resource set(s)—associated with a CORESETPoolIndex value—whose QCL assumption(s) follow that provided in the corresponding Unified TCI state(s) or sharing the corresponding Unified TCI state(s) indicated via the MAC CE or DCI for Unified TCI state indication/update associated with the same CORESETPoolIndex value is referred to as Type-I CORESET(s), while the control resource set(s)—associated with a CORESETPoolIndex value—whose QCL assumption(s) does not follow that provided in the corresponding Unified TCI state or not sharing the corresponding Unified TCI state indicated via the MAC CE or DCI for Unified TCI state indication/update associated with the same CORESETPoolIndex value is referred to as Type-II CORESET(s).

Furthermore, a Type-I CORESET or a Type-II CORESET could correspond to one or more of: (1) "CORESET A": a CORESET other than CORESET with index 0 (or CORESET #0) associated with only UE-dedicated PDCCH reception(s) in a CC, comprising, e.g., CORESET(s) associated with USS set(s) or Type3-PDCCH CSS set(s); (2) "CORESET B": a CORESET other than CORESET #0 associated with only non-UE-dedicated PDCCH reception(s) in a CC, comprising, e.g., CORESET(s) associated with all types of CSS sets such as Type0/0A/1/2/3-PDCCH CSS sets or CSS sets other than Type3-PDCCH CSS set(s) such as Type0/0A/1/2-PDCCH CSS sets; (3) "CORESET C": a CORESET other than CORESET #0 associated with both UE-dedicated and non-UE-dedicated PDCCH receptions in a CC; or (4) CORESET #0, i.e., CORESET with index 0.

The UE could be provided/configured with "useIndicatedR17TCIState" for one or more of the Type-I CORESETs. For instance, the UE could be provided/configured with "useIndicatedR17TCIstate" set to "enabled" in the parameter, e.g., the higher layer parameter ControlResourceSet, that configures the corresponding Type-I CORESET(s).

For a multi-DCI based multi-TRP system wherein a UE could be provided by the network, e.g., via N≥1 or M≥1 MAC CEs or beam indication DCIs (e.g., DCI format 1_1 or 1_2 with or without DL assignment) each associated with a CORESETPoolIndex value, M≥1 joint DL and UL unified TCI states or M≥1 separate UL unified TCI states or a first combination of M≥1 joint DL and UL unified TCI states and separate UL unified TCI states or N≥1 separate DL unified TCI states or a second combination of N≥1 joint DL and UL unified TCI states and separate DL unified TCI states or a third combination of N≥1 joint DL and UL unified TCI states, separate DL unified TCI states and separate UL unified TCI states for UE-dedicated reception on PDSCH/PDCCH or dynamic-grant/configured-grant based PUSCH and all of dedicated PUCCH resources, a BFD RS set could include one or more BFD RS resource indexes associated with one or more indicated unified TCI states associated with a same CORESETPoolIndex value.

In the present disclosure, the BFD RS set n (or m) or the n-th (or m-th) BFD RS set including one or more BFD RS resource indexes could be associated with/configured for the indicated unified TCI state n (or m) or the n-th (or m-th) indicated unified TCI state indicated by one or more TCI codepoints of one or more TCI fields in a beam indication DCI—e.g., among all the indicated N (or M) unified TCI states indicated by one or more (e.g., N or M) beam indication DCIs—associated with CORESETPoolIndex value n−1 (or m−1) or the beam indication DCI is received in a CORESET associated/configured with CORESET-PoolIndex value n−1 (or m−1), where n∈{1, . . . , N} and m∈{1, . . . , M}. In particularly, for N=2 (or M=2), the first BFD RS set including one or more BFD RS resource indexes could be associated with/configured for the first indicated unified TCI state indicated by one or more TCI codepoints of one or more TCI fields in a beam indication DCI—e.g., among the N=2 (M=2) unified TCI states indicated by one or more (e.g., N=2 or M=2) beam indication DCIs—associated with value 0 of CORESETPoolIndex or the beam indication DCI is received in a CORESET associated/configured with value 0 of CORESETPoolIndex, and the second BFD RS set including one or more BFD RS resource indexes could be associated with/configured for the second indicated unified TCI state indicated by one or more TCI codepoints of one or more TCI fields in a beam indication DCI—e.g., among the N=2 (M=2) unified TCI states indicated by one or more (e.g., N=2 or M=2) beam indication DCIs—associated with value 1 of CORESETGroupIndex or the beam indication DCI is received in a CORESET associated/configured with value 1 of CORESETPoolIndex.

In the present disclosure, the indicated unified TCI state n or m could correspond to the n-th joint DL and UL TCI state or the m-th separate UL TCI state or the n-th separate DL TCI state or the m-th TCI state in the first combination of TCI states or the n-th TCI state in the second combination of TCI states or the n-th TCI state in the third combination of TCI states or the joint DL and UL TCI state with the n-th lowest or highest TCI state ID or the separate UL TCI state with the m-th lowest or highest TCI state ID or the separate DL TCI state with the n-th lowest or highest TCI state ID or the TCI state in the first combination of TCI states with the m-th lowest or highest TCI state ID or the TCI state in the second combination of TCI states with the n-th lowest or highest TCI state ID or the TCI state in the third combination of TCI states with the n-th lowest or highest TCI state ID indicated via MAC CE n (or m) or DCI n (or m)—out of the total N≥1 or M≥1 MAC CEs or DCIs for unified TCI state indication—associated with CORESETPoolIndex value n−1 (or m−1), where n∈{1, . . . , N} and m∈{1, . . . , M}.

The UE could implicitly determine the BFD RS set n∈{1, . . . , N} (or m∈{1, . . . , M}) q0_n (or q0_m) in a multi-DCI based multi-TRP system under the Unified TCI framework, wherein the UE could be provided by the network, e.g., via N≥1 or M≥1 MAC CEs or DCIs (e.g., DCI format 1_1 or 1_2 with or without DL assignment) each associated with a CORESETPoolIndex value, M≥1 joint DL and UL Unified TCI states or M≥1 separate UL Unified TCI states or a first combination of M≥1 joint DL and UL Unified TCI states and separate UL Unified TCI states or N≥1 separate DL Unified TCI states or a second combination of N≥1 joint DL and UL Unified TCI states and separate DL Unified TCI states or a third combination of N≥1 joint DL and UL Unified TCI states, separate DL Unified TCI states and separate UL Unified TCI states for UE-dedicated reception on PDSCH/PDCCH or dynamic-grant/configured-grant based PUSCH and all of dedicated PUCCH resources.

In one example, when a second condition is achieved/met/satisfied/triggered, the UE could determine the BFD RS set q0_n (or q0_m) to include periodic CSI-RS resource configuration indexes or SSB indexes (also referred to as BFD RS resource indexes) with same values as the RS indexes in the RS sets indicated in the unified TCI state n (or m) or the n-th (or m-th) indicated unified TCI state indicated by one or more TCI codepoints of one or more TCI fields in a beam indication DCI—e.g., among all the indicated N (or M) unified TCI states indicated by one or more (e.g., N or M) beam indication DCIs—associated with CORESET-PoolIndex value n−1 (or m−1) or the beam indication DCI is received in a CORESET associated/configured with CORESETPoolIndex value n−1 (m−1)—provided by the higher layer parameter TCI-State-r17 or DLorJoint-TCIState or UL-TCIState for respective Type-I CORESETs associated with CORESETPoolIndex value n−1 (or m−1) that the UE uses for monitoring PDCCH, where n∈{1, . . . , N} and m∈{1, . . . , M}.

That is, for N=2 (or M=2), when the second condition is achieved/met/satisfied/triggered, the UE could determine the first BFD RS set q0_0 to include periodic CSI-RS resource configuration indexes or SSB indexes (also referred to as BFD RS resource indexes) with same values as the RS indexes in the RS sets indicated in the first (or second) indicated unified TCI state indicated by one or more TCI codepoints of one or more TCI fields in a beam indication DCI, e.g., among the N=2 (or M=2) unified TCI states indicated by one or more (e.g., N=2 or M=2) beam indication DCIs—associated with value 0 (or 1) of CORESET-PoolIndex or the beam indication DCI is received in a CORESET associated/configured with value 0 (or 1) of CORESETPoolIndex—provided by the higher layer parameter TCI-State-r17 or DLorJointTCI-State or UL-TCIState for respective Type-I CORESETs associated with value 0 (or 1) of CORESETPoolIndex that the UE uses for monitoring PDCCH, and the second BFD RS set q0_1 to include periodic CSI-RS resource configuration indexes or SSB indexes (also referred to as BFD RS resource indexes) with same values as the RS indexes in the RS sets indicated in the second (or first) indicated unified TCI state indicated by one or more TCI codepoints of one or more TCI fields in a beam indication DCI, e.g., among the N=2 (or M=2) unified TCI states indicated by one or more (e.g., N=2 or M=2) beam indication DCIs—associated with value 1 (or 0) of CORE-SETPoolIndex or the beam indication DCI is received in a CORESET associated/configured with value 1 (or 0) of CORESETPoolIndex—provided by the higher layer parameter TCI-State-r17 or DLorJointTCI-State or UL-TCIState for respective Type-I CORESETs associated with value 1 (or 0) of CORESETPoolIndex that the UE uses for monitoring PDCCH.

In another example, when a second condition is achieved/met/satisfied/triggered, the UE could determine the BFD RS set q0_n (or q0_m) to include periodic CSI-RS resource configuration indexes or SSB indexes (also referred to as BFD RS resource indexes) with same values as the RS indexes in the RS sets indicated in the TCI state n (or m)—associated with CORESETPoolIndex value n−1 (or m−1) or active for the CORESET(s) associated/configured with CORESETPoolIndex value n−1 (or m−1)—provided by the higher layer parameter TCI-State for respective Type-II CORESETs associated with CORESETPoolIndex value n−1 (or m−1) that the UE uses for monitoring PDCCH, where n∈{1, . . . , N} and m∈{1, . . . , M}.

That is, for N=2 (or M=2), when the second condition is achieved/met/satisfied/triggered, the UE could determine the first BFD RS set q0_0 to include periodic CSI-RS resource configuration indexes or SSB indexes (also referred to as BFD RS resource indexes) with same values as the RS indexes in the RS sets indicated in the first (or second) indicated TCI state, e.g., among the N=2 (or M=2) indicated TCI states—associated with value 0 (or 1) of CORESET-PoolIndex or active for the CORESET(s) associated/configured with value 0 (or 1) of CORESETPoolIndex—provided by the higher layer parameter TCI-State for respective Type-II CORESETs associated with value 0 (or 1) of CORE-SETPoolIndex that the UE uses for monitoring PDCCH, and the second BFD RS set q0_1 to include periodic CSI-RS resource configuration indexes or SSB indexes (also referred to as BFD RS resource indexes) with same values as the RS indexes in the RS sets indicated in the second (or first) indicated TCI state, e.g., among the N=2 (or M=2) indicated TCI states—associated with value 1 (or 0) of CORESET-PoolIndex or active for the CORESET(s) associated/configured with value 1 (or 0) of CORESETPoolIndex—provided by the higher layer parameter TCI-State for respective Type-II CORESETs associated with value 1 (or 0) of CORE-SETPoolIndex that the UE uses for monitoring PDCCH.

In yet another example, when a second condition is achieved/met/satisfied/triggered, the UE could determine the BFD RS set q0_n (or q0_m) to include periodic CSI-RS resource configuration indexes or SSB indexes (also referred to as BFD RS resource indexes) with same values as the RS indexes in the RS sets indicated in the unified TCI state n (or m) or the n-th (or m-th) indicated unified TCI state indicated by one or more TCI codepoints of one or more TCI fields in a beam indication DCI—e.g., among all the indicated N (or M) unified TCI states indicated by one or more (e.g., N or M) beam indication DCIs—associated with CORESET-PoolIndex value n−1 (or m−1) or the beam indication DCI is received in a CORESET associated/configured with CORESETPoolIndex value n−1 (m−1)—provided by the higher layer parameter TCI-State-r17 or DLorJoint-TCIState or UL-TCIState for respective Type-I CORESETs associated with CORESETPoolIndex value n−1 (or m−1) that the UE uses for monitoring PDCCH, and periodic CSI-RS resource configuration indexes or SSB indexes (also referred to as BFD RS resource indexes) with same values as the RS indexes in the RS sets indicated in the TCI state n (or m) provided by the higher layer parameter TCI-State for respective Type-II CORESETs associated with CORE-SETPoolIndex value n−1 (or m−1) that the UE uses for monitoring PDCCH, where n∈{1, . . . , N} and m∈{1, . . . , M}.

That is, for N=2 (or M=2), when the second condition is achieved/met/satisfied/triggered, the UE could determine the first BFD RS set q0_0 to include periodic CSI-RS resource configuration indexes or SSB indexes (also referred to as BFD RS resource indexes) with same values as the RS indexes in the RS sets indicated in the first (or second) indicated unified TCI state indicated by one or more TCI codepoints of one or more TCI fields in a beam indication DCI, e.g., among the N=2 (or M=2) unified TCI states indicated by one or more (e.g., N=2 or M=2) beam indication DCIs—associated with value 0 (or 1) of CORESET-PoolIndex or the beam indication DCI is received in a CORESET associated/configured with value 0 (or 1) of CORESETPoolIndex—provided by the higher layer parameter TCI-State-r17 or DLorJointTCI-State or UL-TCIState for respective Type-I CORESETs associated with value 0 (or 1) of CORESETPoolIndex that the UE uses for monitoring PDCCH and periodic CSI-RS resource configuration indexes or SSB indexes (also referred to as BFD RS resource indexes) with same values as the RS indexes in the RS sets indicated in the first (or second) indicated TCI state, e.g., among the N=2 (or M=2) indicated TCI states—associated with value 0 (or 1) of CORESETPoolIndex or active for the CORESET(s) associated/configured with value 0 (or 1) of CORESETPoolIndex—provided by the higher layer parameter TCI-State for respective Type-II CORESETs associated with value 0 (or 1) of CORESETPoolIndex that the UE uses for monitoring PDCCH, and the second BFD RS set q0_1 to include periodic CSI-RS resource configuration indexes or SSB indexes (also referred to as BFD RS resource indexes) with same values as the RS indexes in the RS sets indicated in the second (or first) indicated unified TCI state indicated by one or more TCI codepoints of one or more TCI fields in a beam indication DCI, e.g., among the N=2 (or M=2) unified TCI states indicated by one or more beam indication DCIs—associated with value 1 (or 0) of CORESETPoolIndex or the beam indication DCI is received in a CORESET associated/configured with value 1 (or 0) of CORESET-PoolIndex—provided by the higher layer parameter TCI-State-r17 or DLorJointTCI-State or UL-TCIState for respective Type-I CORESETs associated with value 1 (or 0) of CORESETPoolIndex that the UE uses for monitoring PDCCH and periodic CSI-RS resource configuration indexes or SSB indexes (also referred to as BFD RS resource indexes) with same values as the RS indexes in the RS sets indicated in the second (or first) indicated TCI state, e.g., among the N=2 (or M=2) indicated TCI states—associated with value 1 (or 0) of CORESETPoolIndex or active for CORESET(s) associated/configured with value 1 (or 0) of CORESETPoolIndex—provided by the higher layer parameter TCI-State for respective Type-II CORESETs associated with value 1 (or 0) of CORESETPoolIndex that the UE uses for monitoring PDCCH.

In yet another example, when a second condition is achieved/met/satisfied/triggered, the UE could determine a first BFD RS set q0A_n (or q0A_m) to include periodic CSI-RS resource configuration indexes or SSB indexes (also referred to as BFD RS resource indexes) with same values as the RS indexes in the RS sets indicated in the unified TCI state n (or m) or the n-th (or m-th) indicated unified TCI state indicated by one or more TCI codepoints of one or more TCI fields in a beam indication DCI—e.g., among all the indicated N (or M) unified TCI states indicated by one or more (e.g., N or M) beam indication DCIs—associated with CORESETPoolIndex value n−1 (or m−1) or the beam indication DCI is received in a CORESET associated/configured with CORESETPoolIndex value n−1 (m−1)—provided by the higher layer parameter TCI-State-r17 or DLor-Joint-TCIState or ULTCI-State for respective Type-I CORESETs associated with CORESETPoolIndex value n−1 (or m−1) that the UE uses for monitoring PDCCH, and a second BFD RS set q0B_n (or q0B_m) to include periodic CSI-RS resource configuration indexes or SSB indexes (also referred to as BFD RS resource indexes) with same values as the RS indexes in the RS sets indicated in the TCI state n (or m) provided by the higher layer parameter TCI-State for respective Type-II CORESETs associated with CORE-SETPoolIndex value n−1 (or m−1) that the UE uses for monitoring PDCCH, where n∈{1, . . . , N} and m∈{1, . . . , M}.

For example, for N=2 (or M=2), when the second condition is achieved/met/satisfied/triggered, the UE could determine the first of first BFD RS set q0A_0 to include periodic CSI-RS resource configuration indexes or SSB indexes (also referred to as BFD RS resource indexes) with same values as the RS indexes in the RS sets indicated in the first (or second) indicated unified TCI state indicated by one or more TCI codepoints of one or more TCI fields in a beam indication DCI, e.g., among the N=2 (or M=2) unified TCI states indicated by one or more (e.g., N=2 or M=2) beam indication DCIs—associated with value 0 (or 1) of CORESETPoolIndex or the beam indication DCI is received in a CORESET associated/configured with value 0 (or 1) of CORESETPoolIndex—provided by the higher layer parameter TCI-State-r17 or DLorJointTCI-State or UL-TCIState for respective Type-I CORESETs associated with value 0 (or 1) of CORESETPoolIndex that the UE uses for monitoring PDCCH, and the second of first BFD RS set q0A_1 to include periodic CSI-RS resource configuration indexes or SSB indexes (also referred to as BFD RS resource indexes) with same values as the RS indexes in the RS sets indicated in the second (or first) indicated unified TCI state indicated by one or more TCI codepoints of one or more TCI fields in a beam indication DCI, e.g., among the N=2 (or M=2) unified TCI states indicated by one or more (e.g., N=2 or M=2) beam indication DCIs—associated with value 1 (or 0) of CORESETPoolIndex or the beam indication DCI is received in a CORESET associated/configured with value 1 (or 0) of CORESETPoolIndex—provided by the higher layer parameter TCI-State-r17 or DLorJointTCI-State or UL-TCIState for respective Type-I CORESETs associated with value 1 (or 0) of CORESETPoolIndex that the UE uses for monitoring PDCCH. Furthermore, the UE could determine the first of second BFD RS set q0B_0 to include periodic CSI-RS resource configuration indexes or SSB indexes (also referred to as BFD RS resource indexes) with same values as the RS indexes in the RS sets indicated in the first (or second) indicated TCI state, e.g., among the N=2 (or M=2) indicated TCI states—associated with value 0 (or 1) of CORESETPoolIndex or active for the CORESET(s) associated/configured with value 0 (or 1) of CORESETPoolIndex—provided by the higher layer parameter TCI-State for respective Type-II CORESETs associated with value 0 (or 1) of CORESETPoolIndex that the UE uses for monitoring PDCCH, and the second of second BFD RS set q0B_1 to include periodic CSI-RS resource configuration indexes or SSB indexes (also referred to as BFD RS resource indexes) with same values as the RS indexes in the RS sets indicated in the second (or first) indicated TCI state, e.g., among the N=2 (or M=2) indicated TCI states—associated with value 1 (or 0) of CORESETPoolIndex or active for the CORESET(s) associated/configured with value 1 (or 0) of CORESETPoolIndex—provided by the higher layer parameter TCI-State for respective Type-II CORESETs associated with value 1 (or 0) of CORESETPoolIndex that the UE uses for monitoring PDCCH.

For another example, for N=2 (or M=2), the UE could determine a first BFD RS set q0A to include periodic CSI-RS resource configuration indexes or SSB indexes (also referred to as BFD RS resource indexes) with same values as the RS indexes in the RS sets indicated in the first (or second) indicated unified TCI state indicated by one or more TCI codepoints of one or more TCI fields in a beam indication DCI, e.g., among the N=2 (or M=2) unified TCI states indicated by one or more (e.g., N=2 or M=2) beam indication DCIs—associated with value 0 (or 1) of CORESETPoolIndex or the beam indication DCI is received in a CORESET associated/configured with value 0 (or 1) of CORESETPoolIndex—provided by the higher layer parameter TCI-State-r17 or DLorJointTCI-State or UL-TCIState for respective Type-I CORESETs associated with value 0 (or 1) of CORESETPoolIndex that the UE uses for monitoring PDCCH, and a second BFD RS set q0B to include periodic CSI-RS resource configuration indexes or SSB indexes (also referred to as BFD RS resource indexes) with same values as the RS indexes in the RS sets indicated in the second (or first) indicated TCI state, e.g., among the N=2 (or M=2) indicated TCI states—associated with value 1 (or 0) of CORESETPoolIndex or active for the CORESET(s) associated/configured with value 1 (or 0) of CORESETPoolIndex—provided by the higher layer parameter TCI-State for respective Type-II CORESETs associated with value 1 (or 0) of CORESETPoolIndex that the UE uses for monitoring PDCCH.

Alternatively, the UE could be configured/indicated by the network the BFD RS set $n \in \{1, \ldots, N\}$ (or $m \in \{1, \ldots, M\}$) q0_n (or q0_m) in a multi-DCI based multi-TRP system under the unified TCI framework, wherein the UE could be provided by the network, e.g., via $N \geq 1$ or $M \geq 1$ MAC CEs or beam indication DCIs (e.g., DCI format 1_1 or 1_2 with or without DL assignment) each associated with a CORESETPoolIndex value, $M \geq 1$ joint DL and UL unified TCI states or $M \geq 1$ separate UL unified TCI states or a first combination of $M \geq 1$ joint DL and UL unified TCI states and separate UL unified TCI states or $N \geq 1$ separate DL unified TCI states or a second combination of $N \geq 1$ joint DL and UL unified TCI states and separate DL unified TCI states or a third combination of $N \geq 1$ joint DL and UL unified TCI states, separate DL unified TCI states and separate UL unified TCI states for UE-dedicated reception on PDSCH/PDCCH or dynamic-grant/configured-grant based PUSCH and all of dedicated PUCCH resources.

In one example, the UE could be configured/indicated by the network, e.g., provided by the higher layer parameter failureDetectionResourcesToAddModList and/or via BFD RS indication MAC CE, the BFD RS set q0_n (or q0_m) of periodic CSI-RS resource configuration indexes or SSB indexes for beam/link failure detection or declaration. The UE could assess the radio link quality of the BFD RS set q0_n (or q0_m) according to SSBs on the PCell or the PSCell or periodic CSI-RS resource configurations that are indicated in the unified TCI state n (or m) or the n-th (or m-th) indicated unified TCI state indicated by one or more TCI codepoints of one or more TCI fields in a beam indication DCI—e.g., among all the indicated N (or M) unified TCI states indicated by one or more (e.g., N or M) beam indication DCIs—associated with CORESETPoolIndex value n−1 (or m−1) or the beam indication DCI is received in a CORESET associated/configured with CORESETPoolIndex value n−1 (m−1)—provided by the higher layer parameter TCI-State-r17 or DLorJoint-TCIState or UL-TCIState for respective Type-I CORESETs associated with CORESETPoolIndex value n−1 (or m−1) that the UE uses for monitoring PDCCH, where $n \in \{1, \ldots, N\}$ and $m \in \{1, \ldots, M\}$.

For instance, for N=2 (or M=2), the UE could be configured/indicated by the network, e.g., provided by the higher layer parameters failureDetectionResourcesToAddModList0 and failureDetectionResourcesToAddModList1 and/or via BFD RS indication MAC CE, a first BFD RS set q0_0 and a second BFD RS set q0_1 of periodic CSI-RS resource configuration indexes or SSB indexes, for beam/link failure detection or declaration. The UE could assess the radio link quality of the first BFD RS set q0_0 according to SSBs on the PCell or the PSCell or periodic CSI-RS resource configurations that are indicated in the first (or second) unified TCI state indicated by one or more TCI codepoints of one or more TCI fields in a beam indication DCI, e.g., among the N=2 (or M=2) unified TCI states indicated by one or more (e.g., N=2 or M=2) beam indication DCIs—associated with value 0 (or 1) of CORESETPoolIndex or the beam indication DCI is received in a CORESET associated/configured with value 0 (or 1) of CORESETPoolIndex—provided by the higher layer parameter TCI-State-r17 or DLorJoint-TCIState or UL-TCIState for respective Type-I CORESETs associated with value 0 (or 1) of CORESETPoolIndex value that the UE uses for monitoring PDCCH, and the radio link quality of the second BFD RS set q0_1 according to SSBs on the PCell or the PSCell or periodic CSI-RS resource configurations that are indicated in the second (or first) unified TCI state indicated by one or more TCI codepoints of one or more TCI fields in a beam indication DCI, e.g., among the N=2 (or M=2) unified TCI states indicated by one or more (e.g., N=2 or M=2) beam indication DCIs—associated with value 0 (or 1) of CORESETPoolIndex or the beam indication DCI is received in a CORESET associated/configured with value 0 (or 1) of CORESETPoolIndex—provided by the higher layer parameter TCI-State-r17 or DLorJoint-TCIState or UL-TCIState for respective Type-I CORESETs associated with value 1 (or 0) of CORESETPoolIndex value that the UE uses for monitoring PDCCH.

In another example, the UE could be configured/indicated by the network, e.g., provided by the higher layer parameter failureDetectionResourcesToAddModList and/or BFD RS indication MAC CE, the BFD RS set q0_n (or q0_m) of periodic CSI-RS resource configuration indexes or SSB indexes for beam/link failure detection or declaration. The UE could assess the radio link quality of the BFD RS set q0_n (or q0_m) according to SSBs on the PCell or the PSCell or periodic CSI-RS resource configurations that are indicated in the TCI state n (or m)—associated with CORESETPoolIndex value n−1 (or m−1) or active for the CORESET(s) associated/configured with CORESETPoolIndex value n−1 (or m−1)—provided by the higher layer parameter TCI-State for respective Type-II CORESETs associated with CORESETPoolIndex value n−1 (or m−1) that the UE uses for monitoring PDCCH, where n∈{1, . . . , N} and m∈{1, . . . , M}.

For instance, for N=2 (or M=2), the UE could be configured/indicated by the network, e.g., provided by the higher layer parameters failureDetectionResourcesToAddModList0 and failureDetectionResourcesToAddModList1 and/or via BFD RS indication MAC CE, a first BFD RS set q0_0 and a second BFD RS set q0_1 of periodic CSI-RS resource configuration indexes or SSB indexes, for beam/link failure detection or declaration. The UE could assess the radio link quality of the first BFD RS set q0_0 according to SSBs on the PCell or the PSCell or periodic CSI-RS resource configurations that are indicated in the first (or second) TCI state, e.g., among the N=2 (or M=2) indicated TCI states—associated with value 0 (or 1) of CORESETPoolIndex or active for the CORESET(s) associated/configured with value 0 (or 1) of CORESETPoolIndex—provided by the higher layer parameter TCI-State for respective Type-II CORESETs associated with value 0 (or 1) of CORESETGroupIndex value that the UE uses for monitoring PDCCH, and the radio link quality of the second BFD RS set q0_1 according to SSBs on the PCell or the PSCell or periodic CSI-RS resource configurations that are indicated in the second (or first) TCI state, e.g., among the N=2 (or M=2) indicated TCI states—associated with value 1 (or 0) of CORESETPoolIndex or active for the CORESET(s) associated/configured with value 1 (or 0) of CORESETPoolIndex—provided by the higher layer parameter TCI-State for respective Type-II CORESETs associated with value 1 (or 0) of CORESETPoolIndex value that the UE uses for monitoring PDCCH.

In yet another example, the UE could be configured/indicated by the network, e.g., provided by the higher layer parameter failureDetectionResourcesToAddModList and/or via BFD RS indication MAC CE, the BFD RS set q0_n (or q0_m) of periodic CSI-RS resource configuration indexes or SSB indexes for beam/link failure detection or declaration. The UE could assess the radio link quality of the BFD RS set q0_n (or q0_m) according to SSBs on the PCell or the PSCell or periodic CSI-RS resource configurations that are indicated in the unified TCI state n (or m) or the n-th (or m-th) indicated unified TCI state indicated by one or more TCI codepoints of one or more TCI fields in a beam indication DCI—e.g., among all the indicated N (or M) unified TCI states indicated by one or more (e.g., N or M) beam indication DCIs—associated with CORESETPoolIndex value n−1 (or m−1) or the beam indication DCI is received in a CORESET associated/configured with CORESETPoolIndex value n−1 (m−1)—provided by the higher layer parameter TCI-State-r17 or DLorJoint-TCIState or UL-TCIState for respective Type-I CORESETs associated with CORESETPoolIndex value n−1 (or m−1) that the UE uses for monitoring PDCCH, and according to SSBs on the PCell or the PSCell or periodic CSI-RS resource configurations that are indicated in the TCI state n (or m)—associated with CORESETPoolIndex value n−1 (or m−1) or active for the CORESET(s) associated/configured with CORESETPoolIndex value n−1 (or m−1)—provided by the higher layer parameter TCI-State for respective Type-II CORESETs associated with CORESETPoolIndex value n−1 (or m−1) that the UE uses for monitoring PDCCH, where n∈{1, . . . , N} and m∈{1, . . . , M}.

For instance, for N=2 (or M=2), the UE could be configured/indicated by the network, e.g., provided by the higher layer parameters failureDetectionResourcesToAddModList0 and failureDetectionResourcesToAddModList1 and/or via BFD RS indication MAC CE, a first BFD RS set q0_0 and a second BFD RS set q0_1 of periodic CSI-RS resource configuration indexes or SSB indexes, for beam/link failure detection or declaration. The UE could assess the radio link quality of the first BFD RS set q0_0 according to SSBs on the PCell or the PSCell or periodic CSI-RS resource configurations that are indicated in the first (or second) unified TCI state indicated by one or more TCI codepoints of one or more TCI fields in a beam indication DCI, e.g., among the N=2 (or M=2) unified TCI states indicated by one or more (e.g., N=2 or M=2) beam indication DCIs—associated with value 0 (or 1) of CORESETPoolIndex or the beam indication DCI is received in a CORESET associated/configured with value 0 (or 1) of CORESETPoolIndex—provided by the higher layer parameter TCI-State-r17 or DLorJoint-TCIState or UL-TCIState for respective Type-I CORESETs associated with value 0 (or 1) of CORESETPoolIndex value that the UE uses for monitoring PDCCH and according to SSBs on the PCell or the PSCell or periodic CSI-RS resource configurations that are indicated in the first (or second) TCI state, e.g., among the N=2 (or M=2) indicated TCI states—associated with value 0 (or 1) of CORESETPoolIndex or active for the CORESET(s) associated/configured with value 0 (or 1) of CORESETPoolIndex—provided by the higher layer parameter TCI-State for respective Type-II CORESETs associated with value 0 (or 1) of CORESETPoolIndex value that the UE uses for monitoring PDCCH, and the radio link quality of the second BFD RS set q0_1 according to SSBs on the PCell or the PSCell or periodic CSI-RS resource configurations that are indicated in the second (or first) unified TCI state indicated by one or more TCI codepoints of one or more TCI fields in a beam indication DCI, e.g., among the N=2 (or M=2) unified TCI states indicated by one or more (e.g., N=2 or M=2) beam indication DCIs—associated with value 1 (or 0) of CORESETPoolIndex or the beam indication DCI is received in a CORESET associated/configured with value 1 (or 0) of CORESETPoolIndex—provided by the higher layer parameter TCI-State-r17 or DLorJoint-TCIState or UL-TCIState for respective Type-I CORESETs associated with value 1 (or 0) of CORESETPoolIndex value that the UE uses for monitoring PDCCH and according to SSBs on the PCell or the PSCell or periodic CSI-RS resource configurations that are indicated in the second (or first) TCI state, e.g., among the N=2 (or M=2) indicated TCI states—associated with value 1 (or 0) of CORESETPoolIndex and/or active for the CORESET(s) associated/configured with value 1 (or 0) of CORESETPoolIndex—provided by the higher layer parameter TCI-State for respective Type-II CORESETs associated with value 1 (or 0) of CORESETPoolIndex value that the UE uses for monitoring PDCCH.

In yet another example, the UE could be configured/indicated by the network, e.g., provided by the higher layer parameter failureDetectionResourcesToAddModListA and/or via BFD RS indication MAC CE, a first BFD RS set q0A_n (or q0A_m) of periodic CSI-RS resource configuration indexes or SSB indexes for beam/link failure detection or declaration; the UE could assess the radio link quality of the first BFD RS set q0A_n (or q0A_m) according to SSBs on the PCell or the PSCell or periodic CSI-RS resource configurations that are indicated in the unified TCI state n (or m) or the n-th (or m-th) indicated unified TCI state indicated by one or more TCI codepoints of one or more TCI fields in a beam indication DCI—e.g., among all the indicated N (or M) unified TCI states indicated by one or more (e.g., N or M) beam indication DCIs—associated with CORESETPoolIndex value n−1 (or m−1) or the beam indication DCI is received in a CORESET associated/configured with CORESETPoolIndex value n−1 (m−1)—provided by the higher layer parameter TCI-State-r17 or DLorJoint-TCIState or UL-TCIState for respective Type-I CORESETs associated with CORESETPoolIndex value n−1 (or m−1) that the UE uses for monitoring PDCCH, where n $\in \{1, \ldots, N\}$ and m $\in \{1, \ldots, M\}$. The UE could also be configured/indicated by the network, e.g., provided by the higher layer parameter failureDetectionResourcesToAddModListB and/or via BFD RS indication MAC CE, a second BFD RS set q0B_n (or q0B_m) of periodic CSI-RS resource configuration indexes or SSB indexes for beam/link failure detection or declaration; the UE could assess the radio link quality of the second BFD RS set q0B_n (or q0B_m) according to SSBs on the PCell or the PSCell or periodic CSI-RS resource configurations that are indicated in the TCI state n (or m)—associated with CORESETPoolIndex value n−1 (or m−1) or active for the CORESET(s) associated/configured with CORESETPoolIndex value n−1 (or m−1)—provided by the higher layer parameter TCI-State for respective Type-II CORESETs associated with CORESETPoolIndex value n−1 (or m−1) that the UE uses for monitoring PDCCH, where n$\in\{1, \ldots, N\}$ and m$\in\{1, \ldots, M\}$.

For instance, for N=2 (or M=2), the UE could assess the radio link quality of the first of first BFD RS set q0A_0 according to SSBs on the PCell or the PSCell or periodic CSI-RS resource configurations that are indicated in the first (or second) unified TCI state indicated by one or more TCI codepoints of one or more TCI fields in a beam indication DCI, e.g., among the N=2 (or M=2) unified TCI states indicated by one or more (e.g., N=2 or M=2) beam indication DCIs—associated with value 0 (or 1) of CORESETPoolIndex or the beam indication DCI is received in a CORESET associated/configured with value 0 (or 1) of CORESETPoolIndex—provided by the higher layer parameter TCI-State-r17 or DLorJoint-TCIState or UL-TCIState for respective Type-I CORESETs associated with value 0 (or 1) of CORESETPoolIndex value that the UE uses for monitoring PDCCH, and the radio link quality of the second of first BFD RS set q0A_1 according to SSBs on the PCell or the PSCell or periodic CSI-RS resource configurations that are indicated in the second (or first) unified TCI state indicated by one or more TCI codepoints of one or more TCI fields in a beam indication DCI, e.g., among the N=2 (or M=2) unified TCI states indicated by one or more (e.g., N=2 or M=2) beam indication DCIs—associated with value 1 (or 0) of CORESETPoolIndex or the beam indication DCI is received in a CORESET associated/configured with value 1 (or 0) of CORESETPoolIndex—provided by the higher layer parameter TCI-State-r17 or DLorJoint-TCIState or UL-TCIState for respective Type-I CORESETs associated with value 1 (or 0) of CORESETPoolIndex value that the UE uses for monitoring PDCCH. Furthermore, the UE could assess the radio link quality of the first of second BFD RS set q0B_0 according to SSBs on the PCell or the PSCell or periodic CSI-RS resource configurations that are indicated in the first (or second) TCI state, e.g., among the N=2 (or M=2) indicated TCI states—associated with value 0 (or 1) of CORESETPoolIndex and/or active for the CORESET(s) associated/configured with value 0 (or 1) of CORESETPoolIndex—provided by the higher layer parameter TCI-State for respective Type-II CORESETs associated with value 0 (or 1) of CORESETPoolIndex value that the UE uses for monitoring PDCCH, and the radio link quality of the second of second BFD RS set q0B_1 according to SSBs on the PCell or the PSCell or periodic CSI-RS resource configurations that are indicated in the second (or first) TCI state, e.g., among the N=2 (or M=2) indicated TCI states—associated with value 1 (or 0) of CORESETPoolIndex and/or active for the CORESET(s) associated/configured with value 1 (or 0) of CORESETPoolIndex—provided by the higher layer parameter TCI-State for respective Type-II CORESETs associated with value 1 (or 0) of CORESETPoolIndex value that the UE uses for monitoring PDCCH.

For another example, for N=2 (or M=2), the UE could assess the radio link quality of the first BFD RS set q0A according to SSBs on the PCell or the PSCell or periodic CSI-RS resource configurations that are indicated in the first (or second) unified TCI state indicated by one or more TCI codepoints of one or more TCI fields in a beam indication DCI, e.g., among the N=2 (or M=2) unified TCI states indicated by one or more (e.g., N=2 or M=2) beam indication DCIs—associated with value 0 (or 1) of CORESETPoolIndex or the DCI is received in a CORESET associated/configured with value 0 (or 1) of CORESETPoolIndex—provided by the higher layer parameter TCI-State-r17 or DLorJoint-TCIState or UL-TCIState for respective Type-I CORESETs associated with value 0 (or 1) of CORESETPoolIndex value that the UE uses for monitoring PDCCH, and the UE could assess the radio link quality of the second BFD RS set q0B according to SSBs on the PCell or the PSCell or periodic CSI-RS resource configurations that are indicated in the second (or first) TCI state, e.g., among the N=2 (or M=2) indicated TCI states—associated with value 1 (or 0) of CORESETPoolIndex or active for the CORESET(s) associated/configured with value 1 (or 0) of CORESETPoolIndex—provided by the higher layer parameter TCI-State for respective Type-II CORESETs associated with value 1 (or 0) of CORESETPoolIndex value that the UE uses for monitoring PDCCH.

For the BFD RSs, and therefore, the corresponding BFD RS resources determined by the UE, in one example, the UE could assess the radio link quality of one or more SSB indexes on the PCell or the PSCell or periodic CSI-RS resource configuration indexes in the BFD RS set q0_n (or q0_m) against the BFD threshold Qout. Furthermore, the physical layer in the UE provides an indication to higher layers when the radio link quality for all corresponding periodic CSI-RS resource configuration indexes or SSB indexes in the BFD RS set q0_n (or q0_m) is worse than the threshold Qout. Furthermore, the physical layer in the UE provides to higher layers the index of the BFD RS set q0_n (or q0_m) if the corresponding radio link quality is worse than the BFD threshold Qout. The physical layer informs the higher layers when the radio link quality is worse than the BFD threshold Qout a periodicity determined by the maximum between the shortest periodicity among the SSBs on the PCell or the PSCell and/or the periodic CSI-RS configurations in the BFD RS set q0_n (or q0_m) and 2 msec.

For the BFD RSs, and therefore, the corresponding BFD RS resources determined by the UE, in one example, the UE could assess the radio link quality of one or more SSB indexes on the PCell or the PSCell or periodic CSI-RS resource configuration indexes in the first BFD RS set q0A_n (or q0A_m) against the BFD threshold Qout. The physical layer in the UE provides a first indication to higher layers when the radio link quality for all corresponding periodic CSI-RS resource configuration indexes or SSB indexes in the first BFD RS set q0A_n (or q0A_m) is worse than the threshold Qout. Furthermore, the physical layer in the UE provides to higher layers the index of the first BFD RS set q0A_n (or q0A_m) if the corresponding radio link quality is worse than the BFD threshold Qout. The physical layer informs the higher layers when the radio link quality is worse than the BFD threshold Qout a periodicity determined by the maximum between the shortest periodicity among the SSBs on the PCell or the PSCell and/or the periodic CSI-RS configurations in the first BFD RS set q0A_n (or q0A_m) and 2 msec.

In addition, the UE could assess the radio link quality of one or more SSB indexes on the PCell or the PSCell or periodic CSI-RS resource configuration indexes in the second BFD RS set q0B_n (or q0B_m) against the BFD threshold Qout. The physical layer in the UE provides a second indication to higher layers when the radio link quality for all corresponding periodic CSI-RS resource configuration indexes or SSB indexes in the second BFD RS set q0B_n (or q0B_m) is worse than the threshold Qout. Furthermore, the physical layer in the UE provides to higher layers the index of the second BFD RS set q0B_n (or q0B_m) if the corresponding radio link quality is worse than the BFD threshold Qout. The physical layer informs the higher layers when the radio link quality is worse than the BFD threshold Qout a periodicity determined by the maximum between the shortest periodicity among the SSBs on the PCell or the PSCell and/or the periodic CSI-RS configurations in the second BFD RS set q0B_n (or q0B_m) and 2 msec.

Furthermore, for the BFD RSs, and therefore, the corresponding BFD RS resources configured by the network, in one example, the UE could assess the radio link quality of one or more SSB indexes on the PCell or the PSCell or periodic CSI-RS resource configuration indexes in the BFD RS set q0_n (or q0_m) with same values as the RS indexes in the RS sets indicated in the unified TCI state n (or m)—associated with CORESETPoolIndex value n−1 (or m−1)—provided by the higher layer parameter TCI-State-r17 or DLorJoint-TCIState or UL-TCIState for respective Type-I CORESETs associated with CORESETPoolIndex value n−1 (or m−1) that the UE uses for monitoring PDCCH against the BFD threshold Qout, wherein based on those specified herein in the present disclosure, the unified TCI state n (or m) could be indicated by one or more unified TCI state indication/activation MAC CEs or one or more TCI codepoints in one or more TCI fields of one or more beam indication DCIs. The physical layer in the UE provides an indication to higher layers when the radio link quality for all corresponding periodic CSI-RS resource configuration indexes or SSB indexes in the BFD RS set q0_n (or q0_m) that have same values as the RS indexes in the RS sets indicated in the unified TCI state n (or m) provided by TCI-State-r17 or DLorJoint-TCIState or UL-TCIState for respective Type-I CORESETs that the UE uses for monitoring PDCCH is worse than the threshold Qout. Furthermore, the physical layer in the UE provides to higher layers the index of the BFD RS set q0_n (or q0_m) if the corresponding radio link quality is worse than the BFD threshold Qout. The physical layer informs the higher layers when the radio link quality is worse than the BFD threshold Qout a periodicity determined by the maximum between the shortest periodicity among the SSBs on the PCell or the PSCell and/or the periodic CSI-RS configurations in the BFD RS set q0_n (or q0_m) that the UE uses to assess the radio link quality and 2 msec.

Furthermore, for the BFD RSs, and therefore, the corresponding BFD RS resources configured by the network, in one example, the UE could assess the radio link quality of one or more SSB indexes on the PCell or the PSCell or periodic CSI-RS resource configuration indexes in the BFD RS set q0_n (or q0_m) with same values as the RS indexes in the RS sets indicated in the TCI state n (or m)—associated with CORESETPoolIndex value n−1 (or m−1)—provided by the higher layer parameter TCI-State for respective Type-II CORESETs associated with CORESETPoolIndex value n−1 (or m−1) that the UE uses for monitoring PDCCH against the BFD threshold Qout. The physical layer in the UE provides an indication to higher layers when the radio link quality for all corresponding periodic CSI-RS resource configuration indexes or SSB indexes in the BFD RS set q0_n (or q0_m) that have same values as the RS indexes in the RS sets indicated in the TCI state n (or m) provided by TCI-State for respective Type-II CORESETs that the UE uses for monitoring PDCCH is worse than the threshold Qout. Furthermore, the physical layer in the UE provides to higher layers the index of the BFD RS set q0_n (or q0_m) if the corresponding radio link quality is worse than the BFD threshold Qout. The physical layer informs the higher layers when the radio link quality is worse than the BFD threshold Qout a periodicity determined by the maximum between the shortest periodicity among the SSBs on the PCell or the PSCell and/or the periodic CSI-RS configurations in the BFD RS set q0_n (or q0_m) that the UE uses to assess the radio link quality and 2 msec.

Furthermore, for the BFD RSs, and therefore, the corresponding BFD RS resources configured by the network, in one example, the UE could assess the radio link quality of one or more SSB indexes on the PCell or the PSCell or periodic CSI-RS resource configuration indexes in the BFD RS set q0_n (or q0_m) with same values as the RS indexes in the RS sets indicated in the unified TCI state n (or m) and/or the TCI state n (or m)—associated with CORESET-PoolIndex value n−1 (or m−1)—provided by the higher layer parameter TCI-State-r17 or DLorJoint-TCIState or UL-TCIState and/or TCI-State respectively for respective Type-I and/or Type-II CORESETs associated with CORE-SETPoolIndex value n−1 (or m−1) that the UE uses for monitoring PDCCH against the BFD threshold Qout, wherein based on those specified herein in the present disclosure, the unified TCI state n (or m) could be indicated by one or more unified TCI state indication/activation MAC CEs or one or more TCI codepoints in one or more TCI fields of one or more beam indication DCIs. The physical layer in the UE provides an indication to higher layers when the radio link quality for all corresponding periodic CSI-RS resource configuration indexes or SSB indexes in the BFD RS set q0_n (or q0_m) that have same values as the RS indexes in the RS sets indicated in the unified TCI state n (or m) and/or TCI state n (or m) provided by TCI-State-r17 or DLorJoint-TCIState or UL-TCIState and/or TCI-State respectively for respective Type-I and/or Type-II CORE-SETs that the UE uses for monitoring PDCCH is worse than the threshold Qout. Furthermore, the physical layer in the UE provides to higher layers the index of the BFD RS set q0_n (or q0_m) if the corresponding radio link quality is worse than the BFD threshold Qout. The physical layer informs the higher layers when the radio link quality is worse than the BFD threshold Qout a periodicity determined by the maximum between the shortest periodicity among the SSBs on the PCell or the PSCell and/or the periodic CSI-RS configurations in the BFD RS set q0_n (or q0_m) that the UE uses to assess the radio link quality and 2 msec.

Furthermore, for the BFD RSs, and therefore, the corresponding BFD RS resources configured by the network, in one example, the UE could assess the radio link quality of one or more SSB indexes on the PCell or the PSCell or periodic CSI-RS resource configuration indexes in the first BFD RS set q0A_n (or q0A_m) with same values as the RS indexes in the RS sets indicated in the unified TCI state n (or m)—associated with CORESETPoolIndex value n−1 (or m−1)—provided by the higher layer parameter TCI-State-r17 or DLorJoint-TCIState or UL-TCIState for respective Type-I CORESETs associated with CORESETPoolIndex value n−1 (or m−1) that the UE uses for monitoring PDCCH against the BFD threshold Qout, wherein based on those specified herein in the present disclosure, the unified TCI state n (or m) could be indicated by one or more unified TCI state indication/activation MAC CEs or one or more TCI codepoints in one or more TCI fields of one or more beam indication DCIs. The physical layer in the UE provides a first indication to higher layers when the radio link quality for all corresponding periodic CSI-RS resource configuration indexes or SSB indexes in the first BFD RS set q0A_n (or q0A_m) that have same values as the RS indexes in the RS sets indicated in the unified TCI state n (or m) provided by TCI-State-r17 or DLorJoint-TCIState or UL-TCIState for respective Type-I CORESETs that the UE uses for monitoring PDCCH is worse than the threshold Qout.

Furthermore, the physical layer in the UE provides to higher layers the index of the first BFD RS set q0A_n (or q0A_m) if the corresponding radio link quality is worse than the BFD threshold Qout. The physical layer informs the higher layers when the radio link quality is worse than the BFD threshold Qout a periodicity determined by the maximum between the shortest periodicity among the SSBs on the PCell or the PSCell and/or the periodic CSI-RS configurations in the first BFD RS set q0A_n (or q0A_m) that the UE uses to assess the radio link quality and 2 msec. In addition, the UE could assess the radio link quality of one or more SSB indexes on the PCell or the PSCell or periodic CSI-RS resource configuration indexes in the second BFD RS set q0B_n (or q0B_m) with same values as the RS indexes in the RS sets indicated in the TCI state n (or m)—associated with CORESETPoolIndex value n−1 (or m−1)—provided by the higher layer parameter TCI-State for respective Type-II CORESETs associated with CORESET-PoolIndex value n−1 (or m−1) that the UE uses for monitoring PDCCH against the BFD threshold Qout. The physical layer in the UE provides a second indication to higher layers when the radio link quality for all corresponding periodic CSI-RS resource configuration indexes or SSB indexes in the second BFD RS set q0B_n (or q0B_m) that have same values as the RS indexes in the RS sets indicated in the TCI state n (or m) provided by TCI-State for respective Type-II CORESETs that the UE uses for monitoring PDCCH is worse than the threshold Qout. Furthermore, the physical layer in the UE provides to higher layers the index of the second BFD RS set q0B_n (or q0B_m) if the corresponding radio link quality is worse than the BFD threshold Qout. The physical layer informs the higher layers when the radio link quality is worse than the BFD threshold Qout a periodicity determined by the maximum between the shortest periodicity among the SSBs on the PCell or the PSCell and/or the periodic CSI-RS configurations in the second BFD RS set q0B_n (or q0B_m) that the UE uses to assess the radio link quality and 2 msec.

For the BFD RS configurations in the present disclosure, the higher layers in the UE may increment the beam failure instance (BFI) count (by one) in a BFI counter n or m (denoted by BFI_COUNTER_n or BFI_COUNTER_m) associated with CORESETPoolIndex value n−1 or m−1 or the BFD RS set q0_n or q0_m if the higher layers receive from the physical layer in the UE that the radio link quality of the BFD RS set q0_n (or q0_m) is worse than Qout, where $n \in \{1, \ldots, N\}$ and $m \in \{1, \ldots, M\}$. The UE may declare a DL and/or UL beam failure for the BFD RS set q0_n (or q0_m) if the BFI count in the BFI counter n (or m) BFI_COUNTER_n (or BFI_COUNTER_m) for the BFD RS set q0_n (or q0_m) reaches the maximum number of BFI counts (e.g., provided by the higher layer parameter maxBFIcount) before a BFD timer expires. After the higher layers in the UE declare DL and/or UL beam failure for the BFD RS set q0_n (or q0_m), the higher layers in the UE may reset the BFI count in the BFI counter n (or m) BFI_COUNTER_n (or BFI_COUNTER_m) or the BFD timer to zero.

In addition, for the BFD RS configurations in the present disclosure, the higher layers in the UE could reset the BFI count in the BFI counter n (or m) BFI_COUNTER_n (or BFI_COUNTER_m) or the BFD timer to zero if the UE receives from the network a MAC CE or DCI (e.g., DCI format 1_1 or 1_2 with or without DL assignment) based signaling to update the Unified TCI state n (or m) provided by TCI-State_r17 for respective Type-I CORESETs associated with CORESETPoolIndex value n−1 (or m−1), where $n \in \{1, \ldots, N\}$ and $m \in \{1, \ldots, M\}$.

For the BFD RS configurations in the present disclosure, the higher layers in the UE could reset the BFI count in the BFI counter n (or m) BFI_COUNTER_n (or BFI_COUNTER_m) or the BFD timer to zero if the UE receives from the network a MAC CE activation command to update the TCI state n (or m) provided by TCI-State for respective Type-II CORESETs associated with CORESETPoolIndex value n−1 (or m−1), where $n \in \{1, \ldots, N\}$ and $m \in \{1, \ldots, M\}$.

For the BFD RS configurations in the present disclosure, the higher layers in the UE could reset the BFI count in the BFI counter n (or m) BFI_COUNTER_n (or BFI_COUNTER_m) or the BFD timer to zero if the UE receives from the network a MAC CE or DCI (e.g., DCI format 1_1 or 1_2 with or without DL assignment) based signaling to update the Unified TCI state n (or m) provided by TCI-State_r17 or DLorJoint-TCIState or UL-TCIState for respective Type-I CORESETs associated with CORESETPoolIndex value n−1 (or m−1) and/or a MAC CE activation command to update the TCI state n (or m) provided by TCI-State for respective Type-II CORESETs associated with CORESETPoolIndex n−1 (or m−1), where n∈{1, . . . , N} and m∈{1, . . . , M}.

For the BFD RS configurations in the present disclosure, the higher layers in the UE may increment the beam failure instance (BFI) count (by one) in a first BFI counter n or m (denoted by BFI_COUNTER_A_n or BFI_COUNTER_A_m) associated with CORESETPoolIndex value n−1 or m−1 or the first BFD RS set q0A_n or q0A_m if the higher layers receive from the physical layer in the UE that the radio link quality of the first BFD RS set q0A_n (or q0A_m) is worse than Qout, where n∈{1, . . . , N} and m∈{1, . . . , M}. The UE may declare a DL and/or UL beam failure for the first BFD RS set q0A_n (or q0A_m) if the BFI count in the first BFI counter n (or m) BFI_COUNTER_A_n (or BFI_COUNTER_A_m) for the first BFD RS set q0A_n (or q0A_m) reaches the maximum number of BFI counts (e.g., provided by the higher layer parameter maxBFIcount) before a first BFD timer expires.

After the higher layers in the UE declare DL and/or UL beam failure for the first BFD RS set q0A_n (or q0A_m), the higher layers in the UE may reset the BFI count in the first BFI counter n (or m) BFI_COUNTER_A_n (or BFI_COUNTER_A_m) or the first BFD timer to zero. In addition, the higher layers in the UE could also reset the BFI count in the first BFI counter n (or m) BFI_COUNTER_A_n (or BFI_COUNTER_A_m) or the first BFD timer to zero if the UE receives from the network a MAC CE or DCI (e.g., DCI format 1_1 or 1_2 with or without DL assignment) based signaling to update the Unified TCI state n (or m) provided by TCI-State_r17 or DLorJoint-TCIState or UL-TCIState for respective Type-I CORESETs associated with CORESETPoolIndex value n−1 (or m−1), where n∈{1, . . . , N} and m∈{1, . . . , M}. Furthermore, the higher layers in the UE may increment the beam failure instance (BFI) count (by one) in a second BFI counter n or m (denoted by BFI_COUNTER_B_n or BFI_COUNTER_B_m) associated with CORESETPoolIndex value n−1 or m−1 or the second BFD RS set q0B_n or q0B_m if the higher layers receive from the physical layer in the UE that the radio link quality of the second BFD RS set q0B_n (or q0B_m) is worse than Qout, where n∈{1, . . . , N} and m∈{1, . . . , M}.

The UE may declare a DL and/or UL beam failure for the second BFD RS set q0B_n (or q0B_m) if the BFI count in the second BFI counter n (or m) BFI_COUNTER_B_n (or BFI_COUNTER_B_m) for the second BFD RS set q0B_n (or q0B_m) reaches the maximum number of BFI counts (e.g., provided by the higher layer parameter maxBFIcount) before a second BFD timer expires. After the higher layers in the UE declare DL and/or UL beam failure for the second BFD RS set q0B_n (or q0B_m), the higher layers in the UE may reset the BFI count in the second BFI counter n (or m) BFI_COUNTER_B_n (or BFI_COUNTER_B_m) or the second BFD timer to zero. In addition, the higher layers in the UE could also reset the BFI count in the second BFI counter n (or m) BFI_COUNTER_B_n (or BFI_COUNTER_B_m) or the second BFD timer to zero if the UE receives from the network a MAC CE activation command to update the TCI state n (or m) provided by TCI-State for respective Type-II CORESETs associated with CORESETPoolIndex value n−1 (or m−1), where n∈{1, . . . , N} and m∈{1, . . . , M}.

For the BFD RS configurations described in the present disclosure, the UE could be configured with/provided by the network, e.g., via the higher layer parameter candidateBeamRSList, a NBI RS set q1_n (or q1_m)—associated with the BFD RS set q0_n (or q0_m)—of periodic CSI-RS resource configuration indexes or SSB indexes for radio link quality measurement and identifying potential new beam(s) to recover the failed beam(s)/link(s), where n∈{1, . . . , N} and m∈{1, . . . , M}. That is, the UE could be configured with/provided by the network N≥1 (or M≥1) NBI RS sets each associated with a BFD RS set in the multi-DCI based multi-TRP system. The UE expects single-port or two-port CSI-RS with frequency density equal to 1 or 3 REs per RB in the set q1_n (or q1_m).

The UE could assess the radio link quality according to the set q1_n (or q1_m) of resource configurations against a threshold Qin. The UE may apply the Qin threshold to the L1-RSRP measurement obtained from a SSB in q1_n (or q1_m), and apply the Qin threshold to the L1-RSRP measurement obtained from a CSI-RS resource in q1_n (or q1_m) after scaling a respective CSI-RS reception power with a value provided by powerControlOffsetSS. According to the L1-RSRP measurements, the UE could identity the periodic CSI-RS resource configuration index or SSB index in the NBI RS set q1_n (or q1_m), denoted by q_new_n (or q_new_m), that corresponds to the largest/highest measured L1-RSRP among those larger than or equal to the Qin threshold, where n∈{1, . . . , N} and m∈{1, . . . , M}.

For the BFD RS configurations described in the present disclosure, the UE could be configured with/provided by the network, e.g., via the higher layer parameter candidateBeamRSListA, a first NBI RS set q1A_n (or q1A_m)—associated with the first BFD RS set q0A_n (or q0A_m)—of periodic CSI-RS resource configuration indexes or SSB indexes for radio link quality measurement and identifying potential new beam(s) to recover the failed beam(s)/link(s), where n∈{1, . . . , N} and m∈{1, . . . , M}. That is, the UE could be configured with/provided by the network N≥1 (or M≥1) NBI RS sets each associated with a first BFD RS set in the multi-DCI based multi-TRP system. The UE expects single-port or two-port CSI-RS with frequency density equal to 1 or 3 REs per RB in the set q1A_n (or q1A_m).

The UE could assess the radio link quality according to the set q1A_n (or q1A_m) of resource configurations against a threshold Qin. The UE may apply the Qin threshold to the L1-RSRP measurement obtained from a SSB in q1A_n (or q1A_m), and apply the Qin threshold to the L1-RSRP measurement obtained from a CSI-RS resource in q1A_n (or q1A_m) after scaling a respective CSI-RS reception power with a value provided by powerControlOffsetSS. According to the L1-RSRP measurements, the UE could identity the periodic CSI-RS resource configuration index or SSB index in the first NBI RS set q1A_n (or q1A_m), denoted by qA_new_n (or qA_new_m), that corresponds to the largest/highest measured L1-RSRP among those (in the first NBI RS set q1A_n or q1A_m) larger than or equal to the Qin threshold.

In addition, the UE could be configured with/provided by the network, e.g., via the higher layer parameter candidateBeamRSListB, a second NBI RS set q1B_n (or q1B_m)—associated with the second BFD RS set q0B_n (or q0B_m)—of periodic CSI-RS resource configuration indexes or SSB indexes for radio link quality measurement and identifying potential new beam(s) to recover the failed beam(s)/link(s). That is, the UE could be configured with/provided by the network N≥1 (or M≥1) NBI RS sets each associated with a second BFD RS set in the multi-DCI based multi-TRP system. The UE expects single-port or two-port CSI-RS with frequency density equal to 1 or 3 REs per RB in the set q1B_n (or q1B_m). The UE could assess the radio link quality according to the set q1B_n (or q1B_m) of resource configurations against a threshold Qin. The UE may apply the Qin threshold to the L1-RSRP measurement obtained from a SSB in q1B_n (or q1B_m), and apply the Qin threshold to the L1-RSRP measurement obtained from a CSI-RS resource in q1B_n (or q1B_m) after scaling a respective CSI-RS reception power with a value provided by powerControlOffsetSS.

According to the L1-RSRP measurements, the UE could identity the periodic CSI-RS resource configuration index or SSB index in the second NBI RS set q1B_n (or q1B_m), denoted by qB_new_n (or qB_new_m), that corresponds to the largest/highest measured L1-RSRP among those (in the second NBI RS set q1B_n or q1B_m) larger than or equal to the Qin threshold, where $n \in \{1, \ldots, N\}$ and $m \in \{1, \ldots, M\}$.

Alternatively, the UE could be configured with/provided by the network, e.g., via the higher layer parameter candidateBeamRSListX, a main/master NBI RS set q1X_n (or q1X_m)—associated with both the first BFD RS set q0A_n (or q0A_m) and the second BFD RS set q0B_n (or q0B_m)—of periodic CSI-RS resource configuration indexes or SSB indexes for radio link quality measurement and identifying potential new beam(s) to recover the failed beam(s)/link(s), where $n \in \{1, \ldots, N\}$ and $m \in \{1, \ldots, M\}$. That is, the UE could be configured with/provided by the network $N \geq 1$ (or $M \geq 1$) main/master NBI RS sets each associated with both the first and second BFD RS sets in the multi-DCI based multi-TRP system. The UE expects single-port or two-port CSI-RS with frequency density equal to 1 or 3 REs per RB in the set q1X_n (or q1X_m). The UE could assess the radio link quality according to the set q1X_n (or q1X_m) of resource configurations against a threshold Qin. The UE may apply the Qin threshold to the L1-RSRP measurement obtained from a SSB in q1X_n (or q1X_m), and apply the Qin threshold to the L1-RSRP measurement obtained from a CSI-RS resource in q1X_n (or q1X_m) after scaling a respective CSI-RS reception power with a value provided by powerControlOffsetSS.

According to the L1-RSRP measurements, the UE could identity the periodic CSI-RS resource configuration index or SSB index in the main/master NBI RS set q1X_n (or q1X_m), denoted by qA_new_n (or qA_new_m) associated with the first BFD RS set q0A_n (or q0A_m), and/or the periodic CSI-RS resource configuration index or SSB index in the main/master NBI RS set q1X_n (or q1X_m), denoted by qB_new_n (or qB_new_m) associated with the second BFD RS set q0B_n (or q0B_m), that correspond to the largest/highest measured L1-RSRPs among those (in the main/master NBI RS set q1X_n or q1X_m) larger than or equal to the Qin threshold, where $n \in \{1, \ldots, N\}$ and $m \in \{1, \ldots, M\}$.

For the BFD RS configurations described in the present disclosure, for the PCell or the PSCell or the SCell, upon request from higher layers, the UE indicates to higher layers whether there is at least one periodic CSI-RS configuration index or SSB index from the NBI RS set q1_n (or q1_m) with corresponding L1-RSRP measurement that is larger than or equal to the Qin threshold, and provides the periodic CSI-RS configuration index or SSB index q_new_n (or q_new_m) from the NBI RS set q1_n (or q1_m) and the corresponding L1-RSRP measurement that is larger than or equal to the Qin threshold, if any, or the index of the NBI RS set q1_n (or q1_m), where $n \in \{1, \ldots, N\}$ and $m \in \{1, \ldots, M\}$.

In one example, the UE can be provided, by PRACH-ResourceDedicatedBFR, a configuration for PRACH transmission as described in the 3GPP TS 38.213. The UE could transmit at least one PRACH preamble according to antenna port quasi co-location parameters associated with periodic CSI-RS resource configuration or with SSB associated with index q_new_n (or q_new_m) provided by higher layers, where $n \in \{1, \ldots, N\}$ and $m \in \{1, \ldots, M\}$.

In another example, the UE can be provided, by PRACH-ResourceDedicatedBFRMTRP, $N \geq 1$ or $M \geq 1$ (e.g., N=2 or M=2) configurations for PRACH transmission as described in the 3GPP TS 38.213 with each configuration for PRACH transmission associated with a CORESETPoolIndex value (e.g., either 0 or 1) or a BFD RS set. For instance, the PRACH configuration n (or m) could be associated with CORESETPoolIndex value n−1 (or m−1) or BFD RS set q0_n (or q0_m), where $n = \{1, \ldots, N\}$ and $m = \{1, \ldots, M\}$. For this case, the UE could transmit at least one PRACH preamble from the PRACH configuration n (or m) according to antenna port quasi co-location parameters associated with periodic CSI-RS resource configuration or with SSB associated with index q_new_n (or q_new_m) provided by higher layers, where $n \in \{1, \ldots, N\}$ and $m \in \{1, \ldots, M\}$.

In yet another example, the UE can be provided, by schedulingRequestID-BFR, a configuration for PUCCH transmission with a link recovery request (LRR) using either PUCCH format 0 or PUCCH format 1 as described in the 3GPP TS 38.213. The UE could receive from the network an uplink grant in response to the PUCCH transmission with LRR for a first PUSCH MAC CE transmission. The UE could provide in the first PUSCH MAC CE index(es) for at least corresponding SCell(s) with radio link quality worse than Qout, indication(s) of presence of q_new_n (or q_new_m) for $n \in \{1, \ldots, N\}$ and $m \in \{1, \ldots, M\}$, and index(es) q_new_n (or q_new_m) for a periodic CSI-RS configuration or for a SSB provided by higher layers, if any, for $n \in \{1, \ldots, N\}$ and $m \in \{1, \ldots, M\}$, or index(es) of the NBI RS set q1_n (or q1_m), or index(es) of the BFD RS set q0_n (or q0_m).

In yet another example, the UE can be provided, by schedulingRequestID-BFR-MTRP, $N \geq 1$ or $M \geq 1$ (e.g., N=2 or M=2) configurations for PUCCH transmission each having a link recovery request (LRR) and using either PUCCH format 0 or PUCCH format 1 as described in the 3GPP TS 38.213. Furthermore, each configuration for PUCCH transmission with a LRR is associated with a CORESETPoolIndex value (e.g., either 0 or 1) or a BFD RS set. For instance, the UE uses the n-th (or m-th) configuration or configuration n (or m) to transmit PUCCH with LRR associated with CORESETPoolIndex value n−1 (or m−1) or BFD RS set q0_n (or q0_m), where $n \in \{1, \ldots, N\}$ and $m \in \{1, \ldots, M\}$. The UE could receive from the network an uplink grant in response to one or more PUCCH transmissions with LRR for a first PUSCH MAC CE transmission. The UE could provide in the first PUSCH MAC CE index(es) for at least corresponding SCell(s) with radio link quality worse than Qout, indication(s) of presence of q_new_n (or q_new_m) for $n \in \{1, \ldots, N\}$ and $m \in \{1, \ldots, M\}$, and index(es) q_new_n (or q_new_m) for a periodic CSI-RS configuration or for a SSB provided by higher layers, if any, for $n \in \{1, \ldots, N\}$ and $m \in \{1, \ldots, M\}$, or index(es) of the NBI RS set q1_n (or q1_m), or index(es) of the BFD RS set q0_n (or q0_m).

For the BFD RS configurations described in the present disclosure, upon request from higher layers, the UE indicates to higher layers whether there is at least one periodic CSI-RS configuration index or SSB index from the first NBI RS set q1A_n (or q1A_m) with corresponding L1-RSRP measurement that is larger than or equal to the Qin threshold and/or at least one periodic CSI-RS configuration index or SSB index from the second NBI RS set q1B_n (or q1B_m) with corresponding L1-RSRP measurement that is larger than or equal to the Qin threshold or at least one periodic CSI-RS configuration index or SSB index from the main/master NBI RS set q1X_n (or q1X_m) with corresponding L1-RSRP measurement that is larger than or equal to the Qin threshold, and provides the periodic CSI-RS configuration index or SSB index qA_new_n (qA_new_m) from the first NBI RS set q1A_n (or q1A_m) or the main/master NBI RS set q1X_n (or q1X_m) and the corresponding L1-RSRP measurement that is larger than or equal to the Qin threshold, if any, and/or the periodic CSI-RS configuration index or SSB index qB_new_n (or qB_new_m) from the second NBI RS set q1B_n (or q1B_m) or the main/master NBI RS set qX_n (or q1X_m) and the corresponding L1-RSRP measurement that is larger than or equal to the Qin threshold, if any, or the index of the first NBI RS set q1A_n (or q1A_m) and/or the index of the second NBI RS set q1B_n (or q1B_m) or the index of the main/master NBI RS set q1X_n (or q1X_m), where n∈{1, . . . , N} and m∈{1, . . . , M}.

In one example, the UE can be provided, by PRACH-ResourceDedicatedBFR, a configuration for PRACH transmission as described in the 3GPP TS 38.213. The UE could transmit at least one PRACH preamble according to antenna port quasi co-location parameters associated with periodic CSI-RS resource configuration or with SSB associated with index qA_new_n (or qA_new_m) provided by higher layers, where n∈{1, . . . , N} and m∈{1, . . . , M}. The UE could also transmit at least one PRACH preamble according to antenna port quasi co-location parameters associated with periodic CSI-RS resource configuration or with SSB associated with index qB_new_n (or qB_new_m) provided by higher layers, where n∈{1, . . . , N} and m∈{1, . . . , M}.

In another example, the UE can be provided, by PRACH-ResourceDedicatedBFRMTRP, N≥1 or M≥1 (e.g., N=2 or M=2) configurations for PRACH transmission as described in the 3GPP TS 38.213 with each configuration for PRACH transmission associated with a CORESETPoolIndex value (e.g., either 0 or 1) or one or more BFD RS sets. For instance, the PRACH configuration n (or m) could be associated with CORESETPoolIndex value n−1 (or m−1) or the first BFD RS set q0A_n (or q0A_m) or the second BFD RS set q0B_n (or q0B_m), where n={1, . . . , N} and m={1, . . . , M}.

For this case, the UE could transmit at least one PRACH preamble from the PRACH configuration n (or m) according to antenna port quasi co-location parameters associated with periodic CSI-RS resource configuration or with SSB associated with index qA_new_n (or qA_new_m) provided by higher layers, where n∈{1, . . . , N} and m∈{1, . . . , M}. The UE could also transmit at least one PRACH preamble from the PRACH configuration n (or m) according to antenna port quasi co-location parameters associated with periodic CSI-RS resource configuration or with SSB associated with index qB_new_n (or qB_new_m) provided by higher layers, where n∈{1, . . . , N} and m∈{1, . . . , M}.

In yet another example, the UE can be provided, by schedulingRequestID-BFR, a configuration for PUCCH transmission with a link recovery request (LRR) using either PUCCH format 0 or PUCCH format 1 as described in the 3GPP TS 38.213. The UE could receive from the network an uplink grant in response to the PUCCH transmission with LRR for a first PUSCH MAC CE transmission. The UE could provide in the first PUSCH MAC CE index(es) for at least corresponding SCell(s) with radio link quality worse than Qout, indication(s) of presence of qA_new_n (or qA_new_m) or qB_new_n (or qB_new_m) for n∈{1, . . . , N} and m∈{1, . . . , M}, index(es) qA_new_n (or qA_new_m) or qB_new_n (or qB_new_m) for a periodic CSI-RS configuration or for a SSB provided by higher layers, if any, for n∈{1, . . . , N} and m∈{1, . . . , M}, index(es) of the corresponding first or second NBI RS sets q1A_n (or q1A_m) or q1B_n (or q1B_m), index(es) of the corresponding master/main NBI RS set q1X_n (or q1X_m), or index(es) of the corresponding first or second BFD RS set q0A_n (or q0A_m) or q0B_n (or q0B_m) for n∈{1, . . . , N} and m∈{1, . . . , M}.

In yet another example, the UE can be provided, by schedulingRequestID-BFR-MTRP, N≥1 or M≥1 (e.g., N=2 or M=2) configurations for PUCCH transmission each having a link recovery request (LRR) and using either PUCCH format 0 or PUCCH format 1 as described in the 3GPP TS 38.213. Furthermore, each configuration for PUCCH transmission with a LRR is associated with a CORESETPoolIndex value (e.g., either 0 or 1) or one or more BFD RS sets. For instance, the UE uses the n-th (or m-th) configuration or configuration n (or m) to transmit PUCCH with LRR associated with CORESETPoolIndex value n−1 (or m−1) or the first BFD RS set q0A_n (or q0A_m) or the second BFD RS set q0B_n (or q0B_m), where n∈{1, . . . , N} and m∈{1, . . . , M}.

The UE could receive from the network an uplink grant in response to one or more PUCCH transmissions with LRR for a first PUSCH MAC CE transmission. The UE could provide in the first PUSCH MAC CE index(es) for at least corresponding SCell(s) with radio link quality worse than Qout, indication(s) of presence of qA_new_n (or qA_new_m) or qB_new_n (or qB_new_m) for n E {1, . . . , N} and m E {1, . . . , M}, index(es) qA_new_n (or qA_new_m) or qB_new_n (or qB_new_m) for a periodic CSI-RS configuration or for a SSB provided by higher layers, if any, for n∈{1, . . . , N} and me{1, . . . , M}, index(es) of the corresponding first or second NBI RS sets q1A_n (or q1A_m) or q1B_n (or q1B_m), index(es) of the corresponding master/main NBI RS set q1X_n (or q1X_m), or index(es) of the corresponding first or second BFD RS set q0A_n (or q0A_m) or q0B_n (or q0B_m) for n∈{1, . . . , N} and me{1, . . . , M}.

Throughout the present disclosure, the second condition could be one or more of the followings.

In one example, the UE could be provided/indicated/configured/informed by the network, e.g., via higher layer RRC signaling and/or MAC CE command and/or dynamic DCI based signaling, that the implicit BFD RS configuration for the MDCI based MTRP operation is enabled. For instance, a higher layer parameter 'implicitBFDforMDCI' could be provided in a higher layer RRC signaling/parameter such as PDCCH-Config, PDSCH-Config, ServingCell-Config, ControlResourceSet and etc. to turn on/off the implicit BFD RS configuration specified herein in the present disclosure for the MDCI based MTRP operation. When/if the higher layer parameter 'implicitBFDforMDCI' is configured/present or set to 'enabled'/'on'/'1', the UE could follow those specified herein in the present disclosure to (implicitly) determine the BFD RS(s).

In another example, when/if the UE is configured/provided by the network, one or more—e.g., more than one such as two—NBI RS sets as described/specified herein in the present disclosure.

In yet another example, when/if the UE is indicated/provided by the network, in one or more—e.g., more than one such as two (N=2 or M=2) beam indication DCIs, one or more unified TCI states/pairs of unified TCI states by one or more TCI codepoints of one or more TCI fields, wherein each beam indication DCI is received in a CORESET associated/configured with a (different) value of CORESETPoolIndex (e.g., 0 or 1).

In yet another example, when/if the UE is indicated/provided by the network one or more—e.g., more than one such as two (N=2 or M=2)—unified TCI states activation MAC CEs each associated with a (different) value of CORESETPoolIndex (e.g., 0 or 1), wherein each unified TCI states activation MAC CE could provide/indicate/activate one or more TCI codepoints mapping to the TCI field(s) in the beam indication DCI(s).

In yet another example, when/if the UE is not provided in a higher layer RRC signaling/parameter such as PDCCH-Config, PDSCH-Config, ControlResourceSet and etc., two values of CORESETGroupIndex (e.g., 0 and 1) or is provided only a single value of CORESETGroupIndex (e.g., 0).

In yet another example, when/if the UE is provided in a higher layer RRC signaling/parameter such as PDCCH-Config, PDSCH-Config, ControlResourceSet and etc., two values of CORESETPoolIndex (e.g., 0 and 1).

For the PCell or the PSCell, the UE could be provided a CORESET through a link to a search space set provided by recoverySearchSpaceId, as described in the 3GPP TS 38.213, for monitoring PDCCH in the CORESET. If the UE is provided recoverySearchSpaceId, the UE does not expect to be provided another search space set for monitoring PDCCH in the CORESET associated with the search space set provided by recoverySearchSpaceId.

As discussed in the present disclosure, the UE can be provided, by PRACH-ResourceDedicatedBFR or PRACH-ResourceDedicatedBFRMTRP, one or more configurations for PRACH transmission with each configuration for PRACH transmission associated with a CORESETPoolIndex value (e.g., either 0 or 1) or one or more BFD RS sets. For PRACH transmission in slot n and according to antenna port quasi co-location parameters associated with periodic CSI-RS resource configuration or with SS/PBCH block associated with index q_new_n (or q_new_m) (as discussed in the present disclosure), qA_new_n (or qA_new_m) or qB_new_n (or qB_new_m) (as discussed in the present disclosure) provided by higher layers for n∈{1, ..., N} and m E {1, ..., M}, the UE monitors PDCCH in a search space set provided by recoverySearchSpaceId for detection of a DCI format with CRC scrambled by C-RNTI or MCS-C-RNTI starting from slot n+4 within a window configured by BeamFailureRecoveryConfig.

For PDCCH monitoring in a search space set provided by recoverySearchSpaceId and for corresponding PDSCH reception, the UE assumes the same antenna port quasi-collocation parameters as the ones associated with index q_new_n (or q_new_m) (as discussed in the present disclosure), qA_new_n (or qA_new_m) or qB_new_n (or qB_new_m) (as discussed in the present disclosure) provided by higher layers for n∈{1, ..., N} and m∈{1, ..., M} until the UE receives by higher layers an activation for a TCI state provided by TCI-State or TCI-State_r17. After the UE detects a DCI format with CRC scrambled by C-RNTI or MCS-C-RNTI in the search space set provided by recoverySearchSpaceId, the UE continues to monitor PDCCH candidates in the search space set provided by recoverySearchSpaceId until the UE receives a TCI state update via MAC CE or DCI (e.g., DCI format 1_1 or 1_2 with or without DL assignment) based signalling provided by TCI-State or TCI-State_r17.

In one example, if the UE is provided by the network, e.g., via N≥1 or M≥1 MAC CEs or DCIs (e.g., DCI format 1_1 or 1_2 with or without DL assignment) each associated with a CORESETPoolIndex value, M≥1 joint DL and UL Unified TCI states or M≥1 separate UL Unified TCI states or a first combination of M≥1 joint DL and UL Unified TCI states and separate UL Unified TCI states or N≥1 separate DL Unified TCI states or a second combination of N≥1 joint DL and UL Unified TCI states and separate DL Unified TCI states or a third combination of N≥1 joint DL and UL Unified TCI states, separate DL Unified TCI states and separate UL Unified TCI states for the PCell or the PSCell as described in the 3GPP TS 38.214, and if the UE has sent/indicated to the network q_new_n (or q_new_m) for n∈{1, ..., N} and m∈{1, ..., M}, after X symbols from a last symbol of a first PDCCH reception in a search space set provided by recoverySearchSpaceId where the UE detects a DCI format with CRC scrambled by C-RNTI or MCS-C-RNTI, the UE: (1) monitors PDCCH in respective Type-I CORESETs associated with CORESETPoolIndex value n−1 (or m−1), and receives PDSCH (e.g., the PDSCH scheduled by the PDCCH in the Type-I CORESETs associated with CORESETPoolIndex value n−1 or m−1) and aperiodic CSI-RS in a resource from a CSI-RS resource set with same indicated TCI state n (or m) as for the PDCCH and PDSCH, using the same antenna port quasi co-location parameters as the ones associated with the corresponding index q_new_n (or q_new_m), if any, where n∈{1, ..., N} and m∈{1, ..., M}, and (2) transmits PUCCH, PUSCH (e.g., the PUCCH and the PUSCH associated with the PDCCH in the Type-I CORESETs associated with CORESETPoolIndex value n−1 or m−1) and SRS with same indicated TCI state n (or m) as for the PUCCH and the PUSCH using a same spatial domain filter as for the last PRACH transmission, and a power setting associated with the indicated Unified TCI state n (or m) with q_u=0, q_d=q_new_n (or q_new_m), and closed loop index l=0 or 1, where n∈{1, ..., N} and m∈{1, ..., M}.

In such examples, X could correspond to 28, and the subcarrier spacing (SCS) for the X=28 symbols could correspond to one or more of (n∈{1, ..., N} and m∈{1, ..., M}): (1) the smallest of the SCS configurations of the active DL BWP for the PDCCH reception, e.g., in the Type-I CORESETs associated with CORESETPoolIndex value n−1 (or m−1), and of the active DL BWP(s) of the serving cell; or (2) the smallest of the SCS configurations of all the signal(s)/channels sharing the same indicated Unified TCI state n or m (e.g., provided by the higher layer parameter TCI-State_r17).

After the UE detects a DCI format with CRC scrambled by C-RNTI or MCS-C-RNTI in the search space set provided by recoverySearchSpaceId, the UE continues to monitor PDCCH candidates in the search space set provided by recoverySearchSpaceId until the UE receives a MAC CE or DCI (e.g., DCI format 1_1 or 1_2 with or without DL assignment) based signalling to update the Unified TCI state n (or m) provided by TCI-State_r17 for respective Type-I CORESETs associated with CORESETPoolIndex value n−1 (or m−1), where n∈{1, ..., N} and m∈{1, ..., M}.

In one example, if the UE is provided by the network, e.g., via N≥1 or M≥1 MAC CEs or DCIs (e.g., DCI format 1_1 or 1_2 with or without DL assignment) each associated with a CORESETPoolIndex value, M≥1 joint DL and UL Unified TCI states or M≥1 separate UL Unified TCI states or a first combination of M≥1 joint DL and UL Unified TCI states and separate UL Unified TCI states or N≥1 separate DL Unified TCI states or a second combination of N≥1 joint DL and UL Unified TCI states and separate DL Unified TCI states or a third combination of $N \geq 1$ joint DL and UL Unified TCI states, separate DL Unified TCI states and separate UL Unified TCI states for the PCell or the PSCell as described in the 3GPP TS 38.214, and if the UE has sent/indicated to the network q_new_n (or q_new_m) for $n \in \{1, \ldots, N\}$ and $m \in \{1, \ldots, M\}$ and the UE provides BFR MAC CE in Msg3 or MsgA of contention based random access procedure, after X symbols from the last symbol of the PDCCH reception that determines the completion of the contention based random access procedure as described in the 3GPP TS 38.321, the UE: (1) monitors PDCCH in respective Type-I CORESETs associated with CORESETPoolIndex value n−1 (or m−1), and receives PDSCH (e.g., the PDSCH scheduled by the PDCCH in the Type-I CORESETs associated with CORESETPoolIndex n or m) and aperiodic CSI-RS in a resource from a CSI-RS resource set with same indicated TCI state n (or m) as for the PDCCH and PDSCH, using the same antenna port quasi co-location parameters as the ones associated with the corresponding index q_new_n (or q_new_m), if any, where $n \in \{1, \ldots, N\}$ and $m \in \{1, \ldots, M\}$, and (2) transmits PUCCH, PUSCH (e.g., the PUCCH and the PUSCH associated with the PDCCH in the Type-I CORESETs associated with CORESETPoolIndex value n−1 or m−1) and SRS with same indicated TCI state n (or m) as for the PUCCH and the PUSCH using a same spatial domain filter as for the last PRACH transmission, and a power setting associated with the indicated Unified TCI state n (or m) with q_u=0, q_d=q_new_n (or q_new_m), and closed loop index l=0 or 1, where $n \in \{1, \ldots, N\}$ and $m \in \{1, \ldots, M\}$.

In such examples, X could correspond to 28, and the subcarrier spacing (SCS) for the X=28 symbols could correspond to one or more of ($n \in \{1, \ldots, N\}$ and $m \in \{1, \ldots, M\}$): (1) the smallest of the SCS configurations of the active DL BWP for the PDCCH reception, e.g., in the Type-I CORESETs associated with CORESETPoolIndex value n−1 (or m−1), and of the active DL BWP(s) of the serving cell; or (2) the smallest of the SCS configurations of all the signal(s)/channels sharing the same indicated Unified TCI state n or m (e.g., provided by the higher layer parameter TCI-State_r17).

In one example, if the UE is provided by the network, e.g., via $N \geq 1$ or $M \geq 1$ MAC CEs or DCIs (e.g., DCI format 1_1 or 1_2 with or without DL assignment) each associated with a CORESETPoolIndex value, $M \geq 1$ joint DL and UL Unified TCI states or $M \geq 1$ separate UL Unified TCI states or a first combination of $M \geq 1$ joint DL and UL Unified TCI states and separate UL Unified TCI states or $N \geq 1$ separate DL Unified TCI states or a second combination of $N \geq 1$ joint DL and UL Unified TCI states and separate DL Unified TCI states or a third combination of $N \geq 1$ joint DL and UL Unified TCI states, separate DL Unified TCI states and separate UL Unified TCI states, and if the UE has sent/indicated to the network q_new_n (or q_new_m) for $n \in \{1, \ldots, N\}$ and $m \in \{1, \ldots, M\}$, after X symbols from a last symbol of a PDCCH reception with a DCI format scheduling a PUSCH transmission with a same HARQ process number as for the transmission of the first PUSCH MAC CE and having a toggled NDI field value, the UE: (1) monitors PDCCH in respective Type-I CORESETs associated with CORESETPoolIndex value n−1 (or m−1), and receives PDSCH (e.g., the PDSCH scheduled by the PDCCH in the Type-I CORESETs associated with CORESETPoolIndex value n−1 or m−1) and aperiodic CSI-RS in a resource from a CSI-RS resource set with same indicated TCI state n (or m) as for the PDCCH and PDSCH, using the same antenna port quasi co-location parameters as the ones associated with the corresponding index q_new_n or (q_new_m), if any, for $n \in \{1, \ldots, N\}$ and $m \in \{1, \ldots, M\}$, and (2) transmits PUCCH, PUSCH (e.g., the PUCCH and the PUSCH associated with the PDCCH in the Type-I CORESETs associated with CORESETPoolIndex value n−1 or m−1) and SRS with same indicated TCI state n (or m) as for the PUCCH and the PUSCH using a same spatial domain filter as the one corresponding to q_new_n (or q_new_m), and a power setting associated with the indicated Unified TCI state n (or m) with q_u=0, q_d=q_new_n (or q_new_m), and closed loop index l=0 or 1, for $n \in \{1, \ldots, N\}$ and $m \in \{1, \ldots, M\}$.

In such examples, X could correspond to 28, and the subcarrier spacing (SCS) for the X=28 symbols could correspond to one or more of ($n \in \{1, \ldots, N\}$ and $m \in \{1, \ldots, M\}$): (1) the smallest of the SCS configurations of the active DL BWP for the PDCCH reception, e.g., in the Type-I CORESETs associated with CORESETPoolIndex value n−1 (or m−1), and of the active DL BWP(s) of the serving cell; or (2) the smallest of the SCS configurations of all the signal(s)/channels sharing the same indicated Unified TCI state n or m (e.g., provided by the higher layer parameter TCI-State_r17).

In one example, if the UE has sent/indicated to the network q_new_n (or q_new_m) for $n \in \{1, \ldots, N\}$ and $m \in \{1, \ldots, M\}$, after X symbols from a last symbol of a first PDCCH reception in a search space set provided by recoverySearchSpaceId where the UE detects a DCI format with CRC scrambled by C-RNTI or MCS-C-RNTI, the UE: (1) monitors PDCCH in respective Type-II CORESETs associated with CORESETPoolIndex value n−1 (or m−1), and receives PDSCH (e.g., the PDSCH scheduled by the PDCCH in the Type-II CORESETs associated with CORESETPoolIndex value n−1 or m−1) and aperiodic CSI-RS in a resource from a CSI-RS resource set with same indicated TCI state n (or m) as for the PDCCH and PDSCH, using the same antenna port quasi co-location parameters as the ones associated with the corresponding index q_new_n (or q_new_m), if any, for $n \in \{1, \ldots, N\}$ and $m \in \{1, \ldots, M\}$, and (2) transmits PUCCH, PUSCH (e.g., the PUCCH and the PUSCH associated with the PDCCH in the Type-II CORESETs associated with CORESETPoolIndex value n−1 or m−1) and SRS with same indicated TCI state n (or m) as for the PUCCH and the PUSCH using a same spatial domain filter as for the last PRACH transmission, and a power setting of q_u=0, q_d=q_new_n (or q_new_m) and closed loop index l=0 or 1 (e.g., associated with the indicated TCI state n or m provided by TCI-State), for $n \in \{1, \ldots, N\}$ and $m \in \{1, \ldots, M\}$.

In such examples, X could correspond to 28, and the subcarrier spacing (SCS) for the X=28 symbols could correspond to one or more of ($n \in \{1, \ldots, N\}$ and $m \in \{1, \ldots, M\}$): (1) the smallest of the SCS configurations of the active DL BWP for the PDCCH reception, e.g., in the Type-II CORESETs associated with CORESETPoolIndex value n−1 (or m−1), and of the active DL BWP(s) of the serving cell; or (2) the smallest of the SCS configurations of all the signal(s)/channels sharing the same indicated TCI state n or m (e.g., provided by the higher layer parameter TCI-State).

After the UE detects a DCI format with CRC scrambled by C-RNTI or MCS-C-RNTI in the search space set provided by recoverySearchSpaceId, the UE continues to monitor PDCCH candidates in the search space set provided by recoverySearchSpaceId until the UE receives a MAC CE activation command for the TCI state n (or m) provided by TCI-State for respective Type-II CORESETs associated with CORESETPoolIndex value n−1 (or m−1), where n∈{1, . . . , N} and m∈{1, . . . , M}.

In one example, if the UE has sent/indicated to the network q_new_n (or q_new_m) for n∈{1, . . . , N} and m∈{1, . . . , M}, and if the UE provides BFR MAC CE in Msg3 or MsgA of contention based random access procedure, after X symbols from the last symbol of the PDCCH reception that determines the completion of the contention based random access procedure as described in the 3GPP TS 38.321, the UE: (1) monitors PDCCH in respective Type-II CORESETs associated with CORESETPoolIndex n (or m), and receives PDSCH (e.g., the PDSCH scheduled by the PDCCH in the Type-II CORESETs associated with CORESETPoolIndex n or m) and aperiodic CSI-RS in a resource from a CSI-RS resource set with same indicated TCI state n (or m) as for the PDCCH and PDSCH, using the same antenna port quasi co-location parameters as the ones associated with the corresponding index q_new_n (q_new_m), if any, for n∈{1, . . . , N} and m∈{1, . . . , M}, and (2) transmits PUCCH, PUSCH (e.g., the PUCCH and the PUSCH associated with the PDCCH in the Type-II CORESETs associated with CORESETPoolIndex value n−1 or m−1) and SRS with same indicated TCI state n (or m) as for the PUCCH and the PUSCH using a same spatial domain filter as for the last PRACH transmission, and a power setting of q_u=0, q_d=q_new_n (or q_new_m) and closed loop index l=0 or 1 (e.g., associated with the indicated TCI state n or m provided by TCI-State), for n∈{1, . . . , N} and m∈{1, . . . , M}.

In such examples, X could correspond to 28, and the subcarrier spacing (SCS) for the X=28 symbols could correspond to one or more of (for n∈{1, . . . , N} and m∈{1, . . . , M}): (1) the smallest of the SCS configurations of the active DL BWP for the PDCCH reception, e.g., in the Type-II CORESETs associated with CORESETPoolIndex value n−1 (or m−1), and of the active DL BWP(s) of the serving cell; or (2) the smallest of the SCS configurations of all the signal(s)/channels sharing the same indicated TCI state n or m (e.g., provided by the higher layer parameter TCI-State).

In one example, if the UE has sent/indicated to the network q_new_n (or q_new_m) for n∈{1, . . . , N} and m∈{1, . . . , M}, after X symbols from a last symbol of a PDCCH reception with a DCI format scheduling a PUSCH transmission with a same HARQ process number as for the transmission of the first PUSCH MAC CE and having a toggled NDI field value, the UE: (1) monitors PDCCH in respective Type-II CORESETs associated with CORESETPoolIndex value n−1 (or m−1), and receives PDSCH (e.g., the PDSCH scheduled by the PDCCH in the Type-II CORESETs associated with CORESETPoolIndex value n−1 or m−1) and aperiodic CSI-RS in a resource from a CSI-RS resource set with same indicated TCI state n (or m) as for the PDCCH and PDSCH, using the same antenna port quasi co-location parameters as the ones associated with the corresponding index q_new_n (or q_new_m), if any, for n∈{1, . . . , N} and m∈{1, . . . , M}, and (2) transmits PUCCH, PUSCH (e.g., the PUCCH and the PUSCH associated with the PDCCH in the Type-II CORESETs associated with CORESETPoolIndex value n−1 or m−1) and SRS with same indicated TCI state n (or m) as for the PUCCH and the PUSCH using a same spatial domain filter as the one corresponding to q_new_n (or q_new_m), and a power setting of q_u=0, q_d=q_new_n (or q_new_m) and closed loop index l=0 or 1 (e.g., associated with the indicated TCI state n or m provided by TCI-State).

In such examples, X could correspond to 28, and the subcarrier spacing (SCS) for the X=28 symbols could correspond to one or more of (n∈{1, . . . , N} and m∈{1, . . . , M}): (1) the smallest of the SCS configurations of the active DL BWP for the PDCCH reception, e.g., in the Type-II CORESETs associated with CORESETPoolIndex value n−1 (or m−1), and of the active DL BWP(s) of the serving cell; or (2) the smallest of the SCS configurations of all the signal(s)/channels sharing the same indicated TCI state n or m (e.g., provided by the higher layer parameter TCI-State).

In one example, if the UE is provided by the network, e.g., via N≥1 or M≥1 MAC CEs or DCIs (e.g., DCI format 1_1 or 1_2 with or without DL assignment) each associated with a CORESETPoolIndex value, M≥1 joint DL and UL Unified TCI states or M≥1 separate UL Unified TCI states or a first combination of M≥1 joint DL and UL Unified TCI states and separate UL Unified TCI states or N≥1 separate DL Unified TCI states or a second combination of N≥1 joint DL and UL Unified TCI states and separate DL Unified TCI states or a third combination of N≥1 joint DL and UL Unified TCI states, separate DL Unified TCI states and separate UL Unified TCI states for the PCell or the PSCell as described in the 3GPP TS 38.214, and if the UE has sent/indicated to the network q_new_n (or q_new_m) for n∈{1, . . . , N} and m∈{1, . . . , M}, after X symbols from a last symbol of a first PDCCH reception in a search space set provided by recoverySearchSpaceId where the UE detects a DCI format with CRC scrambled by C-RNTI or MCS-C-RNTI, the UE: (1) monitors PDCCH in respective Type-I or Type-II CORESETs associated with CORESETPoolIndex value n−1 (or m−1), and receives PDSCH (e.g., the PDSCH scheduled by the PDCCH in the Type-I or Type-II CORESETs associated with CORESETPoolIndex value n−1 or m−1) and aperiodic CSI-RS in a resource from a CSI-RS resource set with same indicated TCI state n (or m) as for the PDCCH and PDSCH, using the same antenna port quasi co-location parameters as the ones associated with the corresponding index q_new_n (or q_new_m), if any, for n∈{1, . . . , N} and m∈{1, . . . , M}, and (2) transmits PUCCH, PUSCH (e.g., the PUCCH and the PUSCH associated with the PDCCH in the Type-I or Type-II CORESETs associated with CORESETPoolIndex value n−1 or m−1) and SRS with same indicated TCI state n (or m) as for the PUCCH and the PUSCH using a same spatial domain filter as for the last PRACH transmission, and a power setting of q_u=0, q_d=q_new_n (or q_new_m) and closed loop index l=0 or 1 (e.g., associated with the indicated TCI state n or m provided by TCI-State_r17 or TCI-State), for n∈{1, . . . , N} and m∈{1, . . . , M}.

In such examples, X could correspond to 28, and the subcarrier spacing (SCS) for the X=28 symbols could correspond to one or more of (n∈{1, . . . , N} and m∈{1, . . . , M}): (1) the smallest of the SCS configurations of the active DL BWP for the PDCCH reception, e.g., in the Type-I and/or Type-II CORESETs associated with CORESETPoolIndex value n−1 (or m−1), and of the active DL BWP(s) of the serving cell; or (2) the smallest of the SCS configurations of all the signal(s)/channels sharing the same indicated TCI state n or m (e.g., provided by the higher layer parameter TCI-State_r17 or TCI-State).

After the UE detects a DCI format with CRC scrambled by C-RNTI or MCS-C-RNTI in the search space set provided by recoverySearchSpaceId, the UE continues to monitor PDCCH candidates in the search space set provided by recoverySearchSpaceId until the UE receives a MAC CE or DCI (e.g., DCI format 1_1 or 1_2 with or without DL assignment) based signalling to update the Unified TCI state n (or m) provided by TCI-State_r17 for respective Type-I CORESETs associated with CORESETPoolIndex value n−1 (or m−1) and/or a MAC CE activation command for the TCI state (n or m) provided by TCI-State for respective Type-II CORESETs associated with CORESETPoolIndex value n−1 (or m−1), where $n \in \{1, \ldots, N\}$ and $m \in \{1, \ldots, M\}$.

In one example, if the UE is provided by the network, e.g., via N≥1 or M≥1 MAC CEs or DCIs (e.g., DCI format 1_1 or 1_2 with or without DL assignment) each associated with a CORESETPoolIndex value, M≥1 joint DL and UL Unified TCI states or M≥1 separate UL Unified TCI states or a first combination of M≥1 joint DL and UL Unified TCI states and separate UL Unified TCI states or N≥1 separate DL Unified TCI states or a second combination of N≥1 joint DL and UL Unified TCI states and separate DL Unified TCI states or a third combination of N≥1 joint DL and UL Unified TCI states, separate DL Unified TCI states and separate UL Unified TCI states for the PCell or the PSCell as described in the 3GPP TS 38.214, and if the UE has sent/indicated to the network q_new_n (or q_new_m) for $n \in \{1, \ldots, N\}$ and $m \in \{1, \ldots, M\}$ and the UE provides BFR MAC CE in Msg3 or MsgA of contention based random access procedure, after X symbols from the last symbol of the PDCCH reception that determines the completion of the contention based random access procedure as described in the 3GPP TS 38.321, the UE: (1) monitors PDCCH in respective Type-I or Type-II CORESETs associated with CORESETPoolIndex value n−1 (or m−1), and receives PDSCH (e.g., the PDSCH scheduled by the PDCCH in the Type-I or Type-II CORESETs associated with CORESETPoolIndex value n−1 or m−1) and aperiodic CSI-RS in a resource from a CSI-RS resource set with same indicated TCI state n (or m) as for the PDCCH and PDSCH, using the same antenna port quasi co-location parameters as the ones associated with the corresponding index q_new_n (or q_new_m), if any, for $n \in \{1, \ldots, N\}$ and $m \in \{1, \ldots, M\}$, and (2) transmits PUCCH, PUSCH (e.g., the PUCCH and the PUSCH associated with the PDCCH in the Type-I or Type-II CORESETs associated with CORESETPoolIndex value n−1 or m−1) and SRS with same indicated TCI state n (or m) as for the PUCCH and the PUSCH using a same spatial domain filter as for the last PRACH transmission, and a power setting of q_u=0, q_d=q_new_n (or q_new_m) and closed loop index l=0 or 1 (e.g., associated with the indicated TCI state n or m provided by TCI-State_r17 or TCI-State), for $n \in \{1, \ldots, N\}$ and $m \in \{1, \ldots, M\}$.

In such embodiments, X could correspond to 28, and the subcarrier spacing (SCS) for the X=28 symbols could correspond to one or more of ($n \in \{1, \ldots, N\}$ and $m \in \{1, \ldots, M\}$): (1) the smallest of the SCS configurations of the active DL BWP for the PDCCH reception, e.g., in the Type-I and/or Type-II CORESETs associated with CORESETPoolIndex value n−1 (or m−1), and of the active DL BWP(s) of the serving cell; or (2) the smallest of the SCS configurations of all the signal(s)/channels sharing the same indicated TCI state n or m (e.g., provided by the higher layer parameter TCI-State_r17 or TCI-State).

In one example, if the UE is provided by the network, e.g., via N≥1 or M≥1 MAC CEs or DCIs (e.g., DCI format 1_1 or 1_2 with or without DL assignment) each associated with a CORESETPoolIndex value, M≥1 joint DL and UL Unified TCI states or M≥1 separate UL Unified TCI states or a first combination of M≥1 joint DL and UL Unified TCI states and separate UL Unified TCI states or N≥1 separate DL Unified TCI states or a second combination of N≥1 joint DL and UL Unified TCI states and separate DL Unified TCI states or a third combination of N≥1 joint DL and UL Unified TCI states, separate DL Unified TCI states and separate UL Unified TCI states, and if the UE has sent/indicated to the network q_new_n (or q_new_m) for $n \in \{1, \ldots, N\}$ and $m \in \{1, \ldots, M\}$, after X symbols from a last symbol of a PDCCH reception with a DCI format scheduling a PUSCH transmission with a same HARQ process number as for the transmission of the first PUSCH MAC CE and having a toggled NDI field value, the UE: (1) monitors PDCCH in respective Type-I or Type-II CORESETs associated with CORESETPoolIndex value n−1 (or m−1), and receives PDSCH (e.g., the PDSCH scheduled by the PDCCH in the Type-I or Type-II CORESETs associated with CORESETPoolIndex value n−1 or m−1) and aperiodic CSI-RS in a resource from a CSI-RS resource set with same indicated TCI state n (or m) as for the PDCCH and PDSCH, using the same antenna port quasi co-location parameters as the ones associated with the corresponding index q_new_n (or q_new_m), if any, for $n \in \{1, \ldots, N\}$ and $m \in \{1, \ldots, M\}$, and (2) transmits PUCCH, PUSCH (e.g., the PUCCH and the PUSCH associated with the PDCCH in the Type-I or Type-II CORESETs associated with CORESETPoolIndex value n−1 or m−1) and SRS with same indicated TCI state n (or m) as for the PUCCH and the PUSCH using a same spatial domain filter as the one corresponding to q_new_n (or q_new_m), and a power setting of q_u=0, q_d=q_new_n (or q_new_m) and closed loop index l=0 or 1 (e.g., associated with the indicated TCI state n or m provided by TCI-State_r17 or TCI-State), for $n \in \{1, \ldots, N\}$ and $m \in \{1, \ldots, M\}$.

In such example, X could correspond to 28, and the subcarrier spacing (SCS) for the X=28 symbols could correspond to one or more of ($n \in \{1, \ldots, N\}$ and $m \in \{1, \ldots, M\}$): (1) the smallest of the SCS configurations of the active DL BWP for the PDCCH reception, e.g., in the Type-I and/or Type-II CORESETs associated with CORESETPoolIndex value n−1 (or m−1), and of the active DL BWP(s) of the serving cell; or (2) the smallest of the SCS configurations of all the signal(s)/channels sharing the same indicated TCI state n or m (e.g., provided by the higher layer parameter TCI-State_r17 or TCI-State).

In one example, after X symbols from a last symbol of a first PDCCH reception in a search space set provided by recoverySearchSpaceId where the UE detects a DCI format with CRC scrambled by C-RNTI or MCS-C-RNTI, if the UE has sent/indicated to the network qA_new_n (or qA_new_m) for $n \in \{1, \ldots, N\}$ and $m \in \{1, \ldots, M\}$, the UE: (1) monitors PDCCH in respective Type-I CORESETs associated with CORESETPoolIndex value n−1 (or m−1), and receives PDSCH (e.g., the PDSCH scheduled by the PDCCH in the Type-I CORESETs associated with CORESETPoolIndex value n−1 or m−1) and aperiodic CSI-RS in a resource from a CSI-RS resource set with same indicated TCI state n (or m) as for the PDCCH and PDSCH, using the same antenna port quasi co-location parameters as the ones associated with the corresponding index qA_new_n (or qA_new_m), if any, (2) transmits PUCCH, PUSCH (e.g., the PUCCH and the PUSCH associated with the PDCCH in the first CORESETs) and SRS with same indicated TCI state n (or m) as for the PUCCH and the PUSCH using a same spatial domain filter as for the last PRACH transmission, and a power setting associated with the indicated Unified TCI state n (or m) with q_u=0, q_d=qA_new_n (or qA_new_m), and closed loop index l=0 or 1, and after the UE detects a DCI format with CRC scrambled by C-RNTI or MCS-C-RNTI in the search space set provided by recoverySearchSpaceId, the UE continues to monitor PDCCH candidates in the search space set provided by recoverySearchSpaceId until the UE receives a MAC CE or DCI (e.g., DCI format 1_1 or 1_2 with or without DL assignment) based signalling to update the Unified TCI state n (or m) provided by TCI-State_r17 for respective Type-I CORESETs associated with CORESETPoolIndex value n−1 (or m−1), where n∈{1, . . . , N} and m∈{1, . . . , M}.

In one example, after X symbols from a last symbol of a first PDCCH reception in a search space set provided by recoverySearchSpaceId where the UE detects a DCI format with CRC scrambled by C-RNTI or MCS-C-RNTI, if the UE has sent/indicated to the network qB_new_n (or qB_new_m) for n∈{1, . . . , N} and m∈{1, . . . , M}, the UE: (1) monitors PDCCH in respective Type-II CORESETs associated with CORESETPoolIndex value n−1 (or m−1), and receives PDSCH (e.g., the PDSCH scheduled by the PDCCH in the Type-II CORESETs associated with CORESETPoolIndex value n−1 or m−1) and aperiodic CSI-RS in a resource from a CSI-RS resource set with same indicated TCI state n (or m) as for the PDCCH and PDSCH, using the same antenna port quasi co-location parameters as the ones associated with the corresponding index qB_new_n (or qB_new_m), if any, (2) transmits PUCCH, PUSCH (e.g., the PUCCH and the PUSCH associated with the PDCCH in the Type-II CORESETs associated with CORESETPoolIndex value n−1 (or m−1) and SRS with same indicated TCI state n (or m) as for the PUCCH and the PUSCH using a same spatial domain filter as for the last PRACH transmission, and a power setting of q_u=0, q_d=qB_new_n (or qB_new_m) and closed loop index l=0 or 1 (e.g., associated with the indicated TCI state n or m provided by TCI-State), and after the UE detects a DCI format with CRC scrambled by C-RNTI or MCS-C-RNTI in the search space set provided by recoverySearchSpaceId, the UE continues to monitor PDCCH candidates in the search space set provided by recoverySearchSpaceId until the UE receives a MAC CE activation command for the TCI state n (or m) provided by TCI-State for respective Type-II CORESETs associated with CORESETPoolIndex value n−1 (or m−1), where n∈{1, . . . , N} and m∈{1, . . . , M}.

In such examples, X could correspond to 28, and the subcarrier spacing (SCS) for the X=28 symbols could correspond to one or more of (n∈{1, . . . , N} and m∈{1, . . . , M}): (1) the smallest of the SCS configurations of the active DL BWP for the PDCCH reception, e.g., in the Type-I and/or Type-II CORESETs associated with CORESETPoolIndex value n−1 (or m−1), and of the active DL BWP(s) of the serving cell; or (2) the smallest of the SCS configurations of all the signal(s)/channels sharing the indicated TCI state(s) n or m (e.g., provided by the higher layer parameter TCI-State_r17 and/or TCI-State).

In one example, if the UE provides BFR MAC CE in Msg3 or MsgA of contention based random access procedure, after X symbols from the last symbol of the PDCCH reception that determines the completion of the contention based random access procedure as described in the 3GPP TS 38.321, if the UE has sent/indicated to the network qA_new_n (or qA_new_m) for n∈{1, . . . , N} and m∈{1, . . . , M}, the UE: (1) monitors PDCCH in respective Type-I CORESETs associated with CORESETPoolIndex value n−1 (or m−1), and receives PDSCH (e.g., the PDSCH scheduled by the PDCCH in the Type-I CORESETs associated with CORESETPoolIndex value n−1 or m−1) and aperiodic CSI-RS in a resource from a CSI-RS resource set with same indicated TCI state n (or m) as for the PDCCH and PDSCH, using the same antenna port quasi co-location parameters as the ones associated with the corresponding index qA_new_n (or qA_new_m), if any, (2) transmits PUCCH, PUSCH (e.g., the PUCCH and the PUSCH associated with the PDCCH in the Type-II CORESETs associated with CORESETPoolIndex value n−1 or m−1) and SRS with same indicated TCI state n (or m) as for the PUCCH and the PUSCH using a same spatial domain filter as for the last PRACH transmission, and a power setting associated with the indicated Unified TCI state n (or m) with q_u=0, q_d=qA_new_n (or qA_new_m), and closed loop index l=0 or 1.

In one example, if the UE provides BFR MAC CE in Msg3 or MsgA of contention based random access procedure, after X symbols from the last symbol of the PDCCH reception that determines the completion of the contention based random access procedure as described in the 3GPP TS 38.321, if the UE has sent/indicated to the network qB_new_n (or qB_new_m) for n∈{1, . . . , N} and m∈{1, . . . , M}, the UE: (1) monitors PDCCH in respective Type-II CORESETs associated with CORESETPoolIndex value n−1 (or m−1), and receives PDSCH (e.g., the PDSCH scheduled by the PDCCH in the Type-II CORESETs associated with CORESETPoolIndex value n−1 or m−1) and aperiodic CSI-RS in a resource from a CSI-RS resource set with same indicated TCI state n (or m) as for the PDCCH and PDSCH, using the same antenna port quasi co-location parameters as the ones associated with the corresponding index qB_new_n (or qB_new_m), if any, (2) transmits PUCCH, PUSCH (e.g., the PUCCH and the PUSCH associated with the PDCCH in the Type-II CORESETs associated with CORESETPoolIndex value n−1 or m−1) and SRS with same indicated TCI state n (or m) as for the PUCCH and the PUSCH using a same spatial domain filter as for the last PRACH transmission, and a power setting of q_u=0, q_d=qB_new_n (or qB_new_m) and closed loop index l=0 or 1 (e.g., associated with the indicated TCI state n or m provided by TCI-State).

In such examples, X could correspond to 28, and the subcarrier spacing (SCS) for the X=28 symbols could correspond to one or more of (n∈{1, . . . , N} and m∈{1, . . . , M}): (1) the smallest of the SCS configurations of the active DL BWP for the PDCCH reception, e.g., in the Type-I and/or Type-II CORESETs associated with CORESETPoolIndex value n−1 (or m−1), and of the active DL BWP(s) of the serving cell; or (2) the smallest of the SCS configurations of all the signal(s)/channels sharing the indicated TCI state(s) n or m (e.g., provided by the higher layer parameter TCI-State_r17 and/or TCI-State).

In one example, after X symbols from a last symbol of a PDCCH reception with a DCI format scheduling a PUSCH transmission with a same HARQ process number as for the transmission of the first PUSCH MAC CE and having a toggled NDI field value, if the UE has sent/indicated to the network qA_new_n (or qA_new_m) for n∈{1, . . . , N} and m∈{1, . . . , M}, the UE: (1) monitors PDCCH in respective Type-I CORESETs associated with CORESETPoolIndex value n−1 (or m−1), and receives PDSCH (e.g., the PDSCH scheduled by the PDCCH in the Type-I CORESETs associated with CORESETPoolIndex value n−1 or m−1) and aperiodic CSI-RS in a resource from a CSI-RS resource set with same indicated TCI state n (or m) as for the PDCCH and PDSCH, using the same antenna port quasi co-location parameters as the ones associated with the corresponding index qA_new_n (or qA_new_m), if any, (2) transmits PUCCH, PUSCH (e.g., the PUCCH and the PUSCH associated with the PDCCH in the Type-I CORESETs associated with CORESETPoolIndex value n−1 or m−1) and SRS with same indicated TCI state n (or m) as for the PUCCH and the PUSCH using a same spatial domain filter as the one corresponding to qA_new_n (or qA_new_m), and a power setting associated with the indicated Unified TCI state n (or m) with q_u=0, q_d=qA_new_n (or qA_new_m), and closed loop index l=0 or 1.

In one example, after X symbols from a last symbol of a PDCCH reception with a DCI format scheduling a PUSCH transmission with a same HARQ process number as for the transmission of the first PUSCH MAC CE and having a toggled NDI field value, if the UE has sent/indicated to the network qB_new_n (or qB_new_m) for n∈{1, . . . , N} and m∈{1, . . . , M}, the UE: (1) monitors PDCCH in respective Type-II CORESETs associated with CORESETPoolIndex value n−1 (or m−1), and receives PDSCH (e.g., the PDSCH scheduled by the PDCCH in the Type-II CORESETs associated with CORESETPoolIndex value n−1 or m−1) and aperiodic CSI-RS in a resource from a CSI-RS resource set with same indicated TCI state n (or m) as for the PDCCH and PDSCH, using the same antenna port quasi co-location parameters as the ones associated with the corresponding index qB_new_n (or qB_new_m), if any, (2) transmits PUCCH, PUSCH (e.g., the PUCCH and the PUSCH associated with the PDCCH in the Type-II CORESETs associated with CORESETPoolIndex value n−1 or m−1) and SRS with same indicated TCI state n (or m) as for the PUCCH and the PUSCH using a same spatial domain filter as the one corresponding to qB_new_n (or qB_new_m), and a power setting of q_u=0, q_d=qB_new_n (or qB_new_m) and closed loop index l=0 or 1 (e.g., associated with the indicated TCI state n or m provided by TCI-State).

In such examples, X could correspond to 28, and the subcarrier spacing (SCS) for the X=28 symbols could correspond to one or more of (n∈{1, . . . , N} and m∈{1, . . . , M}): (1) the smallest of the SCS configurations of the active DL BWP for the PDCCH reception, e.g., in the Type-I and/or Type-II CORESETs associated with CORESETPoolIndex value n−1 (or m−1), and of the active DL BWP(s) of the serving cell; or (2) the smallest of the SCS configurations of all the signal(s)/channels sharing the indicated TCI state(s) n or m (e.g., provided by the higher layer parameter TCI-State_r17 and/or TCI-State).

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A user equipment (UE), comprising:
   a transceiver configured to receive information associated with a control resource set (CORESET) configured for the UE; and
   a processor operably coupled to the transceiver, the processor configured to:
      identify a first CORESET and a second CORESET having different coresetpoolindex values,
      identify, based on the information, that the first CORESET follows a unified transmission configuration indication (TCI) state;
      determine, based the first CORESET following the unified TCI state, a first set of beam failure detection (BFD) reference signals (RSs) to use; and
      monitor, via the transceiver, a beam failure instance (BFI) based on the first set of BFD RSS,
   wherein the transceiver is further configured to:
      receive information on a first set of candidate beam RSs associated with the first set of BFD RSs; and
      receive a plurality of joint downlink (DL) and uplink (UL) unified TCI states, and
   wherein the processor is further configured to, based on receiving the plurality of joint DL and UL unified TCI states, monitor via the transceiver, a physical downlink control channel (PDCCH) in the first CORESET using same antenna port quasi co-location parameters as ones associated with an index from indices of the first set of candidate beam RSs, after 28 symbols from a last symbol of a PDCCH reception with a downlink control information (DCI) format scheduling a physical uplink shared channel (PUSCH) transmission with a same hybrid automatic repeat request (HARQ) process number as for a transmission of a PUSCH with an indication of presence of the index and having a toggled new data indicator (NDI) field value.

2. The UE of claim 1, wherein:
   the information associated with the CORESET provides a unified TCI state indicating a periodic channel state information RS (CSI-RS) resource index or a synchronization signal block (SSB) index, and
   the processor is further configured to determine a BFD RS resource index for one of the set of BFD RSs based on the periodic CSI-RS resource index or the SSB index.

3. The UE of claim 1, wherein the transceiver is further configured to receive information indicating the first set of BFD RSs to use.

4. The UE of claim 1, wherein:
   the processor is further configured to increment a value of a BFI counter in response to detection of the BFI based on the first set of BFD RSs,
   the transceiver is further configured to receive a media access control-control channel element (MAC CE) or DCI indicating to update the unified TCI state,
   the processor is further configured to reset the value of the BFI counter and a BFD timer in response to reception of the MAC CE or the DCI, and
   a beam failure is declared when the value of the BFI counter reaches a maximum value before the BFD timer expires.

5. The UE of claim 4, wherein:
   the BFI counter and the BFD timer are associated respectively with a first entity identity (ID) that is associated with the first CORESET, and
   the processor is further configured to maintain a second BFI counter and a second BFD timer are associated with a second entity ID that is associated with a second CORESET.

6. The UE of claim 1, wherein the information associated with the CORESET includes a coresetpoolindex value.

7. The UE of claim 6, wherein the processor is further configured to:
   identify that the unified TCI state is a joint DL and UL TCI state, and
   in response to detection of a beam failure based on the BFI, determine, based on the first CORESET following the unified TCI state and the unified TCI state being the joint DL and UL TCI state, (i) to use a message 3 (Msg3) or message A (MsgA) of a contention-based, random-access procedure to send a beam failure recovery media access control-control channel element (MAC CE) associated with the beam failure, or (ii) to use an uplink channel associated with the second CORESET to transmit a beam failure recovery request (BFRQ) associated with the beam failure.

8. The UE of claim 1, wherein the processor is further configured to:
receive a physical downlink shared channel (PDSCH) scheduled by the PDCCH in the first CORESET using same antenna port quasi co-location parameters as ones associated with the index from indices of the first set of candidate beam RSs, and
transmit a PUSCH, a physical uplink control channel (PUCCH) and a sounding reference signal (SRS) using a same spatial domain filter as one corresponding to the index from indices of the first set of candidate beam RSs.

9. A base station (BS), comprising:
a processor; and
a transceiver operably coupled to the processor, the transceiver configured to:
transmit information associated with a control resource set (CORESET) configured for a user equipment (UE), wherein, based on the information, a first CORESET and a second CORESET having different coresetpoolindex values are configured, and the first CORESET is configured to follow a unified transmission configuration indication (TCI) state,
transmit information on a first set of beam failure detection (BFD) reference signals (RSs) associated with the first CORESET,
transmit information on a first set of candidate beam RSs associated with the first set of BFD RSS;
transmit a plurality of joint downlink (DL) and uplink (UL) unified TCI states, and
based on transmitting the plurality of joint DL and UL unified TCI states, transmit a physical downlink control channel (PDCCH) in the first CORESET using same antenna port quasi co-location parameters as ones associated with an index from indices of the first set of candidate beam RSs, after 28 symbols from a last symbol of a PDCCH reception with a downlink control information, DCI, format scheduling a physical uplink shared channel, PUSCH, transmission with a same hybrid automatic repeat request (HARQ) process number as for a transmission of a PUSCH with an indication of presence of the index and having a toggled new data indicator (NDI) field value.

10. The BS of claim 9, wherein:
the information associated with the CORESET provides a unified TCI state indicating a periodic channel state information RS (CSI-RS) resource index or a synchronization signal block (SSB) index, and
the periodic CSI-RS resource index or the SSB index indicates a BFD RS resource index for one of the first set of BFD RSs.

11. The BS of claim 9, wherein the transceiver further configured to:
transmit a physical downlink shared channel (PDSCH) scheduled by the PDCCH in the first CORESET using same antenna port quasi co-location parameters as ones associated with the index from indices of the first set of candidate beam RSs, and
receive a PUSCH, a physical uplink control channel (PUCCH) and a sounding reference signal (SRS) using a same spatial domain filter as one corresponding to the index from indices of the first set of candidate beam RSs.

12. The BS of claim 9, wherein the transceiver is further configured to transmit a media access control-control channel element (MAC CE) or DCI indicating to update the unified TCI state.

13. The BS of claim 9, wherein the information associated with the CORESET includes a coresetpoolindex value.

14. The BS of claim 13, wherein:
the unified TCI state is a joint DL and UL TCI state, and
in case that a beam failure occurs, the transceiver further configured to receive a message 3 (Msg3) or message A (MsgA) of a contention-based, random-access procedure to send a beam failure recovery media access control-control channel element (MAC CE) associated with the beam failure.

15. The BS of claim 9, wherein:
the first CORESET is associated with a first entity identity (ID),
the second CORESET is associated with a second entity ID,
the unified TCI state is a joint DL and UL TCI state, and
in case that a beam failure associated with the first entity ID occurs, the transceiver further configured to receive an uplink channel associated with the second entity ID for a beam failure recovery request (BFRQ) associated with the beam failure.

16. A method performed by a user equipment (UE), the method comprising:
receiving information associated with a control resource set (CORESET) configured for the UE;
identifying a first CORESET and a second CORESET having different coresetpoolindex values,
identifying, based on the information, that the first CORESET follows a unified transmission configuration indication (TCI) state;
determining, based on the first CORESET following the unified TCI state, a first set of beam failure detection (BFD) reference signals (RSs) to use;
monitoring a beam failure instance (BFI) based on the first set of BFD RSs;
receiving information on a first set of candidate beam RSs associated with the first set of BFD RSS;
receiving a plurality of joint downlink (DL) and uplink (UL) unified TCI states; and
based on receiving the plurality of joint DL and UL unified TCI states, monitoring a physical downlink control channel (PDCCH) in the first CORESET using same antenna port quasi co-location parameters as ones associated with an index from indices of the first set of candidate beam RSs, after 28 symbols from a last symbol of a PDCCH reception with a downlink control information (DCI) format scheduling a physical uplink shared channel (PUSCH) transmission with a same hybrid automatic repeat request (HARQ) process number as for a transmission of a PUSCH with an indication of presence of the index and having a toggled new data indicator (NDI) field value.

17. The method of claim 16, wherein:
the information associated with the CORESET provides a unified TCI state indicating a periodic channel state information RS (CSI-RS) resource index or a synchronization signal block (SSB) index, and
determining the set of BFD RSs to use further comprises determining a BFD RS resource index for one of the set of BFD RSs based on the periodic CSI-RS resource index or the SSB index.

18. The method of claim 16, wherein determining the set of BFD RSs to use further comprises receiving information indicating the first set of BFD RSs to use.

19. The method of claim 16, further comprising:
receiving a physical downlink shared channel (PDSCH) scheduled by the PDCCH in the first CORESET using same antenna port quasi co-location parameters as ones associated with the index from indices of the first set of candidate beam RSs; and
transmitting a PUSCH, a physical uplink control channel (PUCCH), and a sounding reference signal (SRS) using a same spatial domain filter as one corresponding to the index from indices of the first set of candidate beam RSs.

\* \* \* \* \*